United States Patent
Shani et al.

(10) Patent No.: US 11,662,467 B2
(45) Date of Patent: May 30, 2023

(54) MEMS MIRROR HAVING SPACED ACTUATORS

(71) Applicant: INNOVIZ TECHNOLIGIES LTD., Rosh Ha'Ayin (IL)

(72) Inventors: Matityahu Shani, Rosh Ha'Ayin (IL); David Elooz, Rosh Ha'Ayin (IL); Idan Bakish, Rosh Ha'Ayin (IL); Michael Girgel, Rosh Ha'Ayin (IL); Moshe Medina, Rosh Ha'Ayin (IL); Sason Sourani, Rosh Ha'Ayin (IL); Yair Alpern, Rosh Ha'Ayin (IL); Smadar David Raly, Rosh Ha'Ayin (IL)

(73) Assignee: INNOVIZ TECHNOLOGIES LTD., Rosh Ha'ayin (IL)

( * ) Notice: Subject to any disclaimer, the term of this patent is extended or adjusted under 35 U.S.C. 154(b) by 387 days.

(21) Appl. No.: 16/767,391

(22) PCT Filed: Nov. 28, 2018

(86) PCT No.: PCT/IB2018/001467
§ 371 (c)(1),
(2) Date: May 27, 2020

(87) PCT Pub. No.: WO2019/106429
PCT Pub. Date: Jun. 6, 2019

(65) Prior Publication Data
US 2020/0393545 A1    Dec. 17, 2020

Related U.S. Application Data

(60) Provisional application No. 62/754,055, filed on Nov. 1, 2018, provisional application No. 62/747,761, filed
(Continued)

(51) Int. Cl.
G02B 26/00    (2006.01)
G01S 17/89    (2020.01)
(Continued)

(52) U.S. Cl.
CPC .............. *G01S 17/89* (2013.01); *G01S 7/4811* (2013.01); *G01S 7/4817* (2013.01); *G01S 17/10* (2013.01);
(Continued)

(58) Field of Classification Search
CPC ...... G01S 17/89; G01S 7/4811; G01S 7/4817; G01S 17/10; G01S 17/894; G01S 17/931; G02B 26/00; G02B 26/08; G02B 26/0833
See application file for complete search history.

(56) References Cited

U.S. PATENT DOCUMENTS 7,969,637 B1 *   6/2011   Fu ........................ G02B 26/101
                                                              359/224.1
11,307,404 B2 *  4/2022   Grutzeck .............. B81B 3/0043
(Continued)

FOREIGN PATENT DOCUMENTS

EP              3032315 A2     6/2016
WO      WO 2015075222           5/2015

OTHER PUBLICATIONS

International Search Report, dated May 28, 2019, issued in International Application No. PCT/IB2018/001467 (6 pp.).

*Primary Examiner* — Jonathan M Hansen
(74) *Attorney, Agent, or Firm* — Finnegan, Henderson, Farabow, Garrett & Dunner LLP

(57) ABSTRACT

A LIDAR system including a MEMS scanning device is disclosed. The LIDAR system includes a light source, a light deflector, a sensor, and a processor. The light deflector deflects light from the light source or light received from an environment outside a vehicle in which the LIDAR system is installed. The sensor detects the light received from the light source or the environment. The processor determines a distance of one or more objects in the environment from the vehicle based on the signals from the sensor. The light deflector includes one or more actuators, which include one
(Continued)

or more actuating arms. Connectors connect the actuating arms to an MEMS mirror or other deflector. The actuating arms move when subjected to an electrical field in the form of a voltage or current. Movement of the actuating arms causes movement of the MEMS mirror or deflector causing it to deflect light.

21 Claims, 61 Drawing Sheets

Related U.S. Application Data on Oct. 19, 2018, provisional application No. 62/646,490, filed on Mar. 22, 2018, provisional application No. 62/596,261, filed on Dec. 8, 2017, provisional application No. 62/591,409, filed on Nov. 28, 2017.

(51) Int. Cl.
*G01S 17/931* (2020.01)
*G01S 17/894* (2020.01)
*G01S 7/481* (2006.01)
*G01S 17/10* (2020.01)
*G02B 26/08* (2006.01)

(52) U.S. Cl.
CPC .......... *G01S 17/894* (2020.01); *G01S 17/931* (2020.01); *G02B 26/00* (2013.01); *G02B 26/08* (2013.01); *G02B 26/0833* (2013.01)

(56) References Cited

U.S. PATENT DOCUMENTS

2002/0171901 A1* 11/2002 Bernstein .............. B81B 3/0021
359/224.1
2004/0070308 A1* 4/2004 Novack .................. H02N 1/006
310/309
2016/0299335 A1* 10/2016 Hofmann ............. G02B 26/101
2018/0306926 A1* 10/2018 LaChapelle ............... G01J 1/44

* cited by examiner

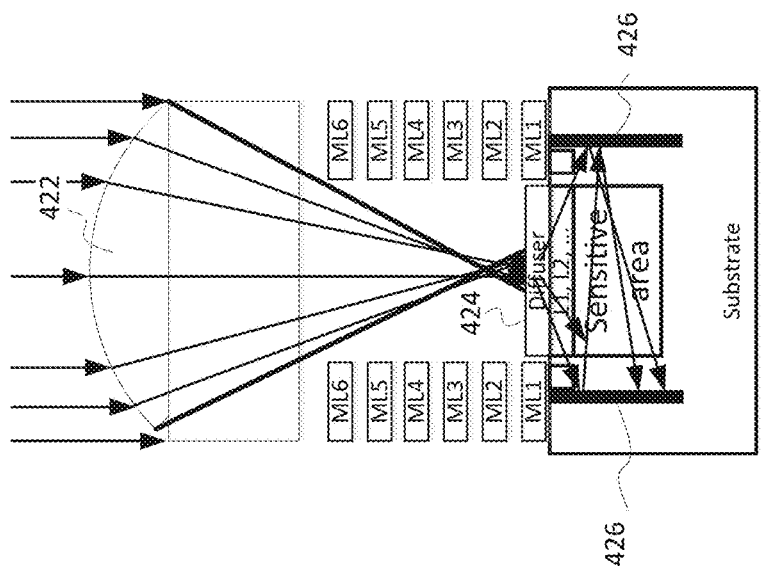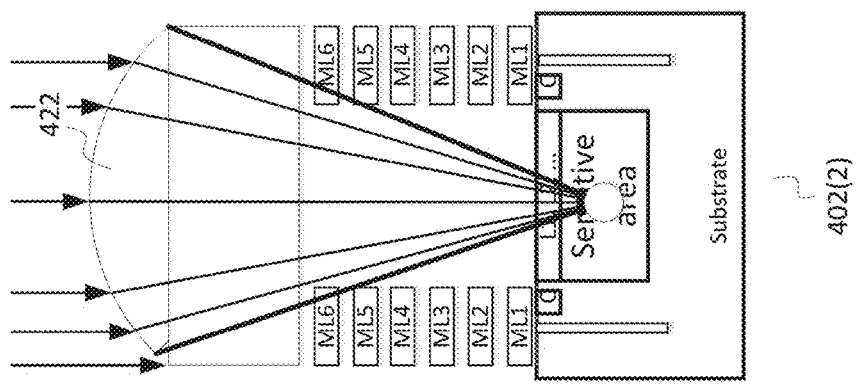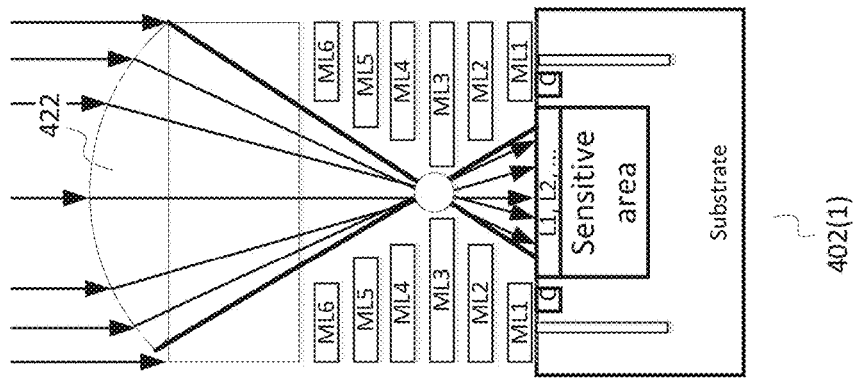
Fig. 4E

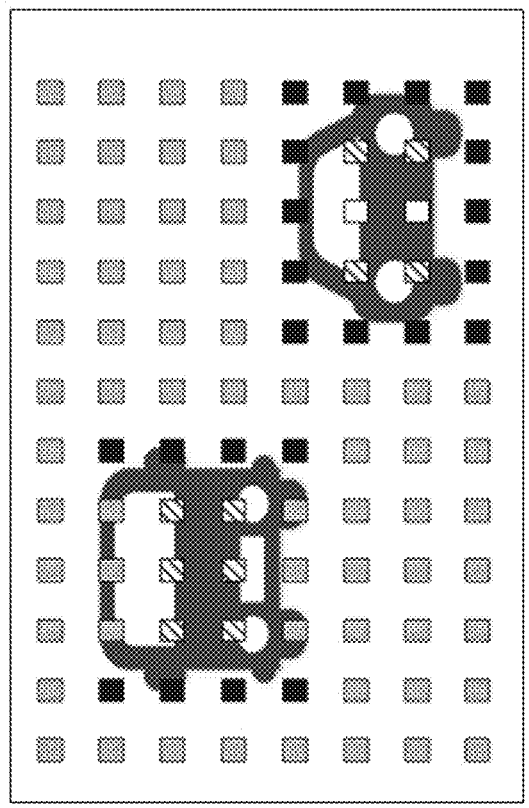
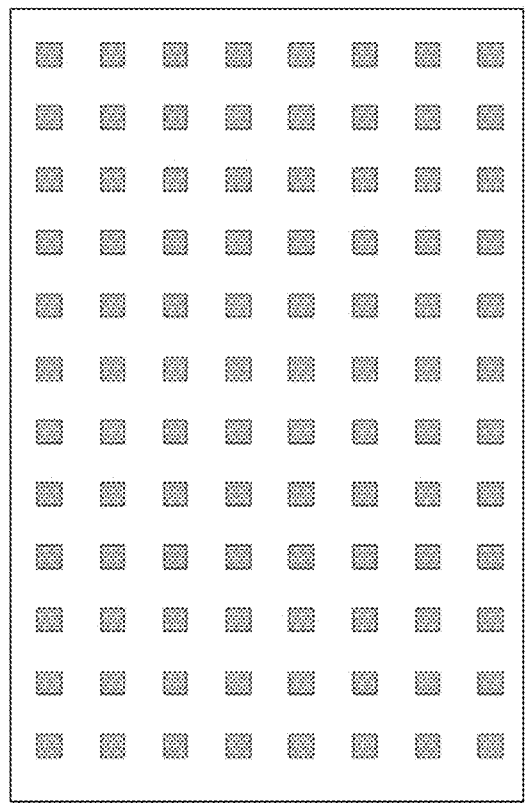
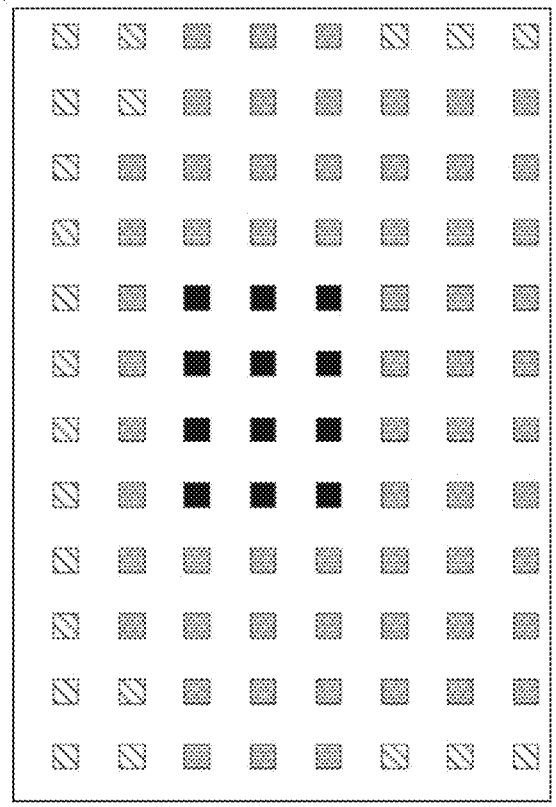
FIG. 5B

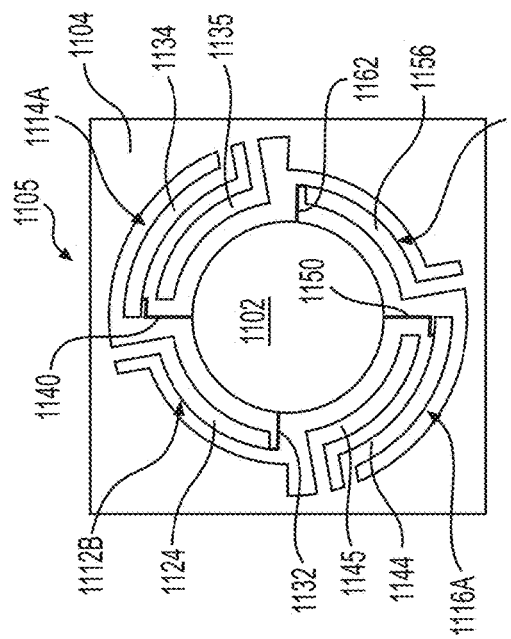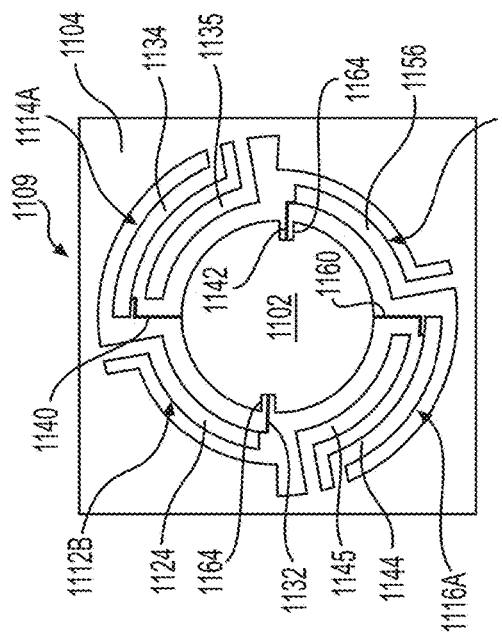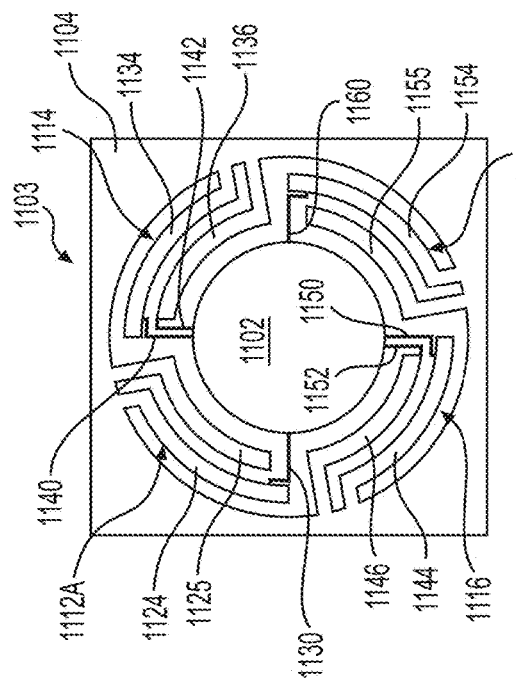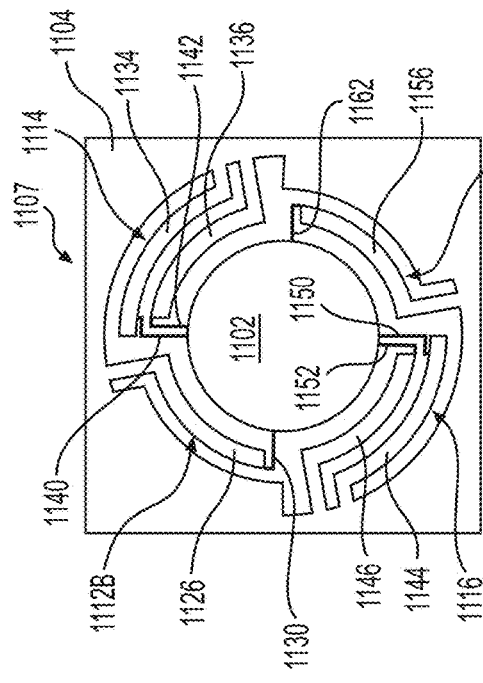

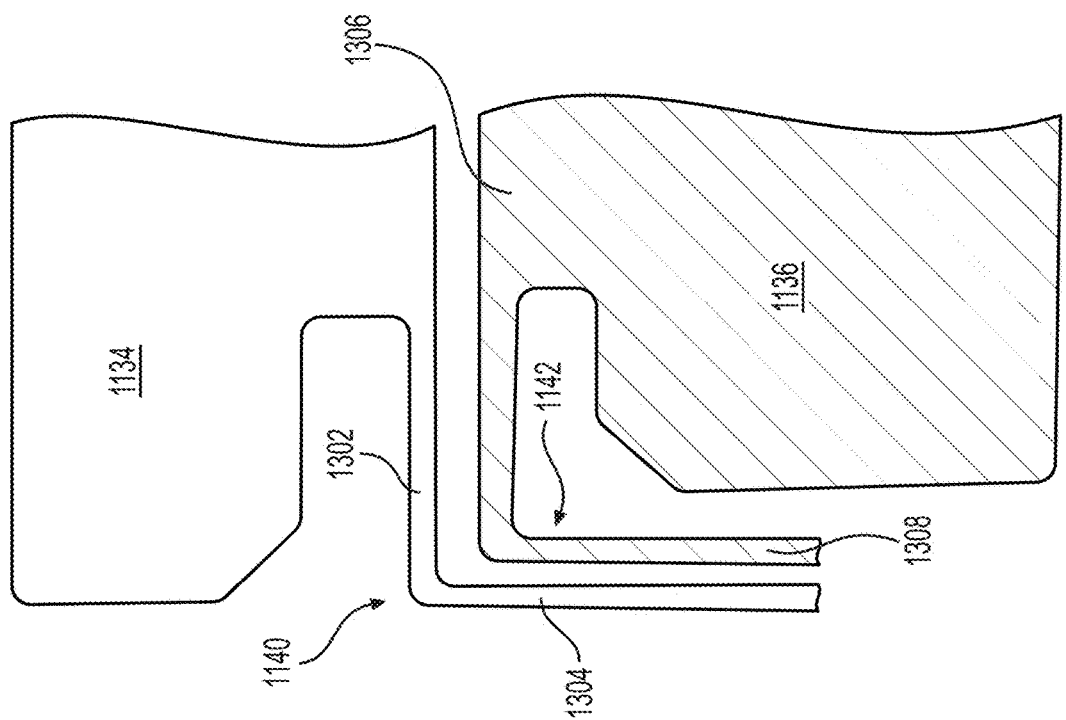
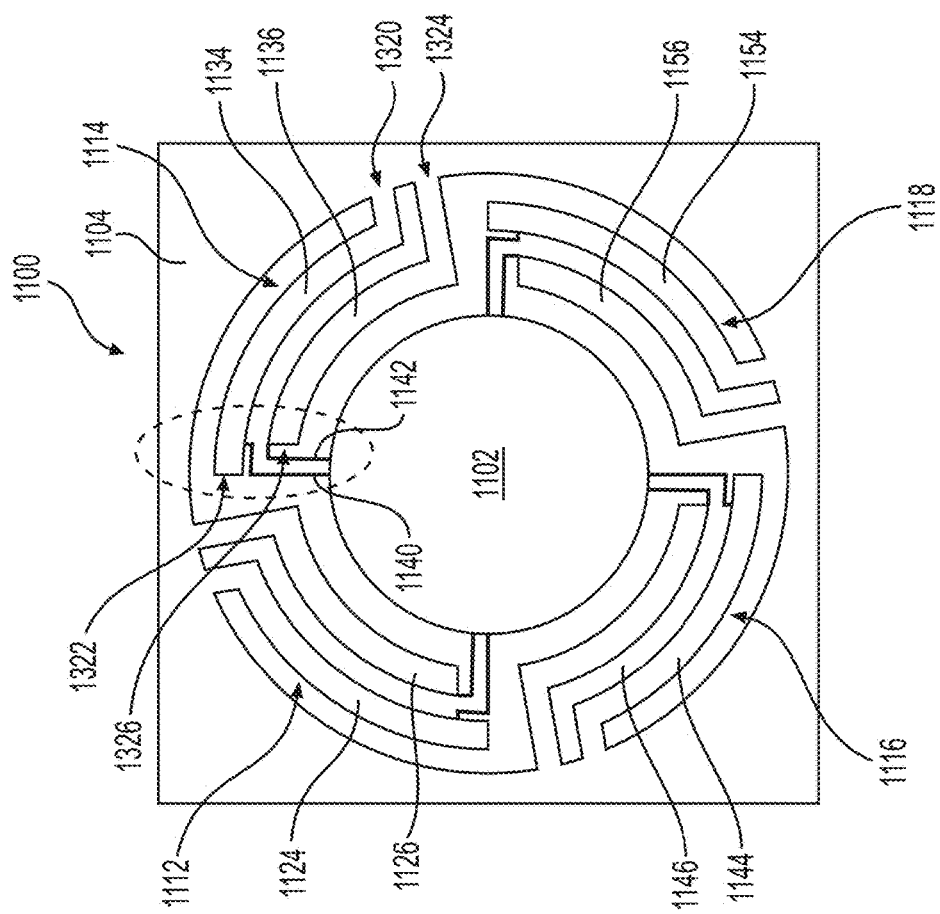
FIG. 13B
FIG. 13A

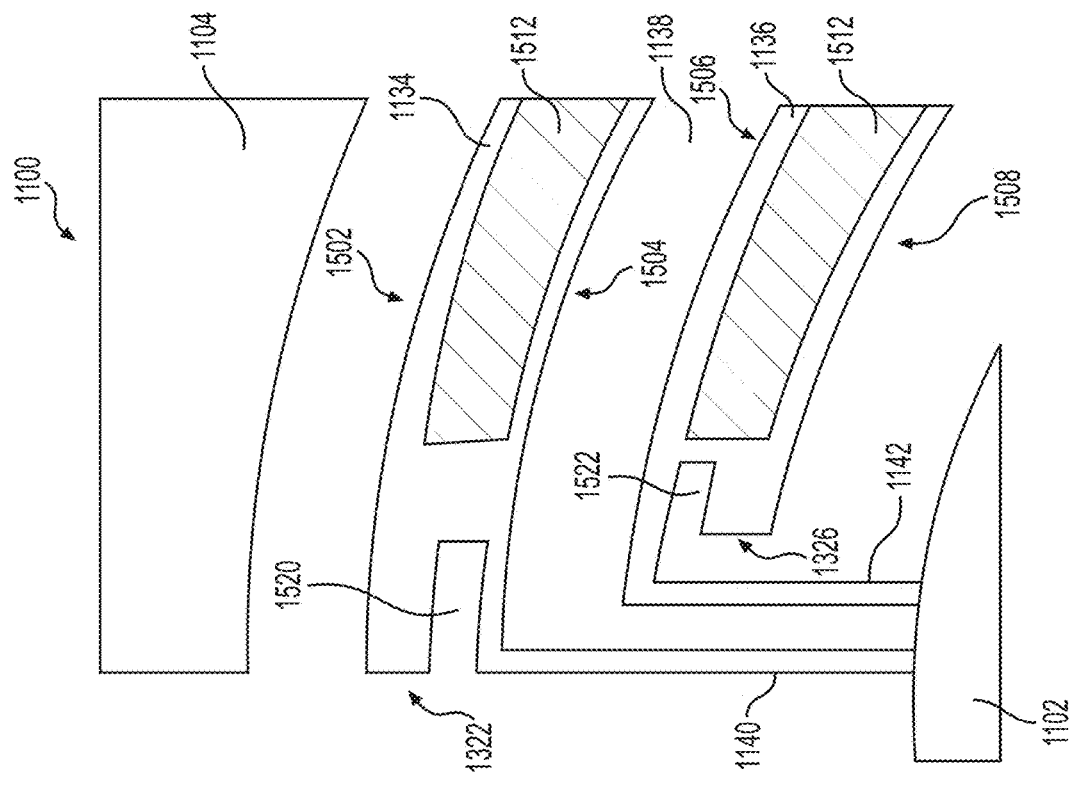
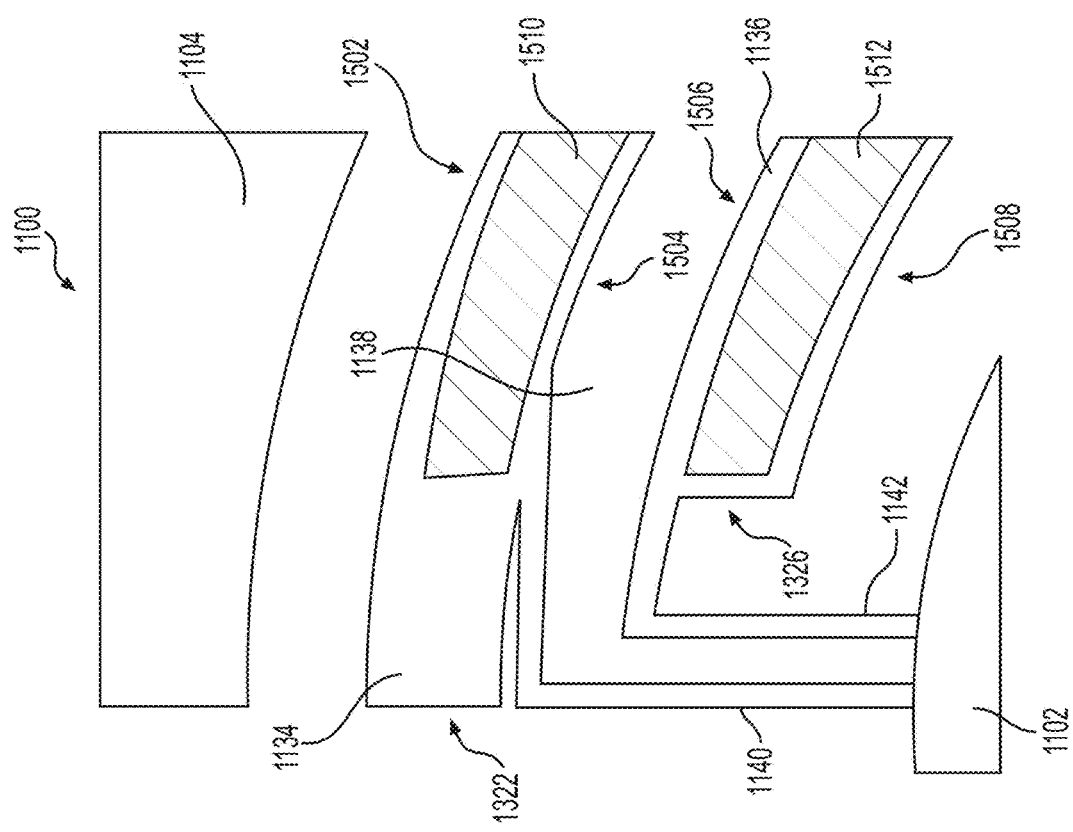

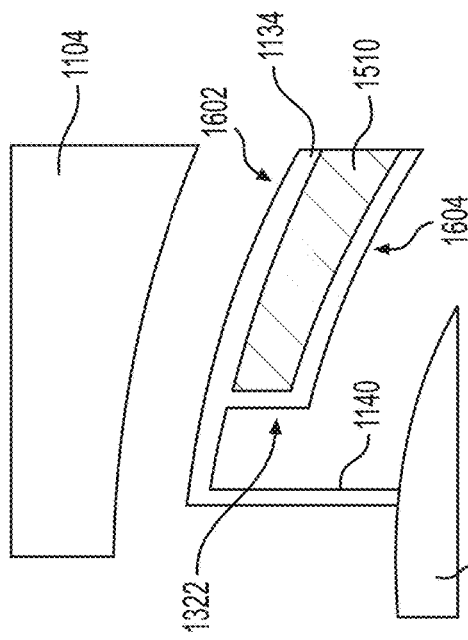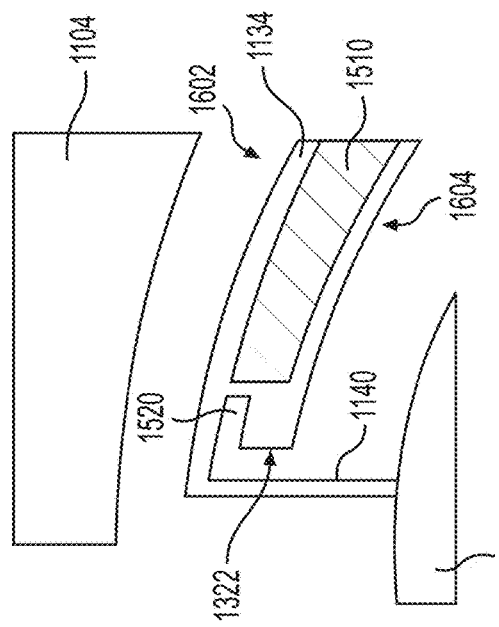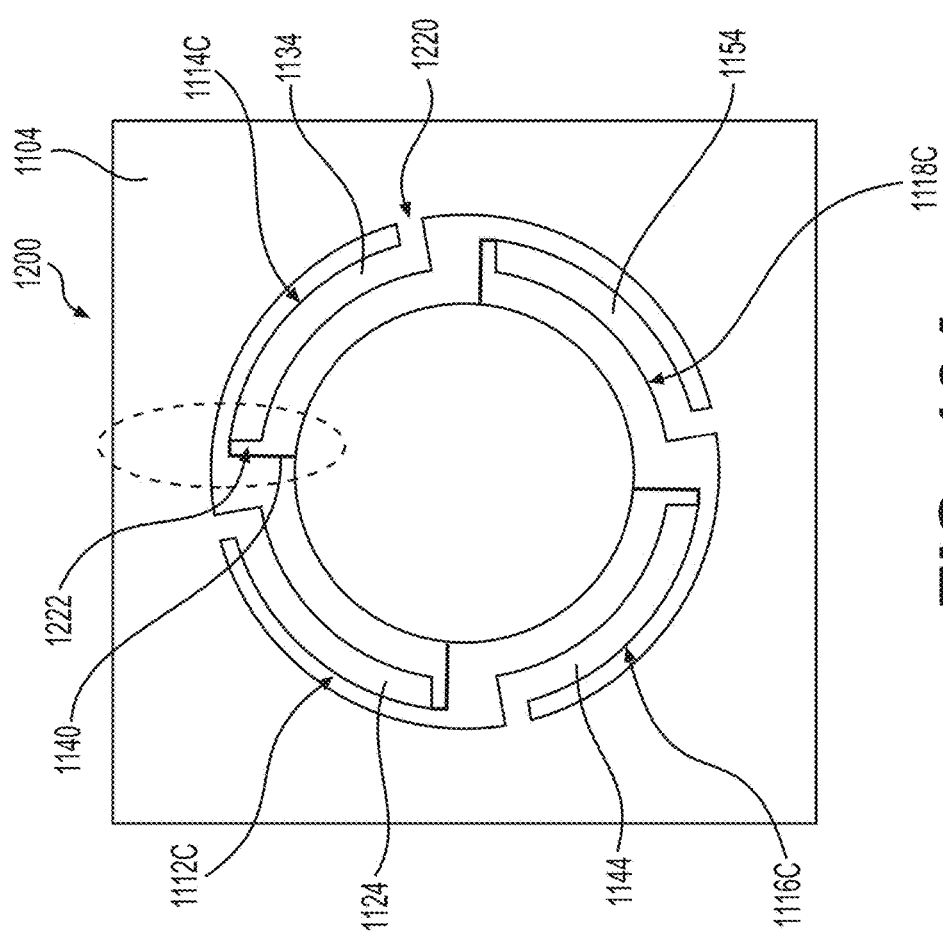

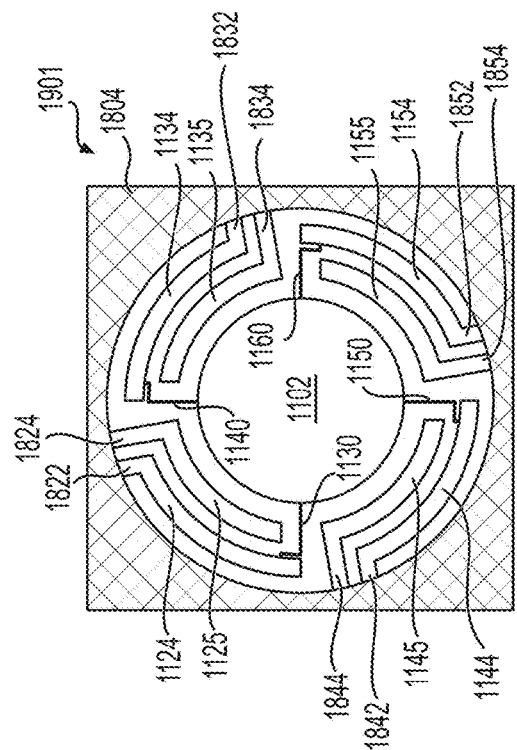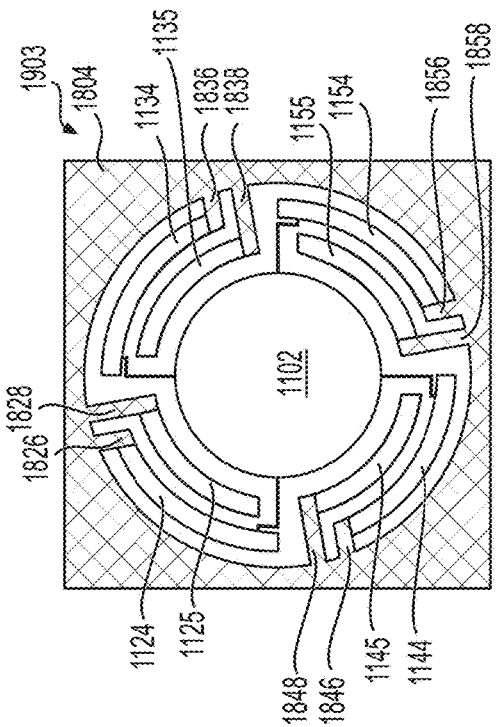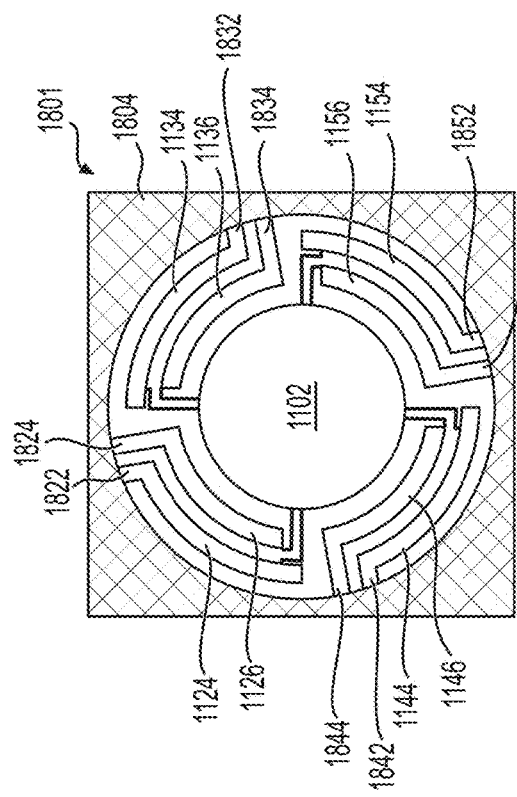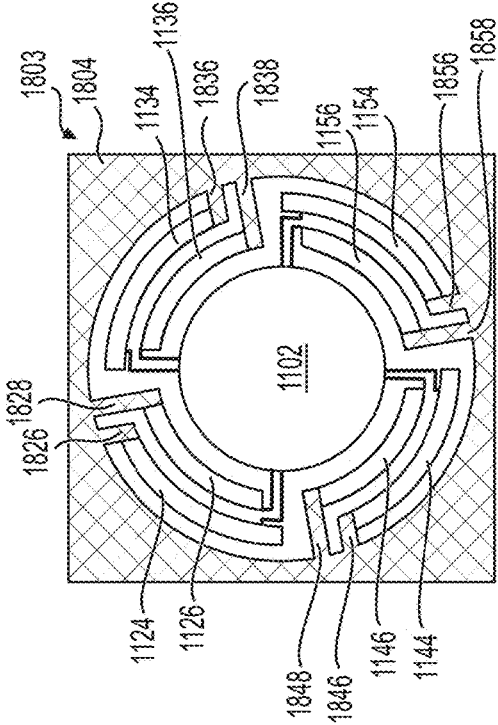
FIG. 18A
FIG. 18B
FIG. 19A
FIG. 19B

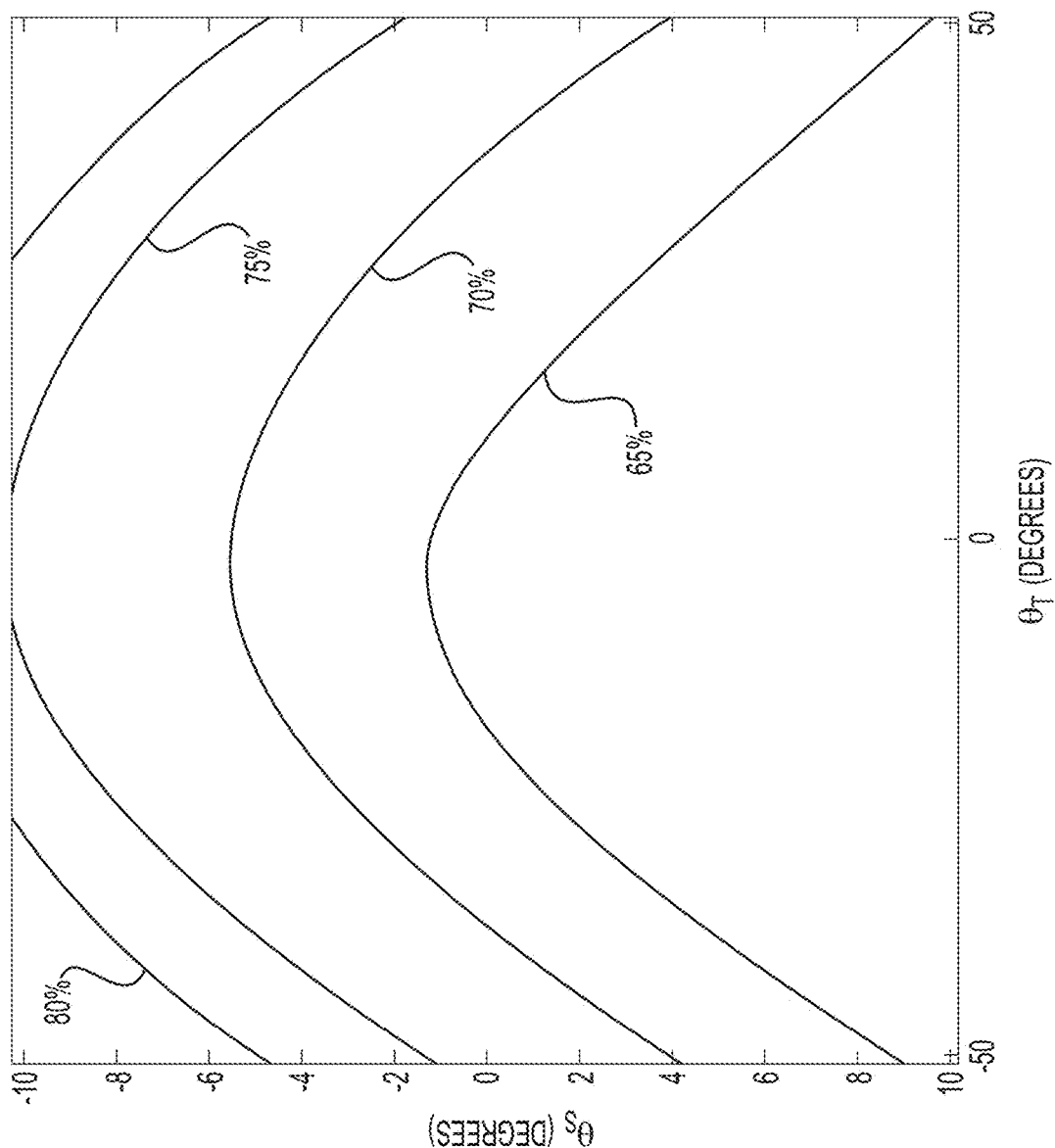

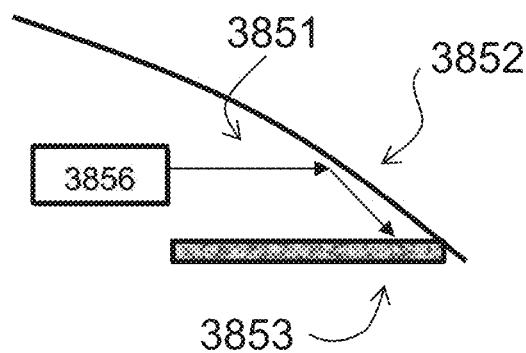
Figure 38D
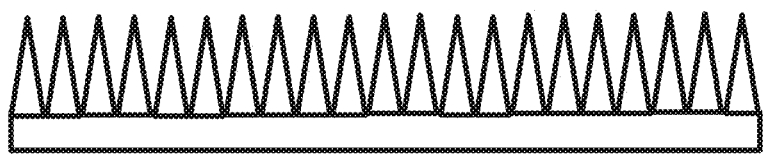
Figure 38E. Cross-section of spikes colored in light absrobing material
Figure 38F. Black coated flat surface – for example acktar
Figure 38G. sand blasted / treated surface coated with black color

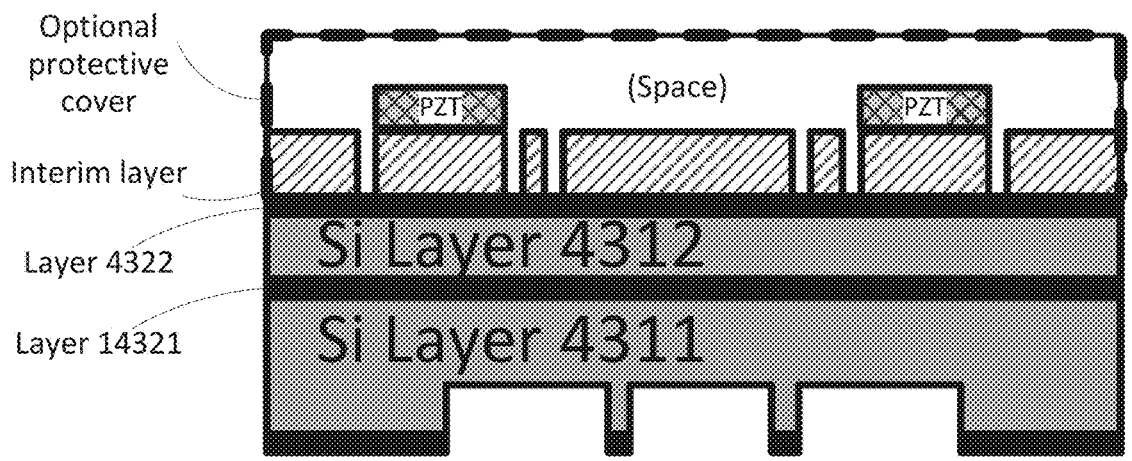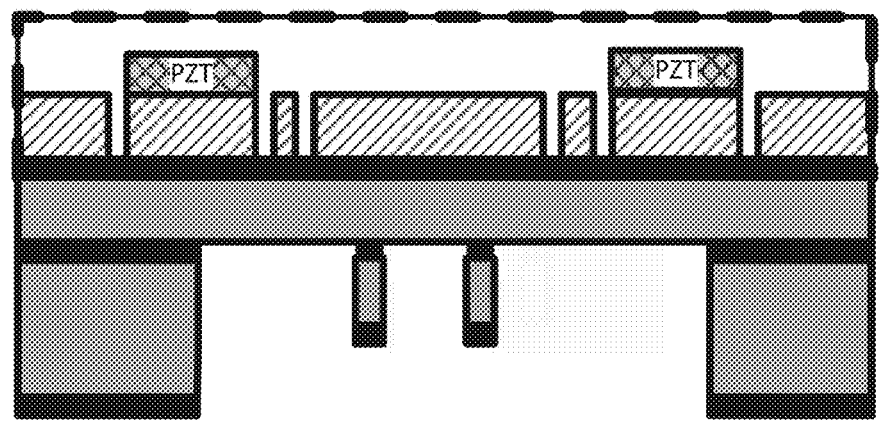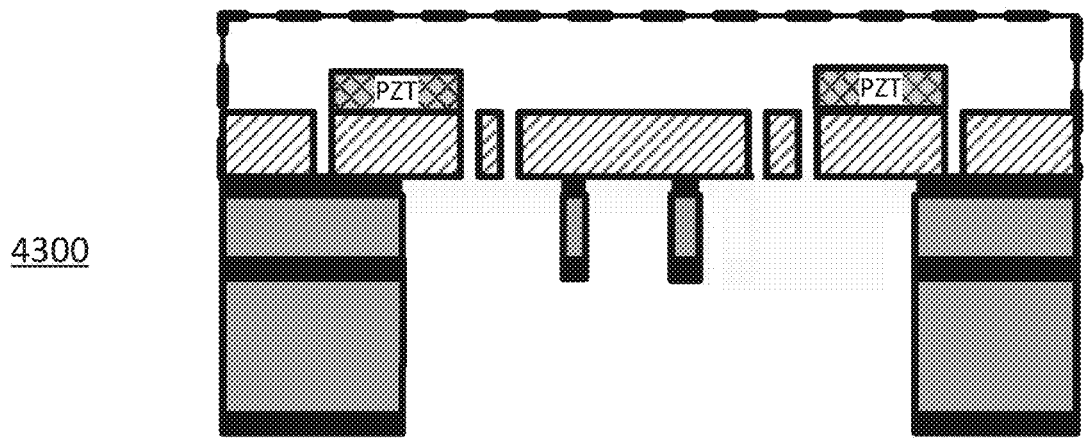
FIG. 43

MEMS MIRROR HAVING SPACED ACTUATORS

CROSS-REFERENCE TO RELATED APPLICATIONS

This application is a U.S. National Phase entry under 35 U.S.C. § 371 from PCT International Application No. PCT/IB2018/001467, filed Nov. 28, 2018, which claims benefit of priority of U.S. Provisional Patent Application No. 62/591,409, filed Nov. 28, 2017; U.S. Provisional Patent Application No. 62/596,261, filed Dec. 8, 2017; U.S. Provisional Patent Application No. 62/646,490, filed Mar. 22, 2018; U.S. Provisional Patent Application No. 62/747,761, filed Oct. 19, 2018; and U.S. Provisional Patent Application No. 62/754,055, filed Nov. 1, 2018, the contents of each of which are incorporated herein by reference in its entirety

BACKGROUND

Technical Field

The present disclosure relates generally to surveying technology for scanning a surrounding environment, and, more specifically, to systems and methods that use LIDAR technology to detect objects in the surrounding environment.

Background Information

With the advent of driver assist systems and autonomous vehicles, automobiles need to be equipped with systems capable of reliably sensing and interpreting their surroundings, including identifying obstacles, hazards, objects, and other physical parameters that might impact navigation of the vehicle. To this end, a number of differing technologies have been suggested including radar, LIDAR, camera-based systems, operating alone or in a redundant manner.

One consideration with driver assistance systems and autonomous vehicles is an ability of the system to determine surroundings across different conditions including, rain, fog, darkness, bright light, and snow. A light detection and ranging system, (LIDAR a/k/a LADAR) is an example of technology that can work well in differing conditions, by measuring distances to objects by illuminating objects with light and measuring the reflected pulses with a sensor. A laser is one example of a light source that can be used in a LIDAR system. As with any sensing system, in order for a LIDAR-based sensing system to be fully adopted by the automotive industry, the system should provide reliable data enabling detection of far-away objects. Currently, however, the maximum illumination power of LIDAR systems is limited by the need to make the LIDAR systems eye-safe (i.e., so that they will not damage the human eye which can occur when a projected light emission is absorbed in the eye's cornea and lens, causing thermal damage to the retina.)

The systems and methods of the present disclosure are directed towards improving performance of LIDAR systems while complying with eye safety regulations.

BRIEF DESCRIPTION OF THE DRAWINGS

The accompanying drawings, which are incorporated in and constitute a part of this disclosure, illustrate various disclosed embodiments. In the drawings:

FIGS. 4A-4E are diagrams illustrating different configurations of sensing units in accordance with some embodiments of the present disclosure.

FIG. 5B includes three example diagrams illustrating emission scheme in a single frame-time for the whole field of view.

FIGS. 11A-11F are illustrations of exemplary MEMS mirror assemblies, consistent with disclosed embodiments.

FIG. 13A is another illustration of an exemplary MEMS mirror assembly consistent with disclosed embodiments.

FIG. 13B is an illustration of L-shaped connectors used to connect the MEMS mirror with one or more actuators consistent with disclosed embodiments.

FIGS. 15A and 15B are illustrations of the attachment locations for attaching connectors with one or more actuating arms consistent with disclosed embodiments.

FIG. 16A is another illustration of an exemplary MEMS mirror assembly consistent with disclosed embodiments.

FIGS. 16B and 16C are additional illustrations of the attachment locations for attaching connectors with one or more actuating arms consistent with disclosed embodiments.

FIGS. 18A, 18B, 19A, 19B, 20A, 20B, 21A, 21B, 22A, 22B, 23A, and 23B are illustrations of exemplary MEMS mirror assemblies with different types of interconnects for connecting the actuating arms to the frame consistent with disclosed embodiments.

FIG. 33 illustrates an example of changes in transmission levels of light in the field of view for a slanted window.

FIGS. 38B-38G illustrate various configurations of structures for addressing laser light reflections into a vehicle.

FIG. 43 illustrates a MEMS system, in accordance with examples of the presently disclosed subject matter.

SUMMARY

Figure 1A:
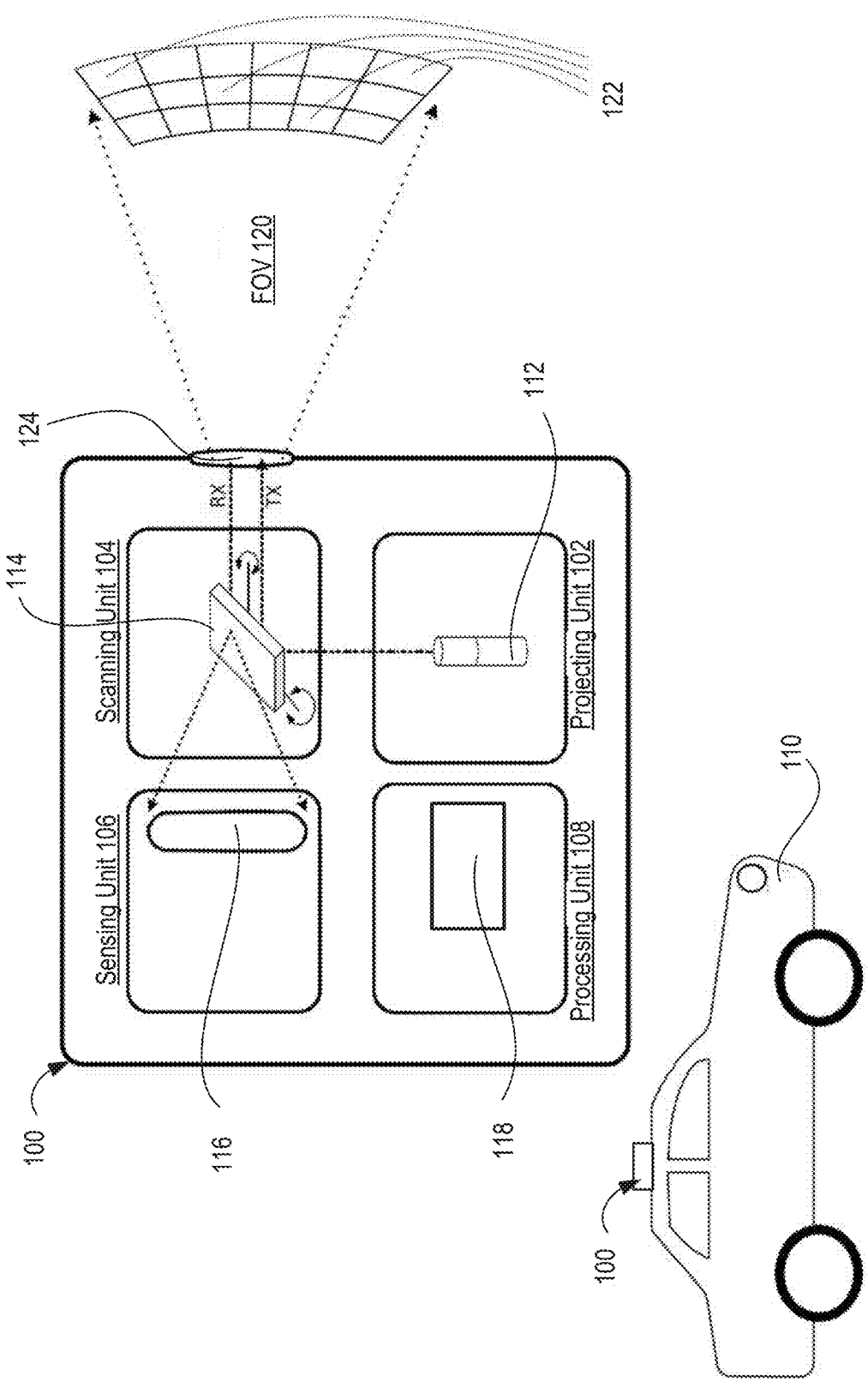
FIG. 1A is a diagram illustrating an exemplary LIDAR system consistent with disclosed embodiments.

In one aspect, a MEMS scanning device may include: a movable MEMS mirror configured to pivot about at least one axis; at least one actuator configured to cause pivoting of the movable MEMS mirror about the at least one axis in a first direction; at least one spring configured to cause pivoting of the movable MEMS mirror about the at least one axis in a second direction different from the first direction. The actuator may include a first actuating arm; a second actuating arm; and a gap between the first actuating arm and the second actuating arm. The first actuating arm and the second actuating arm may lie adjacent each other, at least partially separated from each other by the gap. The first actuating arm and the second actuating arm may be configured to be actuated simultaneously to thereby enable exertion of a combined mechanical force on the at least one spring to pivot the movable MEMS mirror about the at least one axis.

In another aspect, a LIDAR system may include: a light source configured to project light for illuminating an object in an environment external to the LIDAR system; a scanning unit configured to deflect light from the light source in order to scan at least part of the environment. The scanning unit may include: a movable MEMS mirror configured to pivot about at least one axis; at least one actuator configured to cause pivoting of the movable MEMS mirror about the at least one axis in a first direction; and at least one spring configured to cause pivoting of the movable MEMS mirror about the at least one axis in a second direction different from the first direction. The actuator may include a first actuating arm; a second actuating arm; and a gap between the first actuating arm and the second actuating arm. The scanning unit may also include at least one sensor within the at least one housing configured to detect reflections of the projected light; and at least one processor configured to: issue an instruction to the at least one actuator causing the actuator to deflect from an initial position; and; and determine a distance between the vehicle and the object based on signals received from the at least one sensor.

In one aspect, a MEMS scanning device may include a frame, a movable MEMS mirror configured to be rotated about at least one rotational axis, and at least one connector connected to the movable MEMS mirror. The connector may be configured to facilitate rotation of the movable MEMS mirror about the at least one rotational axis. The MEMS scanning device may also include an elongated actuator configured to apply mechanical force on the at least one connector. The elongated actuator may have a base end connected to the frame and a distal end connected to the at least one connector. A width of the base end of the actuator may be wider than the distal end of the actuator.

In one aspect, a light deflector for a LIDAR system located within a vehicle is disclosed. The light deflector may include a windshield optical interface configured for location within a vehicle and along an optical path of the LIDAR system. The optical path may extend through a sloped windshield of the vehicle. An optical angle of the optical path before passing through the sloped windshield may be oriented at a first angle with respect to an adjacent surface of the sloped windshield. The LIDAR system may also include a connector for orienting a LIDAR emitting element to direct light through the windshield optical interface and along the optical path. The optical interface may be configured to alter the optical angle of the optical path from the first angle to a second angle. A ratio of greater than about 0.3 between light refracted through the windshield and light reflected from the windshield may be obtained at the second angle.

In another aspect, a LIDAR system is disclosed. The LIDAR system may include a light source configured to project light for illuminating an object in an environment external to the LIDAR system. The LIDAR system may also include a windshield optical interface configured for location within a vehicle and along an optical path of the LIDAR system. The optical path may extend through a sloped windshield of the vehicle. An optical angle of the optical path before passing through the sloped windshield may be oriented at a first angle with respect to an adjacent surface of the sloped windshield. Further, the LIDAR system may include a scanning unit configured to deflect light from the light source in order to scan at least part of the environment. The scanning unit may include a movable MEMS mirror configured to pivot about at least one axis. The scanning unit may also include a connector configured to orient the MEMS mirror to direct light through the windshield optical interface and along the optical path. The LIDAR System may also include at least one sensor configured to detect light received through the windshield optical interface. In addition, the LIDAR system may include at least one processor configured to determine a distance between the vehicle and the object based on signals received from the at least one sensor.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Terms Definitions

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g. number of meters, number of inches, number of kilometers, number of millimeters), a number of arbitrary length units (e.g. number of LIDAR system lengths), a ratio between the distance to another length (e.g. a ratio to a length of an object detected in a field of view of the LIDAR system), an amount of time (e.g. given as standard unit, arbitrary units or ratio, for example, the time it takes light to travel between the tangible objects), one or more locations (e.g. specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g. by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g. location information (e.g. relative positions) between the projection location, the detection location of the signal (especially if distanced from one another), and more.

In some embodiments, the LIDAR system may be used for detecting a plurality of objects in an environment of the LIDAR system. The term "detecting an object in an environment of the LIDAR system" broadly includes generating information which is indicative of an object that reflected light toward a detector associated with the LIDAR system. If more than one object is detected by the LIDAR system, the generated information pertaining to different objects may be interconnected, for example a car is driving on a road, a bird is sitting on the tree, a man touches a bicycle, a van moves towards a building. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25°, 50°, 100°, 180°, etc.), and up to a predefined vertical elevation (e.g., ±10°, ±20°, +40°-20°, ±90° or 0°-90°).

As used herein, the term "detecting an object" may broadly refer to determining an existence of the object (e.g., an object may exist in a certain direction with respect to the LIDAR system and/or to another reference location, or an object may exist in a certain spatial volume). Additionally or alternatively, the term "detecting an object" may refer to determining a distance between the object and another location (e.g. a location of the LIDAR system, a location on earth, or a location of another object). Additionally or alternatively, the term "detecting an object" may refer to identifying the object (e.g. classifying a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with 0.1°×0.1° or 0.3°×0.3° of the field of view.

Consistent with the present disclosure, the term "object" broadly includes a finite composition of matter that may reflect light from at least a portion thereof. For example, an object may be at least partially solid (e.g. cars, trees); at least partially liquid (e.g. puddles on the road, rain); at least partly gaseous (e.g. fumes, clouds); made from a multitude of distinct particles (e.g. sand storm, fog, spray); and may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side opposing the LIDAR system will be detected); in other cases, light may be projected on only part of the object (e.g. laser beam projected onto a road or a building); in other cases, the object may be partly blocked by another object between the LIDAR system and the detected object; in other cases, the LIDAR's sensor may only detects light reflected from a portion of the object, e.g., because ambient light or other interferences interfere with detection of some portions of the object.

Consistent with the present disclosure, a LIDAR system may be configured to detect objects by scanning the environment of LIDAR system. The term "scanning the environment of LIDAR system" broadly includes illuminating the field of view or a portion of the field of view of the LIDAR system. In one example, scanning the environment of LIDAR system may be achieved by moving or pivoting a light deflector to deflect light in differing directions toward different parts of the field of view. In another example, scanning the environment of LIDAR system may be achieved by changing a positioning (i.e. location and/or orientation) of a sensor with respect to the field of view. In another example, scanning the environment of LIDAR system may be achieved by changing a positioning (i.e. location and/or orientation) of a light source with respect to the field of view. In yet another example, scanning the environment of LIDAR system may be achieved by changing the positions of at least one light source and of at least one sensor to move rigidly respect to the field of view (i.e. the relative distance and orientation of the at least one sensor and of the at least one light source remains).

As used herein the term "field of view of the LIDAR system" may broadly include an extent of the observable environment of LIDAR system in which objects may be detected. It is noted that the field of view (FOV) of the LIDAR system may be affected by various conditions such as but not limited to: an orientation of the LIDAR system (e.g. is the direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The field of view of LIDAR system may be defined, for example, by a solid angle (e.g. defined using $\phi$, $\theta$ angles, in which $\phi$ and $\theta$ are angles defined in perpendicular planes, e.g. with respect to symmetry axes of the LIDAR system and/or its FOV). In one example, the field of view may also be defined within a certain range (e.g. up to 200 m).

Similarly, the term "instantaneous field of view" may broadly include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, LIDAR system may be configured to scan scene in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g. earth, roads, grass, sidewalks, road surface marking), sky, man-made objects (e.g. vehicles, buildings, signs), vegetation, people, animals, light projecting elements (e.g. flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g. a triangle mesh). The terms "point cloud" and "point cloud model" are widely known in the art, and should be construed to include a set of data points located spatially in some coordinate system (i.e., having an identifiable location in a space described by a respective coordinate system). The term "point cloud point" refer to a point in space (which may be dimensionless, or a miniature cellular space, e.g. 1 cm3), and whose location may be described by the point cloud model using a set of coordinates (e.g. (X,Y,Z), (r,$\phi$,$\theta$)). By way of example only, the point cloud model may store additional information for some or all of its points (e.g. color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes. Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR system may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR system may include at least one scanning unit with at least one light deflector configured to deflect light from the light source in order to scan the field of view. The term "light deflector" broadly includes any mechanism or module which is configured to make light deviate from its original path; for example, a mirror, a prism, controllable lens, a mechanical mirror, mechanical scanning polygons, active diffraction (e.g. controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g. a mirror), at least one refracting element (e.g. a prism, a lens), and so on. In one example, the light deflector may be movable, to cause light deviate to differing degrees (e.g. discrete degrees, or over a continuous span of degrees). The light deflector may optionally be controllable in different ways (e.g. deflect to a degree a, change deflection angle by $\Delta\alpha$, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., $\theta$ and $\phi$ coordinates). Alternatively or in addition, the light deflector may optionally be operable to change an angle of deflection between predetermined settings (e.g. along a predefined scanning route) or otherwise. With respect the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A-3C.

Disclosed embodiments may involve pivoting the light deflector in order to scan the field of view. As used herein the term "pivoting" broadly includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementation, the MEMS mirror may move by actuation of a plurality of benders connected to the mirror, the mirror may experience some spatial translation in addition to rotation. Nevertheless, such a mirror may be designed to rotate about a substantially fixed axis, and therefore consistent with the present disclosure it considered to be pivoted. In other embodiments, some types of light deflectors (e.g. non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") broadly refers to the location or position in space where at least one controlled component of the light deflector is situated at an instantaneous point in time, or over a short span of time. In one embodiment, the instantaneous position of light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g. mirror, prism), usually to a limited degree with respect to the maximal degree of change during a scanning of the field of view. For example, a scanning of the entire the field of view of the LIDAR system may include changing deflection of light over a span of 30°, and the instantaneous position of the at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR system may include at least one sensing unit with at least one sensor configured to detect reflections from objects in the field of view. The term "sensor" broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g. atmospheric temperature, rain, etc.).

In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 µm and about 50 µm, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR system may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store information representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIGS. 5A, 5B, and 6.

System Overview

FIG. 1A illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and water craft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

It should be noted that LIDAR system 100 or any of its components may be used together with any of the example embodiments and methods disclosed herein. Further, while some aspects of LIDAR system 100 are described relative to an exemplary vehicle-based LIDAR platform, LIDAR system 100, any of its components, or any of the processes described herein may be applicable to LIDAR systems of other platform types.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflection signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1A, LIDAR system 100 may include a single scanning unit 104 mounted on a roof of vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting a multiple LIDAR systems 100 on vehicle 110, each with a single scanning unit 104. It is nevertheless noted, that the one or more LIDAR systems 100 do not have to provide a complete 360° field of view, and that narrower fields of view may be useful in some situations. For example, vehicle 110 may require a first LIDAR system 100 having a field of view of 75° looking ahead of the vehicle, and possibly a second LIDAR system 100 with a similar FOV looking backward (optionally with a lower detection range). It is also noted that different vertical field of view angles may also be implemented.

Figure 1B:
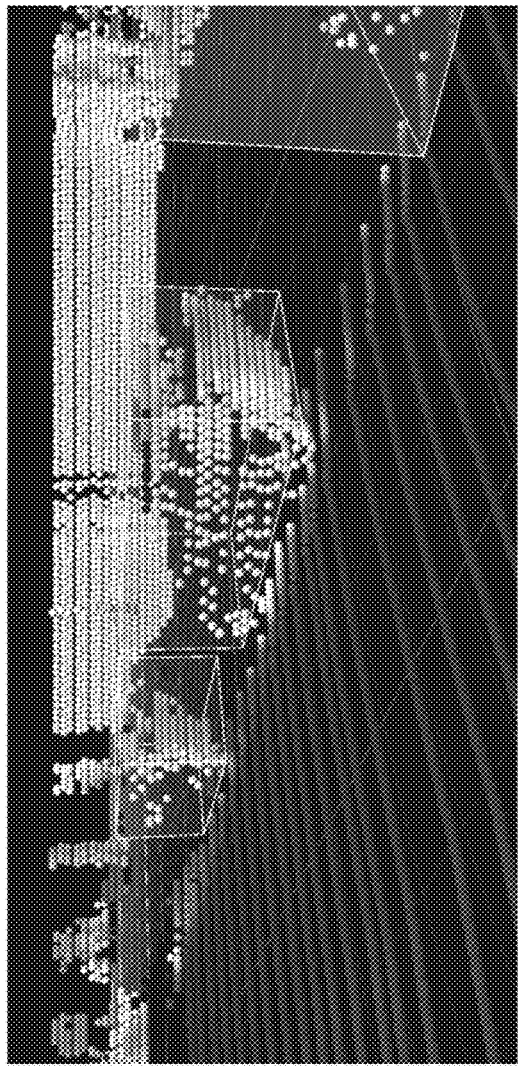
FIG. 1B is an image showing an exemplary output of single scanning cycle of a LIDAR system mounted on a vehicle consistent with disclosed embodiments.

FIG. 1B is an image showing an exemplary output from a single scanning cycle of LIDAR system 100 mounted on vehicle 110 consistent with disclosed embodiments. In this example, scanning unit 104 is incorporated into a right headlight assembly of vehicle 110. Every gray dot in the image corresponds to a location in the environment around vehicle 110 determined from reflections detected by sensing unit 106. In addition to location, each gray dot may also be associated with different types of information, for example, intensity (e.g., how much light returns back from that location), reflectivity, proximity to other dots, and more. In one embodiment, LIDAR system 100 may generate a plurality of point-cloud data entries from detected reflections of multiple scanning cycles of the field of view to enable, for example, determining a point cloud model of the environment around vehicle 110.

Figure 1C:
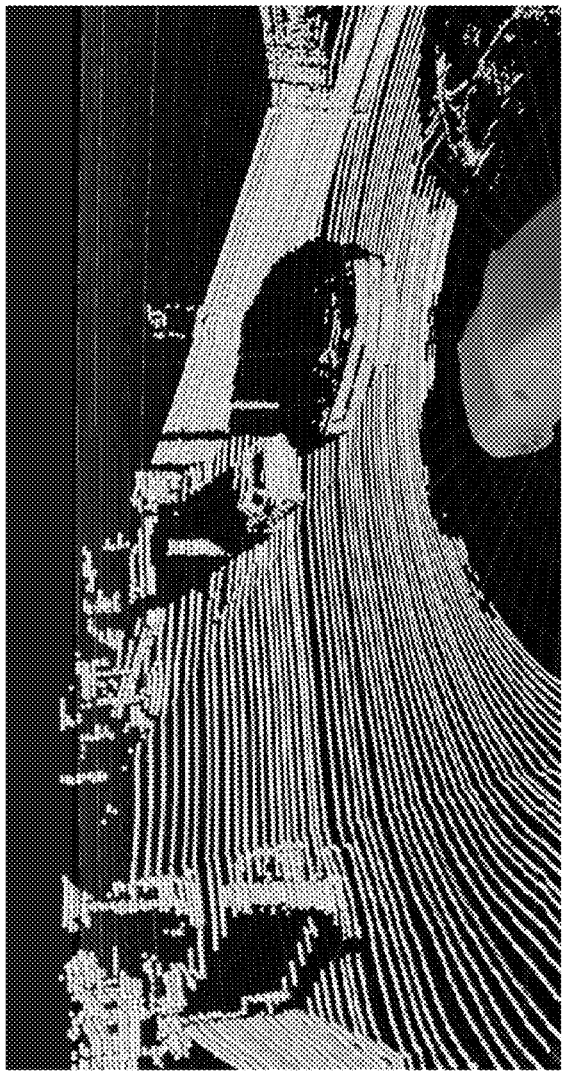
FIG. 1C is another image showing a representation of a point cloud model determined from output of a LIDAR system consistent with disclosed embodiments.

FIG. 1C is an image showing a representation of the point cloud model determined from the output of LIDAR system 100. Consistent with disclosed embodiments, by processing the generated point-cloud data entries of the environment around vehicle 110, a surround-view image may be produced from the point cloud model. In one embodiment, the point cloud model may be provided to a feature extraction module, which processes the point cloud information to identify a plurality of features. Each feature may include data about different aspects of the point cloud and/or of objects in the environment around vehicle 110 (e.g. cars, trees, people, and roads). Features may have the same resolution of the point cloud model (i.e. having the same number of data points, optionally arranged into similar sized 2D arrays), or may have different resolutions. The features may be stored in any kind of data structure (e.g. raster, vector, 2D array, 1D array). In addition, virtual features, such as a representation of vehicle 110, border lines, or bounding boxes separating regions or objects in the image (e.g., as depicted in FIG. 1B), and icons representing one or more identified objects, may be overlaid on the representation of the point cloud model to form the final surround-view image. For example, a symbol of vehicle 110 may be overlaid at a center of the surround-view image.

The Projecting Unit

Figure 2A:
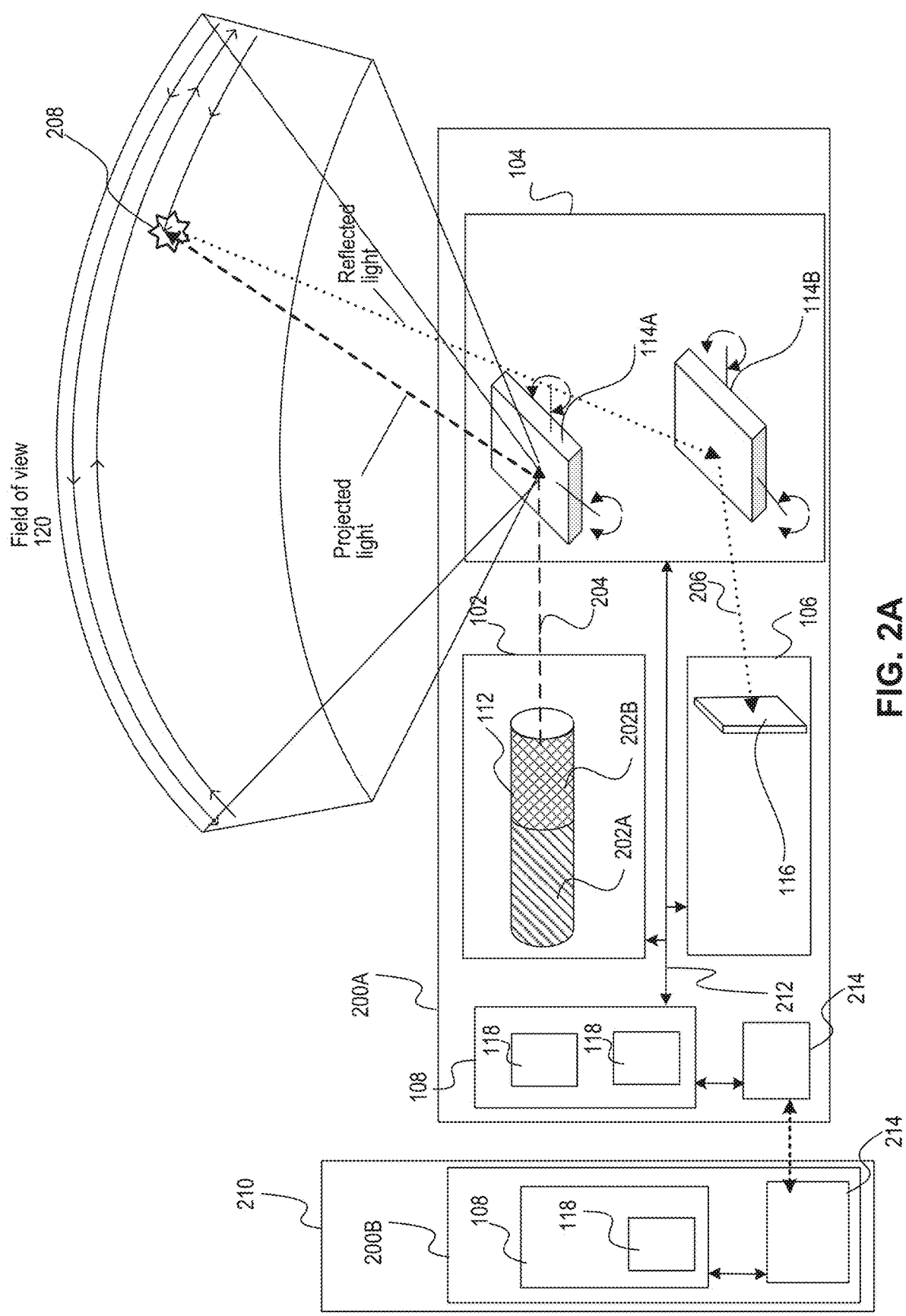
FIGS. 2A-2G are diagrams illustrating different configurations of projecting units in accordance with some embodiments of the present disclosure.
Figure 2B:
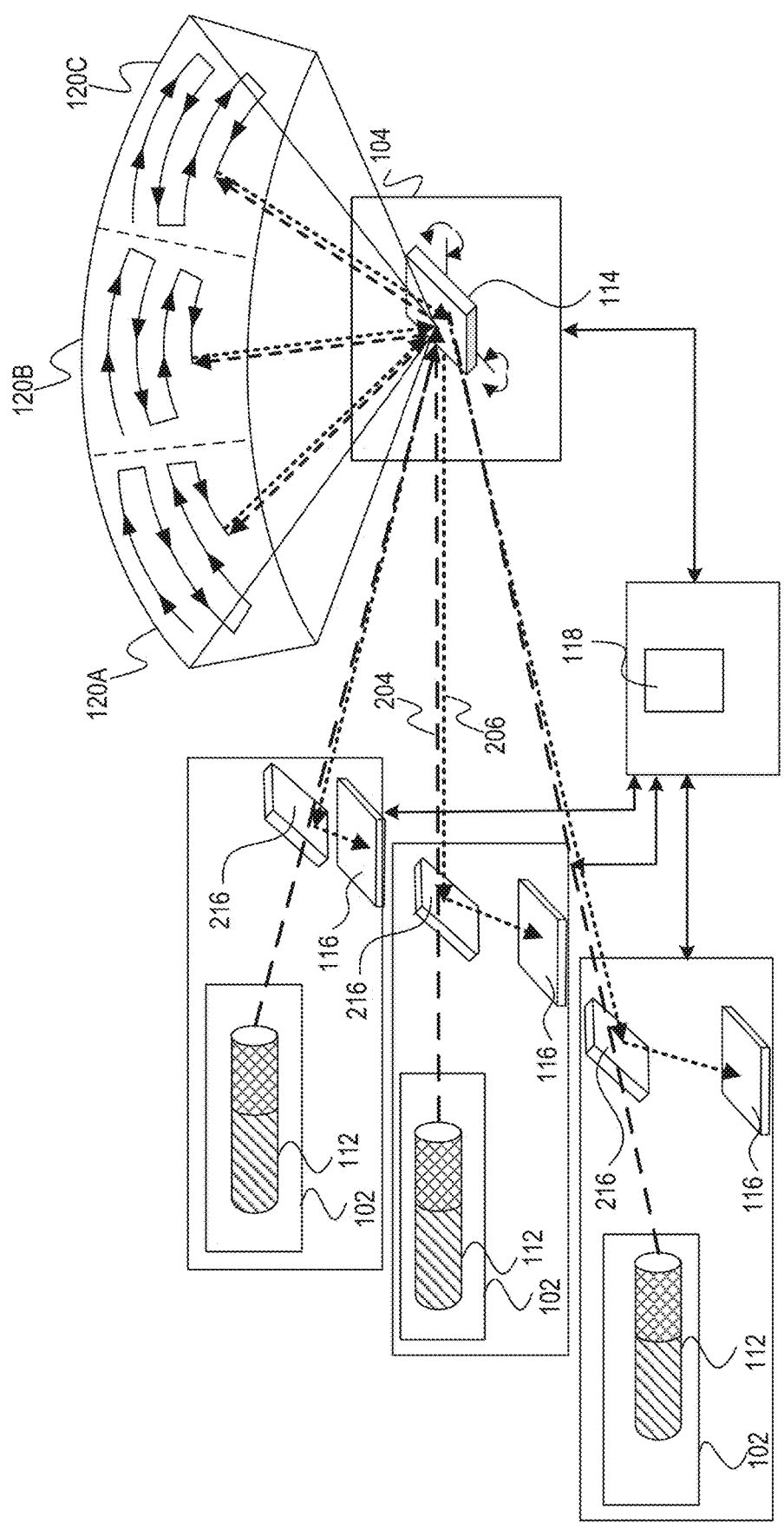
Figure 2C:
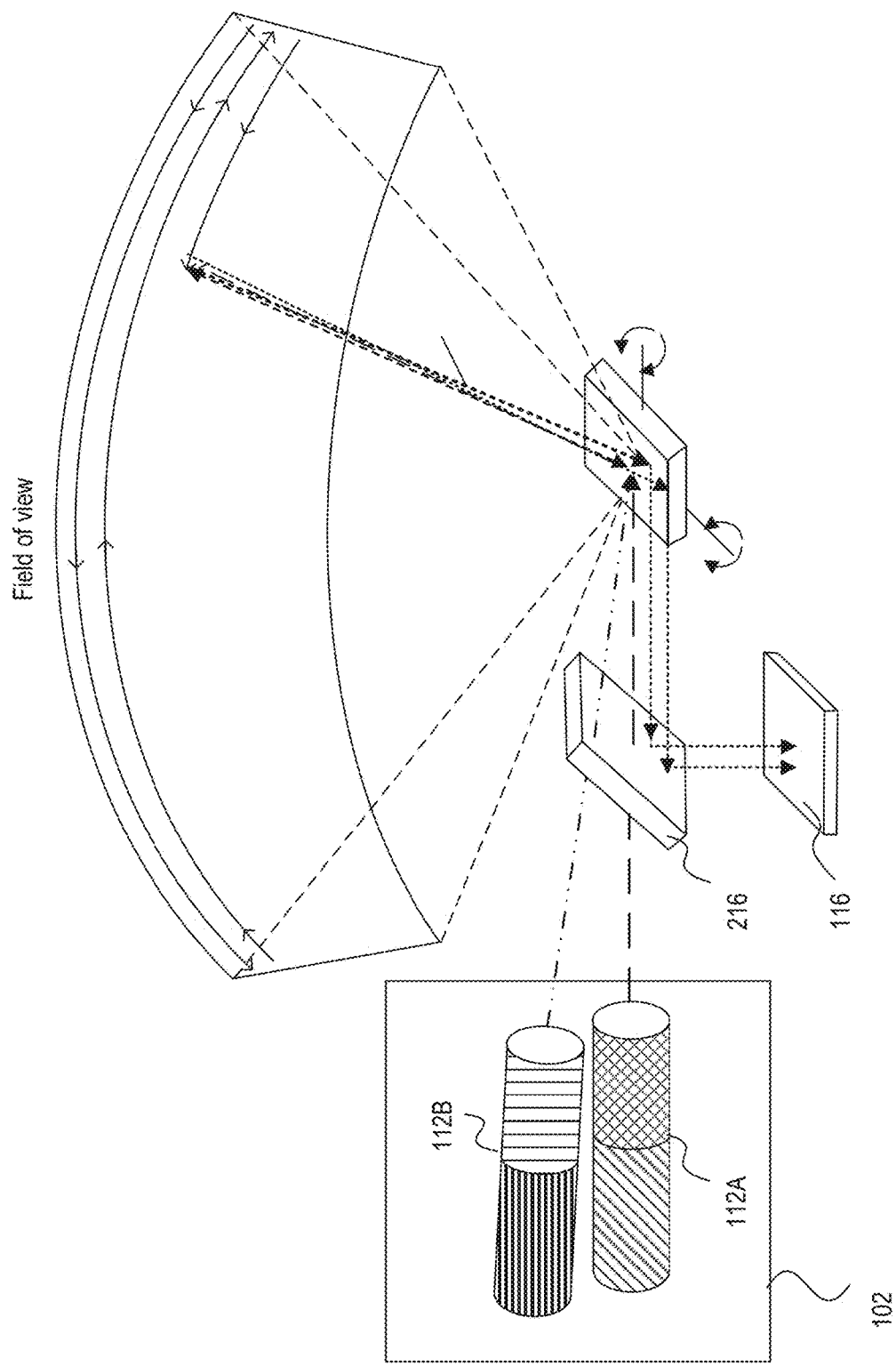
Figure 2D:
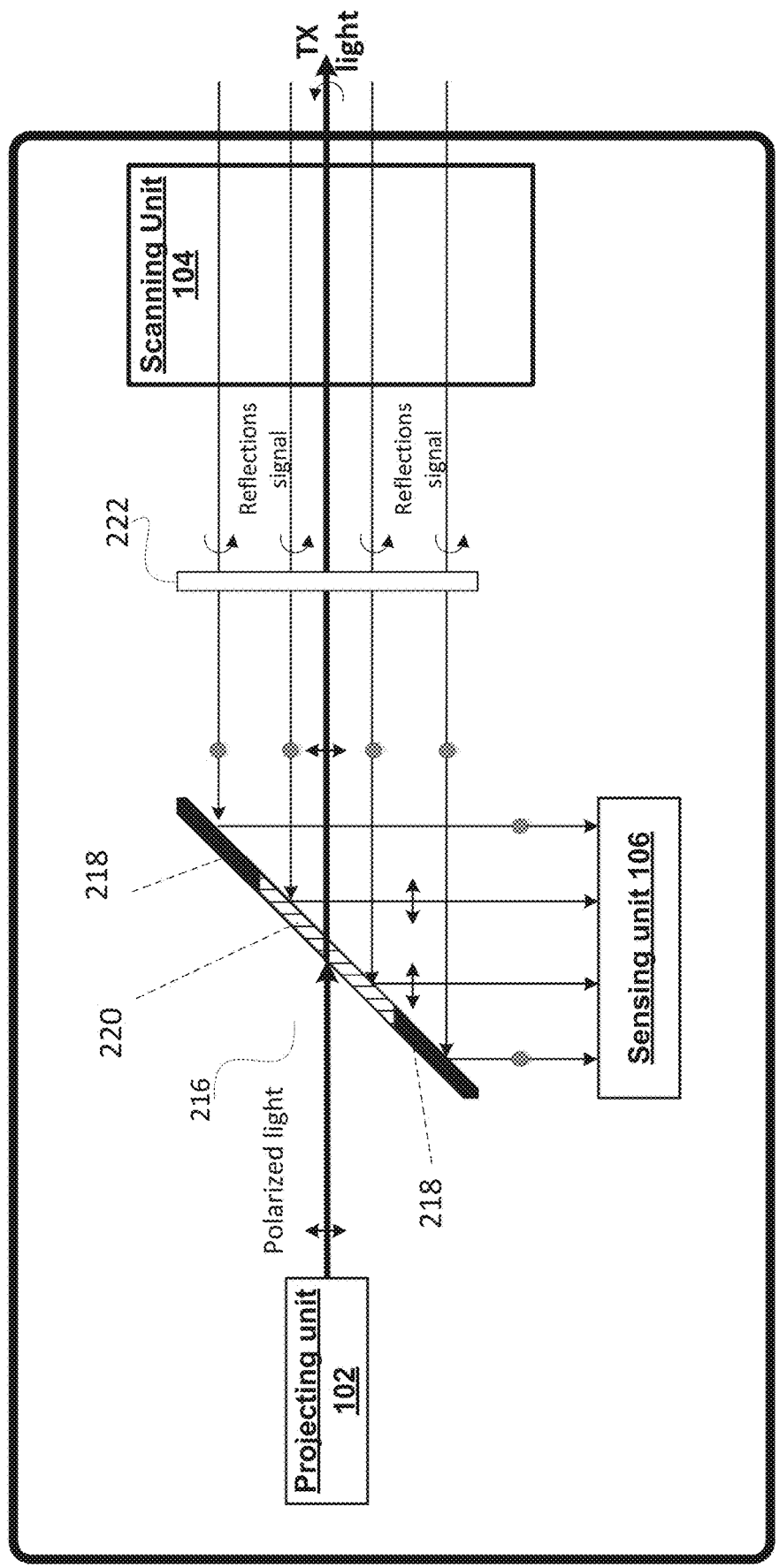
Figure 2E:
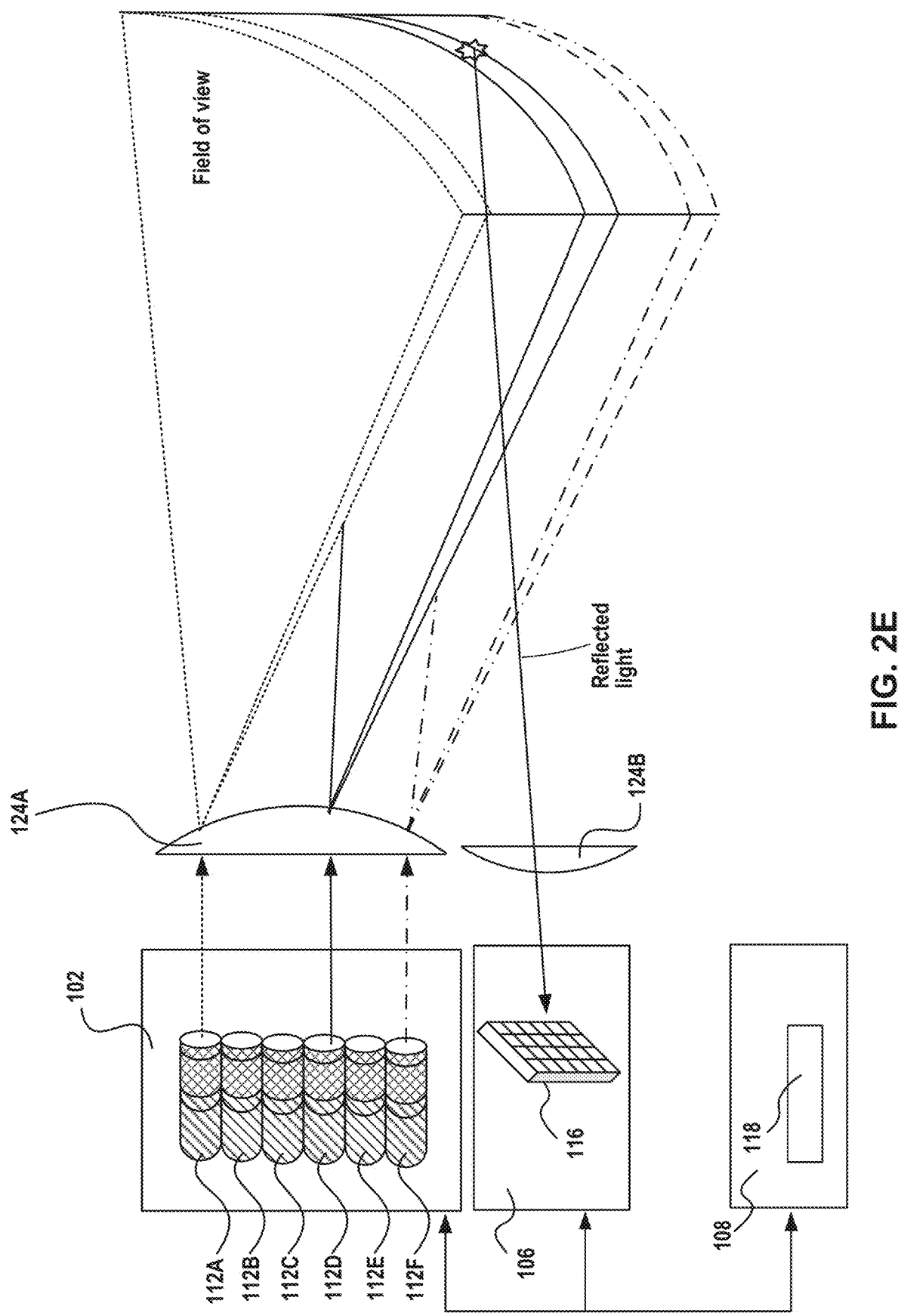
Figure 2F:
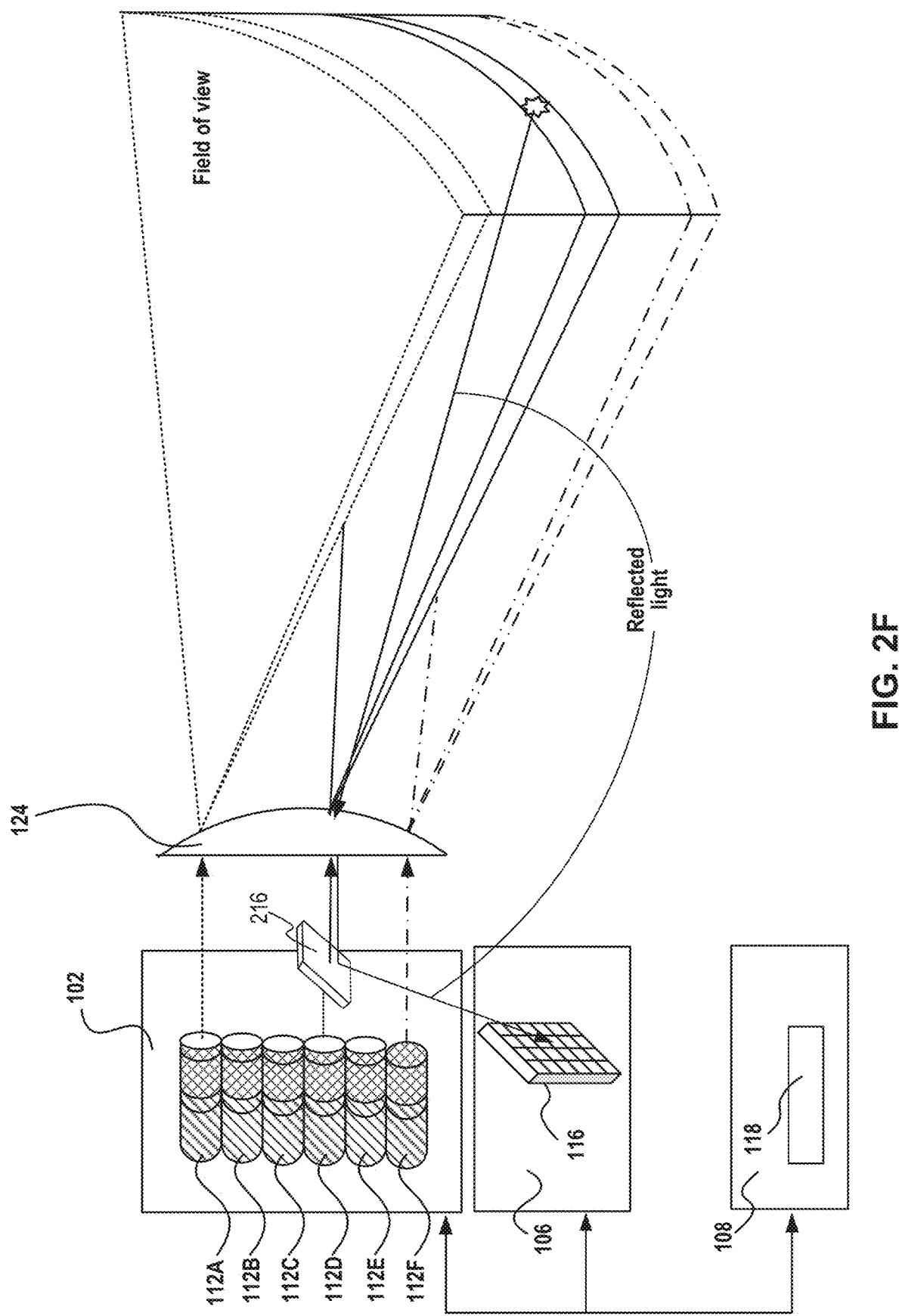
Figure 2G:
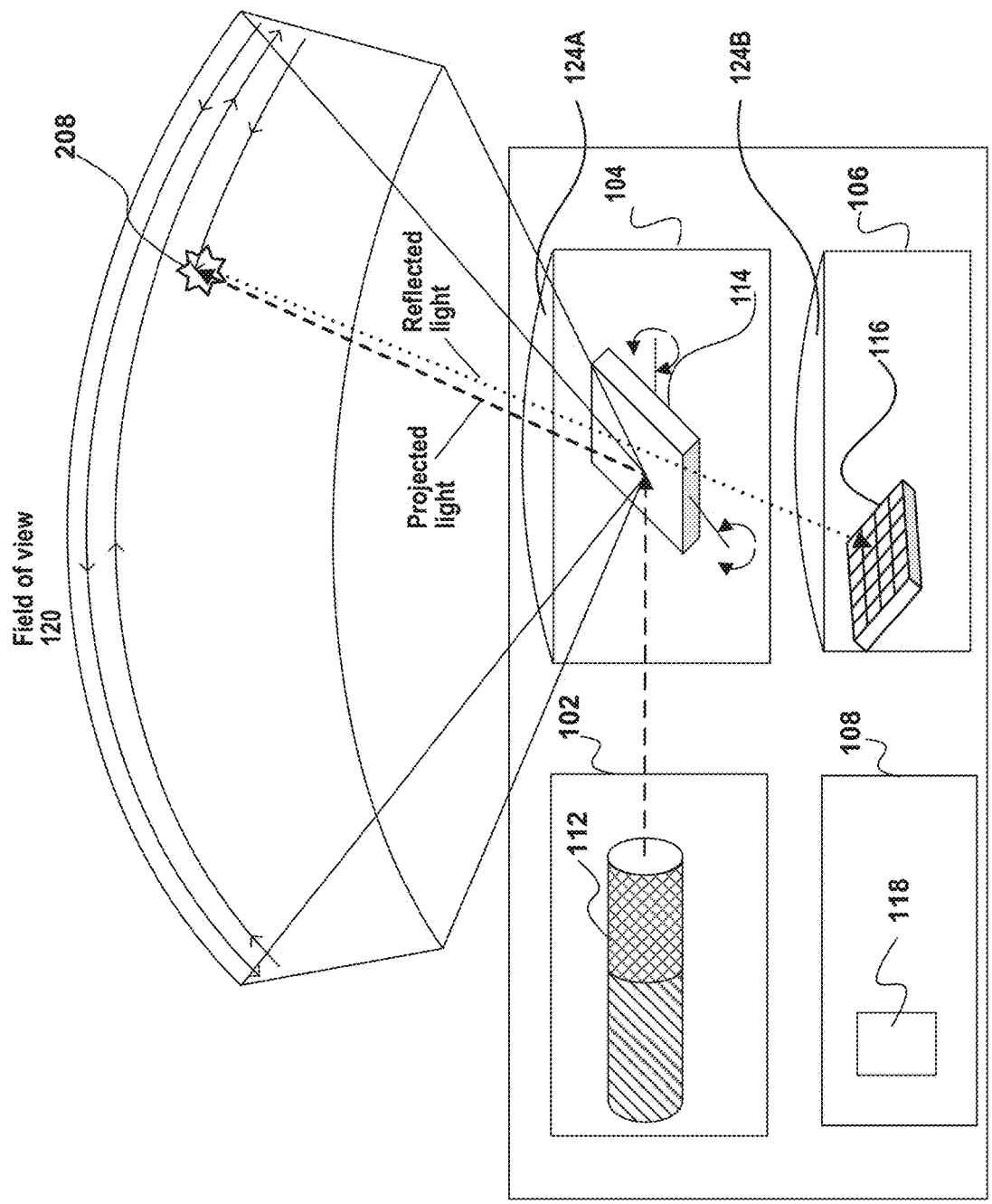

FIGS. 2A-2G depict various configurations of projecting unit 102 and its role in LIDAR system 100. Specifically, FIG. 2A is a diagram illustrating projecting unit 102 with a single light source; FIG. 2B is a diagram illustrating a plurality of projecting units 102 with a plurality of light sources aimed at a common light deflector 114; FIG. 2C is a diagram illustrating projecting unit 102 with a primary and a secondary light sources 112; FIG. 2D is a diagram illustrating an asymmetrical deflector used in some configurations of projecting unit 102; FIG. 2E is a diagram illustrating a first configuration of a non-scanning LIDAR system; FIG. 2F is a diagram illustrating a second configuration of a non-scanning LIDAR system; and FIG. 2G is a diagram illustrating a LIDAR system that scans in the outbound direction and does not scan in the inbound direction. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration" broadly refers to LIDAR systems configurations in which the projected light exiting the LIDAR system and the reflected light entering the LIDAR system pass through substantially different optical paths. In some embodiments, a bi-static configuration of LIDAR system 100 may include a separation of the optical paths by using completely different optical components, by using parallel but not fully separated optical components, or by using the same optical components for only part of the of the optical paths (optical components may include, for example, windows, lenses, mirrors, beam splitters, etc.). In the example depicted in FIG. 2A, the bi-static configuration includes a configuration where the outbound light and the inbound light pass through a single optical window 124 but scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources). In the examples depicted in FIGS. 2E and 2G, the bi-static configuration includes a configuration where the outbound light passes through a first optical window 124A, and the inbound light passes through a second optical window 124B. In all the example configurations above, the inbound and outbound optical paths differ from one another.

In this embodiment, all the components of LIDAR system 100 may be contained within a single housing 200, or may be divided among a plurality of housings. As shown, projecting unit 102 is associated with a single light source 112 that includes a laser diode 202A (or one or more laser diodes coupled together) configured to emit light (projected light 204). In one non-limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g. for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 also include a pivotable return deflector 114B that direct photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such computing environment may include at least one processor and/or may be connected LIDAR system 100 via the cloud. In some embodiments, host 210 may also include interfaces to external devices such as camera and sensors configured to measure different characteristics of host 210 (e.g., acceleration, steering wheel deflection, reverse drive, etc.). Consistent with the present disclosure, LIDAR system 100 may be fixed to a stationary object associated with host 210 (e.g. a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g. cameras, microphones, radar systems). In one example, LIDAR system 100 may be used by a security system. This embodiment is described in greater detail below with reference to FIG. 7.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated services digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In other embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR system configurations in which the projected light exiting from the LIDAR system and the reflected light entering the LIDAR system pass through substantially similar optical paths. In one example, the outbound light beam and the inbound light beam may share at least one optical assembly through which both outbound and inbound light beams pass. In another example, the outbound light may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hits an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical 216 may include an optical isolator that allows the passage of light in only one direction. A diagrammatic representation of asymmetrical deflector 216 is illustrated in FIG. 2D. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single of light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 102 may project light with differing wavelengths, and all the light sources 112 may be directed to the same portion (or overlapping portions) of field of view 120.

FIG. 2C illustrates an example of LIDAR system 100 in which projecting unit 102 includes a primary light source 112A and a secondary light source 112B. Primary light source 112A may project light with a longer wavelength than is sensitive to the human eye in order to optimize SNR and detection range. For example, primary light source 112A may project light with a wavelength between about 750 nm and 1100 nm. In contrast, secondary light source 112B may project light with a wavelength visible to the human eye. For example, secondary light source 112B may project light with a wavelength between about 400 nm and 700 nm. In one embodiment, secondary light source 112B may project light along substantially the same optical path the as light projected by primary light source 112A. Both light sources may be time-synchronized and may project light emission together or in interleaved pattern. An interleave pattern means that the light sources are not active at the same time which may mitigate mutual interference. A person who is of skill in the art would readily see that other combinations of wavelength ranges and activation schedules may also be implemented.

Consistent with some embodiments, secondary light source 112B may cause human eyes to blink when it is too close to the LIDAR optical output port. This may ensure an eye safety mechanism not feasible with typical laser sources that utilize the near-infrared light spectrum. In another embodiment, secondary light source 112B may be used for calibration and reliability at a point of service, in a manner somewhat similar to the calibration of headlights with a special reflector/pattern at a certain height from the ground with respect to vehicle 110. An operator at a point of service could examine the calibration of the LIDAR by simple visual inspection of the scanned pattern over a featured target such a test pattern board at a designated distance from LIDAR system 100. In addition, secondary light source 112B may provide means for operational confidence that the LIDAR is working for the end-user. For example, the system may be configured to permit a human to place a hand in front of light deflector 114 to test its operation.

Secondary light source 112B may also have a non-visible element that can double as a backup system in case primary light source 112A fails. This feature may be useful for fail-safe devices with elevated functional safety ratings. Given that secondary light source 112B may be visible and also due to reasons of cost and complexity, secondary light source 112B may be associated with a smaller power compared to primary light source 112A. Therefore, in case of a failure of primary light source 112A, the system functionality will fall back to secondary light source 112B set of functionalities and capabilities. While the capabilities of secondary light source 112B may be inferior to the capabilities of primary light source 112A, LIDAR system 100 system may be designed in such a fashion to enable vehicle 110 to safely arrive its destination.

FIG. 2D illustrates asymmetrical deflector 216 that may be part of LIDAR system 100. In the illustrated example, asymmetrical deflector 216 includes a reflective surface 218 (such as a mirror) and a one-way deflector 220. While not necessarily so, asymmetrical deflector 216 may optionally be a static deflector. Asymmetrical deflector 216 may be used in a monostatic configuration of LIDAR system 100, in order to allow a common optical path for transmission and for reception of light via the at least one deflector 114, e.g. as illustrated in FIGS. 2B and 2C. However, typical asymmetrical deflectors such as beam splitters are characterized by energy losses, especially in the reception path, which may be more sensitive to power loses than the transmission path.

As depicted in FIG. 2D, LIDAR system 100 may include asymmetrical deflector 216 positioned in the transmission path, which includes one-way deflector 220 for separating between the transmitted and received light signals Optionally, one-way deflector 220 may be substantially transparent to the transmission light and substantially reflective to the received light. The transmitted light is generated by projecting unit 102 and may travel through one-way deflector 220 to scanning unit 104 which deflects it towards the optical outlet. The received light arrives through the optical inlet, to the at least one deflecting element 114, which deflects the reflections signal into a separate path away from the light source and towards sensing unit 106. Optionally, asymmetrical deflector 216 may be combined with a polarized light source 112 which is linearly polarized with the same polarization axis as one-way deflector 220. Notably, the cross-section of the outbound light beam is much smaller than that of the reflections signals. Accordingly, LIDAR system 100 may include one or more optical components (e.g. lens, collimator) for focusing or otherwise manipulating the emitted polarized light beam to the dimensions of the asymmetrical deflector 216. In one embodiment, one-way deflector 220 may be a polarizing beam splitter that is virtually transparent to the polarized light beam.

Consistent with some embodiments, LIDAR system 100 may further include optics 222 (e.g., a quarter wave plate retarder) for modifying a polarization of the emitted light. For example, optics 222 may modify a linear polarization of the emitted light beam to circular polarization. Light reflected back to system 100 from the field of view would arrive back through deflector 114 to optics 222, bearing a circular polarization with a reversed handedness with respect to the transmitted light. Optics 222 would then convert the received reversed handedness polarization light to a linear polarization that is not on the same axis as that of the polarized beam splitter 216. As noted above, the received light-patch is larger than the transmitted light-patch, due to optical dispersion of the beam traversing through the distance to the target.

Some of the received light will impinge on one-way deflector 220 that will reflect the light towards sensor 106 with some power loss. However, another part of the received patch of light will fall on a reflective surface 218 which surrounds one-way deflector 220 (e.g., polarizing beam splitter slit). Reflective surface 218 will reflect the light towards sensing unit 106 with substantially zero power loss. One-way deflector 220 would reflect light that is composed of various polarization axes and directions that will eventually arrive at the detector. Optionally, sensing unit 106 may include sensor 116 that is agnostic to the laser polarization, and is primarily sensitive to the amount of impinging photons at a certain wavelength range.

It is noted that the proposed asymmetrical deflector 216 provides far superior performances when compared to a simple mirror with a passage hole in it. In a mirror with a hole, all of the reflected light which reaches the hole is lost to the detector. However, in deflector 216, one-way deflector 220 deflects a significant portion of that light (e.g., about 50%) toward the respective sensor 116. In LIDAR systems, the number photons reaching the LIDAR from remote distances is very limited, and therefore the improvement in photon capture rate is important.

According to some embodiments, a device for beam splitting and steering is described. A polarized beam may be emitted from a light source having a first polarization. The emitted beam may be directed to pass through a polarized beam splitter assembly. The polarized beam splitter assembly includes on a first side a one-directional slit and on an opposing side a mirror. The one-directional slit enables the polarized emitted beam to travel toward a quarter-wave-plate/wave-retarder which changes the emitted signal from a polarized signal to a linear signal (or vice versa) so that subsequently reflected beams cannot travel through the one-directional slit.

FIG. 2E shows an example of a bi-static configuration of LIDAR system 100 without scanning unit 104. In order to illuminate an entire field of view (or substantially the entire field of view) without deflector 114, projecting unit 102 may optionally include an array of light sources (e.g., 112A-112F). In one embodiment, the array of light sources may include a linear array of light sources controlled by processor 118. For example, processor 118 may cause the linear array of light sources to sequentially project collimated laser beams towards first optional optical window 124A. First optional optical window 124A may include a diffuser lens for spreading the projected light and sequentially forming wide horizontal and narrow vertical beams. Optionally, some or all of the at least one light source 112 of system 100 may project light concurrently. For example, processor 118 may cause the array of light sources to simultaneously project light beams from a plurality of non-adjacent light sources 112. In the depicted example, light source 112A, light source 112D, and light source 112F simultaneously project laser beams towards first optional optical window 124A thereby illuminating the field of view with three narrow vertical beams. The light beam from fourth light source 112D may reach an object in the field of view. The light reflected from the object may be captured by second optical window 124B and may be redirected to sensor 116. The configuration depicted in FIG. 2E is considered to be a bi-static configuration because the optical paths of the projected light and the reflected light are substantially different. It is noted that projecting unit 102 may also include a plurality of light sources 112 arranged in non-linear configurations, such as a two dimensional array, in hexagonal tiling, or in any other way.

FIG. 2F illustrates an example of a monostatic configuration of LIDAR system 100 without scanning unit 104. Similar to the example embodiment represented in FIG. 2E, in order to illuminate an entire field of view without deflector 114, projecting unit 102 may include an array of light sources (e.g., 112A-112F). But, in contrast to FIG. 2E, this configuration of LIDAR system 100 may include a single optical window 124 for both the projected light and for the reflected light. Using asymmetrical deflector 216, the reflected light may be redirected to sensor 116. The configuration depicted in FIG. 2E is considered to be a monostatic configuration because the optical paths of the projected light and the reflected light are substantially similar to one another. The term "substantially similar" in the context of the optical paths of the projected light and the reflected light means that the overlap between the two optical paths may be more than 80%, more than 85%, more than 90%, or more than 95%.

FIG. 2G illustrates an example of a bi-static configuration of LIDAR system 100. The configuration of LIDAR system 100 in this figure is similar to the configuration shown in FIG. 2A. For example, both configurations include a scanning unit 104 for directing projected light in the outbound direction toward the field of view. But, in contrast to the embodiment of FIG. 2A, in this configuration, scanning unit 104 does not redirect the reflected light in the inbound direction. Instead the reflected light passes through second optical window 124B and enters sensor 116. The configuration depicted in FIG. 2G is considered to be a bi-static configuration because the optical paths of the projected light and the reflected light are substantially different from one another. The term "substantially different" in the context of the optical paths of the projected light and the reflected light means that the overlap between the two optical paths may be less than 10%, less than 5%, less than 1%, or less than 0.25%.

The Scanning Unit

Figure 3A:
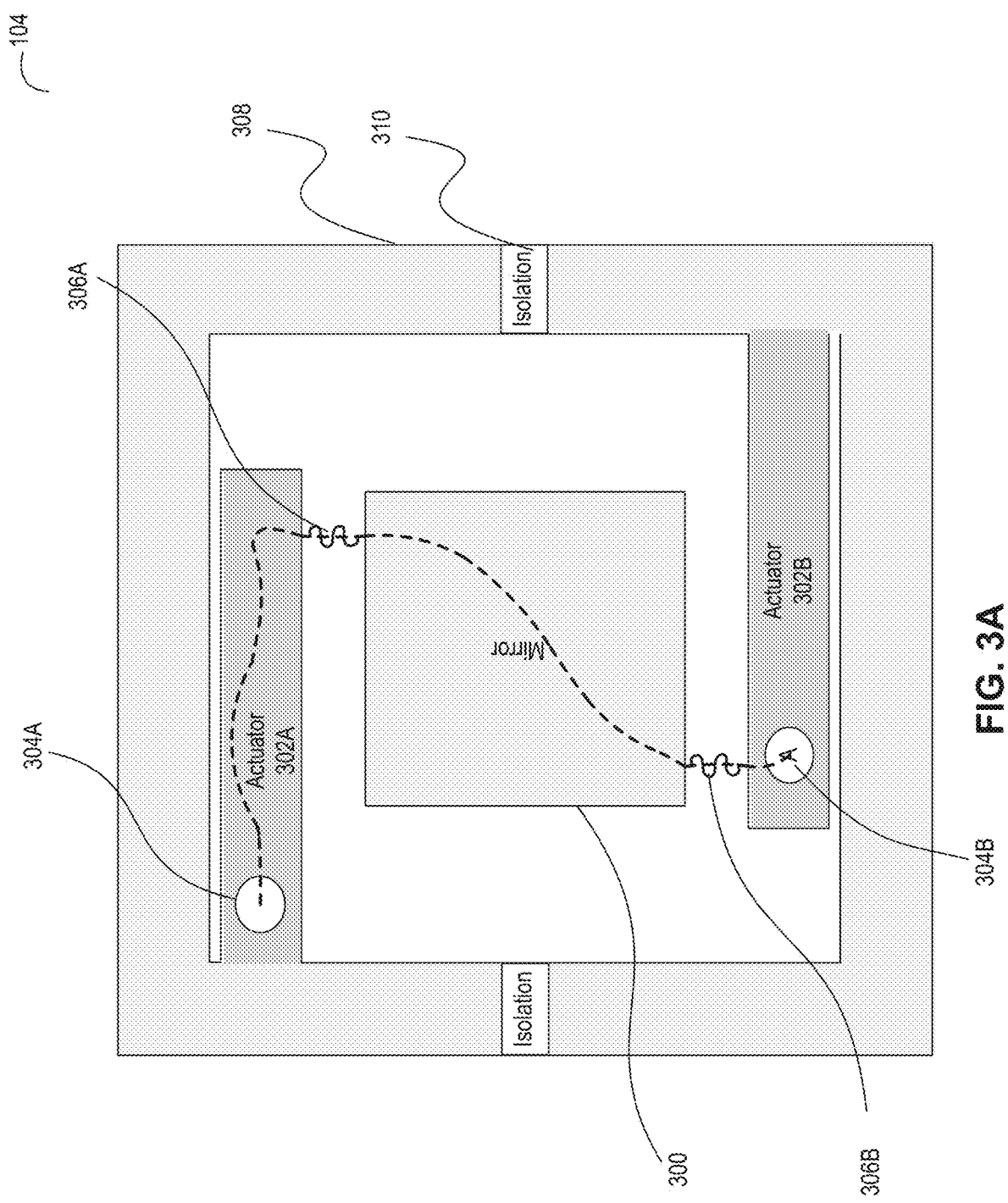
FIGS. 3A-3D are diagrams illustrating different configurations of scanning units in accordance with some embodiments of the present disclosure.
Figure 3B:
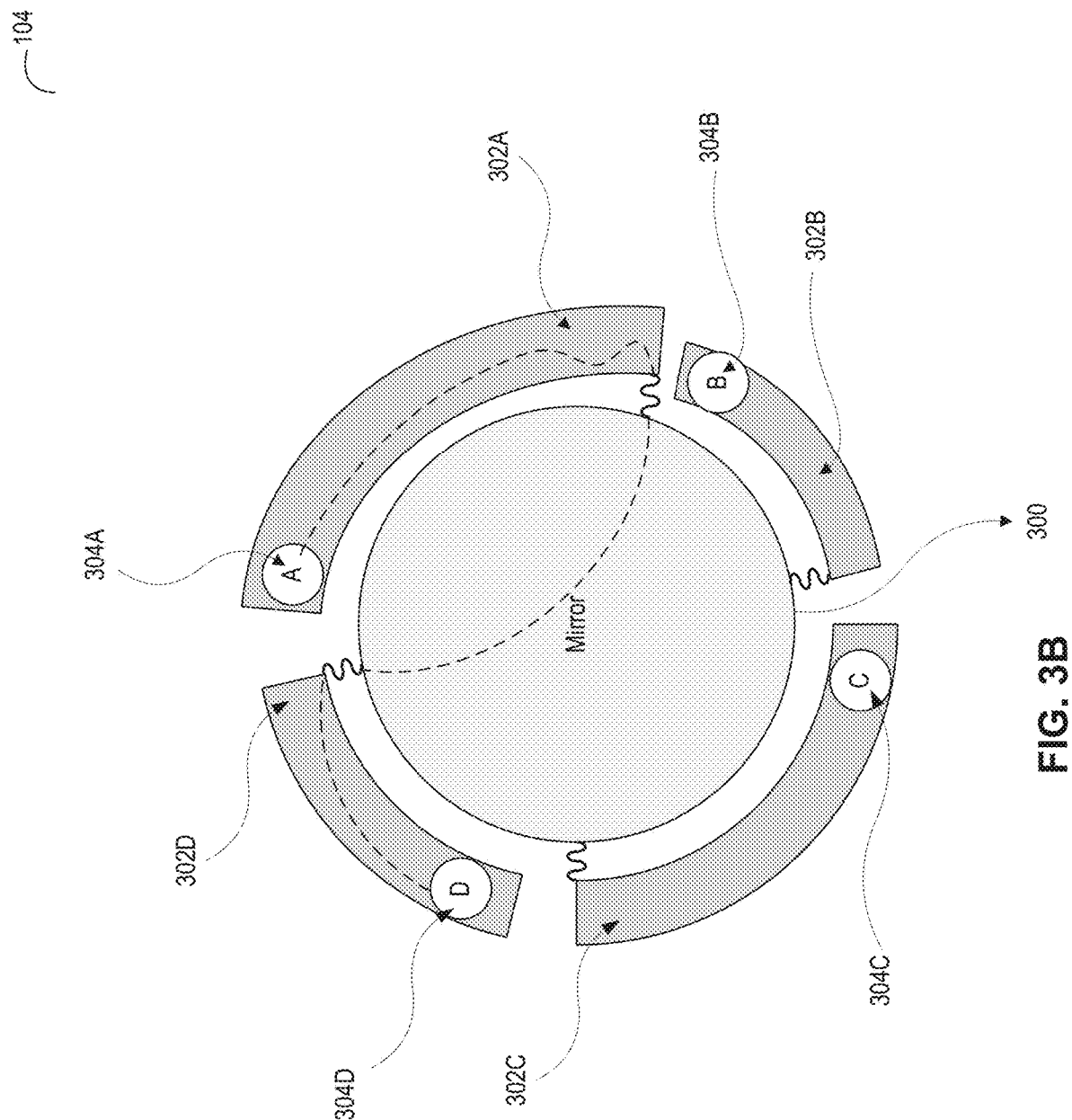
Figure 3C:
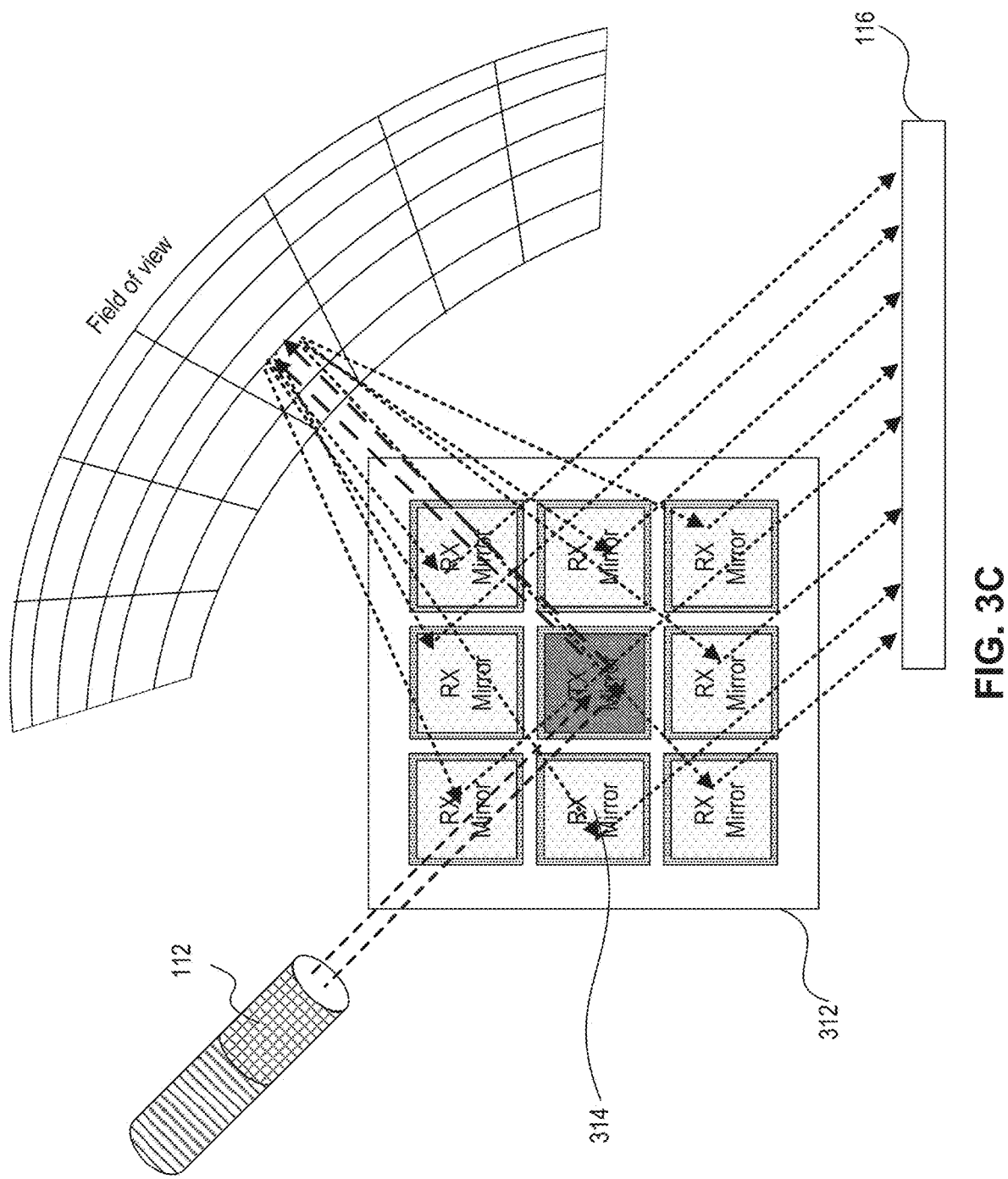
Figure 3D:
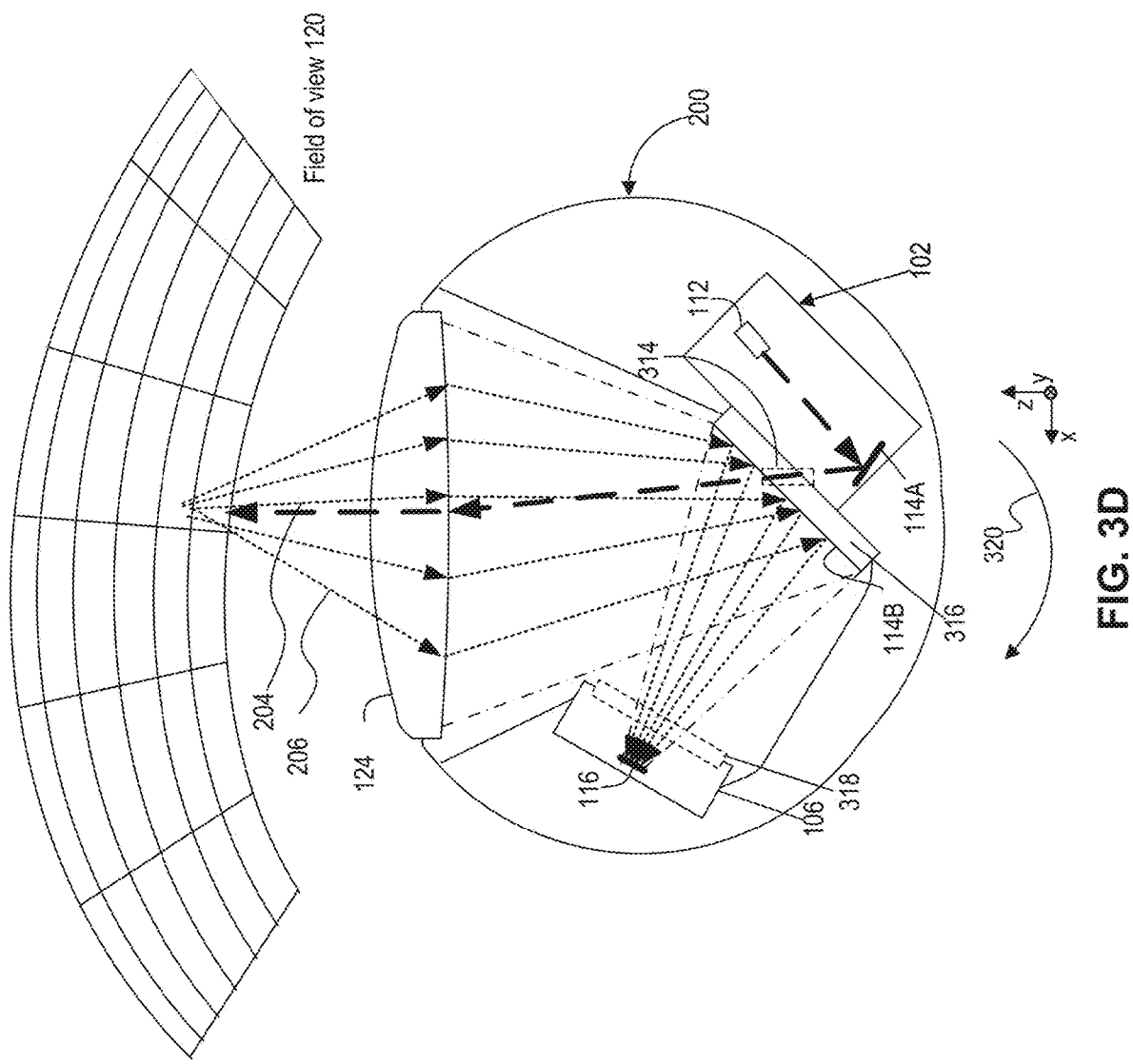

FIGS. 3A-3D depict various configurations of scanning unit 104 and its role in LIDAR system 100. Specifically, FIG. 3A is a diagram illustrating scanning unit 104 with a MEMS mirror (e.g., square shaped), FIG. 3B is a diagram illustrating another scanning unit 104 with a MEMS mirror (e.g., round shaped), FIG. 3C is a diagram illustrating scanning unit 104 with an array of reflectors used for monostatic scanning LIDAR system, and FIG. 3D is a diagram illustrating an example LIDAR system 100 that mechanically scans the environment around LIDAR system 100. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g. PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes. This embodiment is described in greater detail below with reference to FIGS. 32-34.

During scanning, current (represented in the figure as the dashed line) may flow from contact 304A to contact 304B (through actuator 302A, spring 306A, mirror 300, spring 306B, and actuator 302B). Isolation gaps in semiconducting frame 308 such as isolation gap 310 may cause actuator 302A and 302B to be two separate islands connected electrically through springs 306 and frame 308. The current flow, or any associated electrical parameter (voltage, current frequency, capacitance, relative dielectric constant, etc.), may be monitored by an associated position feedback. In case of a mechanical failure—where one of the components is damaged—the current flow through the structure would alter and change from its functional calibrated values. At an extreme situation (for example, when a spring is broken), the current would stop completely due to a circuit break in the electrical chain by means of a faulty element.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. In the illustrated example, the current (represented in the figure as the dashed line) flows from contact 304A to contact 304D, but in other cases current may flow from contact 304A to contact 304B, from contact 304A to contact 304C, from contact 304B to contact 304C, from contact 304B to contact 304D, or from contact 304C to contact 304D. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least of deflector 114 may have a dual axis square-shaped mirror or single axis round-shaped mirror. Examples of round and square mirror are depicted in FIGS. 3A and 3B as examples only. Any shape may be employed depending on system specifications. In one embodiment, actuators 302 may be incorporated as an integral part of at least of deflector 114, such that power to move MEMS mirror 300 is applied directly towards it. In addition, MEMS mirror 300 may be connected to frame 308 by one or more rigid supporting elements. In another embodiment, at least of deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance. Additional details about the asymmetrical deflector 216 are provided below with reference to FIG. 2D.

In some embodiments (e.g. as exemplified in FIG. 3C), scanning unit 104 may include a deflector array (e.g. a reflector array) with small light deflectors (e.g. mirrors). In one embodiment, implementing light deflector 114 as a group of smaller individual light deflectors working in synchronization may allow light deflector 114 to perform at a high scan rate with larger angles of deflection. The deflector array may essentially act as a large light deflector (e.g. a large mirror) in terms of effective area. The deflector array may be operated using a shared steering assembly configuration that allows sensor 116 to collect reflected photons from substantially the same portion of field of view 120 being concurrently illuminated by light source 112. The term "concurrently" means that the two selected functions occur during coincident or overlapping time periods, either where one begins and ends during the duration of the other, or where a later one starts before the completion of the other.

FIG. 3C illustrates an example of scanning unit 104 with a reflector array 312 having small mirrors. In this embodiment, reflector array 312 functions as at least one deflector 114. Reflector array 312 may include a plurality of reflector units 314 configured to pivot (individually or together) and steer light pulses toward field of view 120. For example, reflector array 312 may be a part of an outbound path of light projected from light source 112. Specifically, reflector array 312 may direct projected light 204 towards a portion of field of view 120. Reflector array 312 may also be part of a return path for light reflected from a surface of an object located within an illumined portion of field of view 120. Specifically, reflector array 312 may direct reflected light 206 towards sensor 116 or towards asymmetrical deflector 216. In one example, the area of reflector array 312 may be between about 75 to about 150 mm², where each reflector units 314 may have a width of about 10 μm and the supporting structure may be lower than 100 μm.

According to some embodiments, reflector array 312 may include one or more sub-groups of steerable deflectors. Each sub-group of electrically steerable deflectors may include one or more deflector units, such as reflector unit 314. For example, each steerable deflector unit 314 may include at least one of a MEMS mirror, a reflective surface assembly, and an electromechanical actuator. In one embodiment, each reflector unit 314 may be individually controlled by an individual processor (not shown), such that it may tilt towards a specific angle along each of one or two separate axes. Alternatively, reflector array 312 may be associated with a common controller (e.g., processor 118) configured to synchronously manage the movement of reflector units 314 such that at least part of them will pivot concurrently and point in approximately the same direction.

In addition, at least one processor 118 may select at least one reflector unit 314 for the outbound path (referred to hereinafter as "TX Mirror") and a group of reflector units 314 for the return path (referred to hereinafter as "RX Mirror"). Consistent with the present disclosure, increasing the number of TX Mirrors may increase a reflected photons beam spread. Additionally, decreasing the number of RX Mirrors may narrow the reception field and compensate for ambient light conditions (such as clouds, rain, fog, extreme heat, and other environmental conditions) and improve the signal to noise ratio. Also, as indicated above, the emitted light beam is typically narrower than the patch of reflected light, and therefore can be fully deflected by a small portion of the deflection array. Moreover, it is possible to block light reflected from the portion of the deflection array used for transmission (e.g. the TX mirror) from reaching sensor 116, thereby reducing an effect of internal reflections of the LIDAR system 100 on system operation. In addition, at least one processor 118 may pivot one or more reflector units 314 to overcome mechanical impairments and drifts due, for example, to thermal and gain effects. In an example, one or more reflector units 314 may move differently than intended (frequency, rate, speed etc.) and their movement may be compensated for by electrically controlling the deflectors appropriately.

FIG. 3D illustrates an exemplary LIDAR system 100 that mechanically scans the environment of LIDAR system 100. In this example, LIDAR system 100 may include a motor or other mechanisms for rotating housing 200 about the axis of the LIDAR system 100. Alternatively, the motor (or other mechanism) may mechanically rotate a rigid structure of LIDAR system 100 on which one or more light sources 112 and one or more sensors 116 are installed, thereby scanning the environment. As described above, projecting unit 102 may include at least one light source 112 configured to project light emission. The projected light emission may travel along an outbound path towards field of view 120. Specifically, the projected light emission may be reflected by deflector 114A through an exit aperture 314 when projected light 204 travel towards optional optical window 124. The reflected light emission may travel along a return path from object 208 towards sensing unit 106. For example, the reflected light 206 may be reflected by deflector 114B when reflected light 206 travels towards sensing unit 106. A person skilled in the art would appreciate that a LIDAR system with a rotation mechanism for synchronically rotating one or more light sources or one or more sensors, may use this synchronized rotation instead of (or in addition to) steering an internal light deflector.

In embodiments in which the scanning of field of view 120 is mechanical, the projected light emission may be directed to exit aperture 314 that is part of a wall 316 separating projecting unit 102 from other parts of LIDAR system 100. In some examples, wall 316 can be formed from a transparent material (e.g., glass) coated with a reflective material to form deflector 114B. In this example, exit aperture 314 may correspond to the portion of wall 316 that is not coated by the reflective material. Additionally or alternatively, exit aperture 314 may include a hole or cut-away in the wall 316. Reflected light 206 may be reflected by deflector 114B and directed towards an entrance aperture 318 of sensing unit 106. In some examples, an entrance aperture 318 may include a filtering window configured to allow wavelengths in a certain wavelength range to enter sensing unit 106 and attenuate other wavelengths. The reflections of object 208 from field of view 120 may be reflected by deflector 114B and hit sensor 116. By comparing several properties of reflected light 206 with projected light 204, at least one aspect of object 208 may be determined. For example, by comparing a time when projected light 204 was emitted by light source 112 and a time when sensor 116 received reflected light 206, a distance between object 208 and LIDAR system 100 may be determined. In some examples, other aspects of object 208, such as shape, color, material, etc. may also be determined.

In some examples, the LIDAR system 100 (or part thereof, including at least one light source 112 and at least one sensor 116) may be rotated about at least one axis to determine a three-dimensional map of the surroundings of the LIDAR system 100. For example, the LIDAR system 100 may be rotated about a substantially vertical axis as illustrated by arrow 320 in order to scan field of 120. Although FIG. 3D illustrates that the LIDAR system 100 is rotated clock-wise about the axis as illustrated by the arrow 320, additionally or alternatively, the LIDAR system 100 may be rotated in a counter clockwise direction. In some examples, the LIDAR system 100 may be rotated 360 degrees about the vertical axis. In other examples, the LIDAR system 100 may be rotated back and forth along a sector smaller than 360-degree of the LIDAR system 100. For example, the LIDAR system 100 may be mounted on a platform that wobbles back and forth about the axis without making a complete rotation.

The Sensing Unit

Figure 4A:
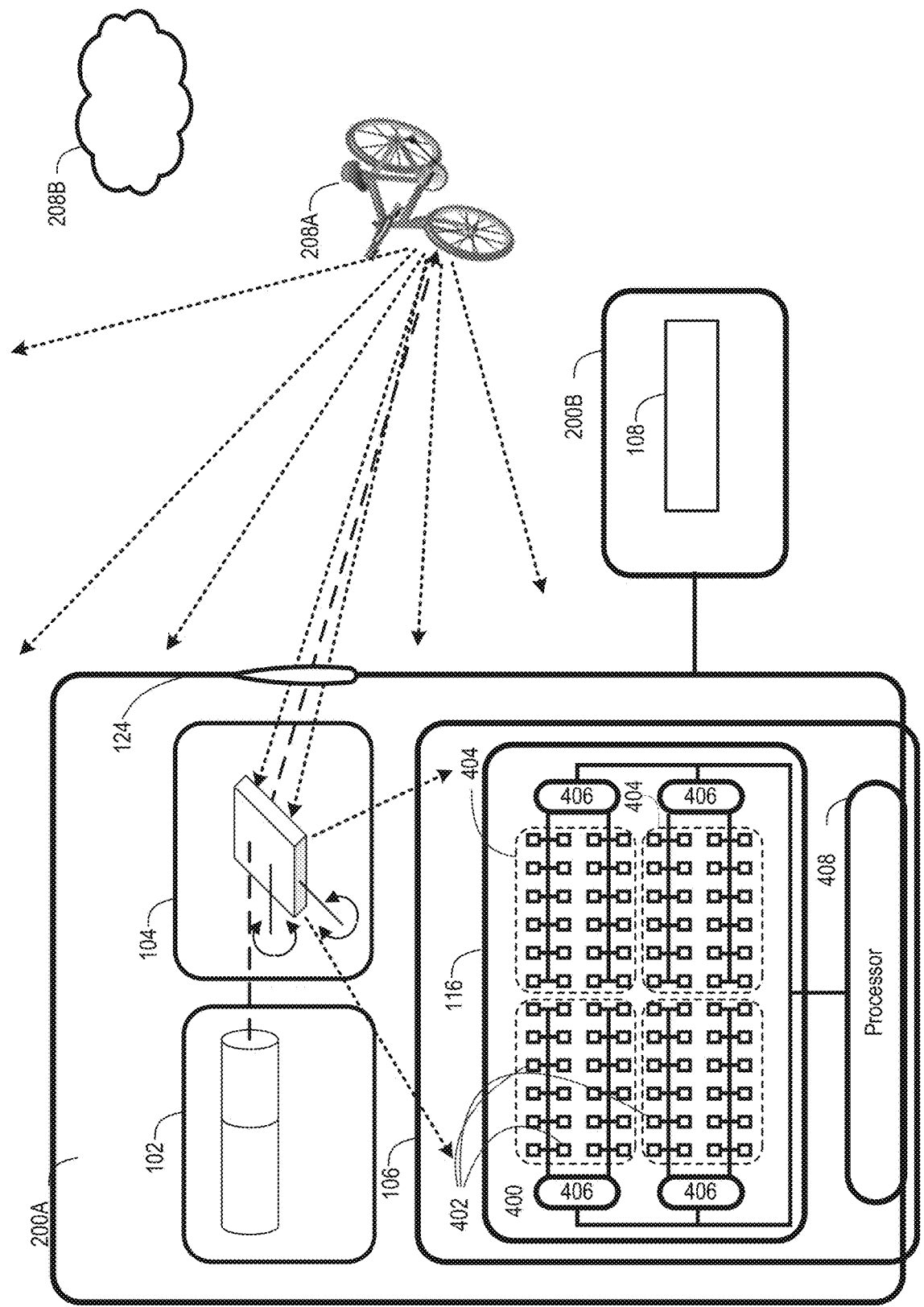
Figure 4B:
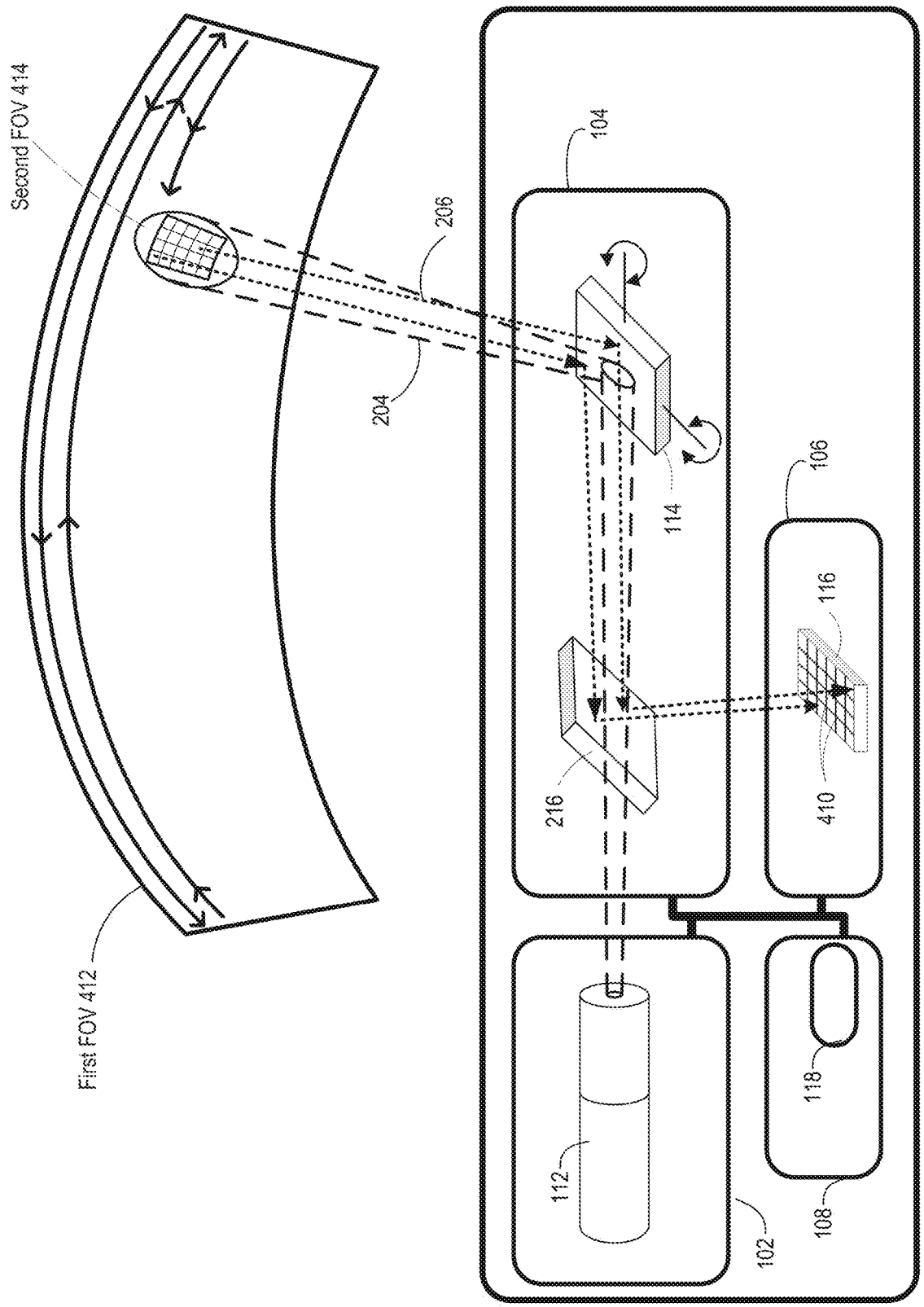
Figure 4C:
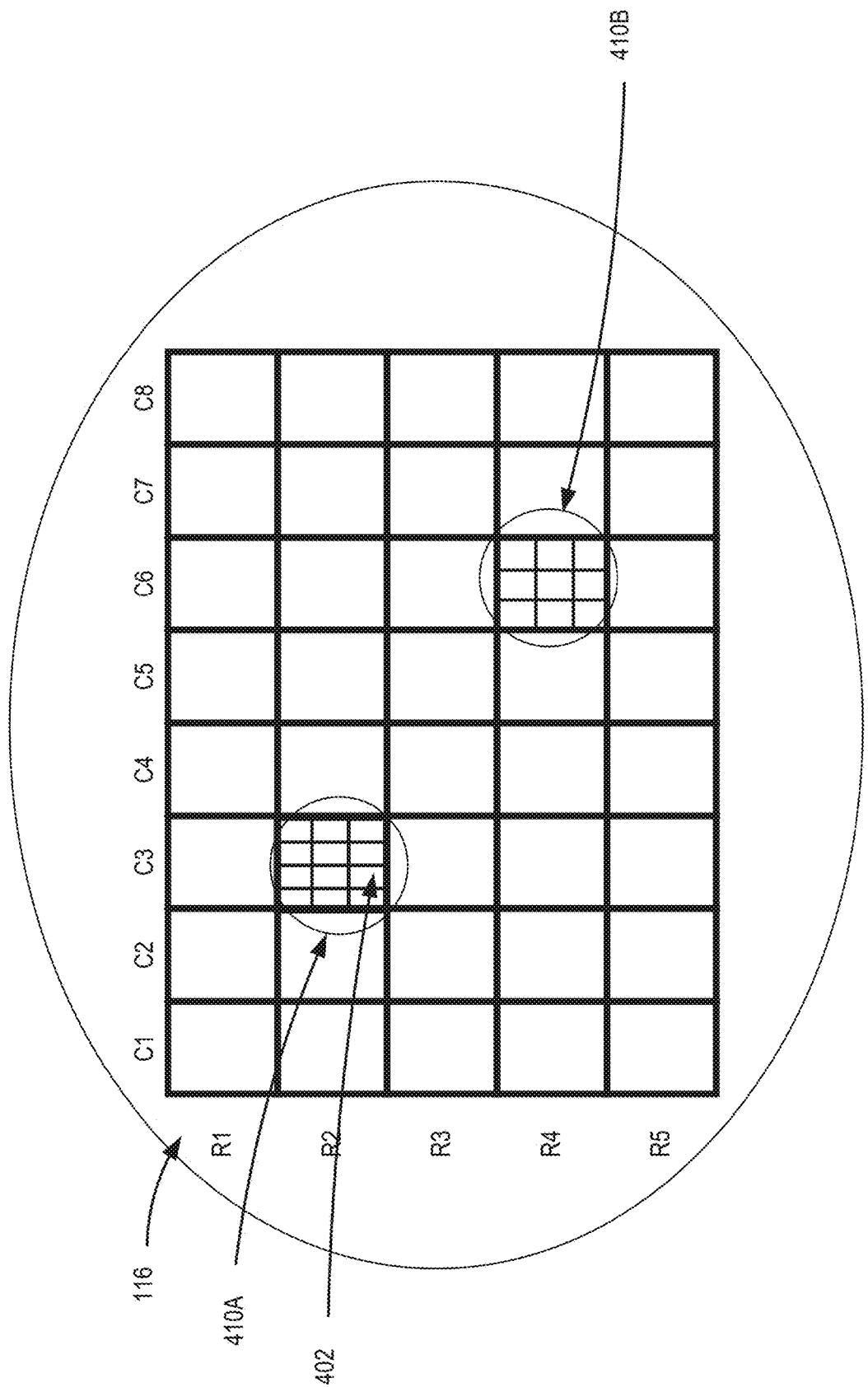
Figure 4D:
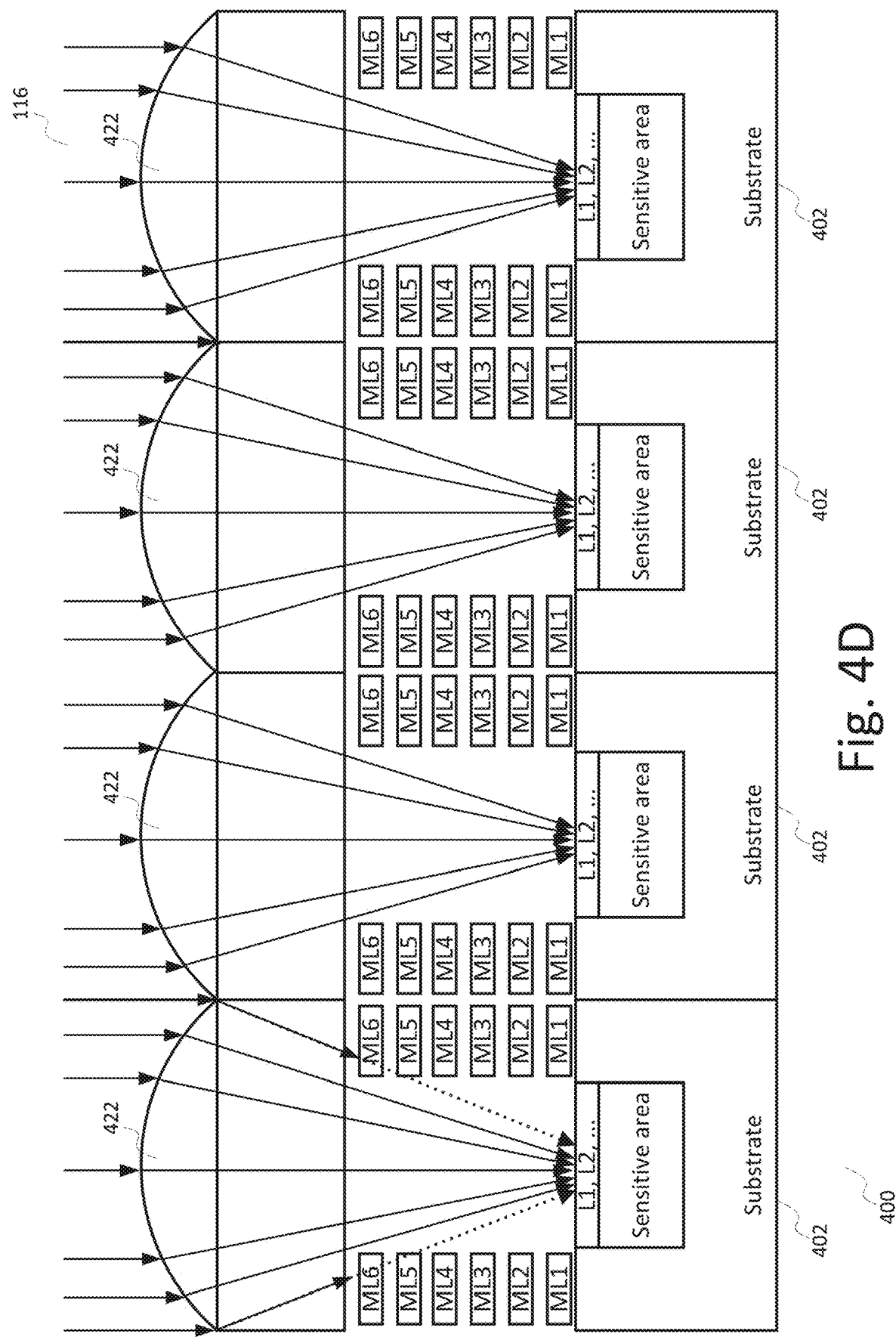

FIGS. 4A-4E depict various configurations of sensing unit 106 and its role in LIDAR system 100. Specifically, FIG. 4A is a diagram illustrating an example sensing unit 106 with a detector array, FIG. 4B is a diagram illustrating monostatic scanning using a two-dimensional sensor, FIG. 4C is a diagram illustrating an example of a two-dimensional sensor 116, FIG. 4D is a diagram illustrating a lens array associated with sensor 116, and FIG. 4E includes three diagram illustrating the lens structure. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208B) in field of view 120 located at different distances from LIDAR system 100 (could be meters or more). Objects 208 may be a solid object (e.g. a road, a tree, a car, a person), fluid object (e.g. fog, water, atmosphere particles), or object of another type (e.g. dust or a powdery illuminated object). When the photons emitted from light source 112 hit object 208 they either reflect, refract, or get absorbed. Typically, as shown in the figure, only a portion of the photons reflected from object 208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g. as shown) or any other arrangement. Detection elements 402 may operate concurrently or partially concurrently with each other. Specifically, each detection element 402 may issue detection information for every sampling duration (e.g. every 1 nanosecond). In one example, detector array 400 may be a SiPM (Silicon photomultipliers) which is a solid-state single-photon-sensitive device built from an array of single photon avalanche diode (SPAD, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g. SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g. within detector array 400)—and may be shaped in different shapes (e.g. rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310—unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the region of output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g. within vehicle 110), and sensing unit 106 may include a dedicated processor 408 for analyzing the reflected light. Alternatively, processing unit 108 may be used for analyzing reflected light 206. It is noted that LIDAR system 100 may be implemented multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e g summed) with signals of other detectors of the region 404 before being passed to processor 408. However, this is only an example and the circuitry of sensor 116 may transmit information from a detection element 402 to processor 408 via other routes (not via a region output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4×6 detectors 410 (also referred to as "pixels"). In one embodiment, a pixel size may be about 1×1 mm. Sensor 116 is two-dimensional in the sense that it has more than one set (e.g. row, column) of detectors 410 in two non-parallel axes (e.g. orthogonal axes, as exemplified in the illustrated examples). The number of detectors 410 in sensor 116 may vary between differing implementations, e.g. depending on the desired resolution, signal to noise ratio (SNR), desired detection distance, and so on. For example, sensor 116 may have anywhere between 5 and 5,000 pixels. In another example (not shown in the figure) Also, sensor 116 may be a one-dimensional matrix (e.g. 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs) or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 412" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 412 may be between about 0.05° and 1° elongated in the vertical dimension. Even if LIDAR system 100 includes more than one two-dimensional sensor 116, the combined field of view of the sensors array may still be smaller than the first FOV 412, e.g. by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

FIG. 4C is a diagram illustrating an example of a two-dimensional sensor 116. In this embodiment, sensor 116 is a matrix of 8×5 detectors 410 and each detector 410 includes a plurality of detection elements 402. In one example, detector 410A is located in the second row (denoted "R2") and third column (denoted "C3") of sensor 116, which includes a matrix of 4×3 detection elements 402. In another example, detector 410B located in the fourth row (denoted "R4") and sixth column (denoted "C6") of sensor 116 includes a matrix of 3×3 detection elements 402. Accordingly, the number of detection elements 402 in each detector 410 may be constant, or may vary, and differing detectors 410 in a common array may have a different number of detection elements 402. The outputs of all detection elements 402 in each detector 410 may be summed, averaged, or otherwise combined to provide a single pixel-output value. It is noted that while detectors 410 in the example of FIG. 4C are arranged in a rectangular matrix (straight rows and straight columns), other arrangements may also be used, e.g. a circular arrangement or a honeycomb arrangement.

According to some embodiments, measurements from each detector 410 may enable determination of the time of flight from a light pulse emission event to the reception event and the intensity of the received photons. The reception event may be the result of the light pulse being reflected from object 208. The time of flight may be a timestamp value that represents the distance of the reflecting object to optional optical window 124. Time of flight values may be realized by photon detection and counting methods, such as Time Correlated Single Photon Counters (TCSPC), analog methods for photon detection such as signal integration and qualification (via analog to digital converters or plain comparators) or otherwise.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element that from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly covered by each other.

FIG. 4D is a cross cut diagram of a part of sensor 116, in accordance with examples of the presently disclosed subject matter. The illustrated part of sensor 116 includes a part of a detector array 400 which includes four detection elements 402 (e.g., four SPADs, four APDs). Detector array 400 may be a photodetector sensor realized in complementary metal-oxide-semiconductor (CMOS). Each of the detection elements 402 has a sensitive area, which is positioned within a substrate surrounding. While not necessarily so, sensor 116 may be used in a monostatic LiDAR system having a narrow field of view (e.g., because scanning unit 104 scans different parts of the field of view at different times). The narrow field of view for the incoming light beam—if implemented—eliminates the problem of out-of-focus imaging. As exemplified in FIG. 4D, sensor 116 may include a plurality of lenses 422 (e.g., microlenses), each lens 422 may direct incident light toward a different detection element 402 (e.g., toward an active area of detection element 402), which may be usable when out-of-focus imaging is not an issue. Lenses 422 may be used for increasing an optical fill factor and sensitivity of detector array 400, because most of the light that reaches sensor 116 may be deflected toward the active areas of detection elements 402

Detector array 400, as exemplified in FIG. 4D, may include several layers built into the silicon substrate by various methods (e.g., implant) resulting in a sensitive area, contact elements to the metal layers and isolation elements (e.g., shallow trench implant STI, guard rings, optical trenches, etc.). The sensitive area may be a volumetric element in the CMOS detector that enables the optical conversion of incoming photons into a current flow given an adequate voltage bias is applied to the device. In the case of a APD/SPAD, the sensitive area would be a combination of an electrical field that pulls electrons created by photon absorption towards a multiplication area where a photon induced electron is amplified creating a breakdown avalanche of multiplied electrons.

A front side illuminated detector (e.g., as illustrated in FIG. 4D) has the input optical port at the same side as the metal layers residing on top of the semiconductor (Silicon). The metal layers are required to realize the electrical connections of each individual photodetector element (e.g., anode and cathode) with various elements such as: bias voltage, quenching/ballast elements, and other photodetectors in a common array. The optical port through which the photons impinge upon the detector sensitive area is comprised of a passage through the metal layer. It is noted that passage of light from some directions through this passage may be blocked by one or more metal layers (e.g., metal layer ML6, as illustrated for the leftmost detector elements 402 in FIG. 4D). Such blockage reduces the total optical light absorbing efficiency of the detector.

FIG. 4E illustrates three detection elements 402, each with an associated lens 422, in accordance with examples of the presenting disclosed subject matter. Each of the three detection elements of FIG. 4E, denoted 402(1), 402(2), and 402(3), illustrates a lens configuration which may be implemented in associated with one or more of the detecting elements 402 of sensor 116. It is noted that combinations of these lens configurations may also be implemented.

In the lens configuration illustrated with regards to detection element 402(1), a focal point of the associated lens 422 may be located above the semiconductor surface. Optionally, openings in different metal layers of the detection element may have different sizes aligned with the cone of focusing light generated by the associated lens 422. Such a structure may improve the signal-to-noise and resolution of the array 400 as a whole device. Large metal layers may be important for delivery of power and ground shielding. This approach may be useful, e.g., with a monostatic LiDAR design with a narrow field of view where the incoming light beam is comprised of parallel rays and the imaging focus does not have any consequence to the detected signal.

In the lens configuration illustrated with regards to detection element 402(2), an efficiency of photon detection by the detection elements 402 may be improved by identifying a sweet spot. Specifically, a photodetector implemented in CMOS may have a sweet spot in the sensitive volume area where the probability of a photon creating an avalanche effect is the highest. Therefore, a focal point of lens 422 may be positioned inside the sensitive volume area at the sweet spot location, as demonstrated by detection elements 402(2). The lens shape and distance from the focal point may take into account the refractive indices of all the elements the laser beam is passing along the way from the lens to the sensitive sweet spot location buried in the semiconductor material.

In the lens configuration illustrated with regards to the detection element on the right of FIG. 4E, an efficiency of photon absorption in the semiconductor material may be improved using a diffuser and reflective elements. Specifically, a near IR wavelength requires a significantly long path of silicon material in order to achieve a high probability of absorbing a photon that travels through. In a typical lens configuration, a photon may traverse the sensitive area and may not be absorbed into a detectable electron. A long absorption path that improves the probability for a photon to create an electron renders the size of the sensitive area towards less practical dimensions (tens of um for example) for a CMOS device fabricated with typical foundry processes. The rightmost detector element in FIG. 4E demonstrates a technique for processing incoming photons. The associated lens 422 focuses the incoming light onto a diffuser element 424. In one embodiment, light sensor 116 may further include a diffuser located in the gap distant from the outer surface of at least some of the detectors. For example, diffuser 424 may steer the light beam sideways (e.g., as perpendicular as possible) towards the sensitive area and the reflective optical trenches 426. The diffuser is located at the focal point, above the focal point, or below the focal point. In this embodiment, the incoming light may be focused on a specific location where a diffuser element is located. Optionally, detector element 422 is designed to optically avoid the inactive areas where a photon induced electron may get lost and reduce the effective detection efficiency. Reflective optical trenches 426 (or other forms of optically reflective structures) cause the photons to bounce back and forth across the sensitive area, thus increasing the likelihood of detection. Ideally, the photons will get trapped in a cavity consisting of the sensitive area and the reflective trenches indefinitely until the photon is absorbed and creates an electron/hole pair.

Consistent with the present disclosure, a long path is created for the impinging photons to be absorbed and contribute to a higher probability of detection. Optical trenches may also be implemented in detecting element 422 for reducing cross talk effects of parasitic photons created during an avalanche that may leak to other detectors and cause false detection events. According to some embodiments, a photo detector array may be optimized so that a higher yield of the received signal is utilized, meaning, that as much of the received signal is received and less of the signal is lost to internal degradation of the signal. The photo detector array may be improved by: (a) moving the focal point at a location above the semiconductor surface, optionally by designing the metal layers above the substrate appropriately; (b) by steering the focal point to the most responsive/sensitive area (or "sweet spot") of the substrate and (c) adding a diffuser above the substrate to steer the signal toward the "sweet spot" and/or adding reflective material to the trenches so that deflected signals are reflected back to the "sweet spot."

While in some lens configurations, lens 422 may be positioned so that its focal point is above a center of the corresponding detection element 402, it is noted that this is not necessarily so. In other lens configuration, a position of the focal point of the lens 422 with respect to a center of the corresponding detection element 402 is shifted based on a distance of the respective detection element 402 from a center of the detection array 400. This may be useful in relatively larger detection arrays 400, in which detector elements further from the center receive light in angles which are increasingly off-axis. Shifting the location of the focal points (e.g., toward the center of detection array 400) allows correcting for the incidence angles. Specifically, shifting the location of the focal points (e.g., toward the center of detection array 400) allows correcting for the incidence angles while using substantially identical lenses 422 for all detection elements, which are positioned at the same angle with respect to a surface of the detector.

Adding an array of lenses 422 to an array of detection elements 402 may be useful when using a relatively small sensor 116 which covers only a small part of the field of view because in such a case, the reflection signals from the scene reach the detectors array 400 from substantially the same angle, and it is, therefore, easy to focus all the light onto individual detectors. It is also noted, that in one embodiment, lenses 422 may be used in LIDAR system 100 for favoring about increasing the overall probability of detection of the entire array 400 (preventing photons from being "wasted" in the dead area between detectors/sub-detectors) at the expense of spatial distinctiveness. This embodiment is in contrast to prior art implementations such as CMOS RGB camera, which prioritize spatial distinctiveness (i.e., light that propagates in the direction of detection element A is not allowed to be directed by the lens toward detection element B, that is, to "bleed" to another detection element of the array). Optionally, sensor 116 includes an array of lens 422, each being correlated to a corresponding detection element 402, while at least one of the lenses 422 deflects light which propagates to a first detection element 402 toward a second detection element 402 (thereby it may increase the overall probability of detection of the entire array).

Specifically, consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal point (e.g., the focal point may be a plane) to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

Referring by way of a nonlimiting example to FIGS. 2E, 2F and 2G, it is noted that the one or more sensors 116 of system 100 may receive light from a scanning deflector 114 or directly from the FOV without scanning Even if light from the entire FOV arrives to the at least one sensor 116 at the same time, in some implementations the one or more sensors 116 may sample only parts of the FOV for detection output at any given time. For example, if the illumination of projection unit 102 illuminates different parts of the FOV at different times (whether using a deflector 114 and/or by activating different light sources 112 at different times), light may arrive at all of the pixels or sensors 116 of sensing unit 106, and only pixels/sensors which are expected to detect the LIDAR illumination may be actively collecting data for detection outputs. This way, the rest of the pixels/sensors do not unnecessarily collect ambient noise. Referring to the scanning—in the outbound or in the inbound directions—it is noted that substantially different scales of scanning may be implemented. For example, in some implementations the scanned area may cover 1% or 0.1% of the FOV, while in other implementations the scanned area may cover 10% or 25% of the FOV. All other relative portions of the FOV values may also be implemented, of course.

The Processing Unit

Figure 5A:
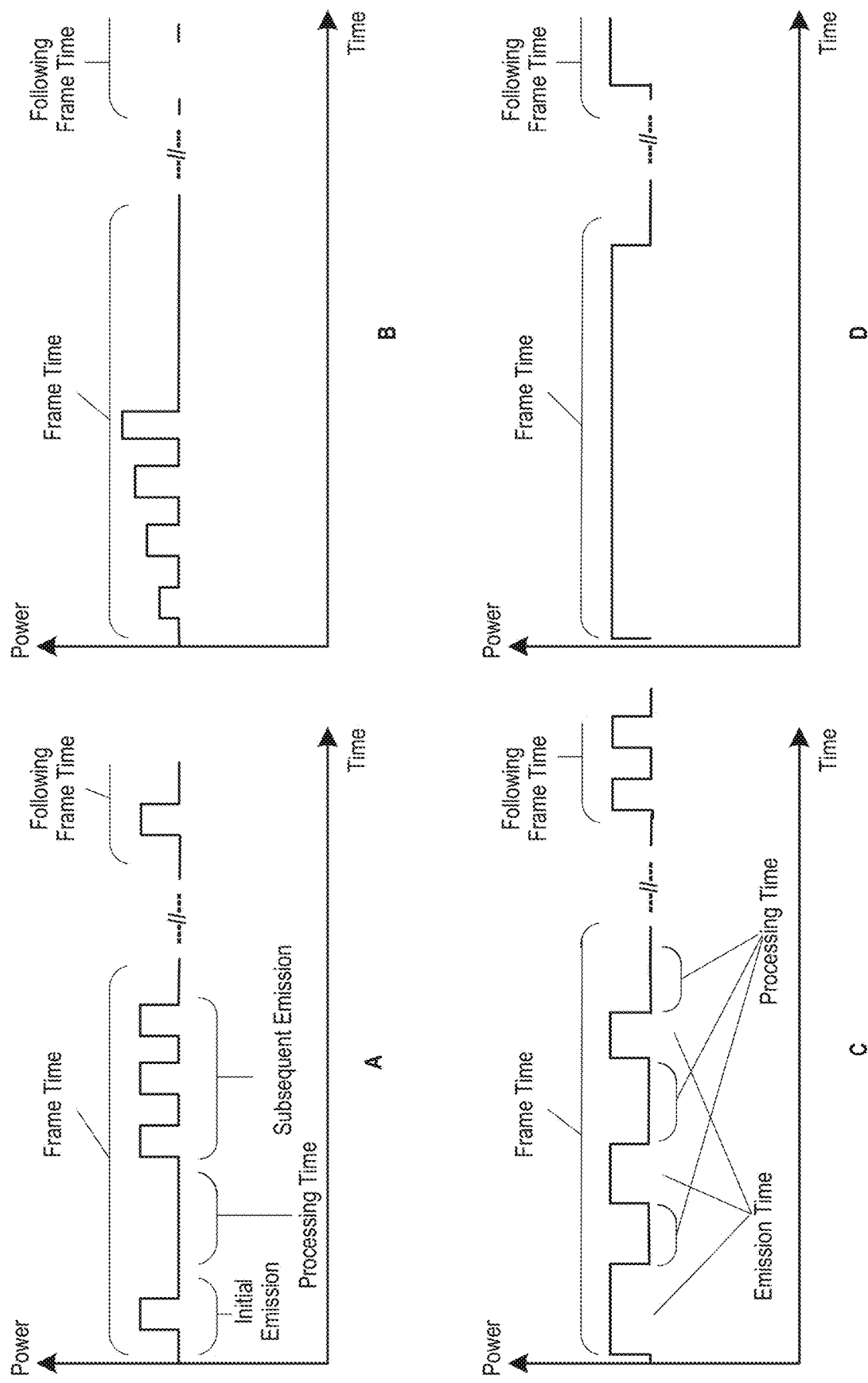
FIG. 5A includes four example diagrams illustrating emission patterns in a single frame-time for a single portion of the field of view.
Figure 6:
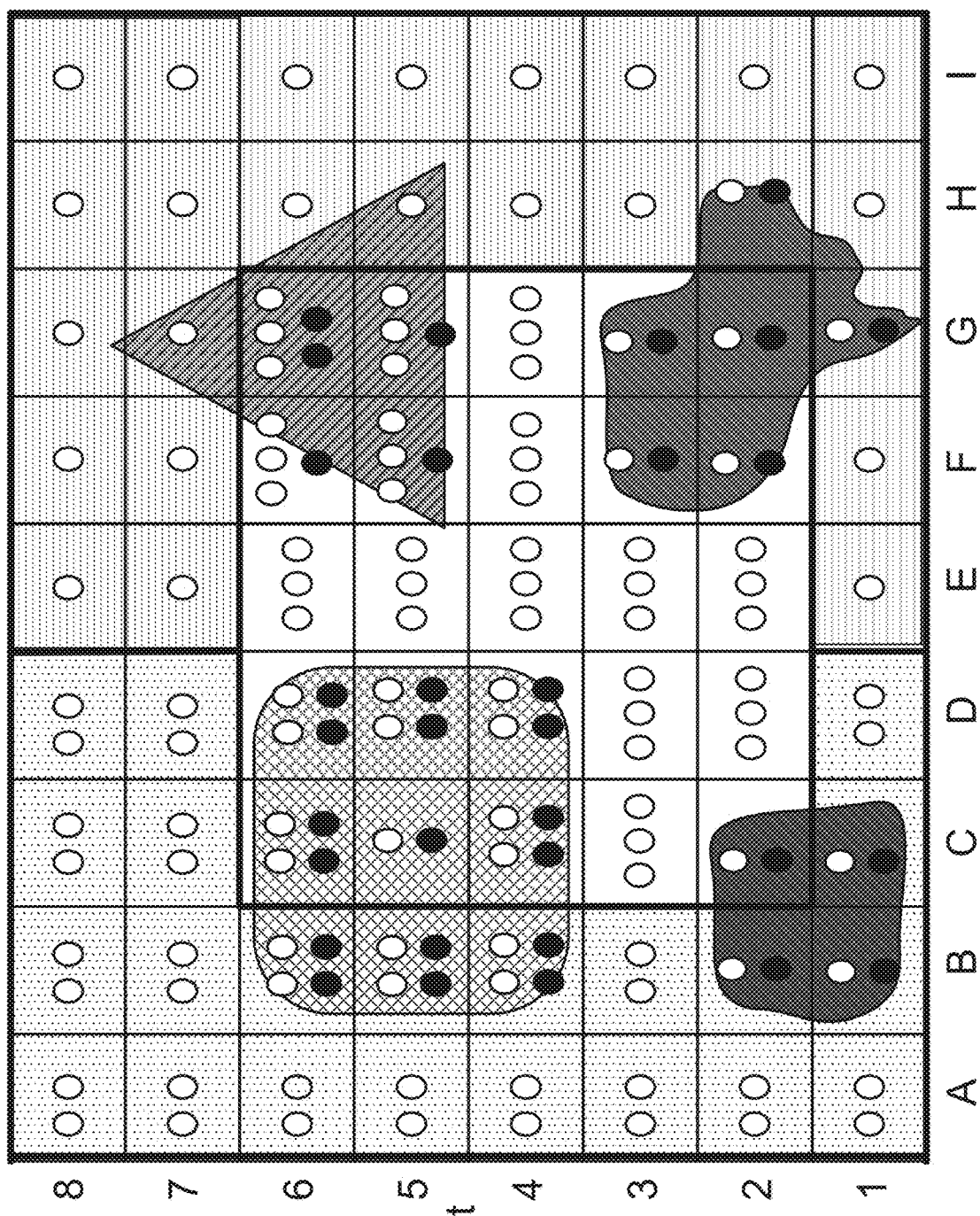
FIG. 6 is a diagram illustrating the actual light emission projected towards and reflections received during a single frame-time for the whole field of view.

FIGS. 5A, 5B, and 6 depict different functionalities of processing units 108 in accordance with some embodiments of the present disclosure. Specifically, FIG. 5A is a diagram illustrating emission patterns in a single frame-time for a single portion of the field of view, FIG. 5B is a diagram illustrating emission scheme in a single frame-time for the whole field of view, and. FIG. 6 is a diagram illustrating the actual light emission projected towards field of view during a single scanning cycle.

FIG. 5A illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5A depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g. one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g. for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame). This embodiment is described in greater detail below with reference to FIGS. 23-25.

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g. 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following.

a. Overall energy of the subsequent emission.
    b. Energy profile of the subsequent emission.
    c. A number of light-pulse-repetition per frame.
    d. Light modulation characteristics such as duration, rate, peak, average power, and pulse shape.
    e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g. regions of interest, further distanced targets, low reflection targets, etc.) while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined upon after every pulse emitted, or after a number of pulses emitted.

FIG. 5B illustrates three examples of emission schemes in a single frame-time for field of view 120. Consistent with embodiments of the present disclosure, at least one processing unit 108 may use obtained information to dynamically adjust the operational mode of LIDAR system 100 and/or determine values of parameters of specific components of LIDAR system 100. The obtained information may be determined from processing data captured in field of view 120, or received (directly or indirectly) from host 210. Processing unit 108 may use the obtained information to determine a scanning scheme for scanning the different portions of field of view 120. The obtained information may include a current light condition, a current weather condition, a current driving environment of the host vehicle, a current location of the host vehicle, a current trajectory of the host vehicle, a current topography of road surrounding the host vehicle, or any other condition or object detectable through light reflection. In some embodiments, the determined scanning scheme may include at least one of the following: (a) a designation of portions within field of view 120 to be actively scanned as part of a scanning cycle, (b) a projecting plan for projecting unit 102 that defines the light emission profile at different portions of field of view 120; (c) a deflecting plan for scanning unit 104 that defines, for example, a deflection direction, frequency, and designating idle elements within a reflector array; and (d) a detection plan for sensing unit 106 that defines the detectors sensitivity or responsivity pattern.

In addition, processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g. camera, GPS), received (directly or indirectly) from host 210, or any combination of the above. In some embodiments, the identification of at least one region of interest may include identification of portions, areas, sections, pixels, or objects within field of view 120 that are important to monitor. Examples of areas that may be identified as regions of interest may include, crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Diagrams A-C in FIG. 5B depict examples of different scanning schemes for scanning field of view 120. Each square in field of view 120 represents a different portion 122 associated with an instantaneous position of at least one light deflector 114. Legend 500 details the level of light flux represented by the filling pattern of the squares. Diagram A depicts a first scanning scheme in which all of the portions have the same importance/priority and a default light flux is allocated to them. The first scanning scheme may be utilized in a start-up phase or periodically interleaved with another scanning scheme to monitor the whole field of view for unexpected/new objects. In one example, the light source parameters in the first scanning scheme may be configured to generate light pulses at constant amplitudes. Diagram B depicts a second scanning scheme in which a portion of field of view 120 is allocated with high light flux while the rest of field of view 120 is allocated with default light flux and low light flux. The portions of field of view 120 that are the least interesting may be allocated with low light flux. Diagram C depicts a third scanning scheme in which a compact vehicle and a bus (see silhouettes) are identified in field of view 120. In this scanning scheme, the edges of the vehicle and bus may be tracked with high power and the central mass of the vehicle and bus may be allocated with less light flux (or no light flux). Such light flux allocation enables concentration of more of the optical budget on the edges of the identified objects and less on their center which have less importance.

FIG. 6 illustrating the emission of light towards field of view 120 during a single scanning cycle. In the depicted example, field of view 120 is represented by an 8×9 matrix, where each of the 72 cells corresponds to a separate portion 122 associated with a different instantaneous position of at least one light deflector 114. In this exemplary scanning cycle, each portion includes one or more white dots that represent the number of light pulses projected toward that portion, and some portions include black dots that represent reflected light from that portion detected by sensor 116. As shown, field of view 120 is divided into three sectors: sector I on the right side of field of view 120, sector II in the middle of field of view 120, and sector III on the left side of field of view 120. In this exemplary scanning cycle, sector I was initially allocated with a single light pulse per portion; sector II, previously identified as a region of interest, was initially allocated with three light pulses per portion; and sector III was initially allocated with two light pulses per portion. Also as shown, scanning of field of view 120 reveals four objects 208: two free-form objects in the near field (e.g., between 5 and 50 meters), a rounded-square object in the mid field (e.g., between 50 and 150 meters), and a triangle object in the far field (e.g., between 150 and 500 meters). While the discussion of FIG. 6 uses number of pulses as an example of light flux allocation, it is noted that light flux allocation to different parts of the field of view may also be implemented in other ways such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. The illustration of the light emission as a single scanning cycle in FIG. 6 demonstrates different capabilities of LIDAR system 100. In a first embodiment, processor 118 is configured to use two light pulses to detect a first object (e.g., the rounded-square object) at a first distance, and to use three light pulses to detect a second object (e.g., the triangle object) at a second distance greater than the first distance. This embodiment is described in greater detail below with reference to FIGS. 11-13. In a second embodiment, processor 118 is configured to allocate more light to portions of the field of view where a region of interest is identified. Specifically, in the present example, sector II was identified as a region of interest and accordingly it was allocated with three light pulses while the rest of field of view 120 was allocated with two or less light pulses. This embodiment is described in greater detail below with reference to FIGS. 20-22. In a third embodiment, processor 118 is configured to control light source 112 in a manner such that only a single light pulse is projected toward to portions B1, B2, and C1 in FIG. 6, although they are part of sector III that was initially allocated with two light pulses per portion. This occurs because the processing unit 108 detected an object in the near field based on the first light pulse. This embodiment is described in greater detail below with reference to FIGS. 23-25. Allocation of less than maximal amount of pulses may also be a result of other considerations. For examples, in at least some regions, detection of object at a first distance (e.g. a near field object) may result in reducing an overall amount of light emitted to this portion of field of view 120. This embodiment is described in greater detail below with reference to FIGS. 14-16. Other reasons to for determining power allocation to different portions is discussed below with respect to FIGS. 29-31, FIGS. 53-55, and FIGS. 50-52.

Additional details and examples on different components of LIDAR system 100 and their associated functionalities are included in Applicant's U.S. patent application Ser. No. 15/391,916 filed Dec. 28, 2016; Applicant's U.S. patent application Ser. No. 15/393,749 filed Dec. 29, 2016; Applicant's U.S. patent application Ser. No. 15/393,285 filed Dec. 29, 2016; and Applicant's U.S. patent application Ser. No. 15/393,593 filed Dec. 29, 2016, which are incorporated herein by reference in their entirety.

Example Implementation: Vehicle

Figure 9:
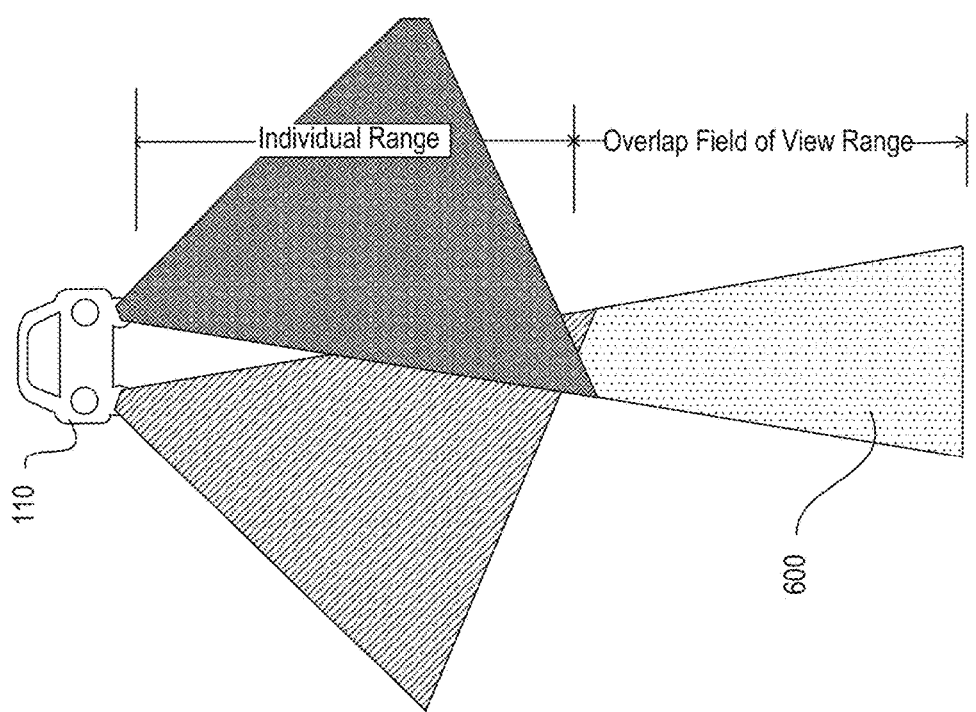
FIGS. 7-9 are diagrams illustrating a first example implementation consistent with some embodiments of the present disclosure.
Figure 7:
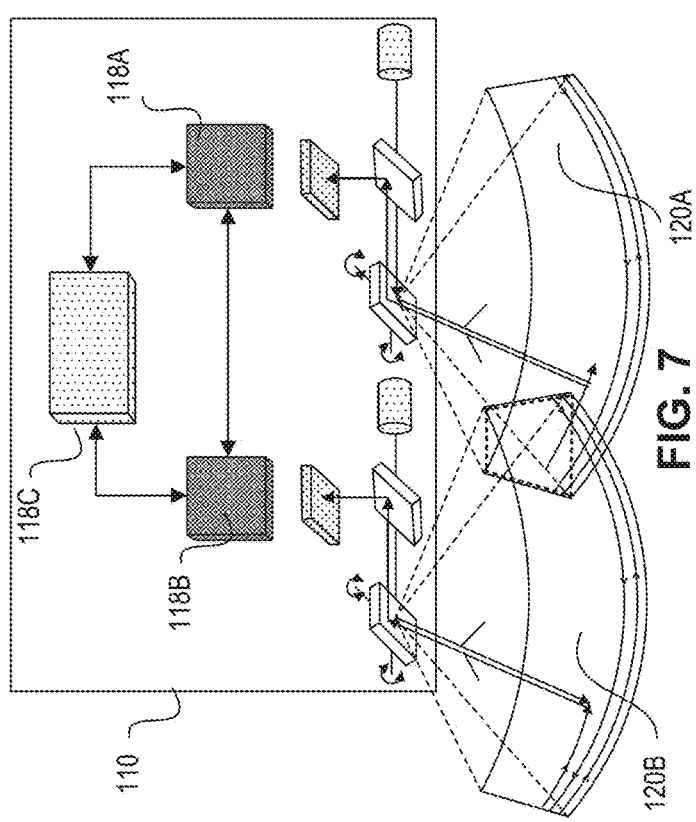
Figure 8:
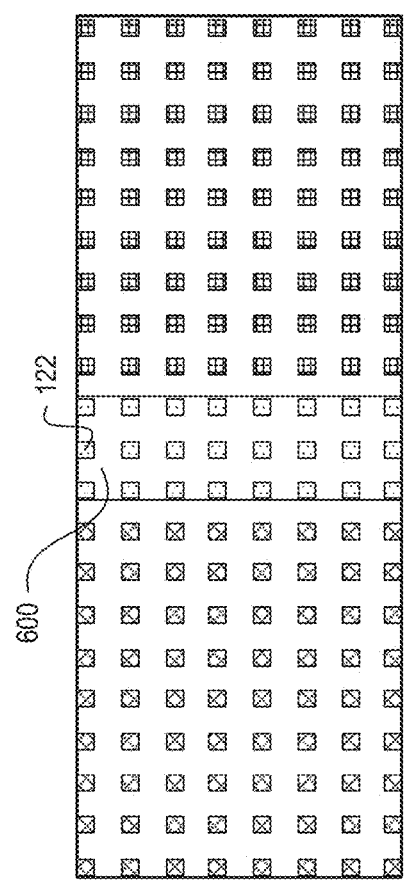

FIGS. 7-9 illustrate the implementation of LIDAR system 100 in a vehicle (e.g., vehicle 110). Any of the aspects of LIDAR system 100 described above or below may be incorporated into vehicle 110 to provide a range-sensing vehicle. Specifically, in this example, LIDAR system 100 integrates multiple scanning units 104 and potentially multiple projecting units 102 in a single vehicle. In one embodiment, a vehicle may take advantage of such a LIDAR system to improve power, range and accuracy in the overlap zone and beyond it, as well as redundancy in sensitive parts of the FOV (e.g. the forward movement direction of the vehicle). As shown in FIG. 7, vehicle 110 may include a first processor 118A for controlling the scanning of field of view 120A, a second processor 118B for controlling the scanning of field of view 120B, and a third processor 118C for controlling synchronization of scanning the two fields of view. In one example, processor 118C may be the vehicle controller and may have a shared interface between first processor 118A and second processor 118B. The shared interface may enable an exchanging of data at intermediate processing levels and a synchronization of scanning of the combined field of view in order to form an overlap in the temporal and/or spatial space. In one embodiment, the data exchanged using the shared interface may be: (a) time of flight of received signals associated with pixels in the overlapped field of view and/or in its vicinity; (b) laser steering position status; (c) detection status of objects in the field of view.

FIG. 8 illustrates overlap region 600 between field of view 120A and field of view 120B. In the depicted example, the overlap region is associated with 24 portions 122 from field of view 120A and 24 portions 122 from field of view 120B. Given that the overlap region is defined and known by processors 118A and 118B, each processor may be designed to limit the amount of light emitted in overlap region 600 in order to conform with an eye safety limit that spans multiple source lights, or for other reasons such as maintaining an optical budget. In addition, processors 118A and 118B may avoid interferences between the light emitted by the two light sources by loose synchronization between the scanning unit 104A and scanning unit 104B, and/or by control of the laser transmission timing, and/or the detection circuit enabling timing.

FIG. 9 illustrates how overlap region 600 between field of view 120A and field of view 120B may be used to increase the detection distance of vehicle 110. Consistent with the present disclosure, two or more light sources 112 projecting their nominal light emission into the overlap zone may be leveraged to increase the effective detection range. The term "detection range" may include an approximate distance from vehicle 110 at which LIDAR system 100 can clearly detect an object. In one embodiment, the maximum detection range of LIDAR system 100 is about 300 meters, about 400 meters, or about 500 meters. For example, for a detection range of 200 meters, LIDAR system 100 may detect an object located 200 meters (or less) from vehicle 110 at more than 95%, more than 99%, more than 99.5% of the times. Even when the object's reflectivity may be less than 50% (e.g., less than 20%, less than 10%, or less than 5%). In addition, LIDAR system 100 may have less than 1% false alarm rate. In one embodiment, light from projected from two light sources that are collocated in the temporal and spatial space can be utilized to improve SNR and therefore increase the range and/or quality of service for an object located in the overlap region. Processor 118C may extract high-level information from the reflected light in field of view 120A and 120B. The term "extracting information" may include any process by which information associated with objects, individuals, locations, events, etc., is identified in the captured image data by any means known to those of ordinary skill in the art. In addition, processors 118A and 118B may share the high-level information, such as objects (road delimiters, background, pedestrians, vehicles, etc.), and motion vectors, to enable each processor to become alert to the peripheral regions about to become regions of interest. For example, a moving object in field of view 120A may be determined to soon be entering field of view 120B.

Example Implementation: Surveillance System

Figure 10:
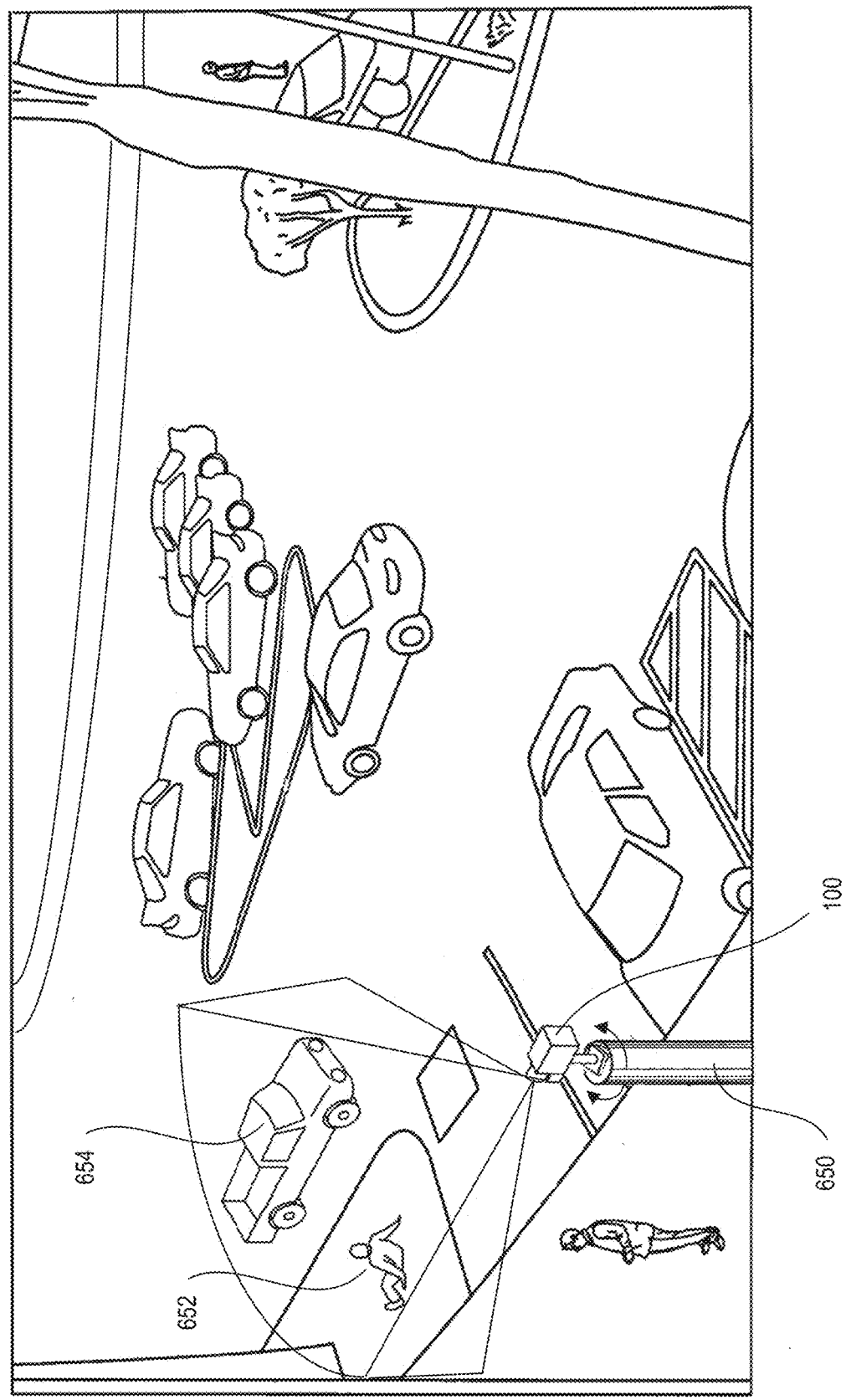
FIG. 10 is a diagram illustrating a second example implementation consistent with some embodiments of the present disclosure.

FIG. 10 illustrates the implementation of LIDAR system 100 in a surveillance system. As mentioned above, LIDAR system 100 may be fixed to a stationary object 650 that may include a motor or other mechanisms for rotating the housing of the LIDAR system 100 to obtain a wider field of view. Alternatively, the surveillance system may include a plurality of LIDAR units. In the example depicted in FIG. 10, the surveillance system may use a single rotatable LIDAR system 100 to obtain 3D data representing field of view 120 and to process the 3D data to detect people 652, vehicles 654, changes in the environment, or any other form of security-significant data.

Consistent with some embodiment of the present disclosure, the 3D data may be analyzed to monitor retail business processes. In one embodiment, the 3D data may be used in retail business processes involving physical security (e.g., detection of: an intrusion within a retail facility, an act of vandalism within or around a retail facility, unauthorized access to a secure area, and suspicious behavior around cars in a parking lot). In another embodiment, the 3D data may be used in public safety (e.g., detection of: people slipping and falling on store property, a dangerous liquid spill or obstruction on a store floor, an assault or abduction in a store parking lot, an obstruction of a fire exit, and crowding in a store area or outside of the store). In another embodiment, the 3D data may be used for business intelligence data gathering (e.g., tracking of people through store areas to determine, for example, how many people go through, where they dwell, how long they dwell, how their shopping habits compare to their purchasing habits).

Consistent with other embodiments of the present disclosure, the 3D data may be analyzed and used for traffic enforcement. Specifically, the 3D data may be used to identify vehicles traveling over the legal speed limit or some other road legal requirement. In one example, LIDAR system 100 may be used to detect vehicles that cross a stop line or designated stopping place while a red traffic light is showing. In another example, LIDAR system 100 may be used to identify vehicles traveling in lanes reserved for public transportation. In yet another example, LIDAR system 100 may be used to identify vehicles turning in intersections where specific turns are prohibited on red.

It should be noted that while examples of various disclosed embodiments have been described above and below with respect to a control unit that controls scanning of a deflector, the various features of the disclosed embodiments are not limited to such systems. Rather, the techniques for allocating light to various portions of a LIDAR FOV may be applicable to type of light-based sensing system (LIDAR or otherwise) in which there may be a desire or need to direct different amounts of light to different portions of field of view. In some cases, such light allocation techniques may positively impact detection capabilities, as described herein, but other advantages may also result.

It should also be noted that various sections of the disclosure and the claims may refer to various components or portions of components (e.g., light sources, sensors, sensor pixels, field of view portions, field of view pixels, etc.) using such terms as "first," "second," "third," etc. These terms are used only to facilitate the description of the various disclosed embodiments and are not intended to be limiting or to indicate any necessary correlation with similarly named elements or components in other embodiments. For example, characteristics described as associated with a "first sensor" in one described embodiment in one section of the disclosure may or may not be associated with a "first sensor" of a different embodiment described in a different section of the disclosure.

It is noted that LIDAR system 100, or any of its components, may be used together with any of the particular embodiments and methods disclosed below. Nevertheless, the particular embodiments and methods disclosed below are not necessarily limited to LIDAR system 100, and may possibly be implemented in or by other systems (such as but not limited to other LIDAR systems, other electrooptical systems, other optical systems, etc.—whichever is applicable). Also, while system 100 is described relative to an exemplary vehicle-based LIDAR platform, system 100, any of its components, and any of the processes described herein may be applicable to LIDAR systems disposed on other platform types. Likewise, the embodiments and processes disclosed below may be implemented on or by LIDAR systems (or other systems such as other electrooptical systems etc.) which are installed on systems disposed on platforms other than vehicles, or even regardless of any specific platform.

The present disclosure relates to MEMS scanning devices. While the present disclosure provides examples of MEMS scanning devices that may be part of a scanning LIDAR system, it should be noted that aspects of the disclosure in their broadest sense, are not limited to MEMS scanning devices for a LIDAR system. Rather, it is contemplated that the forgoing principles may be applied to other types of electro-optic systems as well. FIGS. 3A-3D depict exemplary MEMS scanning devices 104.

A MEMS scanning device in accordance with the present disclosure may include a movable MEMS mirror configured to pivot about at least one axis. A MEMS scanning device may include a light deflector configured to make light deviate from its original path. In some exemplary embodiments, the light deflector may be in the form of a MEMS mirror that may include any MEMS structure with a rotatable part which rotates with respect to a plane of a wafer (or frame). For example, a scanning MEMS system may include structures such as a rotatable valve, or an acceleration sensor. In some exemplary embodiments, the rotatable part may include a reflective coating or surface to form a MEMS mirror capable of reflecting or deflecting light from a light source. Various exemplary embodiments of MEMS mirror assemblies discussed below may be part of a scanning LIDAR system (such as—but not limited to—system 100, e.g. MEMS mirror 300, deflector 114), or may be used for any other electro-optic system in which a rotatable MEMS mirror or another rotatable MEMS structure may be of use. While a MEMS mirror has been disclosed as an exemplary embodiment of a light deflector, it should be noted that aspects of the disclosure in their broadest sense, are not limited to MEMS mirror. Thus, for example, the disclosed MEMS mirror in a MEMS scanning device according to this disclosure may instead include prisms, controllable lenses, mechanical mirrors, mechanical scanning polygons, active diffraction (e.g. controllable LCD), Risley prisms, or other types of optical equipment capable of deflecting a path of light.

In accordance with the present disclosure, a MEMS mirror assembly may include a frame, which supports the MEMS mirror. As used in this disclosure a frame may include any supporting structure to which the MEMS mirror may be attached such that the MEMS mirror may be capable of rotating relative to the frame. For example, the MEMS mirror may include portions of a wafer used to manufacture the MEMS mirror that may structurally support the MEMS mirror while allowing the MEMS mirror to pivot about one or more axes of rotation relative to the frame.

Figure 11A:
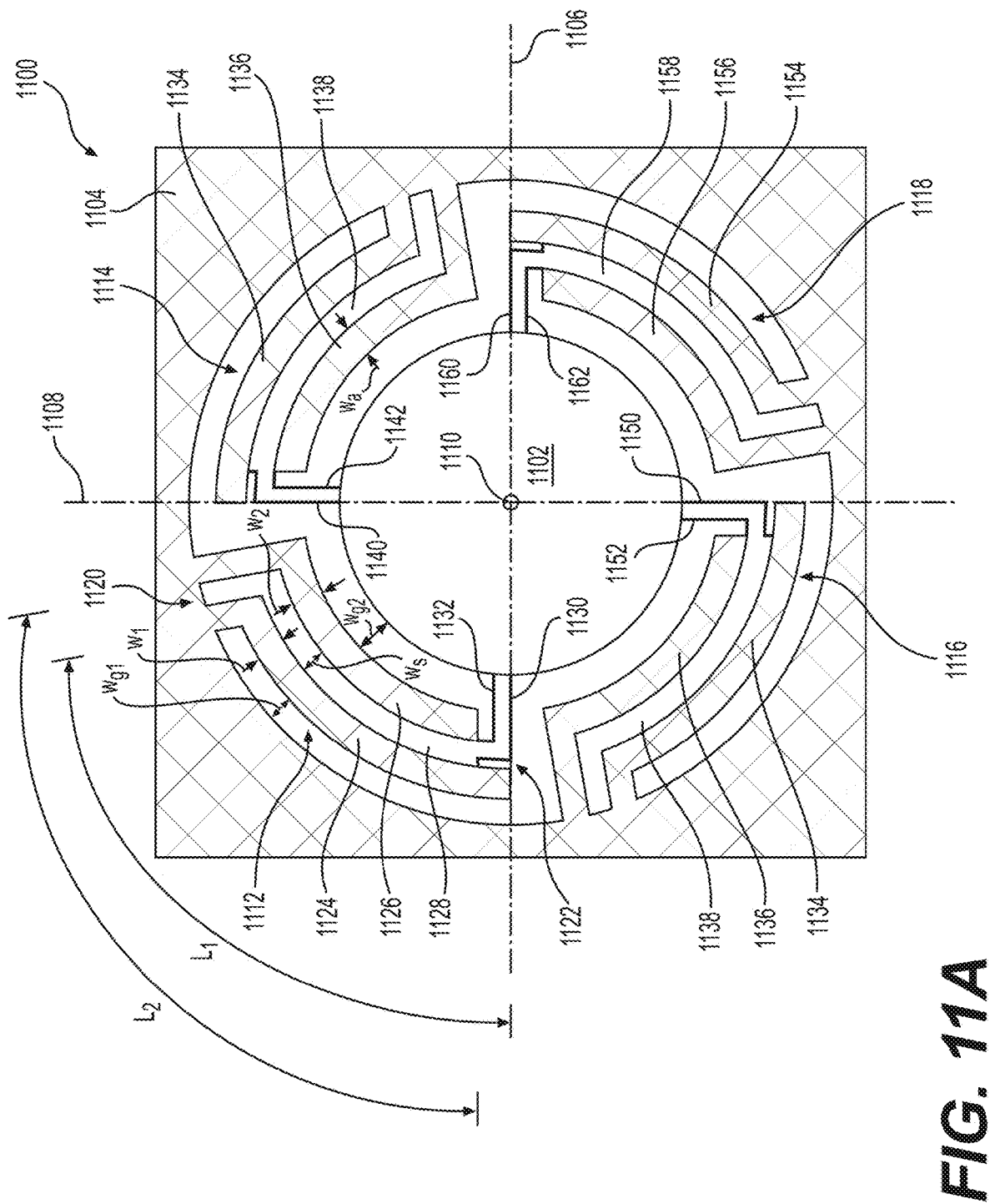

FIG. 11A illustrates an exemplary MEMS mirror assembly 1100 consistent with this disclosure. For example, as illustrated in FIG. 11A, MEMS mirror assembly 1100 may include MEMS mirror 1102 supported by frame 1104. MEMS mirror 1102 may be a movable MEMS mirror in that MEMS mirror 1102 may be translatable relative to frame 1104 and/or rotatable about one or more axes relative to frame 1104. For example, MEMS mirror 1102 may be translatable or rotatable about exemplary axes 1106, 1108, or 1110 (going into the plane of the figure) as illustrated in FIG. 11A. In some exemplary embodiments, MEMS mirror 1102 may include a reflective surface and/or reinforcement structures, for example, reinforcing ribs attached to an underside of MEMS mirror 1102 opposite the reflective surface. Although MEMS mirror 1102 has been illustrated as having a circular shape in FIG. 11A, it is contemplated that MEMS mirror 1102 may have a square shape, a polygonal shape (e.g. octagonal), an elliptical shape, or any other geometrical shape suitable for use with system 100. While the present disclosure describes examples of a MEMS mirror and frame, it should be noted that aspects of the disclosure in their broadest sense are not limited to the disclosed examples of the MEMS mirror and/or frame.

In accordance with the present disclosure a MEMS scanning device may include at least one actuator configured to cause pivoting of the movable MEMS mirror about the at least one axis in a first direction. An actuator according to the present disclosure may include one or more movable structural members of the MEMS mirror assembly that may be capable of causing translational and/or rotational movement of the MEMS mirror relative to the frame. The disclosed actuator may be an integral part of the MEMS mirror assembly or may be separate and distinct from the MEMS mirror assembly. The disclosed actuator may be directly or indirectly attached to the disclosed MEMS mirror.

In some exemplary embodiments, the actuator may be a part of the MEMS mirror assembly and may itself be configured to move relative to the frame and/or relative to the MEMS mirror associated with the MEMS mirror assembly. For example, the disclosed actuator may be connected between the frame and the MEMS mirror and may be configured to be displaced, bent, twisted, and/or distorted to cause movement (i.e. translation or rotation) of the MEMS mirror relative to the frame. It is contemplated that a MEMS mirror assembly according to the present disclosure may include one, two, or any other number of actuators.

By way of example, FIG. 11A illustrates exemplary actuators 1112, 1114, 1116, and 1118 associated with MEMS mirror assembly 1100 consistent with this disclosure. As illustrated in FIG. 11A, actuator 1112 may be connected to frame 1104 adjacent first end 1120 and may be connected to MEMS mirror 1102 adjacent an opposite end 1122 of actuator 1112. Details regarding the connection between actuator 1112 and MEMS mirror 1102 will be described in more detail below. Actuators 1114, 1116, and 1118 may be connected between frame 1104 and MEMS mirror 1102 in a similar manner Movement of the one or more actuators 1112, 1114, 1116, and 1118 may cause translational and/or rotational movement of MEMS mirror 1102 about the one or more axes 1106, 1108, and/or 1110. While the present disclosure describes examples of actuators associated with a MEMS scanning device, it should be noted that aspects of the disclosure in their broadest sense are not limited to the disclosed actuator examples.

The actuators of the MEMS mirror assembly may be actuated in various different ways, such as by contraction of a piezoelectric member on each actuator (e.g. PZT, Lead zirconate titanate, aluminum nitride), electromagnetic actuation, electrostatic actuation, etc. As mentioned above, the actuators may be piezoelectric actuators. It is noted that in the description below, any applicable piezoelectric material may be used wherever the example of PZT is used. Optionally, one or more of the plurality of actuators may include a piezoelectric layer (e.g., a PZT layer), which is configured to bend the respective actuator, thereby rotating the mirror, when subjected to an electrical field. By way of example, the one or more actuators 1112, 1114, 1116, and 1118 associated with MEMS mirror assembly 1100 may include one or more PZT layers. Energizing the one or more PZT layers with an electrical field (e.g. by providing a bias voltage or current) may cause the one or more actuators 1112, 1114, 1116, and 1118 to expand, contract, bend, twist, or alter their configuration, which in turn may cause MEMS mirror 1102 to be translated or rotated about the one or more axes 1106, 1108, and/or 1110. While the present disclosure describes examples of axes of rotation of the MEMS mirror, it should be noted that aspects of the disclosure in their broadest sense are not limited to the disclosed examples of the axes of rotation. Thus, for example, the MEMS mirror according to the present disclosure may translate and/or rotate about axes other than the disclosed axes 1106, 1108, and/or 1110. It is also contemplated that in other implementations, the actuators themselves may move perpendicularly to a plane of the frame, parallel to the plane of the frame and/or in any combination of the two.

In accordance with the present disclosure a MEMS scanning device may include at least one spring configured to cause pivoting of the movable MEMS mirror about the at least one axis in a second direction different from the first direction. A spring as used in this disclosure refers to any component or structure configured to provide a restoring force to the MEMS mirror. In some cases, the disclosed spring may limit the motion of the mirror in response to actuation and may restore the mirror to an equilibrium position after actuation (e.g., once an actuating voltage signal has been discontinued). In some embodiments, the at least one second direction may be opposite the at least one first direction. That is, the restoring force provided by the one or more springs may be in a direction opposite to (or substantially opposite to) an actuating force intended to cause at least one displacement (i.e. translation or rotation) of the MEMS mirror.

By way of example, FIG. 3A illustrates exemplary springs 302A and 302B. Returning to FIG. 11A, the silicon in the one or more actuators 1112, 1114, 1116, and 1118 may also function as springs and may cause MEMS mirror 1102 to be translated or rotated in a direction opposite to a direction in which the one or more actuators 1112, 1114, 1116, and 1118 cause translation and/or rotation of MEMS mirror 1102. Although the present disclosure describes examples of springs associated with a MEMS scanning device, it should be noted that aspects of the disclosure in their broadest sense are not limited to the disclosed spring examples.

According to the present disclosure, the at least one actuator includes a first actuating arm, a second actuating arm, and a gap between the first actuating arm and the second actuating arm. Like an actuator, an actuating arm according to this disclosure may include a structural member that may be capable of causing translational or rotational movement of the MEMS mirror relative to the frame. In some exemplary embodiments, the disclosed actuator may include only one actuating arm. By way of nonlimiting examples, FIGS. 12A-12F illustrate actuators having only one actuating arm. In other exemplary embodiments the disclosed actuator may include more than one actuating arm. Each actuating arm may be deemed an actuator that may operate in unison with an actuating arm paired with it. For example, in some embodiments, the disclosed actuator may include two actuating arms separated from each other by a gap. Some or all actuating arms may be equipped with PZT layers, which may cause those actuating arms to expand, contract, bend, twist, or move in some way. Movement of the one or more actuating arms in turn may cause movement of the MEMS mirror associated with the MEMS scanning device.

In accordance with the present disclosure, the first actuating arm and the second actuating arm lie adjacent to each other, at least partially separated from each other by the gap. The first and second actuating arms are configured to be actuated simultaneously to thereby enable exertion of a combined mechanical force on the movable MEMS mirror to pivot the movable MEMS mirror about the at least one axis. It is to be understood that when the first and second arms are actuated simultaneously, they may be actuated be totally, substantially, or partly simultaneously. Thus, for example, even when being actuated simultaneously, the two actuating arms may be actuated/de-actuated slightly before or after the other arm. Further, the restoring force due to the spring action of the silicon of the one or more actuating arms may also be applied simultaneously for moving the MEMS mirror in the second direction, for example, by simultaneously not applying voltages on PZT of both actuating arms. It is also contemplated that in some embodiments, other means for applying a restorative force may be used instead of a spring. For example, in some embodiments, the actuating arms may include an additional PZT layer or other electromagnetic actuator that may provide a restorative force. In some exemplary embodiments according to the present disclosure, the actuating arms may be positioned adjacent to each other and may be separated by a gap. As discussed above, in some exemplary embodiments, the one or more actuating arms associated with the disclosed actuator may each include a PZT layer. The PZT layer associated with the discrete actuating arms may be subjected to an electrical field, voltage, etc. at the same time or at different times, which in turn may cause the actuating arms to be displaced simultaneously or at different times. In some embodiments, the first and second actuating arms may be displaced simultaneously to help ensure that the displacement of the two actuating arms applies a combined mechanical force on the MEMS mirror (e.g., via one or more connectors which connect the actuating arms to the MEMS mirror) causing a displacement (e.g. translation and/or rotation) of the MEMS mirror.

FIG. 11A, for example, illustrates first actuator 1112 which includes first actuating arm 1124, second actuating arm 1126, and gap 1128 between first actuating arm 1124 and second actuating arm 1126. As also illustrated in the exemplary embodiment of FIG. 11A, first actuating arm 1124 may lie adjacent to second actuating arm 1126. Each of first and second actuating arms 1124, 1126 may include an associated PZT layer. Application of an electrical voltage or current to the PZT layer may cause first and second actuating arms 1124, 1126 to deform by, for example, expansion, contraction, bending, twisting etc. Deformation of the first and second actuating arms 1124 and 1126 may in turn cause movement of MEMS mirror 1102. It is contemplated that in some embodiments, the PZT layers of the first and second actuating arms 1124, 1126 may be activated at the same time, which may cause deformation of both first and second actuating arms 1124 and 1126 simultaneously. Such simultaneous deformation in turn may cause a combined mechanical force generated by both first and second actuating arms 1124 and 1126 to be applied on MEMS mirror 1102.

As illustrated in the exemplary embodiment of FIG. 11A, first actuating arm 1124 may be an outer actuating arm whereas second actuating arm 1126 may be an inner actuating arm. According to the embodiments of this disclosure, the terms inner and outer may be also understood based on distances relative to a center of the MEMS mirror. For example, as illustrated in FIG. 11A, first actuating arm 1124 may be positioned at a distance (e.g. radial distance) from MEMS mirror 1102 that may be greater than a distance (e.g. radial distance) of second actuating arm 1126 from MEMS mirror 1102. In some exemplary embodiments, first actuating arm 1124 may be an outer actuating arm because it may be positioned nearer to frame 1104 relative to MEMS mirror 1102, whereas second actuating arm 1126 may be an inner actuating arm because it may be positioned nearer to MEMS mirror 1102 relative to frame 1104.

Figure 11B:
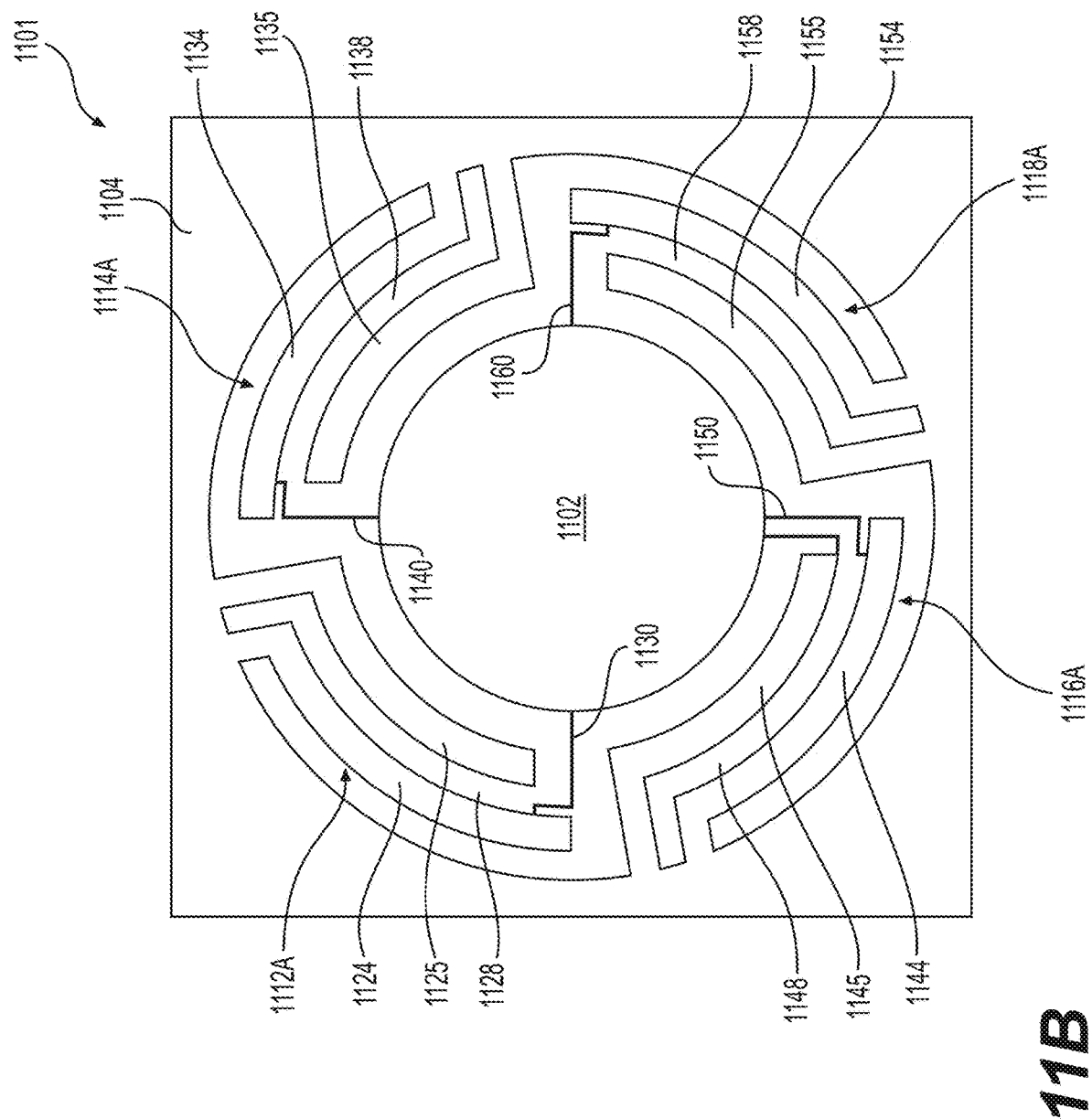

In accordance with the present disclosure, in the MEMS scanning device the gap may include a slit. Additionally, according to the present disclosure a width of the slit is less than 5% of an average width of the first actuating arm. Thus for example, adjacent actuating arms in exemplary embodiments of MEMS mirror assemblies may be separated by an elongated space or gap in the form of a slit. As illustrated in the exemplary MEMS mirror assembly 1100 of FIG. 11A, one or more of gaps 1128, 1138, 1148, and 1158 may be in the form of a slit, which may separate one or more of actuators 1112, 1114, 1116, and 1118 into their respective actuating arms. A width "$W_s$" (measured for example in a generally radial direction from MEMS mirror 1102) of the slit or gap 1128, 1138, 1148, and/or 1158 may be less than about 5%, less than about 10%, or less than about 20%, or less than about 25% of a width "$W_a$." The width Wa (measured for example in a generally radial direction from MEMS mirror 1102) may be the widths of one or more of actuating arms 1124, 1126, 1134, 1136, 1144, 1146, 1154, and/or 1156, a width of the wider or the narrower actuating arm, or an average width of adjacent actuating arms In accordance with the present disclosure, in the MEMS scanning device the gap may be filled with stationary non-reflective material. Non-reflective material as used in this disclosure may refer to materials that reduce and/or eliminate reflections of any incident light on the material. Including such non-reflective material may help to reduce or eliminate any unwanted reflections of light from the silicon strips not connected to the MEMS mirror so as to reduce reflection contributions from sources other than the MEMS mirror. By way of example, as illustrated in FIG. 11B, one or more of the stationary silicon strips 1125, 1135, 1145, and 1155 may be covered with non-reflective material so that light is not reflected by the silicon strips Making the non-reflective material stationary may also help ensure that MEMS mirror 1102 is not subjected to any undesirable movements due to movements of the non-reflective filler material.

In accordance with the present disclosure, the at least one actuator of the disclosed MEMS scanning device may include a first actuator and a second actuator. In some exemplary embodiments, the disclosed MEMS scanning device may include more than one actuator. It is contemplated that the MEMS scanning device according to the present disclosure may include two, three, four, or any other number of actuators. One or more of these actuators may be connected to the MEMS mirror associated with the MEMS scanning device to cause a movement (translation and/or rotation) of the MEMS mirror.

In accordance with the present disclosure, the first actuator may include the first actuating arm and the second actuating arm, and the second actuator may include a third actuating arm and a fourth actuating arm. As discussed above, in some exemplary embodiments, the first actuator associated with the disclosed MEMS scanning device may include a first actuating arm separated by a first gap from the second actuating arm. It is also contemplated that similar to the first actuator, the second actuator may also include one or more actuating arms. For example, the second actuator may include a third actuating arm and a fourth actuating arm separated from each other by a second gap. The first and second gaps may or may not be equal. Similarly, it is contemplated that in some exemplary embodiments, one or both of the first and second actuators may include one, two, or more actuating arms.

By way of example, FIG. 11A illustrates four actuators, including first actuator 1112, second actuator 1114, third actuator 1116, and fourth actuator 1118. As also discussed above, first actuator 1112 may include first actuating arm 1124 and second actuating arm 1126 separated by gap 1128, which may be a first gap. Like first actuator 1112, second actuator 1114 may include third actuating arm 1134 and fourth actuating arm 1136 separated by gap 1138. It is contemplated that gap 1128 may have dimensions equal to or different from dimensions of gap 1138. In some exemplary embodiments as illustrated in FIG. 11A, third actuating arm 1134 may be an outer actuating arm similar to first actuating arm 1124, and fourth actuating arm 1136 may be an inner actuating arm similar to second actuating arm 1126.

Third and fourth actuating arms 1134 and 1136 may be similar to first and/or second actuating arms 1124 and 1126, respectively. To ensure clarity, throughout this disclosure, the discussion of structural and functional characteristics is not repeated when subsequently disclosed elements have structural and functional characteristics similar to those previously discussed in the disclosure. Additionally, unless otherwise stated, throughout this disclosure, similarly numbered elements should be presumed to have similar structural and functional characteristics. Further, similar elements from one structure to the next may also have similar characteristics even if differently numbered.

In a MEMS scanning device according to the present disclosure, the at least one axis includes a first axis and a second axis (e.g. axis 1106, axis 1108, etc.). The first actuating arm and the second actuating arm may be configured to simultaneously act to pivot the movable MEMS mirror about the first axis. The third actuating arm and the fourth actuating arm being configured to simultaneously act to pivot the MEMS mirror about the second axis. As discussed above, the disclosed MEMS mirror may be translated or rotated (or pivoted) about one or more than one axis. In some exemplary embodiments, the MEMS mirror may be translated relative to or rotated about a first axis and a second axis different from the first axis. The first and second axis may be disposed generally perpendicular to each other or may be inclined relative to each other at an arbitrary angle. According to embodiments of this disclosures, terms such as generally, about, and substantially should be interpreted to encompass typical machining and manufacturing tolerances. Thus, for example, two axes may be deemed to be generally perpendicular if an angle between the two axes lies between 90±0.1°, 90±0.5°, or 90±1°. Likewise two axes or structural elements may be deemed to be generally parallel if an angle between them lies between 0±0.1°, 0±0.5°, or 0±1°. It is also contemplated that the MEMS mirror of the disclosed MEMS scanning device may be rotatable about one, two, or more than two axes of rotation.

In some exemplary embodiments, one or more of the actuators (e.g., the first actuator) may be configured to pivot (i.e. rotate) the MEMS mirror about a first axis of rotation, whereas one or more of the actuators (e.g., the second actuator) may be configured to pivot the MEMS mirror about a second axis of rotation. It is contemplated, however, that a single actuator may cause rotation of the MEMS mirror about more than one axis of rotation. For example, the first and second actuating arms associated with the first actuator may be configured to move so that the first and second actuating arms may induce a pivoting motion (or rotation) and/or a translation of the MEMS mirror about the first axis. Likewise, the third and fourth actuating arms associated with the second actuator may be configured to move so that the third and fourth actuating arms may induce a pivoting motion (or rotation) and/or a translation of the MEMS mirror about the second axis. The rotation or pivoting about the first and second axis may occur simultaneously or at different times. Thus for example, the first, second, third, and fourth actuating arms may be configured to move simultaneously or at different times to cause rotation of the MEMS mirror about the first and second axes at the same or different times, respectively.

By way of example, FIG. 11A illustrates MEMS mirror assembly 1100 that may have first axis 1106, second axis 1108, and third axis 1110. In the exemplary embodiment of FIG. 11A, first, second, and third axes 1106, 1108, 1110 are disposed generally perpendicular to each other. It is contemplated, however, that in other exemplary embodiments, one or more of first, second, and third axes 1106, 1108, 1110 may be inclined relative to each other at other angles of inclination. As also illustrated in FIG. 11A, first and second actuating arms 1124 and 1126 of first actuator 1112 may be configured to cause MEMS mirror 1102 to pivot, rotate, and/or translate about, for example, first axis 1106. Similarly, third and fourth actuating arms 1134 and 1136 of second actuator 1114 may be configured to cause MEMS mirror 1102 to pivot, rotate, and/or translate about, for example, second axis 1108 and/or third axis 1110, different from first axis 1106.

In one exemplary embodiment, first and second actuating arms 1124 and 1126 may be configured to act simultaneously to cause a rotation of MEMS mirror 1102 about axis 1106. It is contemplated, however, that first and second actuating arms 1124 and 1126 may be configured to act at different times to cause one or more rotations of MEMS mirror 1102 about axis 1106. Likewise, it is contemplated that third and fourth actuating arms 1134 and 1136 may be configured to act simultaneously or at different times to cause one or more rotations of MEMS mirror 1102 about axis 1108. In some exemplary embodiments, first, second, third, and fourth actuating arms 1124, 1126, 1134, and 1136 may all act simultaneously to cause simultaneous rotations or MEMS mirror 1102 about both first and second axis 1106, 1108. It is also contemplated, however, that one or more of first, second, third, and fourth actuating arms 1124, 1126, 1134, and 1136 may act at different times to cause one or more rotations of MEMS mirror 1102 at the same or different times.

According to the present disclosure, in the MEMS scanning device, the first actuating arm and the second actuating arm are of differing lengths. In other exemplary embodiments, the first and second actuating arms may be about equal in length. As discussed above, terms such as about encompass typical machining and manufacturing tolerances. Thus, for example, lengths of first and second actuating arms may be deemed to be about equal if they differ by less than ±1 μm, ±1 mm, ±1 mil, etc. It is also contemplated that in some exemplary embodiments, the second actuating arm may be longer than the first actuating arm.

In accordance with the present disclosure, one of the actuator arms may be wider than the other actuator arm. For example, in the MEMS scanning device, optionally the first actuating arm and the second actuating arm are of differing widths. In another example, optionally the second actuating arm may be wider than the first actuating arm. The wider arm may be wider by . . . 5%, 10%, 25%, etc. . . . ; wider arm may be for reasons of geometry, required force of the actuator arm, etc. . . . In other exemplary embodiments, the first and second actuating arms may have about equal widths. It is also contemplated that in some exemplary embodiments, the second actuating arm may be wider than the first actuating arm.

In accordance with the present disclosure, the disclosed MEMS scanning device may include first and second actuating arms, wherein the first actuating arm is shaped differently than the second actuating arm. In other exemplary embodiments according to the present disclosure, the first actuating arm and the second actuating arm may have the same shape. For example, the first and second actuating arms may have different lengths, widths, areas, geometric shapes, curvatures, etc.

By way of example, FIG. 11A illustrates first actuating arm 1124 and second actuating arm 1126. As illustrated in FIG. 11A, first actuating arm 1124 may have a length "$L_1$" and second actuating arm 1126 may have a length "$L_2$." In one exemplary embodiment as illustrated in FIG. 11A, length $L_1$ of first actuating arm 1124 may be greater than length $L_2$ of second actuating arm 1126. It is contemplated, however, that length $L_1$ may be about equal to or smaller than length $L_2$. As also illustrated in FIG. 11A, first actuating arm 1124 may have a width "$W_1$" and second actuating arm may have a width "$W_2$." In one exemplary embodiment as illustrated in FIG. 11A, width $W_1$ of first actuating arm 1124 may be generally uniform over length $L_1$, and width $W_2$ of second actuating arm 1126 may be generally uniform over length $L_2$. It is contemplated, however, that one or more of width $W_1$ of first actuating arm 1124 and/or width $W_2$ of second actuating arm 1126 may be nonuniform over lengths $L_1$ and $L_2$, respectively. In some exemplary embodiments, at least one of the pairs of actuating arms in the one or more actuators may include actuators of differing widths. For example, width $W_1$ of first actuating arm 1124 may be wider than width $W_2$ of second actuating arm 1126 by about 10%, about 25%, about 50%, about 100%, or by any other percentage value. In other exemplary embodiments the reverse may be true so that width $W_2$ of second actuating arm 1126 may be wider than width $W_1$ of first actuating arm 1124 by about 10%, about 25%, about 50%, about 100%, or by any other percentage value or vice-versa. It is also contemplated that length $L_1$ may be longer than length $L_2$ by about 10%, about 25%, about 50%, about 100%, or by any other percentage value, or vice-versa.

As also illustrated in FIG. 11A, first actuating arm 1124 and second actuating arm may have generally similar shapes. For example, as illustrated in FIG. 11A, first actuating arm 1124 and second actuating arm 1126 both have generally annular segment shapes. It is contemplated, however, that first and second actuating arms 1124 and 1126 may have the same or different shapes. Although lengths, widths, and shapes have been discussed above with respect to first and second actuating arms 1124 and 1126, it is to be understood that other actuating arms (e.g. actuating arms 1134 and 1136) may have geometries similar to or different from those discussed above for actuating arms 1124 and 1126.

In accordance with the present disclosure, the MEMS scanning device may have first and second actuating arms, wherein the first actuating arm is connected to the MEMS mirror via a first connector and the second actuating arm is connected to the MEMS mirror via a second connector. As used in this disclosure a connector may include a structural element that may electrically and/or mechanically connect other elements of the disclosed MEMS scanning device. For example, a connector may provide electrical and/or mechanical connections between one or more actuating arms, springs associated with the actuating arms, and the MEMS mirror. In some exemplary embodiments, the connector may be directly attached to one or more of actuating arms, to springs, and/or to the MEMS mirror. In other embodiments, the connector may include more than one connector member that may be connected to each other and may be attached to the one or more actuating arms, to springs, and/or to the MEMS mirror. In some embodiments, the connector may be a mechanical connector, which may be configured to allow relative movement between the MEMS mirror and the one or more actuating arms or actuators. In other embodiments, the connector may also be configured to allow electrical current and or signals to pass through the connector during operation of the MEMS scanning device. In some embodiments according to the present disclosure, each actuating arm may be connected to the MEMS mirror by a separate connector. It is contemplated, however, that in other exemplary embodiments, a single connector may connect more than one actuating arm to the MEMS mirror. Such a connector may include more than two ends—for example, one end connected to the mirror, and additional to ends connected to the different actuator arms.

By way of example, FIG. 11A illustrates MEMS mirror assembly 1100 that may include first connector 1130 and second connector 1132. As illustrated in the exemplary embodiment of FIG. 11A, one end of first connector 1130 may be connected to first actuating arm 1124 whereas an opposite end of first connector 1130 may be connected to MEMS mirror 1102. Likewise, one end of second connector 1132 may be connected to second actuating arm 1126 and an opposite end of second connector 1132 may be connected to MEMS mirror 1102.

As also illustrated in FIG. 11A, second actuator 1114 may be connected to MEMS mirror 1102 via connectors 1140 and 1142. For example, third actuating arm 1134 of second actuator 1114 may be connected to one end of connector 1140, whereas an opposite end of connector 1140 may be connected to MEMS mirror 1102. Similarly, for example, fourth actuating arm 1136 of second actuator 1114 may be connected to one end of connector 1142, whereas an opposite end of connector 1142 may be connected to MEMS mirror 1102. As discussed above, one or more springs (not shown) may be disposed between ends of first, second, third, and fourth connectors 1130, 1132, 1140, and 1142, and the first, second, third, and fourth actuating arms 1124, 1126, 1134, and 1136, respectively.

Although two actuators (i.e. first actuator 1112 and second actuator 1114) have been discussed above, it is contemplated that the MEMS scanning device according to the present disclosure may have more than two actuators. For example, the disclosed MEMS scanning device may include a plurality of actuators operable to rotate the MEMS mirror with respect to a plane of the frame. The MEMS scanning device may also include a plurality of interconnect elements (e.g. springs), each being mechanically connected between one or more of the actuators and the MEMS mirror. The actuation of the actuators in different movement schemes may result in rotation of the MEMS mirror. Additionally or alternatively, actuation of the actuators may also result in translation of the MEMS mirror in one or more directions. It is noted that, optionally, all of the MEMS mirror-assembly components discussed above may be fabricated on a single wafer and may share common layers (e.g., a common silicon layer, a common PZT layer). As also discussed above, different components of the MEMS mirror assembly may include various additional layers, such as an optional PZT layer for the actuators, one or more highly reflective layers for the mirror surface, and so on. The MEMS mirror assembly may also include additional components, such as a controller (e.g. processor or microprocessor, which may be operable to control actuation of the various actuators, mirror location feedback mechanism), optical components, structural elements, casing, etc. Such additional components of the MEMS mirror assembly may be implemented on the same wafer as the MEMS mirror, on another wafer, or be otherwise integrated with the wafer of the movable MEMS mirror.

By way of example, FIG. 11A illustrates an exemplary embodiment of MEMS mirror assembly 1100 including actuators 1116 and 1118 in addition to first and second actuators 1112 and 1114. Similar to the arrangement in actuators 1112 and 1114, actuator 1116 may include actuating arms 1144 and 1146 separated by gap 1148. Actuating arm 1144 may be connected to one end of connector 1150 and an opposite end of connector 1150 may be connected to MEMS mirror 1102. Likewise actuating arm 1146 may be connected to one end of connector 1152 and an opposite end of connector 1152 may be connected to MEMS mirror 1102. Further, actuator 1118 may include actuating arms 1154 and 1156 separated by gap 1156. Actuating arm 1154 may be connected to one end of connector 1160 and an opposite end of connector 1160 may be connected to MEMS mirror 1102. Likewise actuating arm 1156 may be connected to one end of connector 1162 and an opposite end of connector 1162 may be connected to MEMS mirror 1102. As also illustrated in FIG. 11A, actuating arms 1144 and 1154 may be outer actuating arms similar to actuating arms 1124 and 1134. Likewise, actuating arms 1146 and 1156 may be inner actuating arms similar to actuating arms 1126 and 1136.

In accordance with the present disclosure, the MEMS mirror assembly may include one, two, or more actuators which are spaced apart from the MEMS mirror by one or more corresponding silicon strips (also referred to as silicon bands). The one or more silicon strips may belong to the silicon layer on which the actuator and the mirror are implemented. FIG. 11B illustrates an exemplary embodiment of a MEMS mirror assembly 1101 that may include such a silicon strip or silicon band. Like MEMS mirror assembly 1100 of FIG. 11A, the exemplary MEMS mirror assembly 1101 of FIG. 11B may include MEMS mirror 1102, frame 1104, and actuators 1112A, 1114A, 1116A, and 1118A. Unlike actuator 1112 of MEMS mirror assembly 1100 of FIG. 11A, however, actuator 1112A of MEMS mirror assembly 1101 of FIG. 11B may include actuating arm 1124 and silicon strip 1125. As illustrated in FIG. 11B, silicon strip 1125 may be positioned adjacent actuating arm 1124 and may be separated from actuating arm 1124 by gap 1128. Actuating arm 1124 may be connected to MEMS mirror 1102 via connector 1130 as discussed with respect to MEMS mirror assembly 1100 above. Silicon strip 1125, however, may not be mechanically or electrically connected to MEMS mirror 1102. Like second actuating arm 1126 of MEMS mirror assembly 1100, silicon strip 1125 of MEMS mirror assembly 1101 may be disposed between and spaced apart from actuating arm 1124 and MEMS mirror 1102. Further, silicon strip 1125 may be similar to second actuating arm 1126 of MEMS mirror assembly 1100 when not connected to MEMS mirror 1102.

Exemplary MEMS mirror assembly 1101 illustrated in FIG. 11B may also include actuators 1114A, 1116A, and 1118A. Like actuator 1112A, of MEMS mirror 1101, actuators 1114A, 1116A, and 1118A each may include one actuating arm 1134, 1144, and 1154, respectively. As also illustrated in FIG. 11B, actuators 1114A, 1116A, and 1118A may include silicon strips 1135, 1145, and 1155, respectively, separated from respective actuating arms 1134, 1144, and 1154 by gaps 1138, 1148, and 1158, respectively. Additionally, actuating arms 1134, 1144, and 1154 may be connected to MEMS mirror 1102 via connectors 1140, 1150, and 1160, respectively. Silicon strips 1135, 1145, and 1155 may be similar to actuating arms 1136, 1146, and 1156, respectively, when actuating arms 1136, 1146, and 1156 are not connected to MEMS mirror 1102.

Unlike prior art MEMS mirrors in which actuators are positioned adjacent to the MEMS mirror (e.g. 10s of micrometers space between the MEMS mirror and its actuator), in the MEMS mirror assemblies of this disclosure (e.g. referenced in FIGS. 11A through 11F, and 12A, through 12F), some (or all) of the actuating arms may be spaced apart from the MEMS mirror (e.g. by about 0.5-1 mm, or even more). For example, the widths of gaps 1128, 1138, 1148, and 1158, the width of gaps "$W_{g1}$" (see FIG. 11A) between outer actuating arms (e.g. 1124, 1134, 1144, and 1154) and frame 1104, the gaps "$W_{g2}$" (see FIG. 11A) between inner actuating arms (e.g. 1126, 1136, 1146, and 1156) and MEMS mirror 1102, and/or the gaps "$W_{g3}$" (see FIG. 12A) between outer actuating arms 1124, 1134, 1144, and 1154 in the disclosed embodiments may be of the order of at least about 50 μm, about 75 μm, about 100 μm, about 150 μm, or larger. In some exemplary embodiments, the widths of these gaps may be of more than about ⅕ th, more than about ⅓ rd, more than about ¼ th, or more than about ½ of the actuating arm widths (e.g. $W_1$ or $W_2$).

FIGS. 11C-11F illustrate exemplary MEMS mirror assemblies 1103, 1105, 1107, and 1109 that may be included in the disclosed MEMS scanning device according to the present disclosure. As illustrated in FIG. 11C, MEMS mirror assembly 1103 may include MEMS mirror 1102, frame 1102 and actuators 1112A, 1114, 1116, and 1118A. Actuators 1114 and 1116 of MEMS mirror 1103 may be similar to actuators 1114 and 1116, respectively of MEMS mirror 1100 discussed above with reference to FIG. 11A, whereas actuators 1112A and 1118A of MEMS mirror assembly 1103 may be similar to actuators 1112A and 1118A, respectively, of MEMS mirror assembly 1101 discussed above with reference to FIG. 11B. Thus, for example, unlike the configuration of FIG. 11A, in actuator 1112A, only actuating arm 1124 may be connected to MEMS mirror 1102. Likewise, in actuator 1118A, only actuating arm 1154 may be connected to MEMS mirror 1102.

As illustrated in FIG. 11D, MEMS mirror assembly 1105 may include MEMS mirror 1102, frame 1102 and actuators 1112B, 1114A, 1116A, and 1118B. Actuators 1114A and 1116A of MEMS mirror 1105 may be similar to actuators 1114A and 1116A, respectively of MEMS mirror 1101 discussed above with reference to FIG. 11B. Furthermore, actuator 1112B of MEMS mirror assembly 1105 may include actuating arm 1126, which may be connected to MEMS mirror 1102 via connector 1132. Actuating arm 1126 and connector 1132 of MEMS mirror 1105 may be similar to actuating arm 1126 and connector 1132, respectively, of MEMS mirror assembly 1100 discussed above with reference to FIG. 11A. Like actuator 1112B, actuator 1118B of MEMS mirror assembly 1105 may include actuating arm 1156, which may be connected to MEMS mirror 1102 via connector 1162. Actuating arm 1156 and connector 1162 of MEMS mirror 1105 may be similar to actuating arm 1156 and connector 1162, respectively, of MEMS mirror assembly 1100 discussed above with reference to FIG. 11A. In one exemplary embodiment as illustrated in FIG. 11D, actuating arms 1126 and 1156 may be positioned relative to MEMS mirror 1102 at positions similar to actuating arms 1126 and 1156 in MEMS mirror 1100 of FIG. 11A, although other positions relative to MEMS mirror 1102 are also contemplated. As also illustrated in FIG. 11D, actuator 1112B of MEMS mirror 1105 may not include outer actuating arm 1124 and actuator 1118B may not include outer actuating arm 1154. Instead frame 1104 may extend into the space typically occupied by actuating arms 1124 and 1154.

As illustrated in FIG. 11E, MEMS mirror assembly 1107 may include MEMS mirror 1102, frame 1102 and actuators 1112B, 1114, 1116, and 1118B. Actuators 1114 and 1116 of MEMS mirror 1107 may be similar to actuators 1114 and 1116, respectively of MEMS mirror 1100 discussed above with reference to FIG. 11A. Furthermore, actuators 1112B and 1118B of MEMS mirror assembly 1107 may be similar to actuators 1112B and 1118B, respectively, of MEMS mirror assembly 1105 discussed above with reference to FIG. 11D. As also illustrated in FIG. 11E, frame 1104 may extend into the space typically occupied by actuating arms 1124 and 1154.

As illustrated in FIG. 11F, MEMS mirror assembly 1109 may include MEMS mirror 1102, frame 1102 and actuators 1112B, 1114A, 1116A, and 1118B. Actuators 1114A and 1116A of MEMS mirror 1109 may be similar to actuators 1114A and 1116A, respectively of MEMS mirror 1105 discussed above with reference to FIG. 11D. Furthermore, actuators 1112B and 1118B of MEMS mirror assembly 1107 may be similar to actuators 1112B and 1118B, respectively, of MEMS mirror assembly 1105 discussed above with reference to FIG. 11D. As illustrated in FIG. 11F, however, connectors 1132 and 1162 may be connected to actuating arms 1126 and 1156 at a location closer to MEMS mirror 1102 as compared to the connector locations for actuating arms 1126 and 1156, respectively, in MEMS mirror assembly 1105. As also illustrated in FIG. 11F, MEMS mirror 1102 may include radially extending notches 1164 and connectors 1132 and 1162 may be connected to MEMS mirror 1102 at a radially inner location of notches 1164. Like the embodiments illustrated in FIGS. 11D and 11E, in the embodiment of FIG. 11F, frame 1104 may extend into the space typically occupied by actuating arms 1124 and 1154. While the present disclosure provides numerous examples of MEMS mirror assemblies as illustrated in FIGS. 11A-11F, it should be noted that aspects of the disclosure, in their broadest sense, are not limited to the illustrated or described MEMS mirror assembly examples.

As demonstrated in the examples of FIGS. 11A-11F, the MEMS mirror assembly may include one, two, or more actuators which are spaced apart from the MEMS mirror by one or more corresponding silicon strips each. These one or more silicon strips may belong to the silicon layer on which the actuator and the mirror are implemented. Such silicon strips, if implemented, may be used as a second actuator arm covering at least partly overlapping part of a perimeter of the MEMS mirror, as a static handle or spacer, or for other uses. If used as a handle or a spacer, the silicon strips may be separated from the respective actuators so respective actuator(s) are not mobilized by movement of the actuators (e.g., as demonstrated in the exemplary embodiments illustrated in FIGS. 11B, 11C, 11D, and 11F). Such static silicon strips are also not directly connected to the MEMS mirror by an interconnect element. Alternatively (or in addition), some or all of the silicon stripes may belong to actuators of the plurality of actuators (e.g., as demonstrated in the exemplary embodiments illustrated in FIGS. 11A, 11C, 11E, and 11F) which are used to translate and/or rotate the MEMS mirror.

Figure 12A:
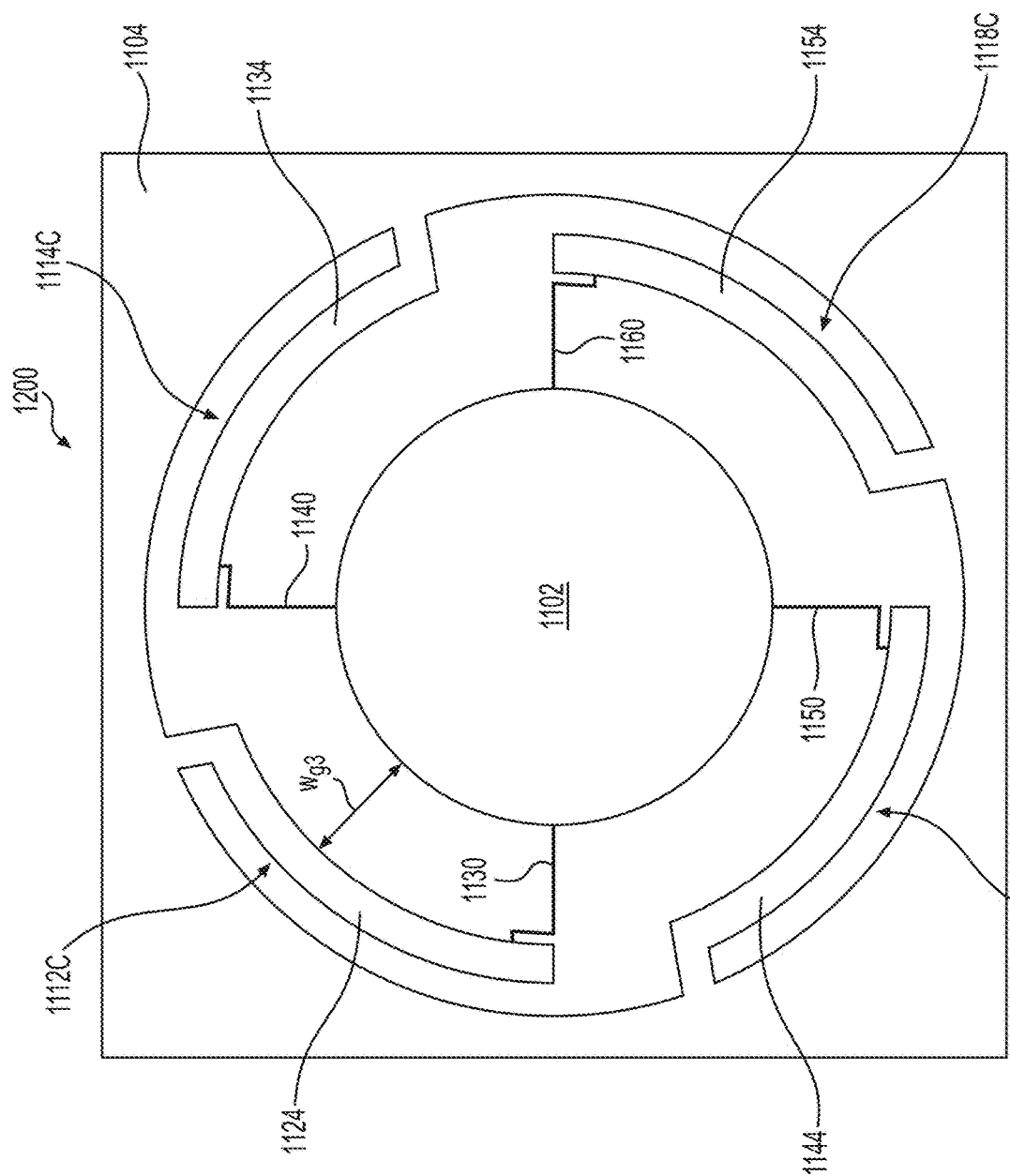
FIGS. 12A-12F are illustrations of additional exemplary MEMS mirror assemblies, consistent with disclosed embodiments.

FIGS. 12A-12F illustrate additional exemplary MEMS mirror assemblies 1200, 1201, 1203, 1205, 1207, and 1209 that may be included in the disclosed MEMS scanning device according to the present disclosure. For example, FIG. 12A illustrates MEMS mirror assembly 1200 that may include MEMS mirror 1102, frame 1104, and actuators 1112C, 1114C, 1116C, and 1118C. Each of actuators 1112C, 1114C, 1116C, and 1118C may include one actuating arm connected via a connector to MEMS mirror 1102. For example, as illustrated in FIG. 12A, actuators 1112C, 1114C, 1116C, and 1118C may include actuating arms 1124, 1134, 1144, and 1154, respectively, connected to MEMS mirror 1102 via connectors 1130, 1140, 1150, and 1160, respectively. In the exemplary embodiment illustrated in FIG. 12A, MEMS mirror assembly 1200 may not include any of actuating arms 1126, 1136, 1146, and 1156, or connectors 1132, 1142, 1152, and 1162 discussed above with reference to MEMS mirror assembly 1100 of FIG. 11A. Instead MEMS mirror 1200 may include an opening or gap "$W_{g3}$" between actuating arms 1124, 1134, 1144, and 1154 and MEMS mirror 1102.

Figure 12B:
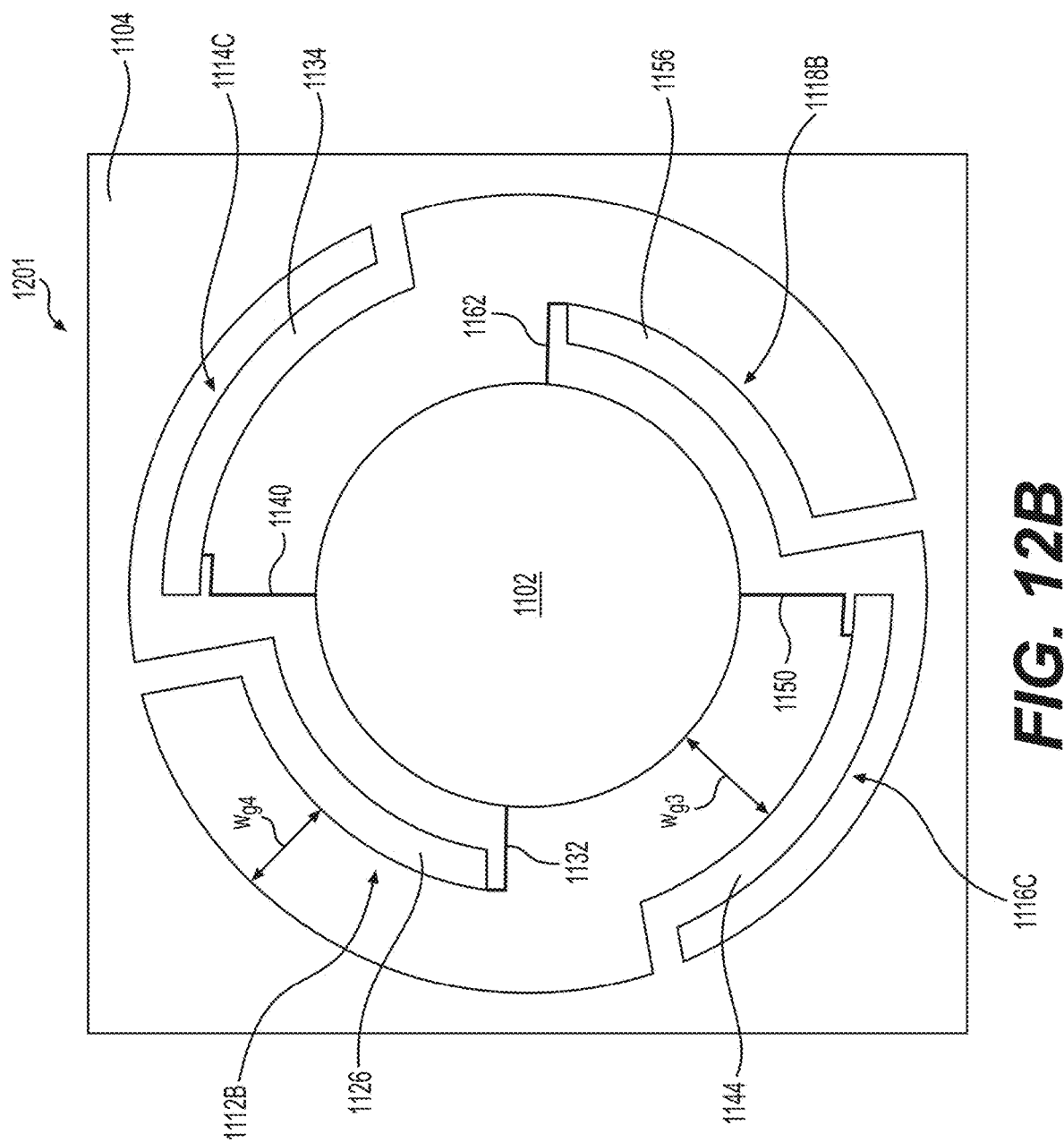

FIG. 12B illustrates an exemplary MEMS mirror assembly 1201, which may be included in the disclosed MEMS scanning device according to the present disclosure. MEMS mirror 1201 may include MEMS mirror 1102, frame 1104, and actuators 1112B, 1114C, 1116C, and 1118B. Actuators 1114C and 1116C of MEMS mirror assembly 1201 may be similar to actuators 1114C and 1116C, respectively, of MEMS mirror assembly 1200 discussed above. Further actuators 1112B and 1118B of MEMS mirror assembly 1201 illustrated in FIG. 12B may be similar to actuators 1112B and 1118B, respectively, of MEMS mirror assembly 1105 (FIG. 11D) of MEMS mirror assembly 1107 (FIG. 11E) discussed above. Unlike MEMS mirror assemblies 1105 and 1107, however, in MEMS mirror 1201, frame 1104 may not extend into the space typically occupied by actuating arms 1124 and 1154. Instead, as illustrated in FIG. 12B, actuating arms 1126 and 1156 of MEMS mirror 1201 may be separated by a gap "$W_{g4}$" from frame 1104. Gaps $W_{g3}$ and $W_{g4}$ may have dimensions similar to those discussed above for gaps $W_{g1}$ and $W_{g2}$.

Figure 12C:
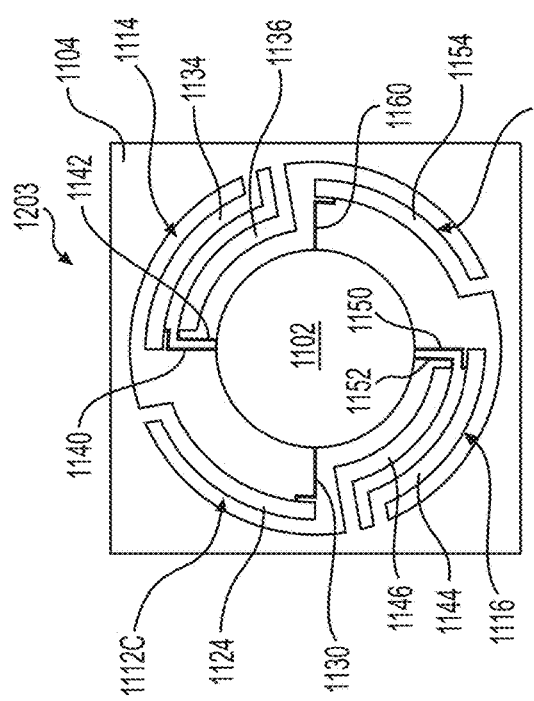

FIG. 12C illustrates an exemplary MEMS mirror assembly 1203, which may be included in the disclosed MEMS scanning device according to the present disclosure. MEMS mirror 1203 may include MEMS mirror 1102, frame 1104, and actuators 1112C, 1114, 1116, and 1118C. Actuators 1112C and 1118C of MEMS mirror assembly 1203 may be similar to actuators 1112C and 111C8, respectively, of MEMS mirror assembly 1200 discussed above with reference to FIG. 12A. Actuators 1114 and 1116 of MEMS mirror assembly 1203 may be similar to actuators 1114 and 1116 of MEMS mirror assembly 1100 discussed above with reference to FIG. 11A.

Figure 12D:
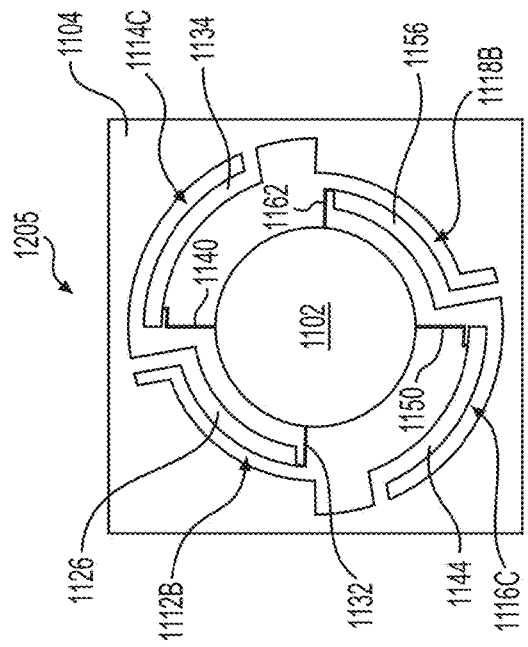

FIG. 12D illustrates an exemplary MEMS mirror assembly 1205, which may be included in the disclosed MEMS scanning device according to the present disclosure. MEMS mirror 1205 may include MEMS mirror 1102, frame 1104, and actuators 1112B, 1114C, 1116C, and 1118B. Actuators 1112B and 1118B of MEMS mirror assembly 1205 may be similar to actuators 1112B and 1118B, respectively, of MEMS mirror assembly 1105 or 1107 discussed above with reference to FIGS. 11D and 11E. Actuators 1114C and 1116C of MEMS mirror assembly 1205 may be similar to actuators 1114C and 1116C of MEMS mirror assembly 1200 discussed above with reference to FIG. 12A.

Figure 12E:
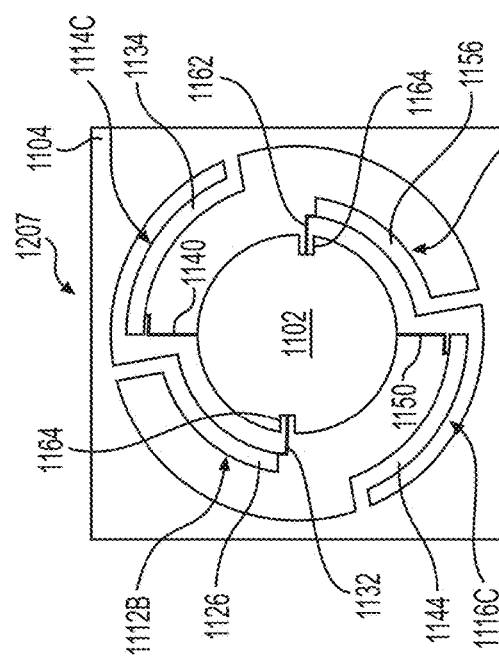

FIG. 12E illustrates an exemplary MEMS mirror assembly 1207, which may be included in the disclosed MEMS scanning device according to the present disclosure. MEMS mirror 1207 may include MEMS mirror 1102, frame 1104, and actuators 1112B, 1114C, 1116C, and 1118B. MEMS mirror 1102 of MEMS mirror 1207 may include radial notches 1164 similar to those discussed above for MEMS mirror 1109 with reference to FIG. 11F. Moreover, connectors 1132 and 1162 of MEMS mirror 1207 may be connected to actuating arms 1126 and 1166 at location closer to MEMS mirror 1102 (e.g. locations radially nearer to MEMS mirror 1102), similar to the connectors 1132 and 1162, respectively, of MEMS mirror assembly 1107 shown in FIG. 11E.

Figure 12F:
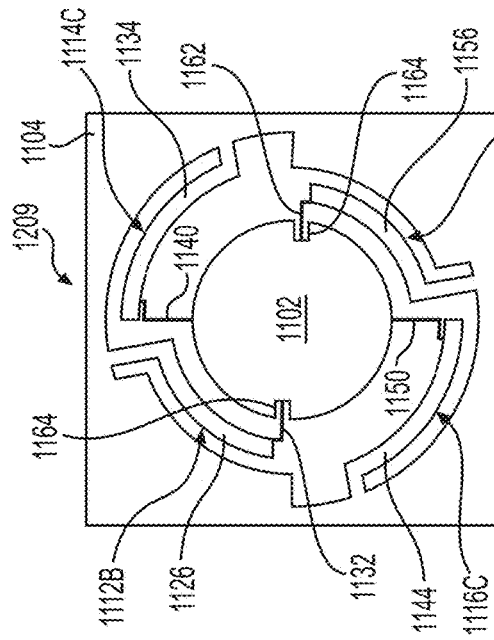

FIG. 12F illustrates an exemplary MEMS mirror assembly 1209, which may be included in the disclosed MEMS scanning device according to the present disclosure. MEMS mirror 1209 may include MEMS mirror 1102, frame 1104, and actuators 1112B, 1114C, 1116C, and 1118B. Actuators 1112B and 1118B of MEMS mirror assembly 1209 may be similar to actuators 1112B and 1118B, respectively, of MEMS mirror assembly 1109 discussed above with reference to FIG. 11F. Actuators 1114C and 1116C of MEMS mirror assembly 1209 may be similar to actuators 1114C and 1116C of MEMS mirror assembly 1200 discussed above with reference to FIG. 12A. As illustrated in FIG. 12F, portions of frame 1104 may extend closer to actuating arms 1126 and 1156 in MEMS mirror assembly 1209 when compared to MEMS mirror assembly 1207. While the present disclosure provides numerous examples of MEMS mirror assemblies as illustrated in FIGS. 12A-12F, it should be noted that aspects of the disclosure, in their broadest sense, are not limited to the illustrated or described MEMS mirror assembly examples.

As can be seen, for example, in the exemplary embodiments illustrated in FIGS. 11A, 11C, 11D, and 12C, the MEMS mirror assembly may include pairs of actuating arms, each including a first actuating arm (e.g., an "outer" one) and a second actuating arm (e.g., an "inner" one) located between the first actuating arm and the MEMS mirror. The actuating arms of such a pair may be designed (and controlled by a controller) to move in synchronization with each other for rotating the MEMS mirror in cooperation. In some exemplary embodiments, actuators positioned on an opposite side of the MEMS mirror may pull the mirror in the opposite direction.

In some exemplary embodiments, the plurality of actuators may further include both paired and unpaired actuating arms distributed around the MEMS mirror (e.g., as exemplified in the embodiments illustrated in FIGS. 11C, 11E, and 12C. In other exemplary embodiments, the paired and unpaired actuating arms may be arranged in an antisymmetric fashion around the MEMS mirror (e.g., as exemplified in FIGS. 11C, 11E, and 12C). Such arrangements may be used, for example, for separating resonance frequencies in different directions of movement of MEMS mirror 1102. It is contemplated that in some embodiments, more than a pair of arms may be distributed around the MEMS mirror (e.g. as exemplified in the embodiments illustrated in FIGS. 17B and 17C).

According to the present disclosure, the MEMS scanning device includes a connector connecting at least one of the first actuating arm and the second actuating arm to the movable MEMS mirror, the connector having an L shape. For example, some or all of the interconnects may be generally L-shaped, including two elongated parts connected to each other at a substantially right angle. Thus, for example, the two elongated parts may be disposed generally perpendicular to each other. Such a geometric arrangement of the elongated portions of the connector may help reduce the stress induced in the connector portions during movement of the MEMS mirror.

FIG. 13A illustrates a MEMS mirror assembly 1100 similar to MEMS mirror assembly 1100 of FIG. 11A. As illustrated in FIG. 13A, MEMS mirror assembly 1100 may include MEMS mirror 1102, frame 1104, and actuators 1112, 1114, 1116, and 1118. Further, each actuator 1112, 1114, 1116, and 1118 may include a pair of actuating arms as discussed above with reference to FIG. 11A. For example, actuator 1114 may include actuating arm 1134 and actuating arm 1136. Actuating arm 1134 may be connected to one end of connector 1140 and actuating arm 1136 may be connected to one end of connector 1142. Opposite ends of connectors 1140 and 1142 may be connected to MEMS mirror 1102.

FIG. 13B illustrates an exemplary arrangement of actuating arms 1134 and 1136 and their connection with connectors 1140 and 1142, respectively. FIG. 13B represents a magnified view of actuator 1118 in the section encompassed by the dashed ellipse shown in FIG. 13A. As illustrated in FIG. 13B, one end of connector 1140 may be connected to outer actuating arm 1134. Connector 1140 may include elongated parts 1302 and 1304. Elongated part 1302 may be disposed generally parallel to actuating arm 1134, whereas elongated part 1304 may be disposed inclined relative to actuating arm 1134. In one exemplary embodiment as illustrated in FIG. 13B, elongated parts 1302 and 1304 may be disposed generally perpendicular to each other, forming a generally L-shaped connector 1140. Similarly, connector 1142 may include elongated part 1306 and 1308. Elongated part 1306 may be disposed generally parallel to actuating arm 1136, whereas elongated part 1308 may be disposed inclined relative to actuating arm 1136. In one exemplary embodiment as illustrated in FIG. 13B, elongated parts 1306 and 1308 may be disposed generally perpendicular to each other, forming a generally L-shaped connector 1142. Although both connectors 1140 and 1142 have been illustrated in FIG. 13B as being generally L-shaped, it is contemplated that one, both, or none of the connectors 1140 and 1142 may form an L-shape. Furthermore, it is contemplated that the pair of elongated parts 1302, 1304, or the pair of elongated parts 1306, 1308 may each be disposed inclined (i.e. at angles different from 90°) relative to each other. Moreover, although connectors 1140 and 1142 have been discussed in connection with actuating arms 1134 and 1136 of actuator 1114, similar connectors may be implemented with actuators 1112, 1116, and 1118.

Figure 14:
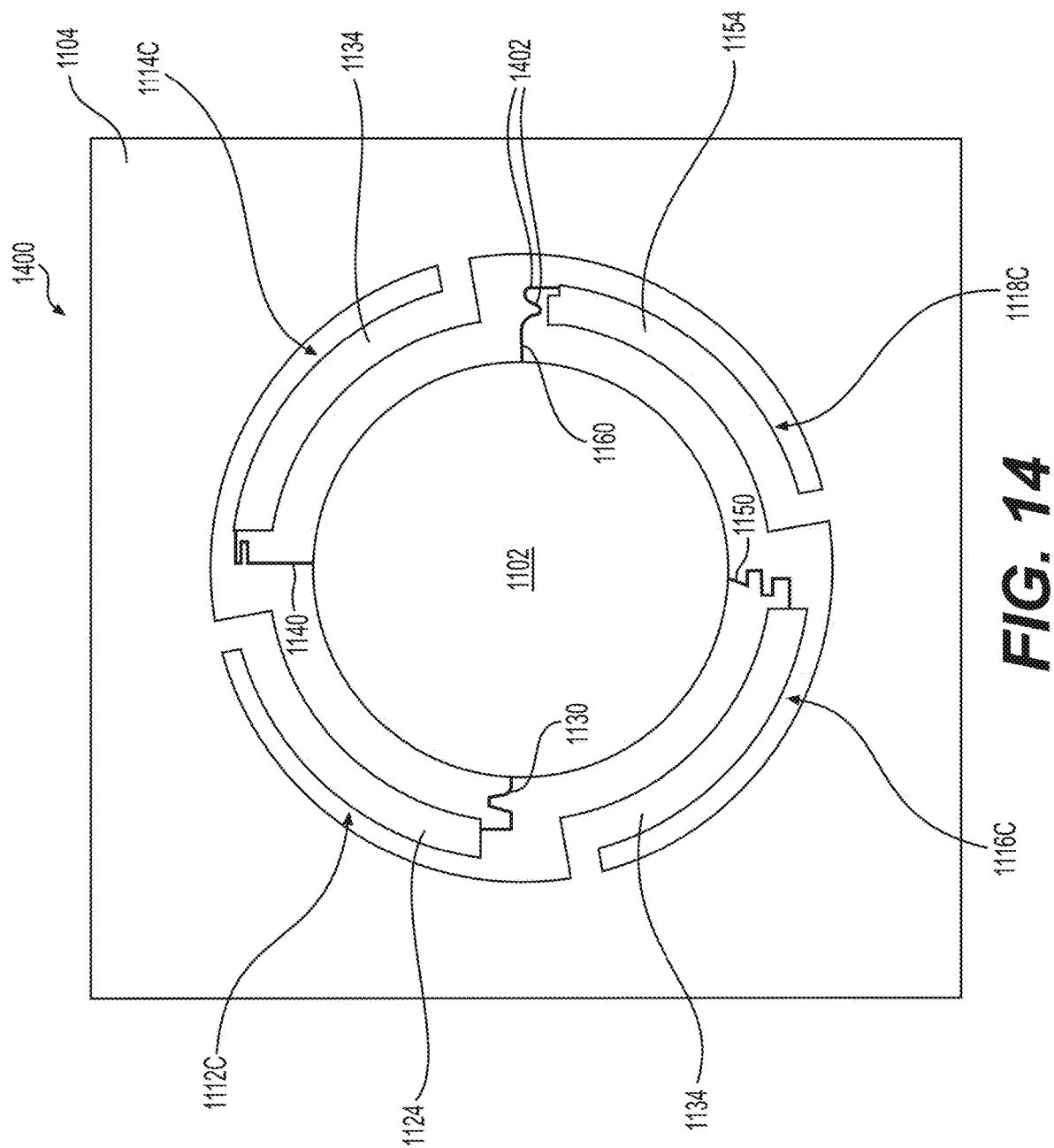
FIG. 14 an illustration of an exemplary MEMS mirror assembly having S-shaped connectors consistent with disclosed embodiments.

In accordance with the present disclosure, the MEMS scanning device may include a connector connecting at least one of the first actuating arm and the second actuating arm to the movable MEMS mirror, the connector having an S shape. For example, some or all of the interconnects may be generally S-shaped. Such a geometric arrangement of the elongated portions of the connector may help reduce the stress induced in the connector portions during movement of the MEMS mirror. FIG. 14 illustrates an exemplary MEMS mirror assembly 1400, which may include MEMS mirror 1102, frame 1104, and actuators 1112C, 1114C, 1116C, and 1118C. Actuators 1112C, 1114C, 1116C, and 1118C may include actuating arms 1124, 1134, 1144, and 1154, respectively, which may be connected to MEMS mirror 1102 via connectors 1130, 1140, 1150, and 1160, respectively. As exemplified in FIG. 14, one or more of the flexible connectors 1130, 1140, 1150, and 1160 of MEMS mirror assembly 1400 may be an elongated structure which may include at least two turns (e.g. 1402) in opposing directions. Each of the turns or bends 1402 may span an angle greater than about 120°. Further, as illustrated in FIG. 14, when one turn 1402 is in a clockwise direction, the adjacent turn 1402 is in a counterclockwise direction. In some exemplary embodiments, some or all of the turns of connectors 1130, 1140, 1150, and 1160 may be at angles greater than about 150°, of about 180°, or even at reflex angles which are greater than about 180°. The turns 1402 may be continuously curved turns (e.g., as exemplified with respect to the example of interconnect element 1160), but may also include one or more angled corners (e.g., as illustrated by interconnect elements 1130, 1140, and/or 1150).

While the present disclosure provides examples of connector shapes (e.g. L-shaped, S-shaped, etc.), it should be noted that aspects of the disclosure in their broadest sense, are not limited to the disclosed shapes. Furthermore, although the connector shapes have been described above with reference to MEMS mirror 1100, it should be noted that one or more of the disclosed connector shapes may be implemented to connect one or more actuating in any of the MEMS mirror assemblies, for example, 1101, 1103, 1105, 1107, 1109, 1200, 1201, 1203, 1205, 1207, and/or 1209 illustrated in FIGS. 11A-11F and FIGS. 12A-12F.

In accordance with the present disclosure, the MEMS scanning device includes a first actuating arm and a second actuating arm. In some MEMS scanning devices in accordance with the present disclosure, each of the first actuating arm and the second actuating arm includes an outer side and an opposing inner side closer to the movable MEMS mirror than the outer side, wherein the first connector is connected to the opposing inner side of the first actuating arm and the second connector is connected to the outer side of the second actuating arm. For example, in some exemplary embodiments according to the present disclosure, in at least one pair of actuators, the first actuator may be connected to a respective first interconnect element in an inner part of the first actuator, and the second actuator may be connected to a respective second interconnect element in an outer part of the second actuator. The proposed structure may have at least one of the following structural characteristics: the interconnect of the inner actuator may be relatively long; the interconnect of the inner actuator may be connected in the furthermost distance from the MEMS mirror; the interconnects of both the inner actuator and the outer actuator may be of similar lengths; and the interconnects of both the inner actuator and the outer actuator may be connected to the actuators at proximate points. Various combinations of these features can be used, inter alia, for achieving one or more of the following features: reducing undesirable derivative movements (e.g. movement within the plane of the silicon layer when the intended movement is rotation about an axis parallel thereto), reducing stresses on the interconnects, working in higher frequencies, reaching larger rotation angles, increasing resonance frequencies, working with a thicker mirror, reducing crosstalk between different actuators and/or axes of movement, and so on. In addition to the structure and position of the interconnects, the aforementioned features may also be enhanced by selecting the most suitable structure and combination of actuators, e.g. out of the configuration illustrated in FIGS. 11A-11F and 12A-12F.

It is noted that connecting interconnects at a part of the actuator which is nearest to the MEMS mirror (and not, for example, to a middle, or to the most remote part of the actuator) may be implemented in many MEMS mirror assemblies, and not only in the ones discussed above (e.g., with or without separating silicon strips between the actuators and the mirrors). In accordance with this disclosure, a MEMS mirror assembly is disclosed, including at least: a MEMS mirror; a frame; a plurality of actuators operable to rotate the MEMS mirror with respect to a plane of the frame; and interconnect elements that are mechanically connected between the actuators and the MEMS mirror; wherein for at least two of the interconnect elements are connected to an inner part of a moving end of the respective actuator. Any variations of the MEMS mirror assembly discussed above may also implemented to such a MEMS mirror assembly (if feasible), mutatis mutandis. It is further contemplated that the MEMS scanning device according to the present disclosure, one or both of the first and second connectors may be connected to the outer side or the inner side of the first and second actuating arms respectively. The particular position (outer side or inner side) for connecting the one or more connectors may be determined based on considerations such as limiting the amount of stress induced in the connectors, improving manufacturability of the MEMS scanning device, reducing crosstalk between the different actuators (i.e. reducing the influence of the movement induced by one connector on the movement induced by the other connector), etc.

FIGS. 15A and 15B illustrate two exemplary connector arrangements that may be employed to connect one or more of the actuating arms to respective connectors. For example, as illustrated in FIG. 13A, actuating arm 1134 of actuator 1118 may be connected to frame 1104 adjacent frame end 1320. Actuating arm 1134 may extend from adjacent frame end 1320 in a generally circumferential direction towards arm end 1322. Likewise, actuating arm 1136 of actuator 1118 may be connected to frame 1104 adjacent frame end 1324. Actuating arm 1136 may extend from adjacent frame end 1324 in a generally circumferential direction towards arm end 1326. FIGS. 15A and 15B illustrate magnified views of actuator 1118 (of MEMS mirror assembly 1100) in the section encompassed by the dashed ellipse shown in FIG. 13A (i.e. adjacent arm ends 1324 and 1326).

According to the present disclosure, as illustrated in FIG. 15A, MEMS mirror assembly 1100 may include MEMS mirror 1102, frame 1104, actuating arm 1134, actuating arm 1136, and connectors 1140 and 1142. As illustrated in FIG. 15A, actuating arm 1134 may be positioned at a greater distance from MEMS mirror 1102 as compared to actuating arm 1136. Actuating arm 1134 may have an outer side 1502 and an inner side 1504. Outer side 1502 of actuating arm 1134 may be located at a greater distance from MEMS mirror 1102 as compared to inner side 1504. Thus, outer side 1502 may be positioned nearer to frame 1104 and further from MEMS mirror 1102 as compared to inner side 1504. Like actuating arm 1134, actuating arm 1136 may also have an outer side 1506 and an inner side 1508. Outer side 1506 of actuating arm 1136 may be located at a greater distance from MEMS mirror 1102 as compared to inner side 1508. Thus, outer side 1506 may be positioned nearer to frame 1104 and further from MEMS mirror 1102 as compared to inner side 1508. As also illustrated in FIG. 15A, outer side 1506 of actuating arm 1336 may be positioned adjacent inner side 1504 of actuating arm 1334. Outer side 1506 of actuating arm 1336 may be separated (i.e. spaced apart) from inner side 1504 of actuating arm 1334 by gap 1138.

In some exemplary embodiments as illustrated in FIG. 15A, connector 1140 may be connected to inner side 1504 of actuating arm 1134. It is contemplated that connector 1140 may be connected to inner side 1504 at a position between frame end 1320 and arm end 1322. For example, connector 1140 may be connected to inner side 1504 of actuating arm 1134 at a position relatively nearer to arm end 1322 as compared to frame end 1320. As also illustrated in FIG. 15A, connector 1142 may be connected to outer side 1506 of actuating arm 1136. For example, connector 1142 may be connected to outer side 1506 of actuating arm 1136 at arm end 1326. It is contemplated that in other exemplary embodiments, one or both of connectors 1140 and 1142 may be connected to actuating arms 1134 and 1136, respectively, at or adjacent arm ends 1322 and 1326, respectively. It is also contemplated that one or both of connectors 1140 and 1142 may be connected either to outer sides 1502 and 1506, respectively, or inner sides 1504 and 1508, respectively, of their respective associated actuating arms 1134 and 1136. FIG. 15A also illustrates PZT layers 1510 and 1512, which may be disposed on some or all portions of actuating arms 1134 and 1136, respectively.

FIG. 15B illustrates a variation of the exemplary arrangement of FIG. 15A. As illustrated in FIG. 15B, connector 1140 may be connected to arm end 1322 instead of being positioned between frame end 1320 and arm end 1322. In some exemplary embodiments as illustrated in FIG. 15B, actuating arms 1134 and 1136 may include circumferential recesses 1520 and 1522, respectively. Recess 1520 may extend from arm end 1322 to a predetermined distance in a circumferential direction towards frame end 1320. Recess 1520 may be disposed nearer inner side 1504. It is contemplated, however, that recess 1520 may be disposed nearer outer side 1502 or equidistant from outer and inner sides 1502, 1504. Likewise, recess 1522 may extend from arm end 1326 to a predetermined distance in a circumferential direction towards frame end 1324. Recess 1522 may be disposed nearer outer side 1506. It is contemplated, however, that recess 1522 may be disposed nearer inner side 1508 or equidistant from outer and inner sides 1506, 1508. The dimensions of recesses 1520 and 1522 may be the same or may be different. Notches 1520 and 1522 may further help minimize the stresses induced in connectors 1140 and 1142 during operation of MEMS mirror assembly 1100.

FIG. 16A illustrates a MEMS mirror assembly 1200, which is similar to MEMS mirror assembly 1200 illustrated in FIG. 12A. As illustrated in FIG. 16A, MEMS mirror assembly 1200 may include MEMS mirror 1102, frame 1104, and actuators 1112C, 1114C, 1116C, and 1118C. Further, each actuator 1112C, 1114C, 1116C, and 1118C may include an actuating arm as discussed above with respect to MEMS mirror assembly 1200 with reference to FIG. 12A. For example, actuator 1118C may include actuating arm 1134, which may be connected to one end of connector 1140. An opposite end of connectors 1140 may be connected to MEMS mirror 1102. FIGS. 16B and 16C illustrate magnified views of actuator 1118C (of MEMS mirror assembly 1200) in the section encompassed by the dashed ellipse shown in FIG. 16A (i.e. adjacent arm end 1322).

In some exemplary embodiments according to the present disclosure, as illustrated in FIG. 16A, actuating arm 1134 may be positioned nearer frame 1104 and may be separated (i.e. spaced apart) from mirror 1102 by a large gap. Actuating arm 1134 may have an outer side 1602 and an inner side 1604. Outer side 1602 of actuating arm 1134 may be located at a greater distance from MEMS mirror 1102 as compared to inner side 1604. Thus, outer side 1602 may be positioned nearer to frame 1104 and further from MEMS mirror 1102 as compared to inner side 1604.

In other exemplary embodiments as illustrated in FIG. 16B, connector 1140 may be connected to outer side 1602 of actuating arm 1134. Moreover, connector 1140 may be connected to actuating arm 1134 at arm end 1322. It is contemplated that in other exemplary embodiments, connector 1140 may be connected to inner side 1604 of actuating arm 1134 either at arm end 1322 or at a position between frame end 1320 and arm end 1322. FIG. 16C illustrates a variation of the exemplary arrangement of FIG. 16B. As illustrated in FIG. 16C, actuating arm 1134 may include circumferential recesses 1520 similar to that discussed above with reference to FIG. 15A. While the present disclosure provides examples of actuating arm locations for attaching the connectors, it should be noted that aspects of the disclosure in their broadest sense, are not limited to the disclosed attachment configurations.

It is noted that first type of interconnect (connected to an inner part of the respective actuator, e.g. 1140 in FIGS. 15A and 15B) may also be implemented in MEMS mirror assemblies where some or all of the actuators are remote from to the MEMS mirror. Example of such configurations are provided in FIGS. 11B, 11D, 11F, 12A, 12C, 12D, and 12F.

In accordance with the present disclosure, the MEMS scanning device includes an actuator having a first actuating arm and a second actuating arm, wherein the first actuating arm and the second actuating arm are connected to the MEMS mirror by a single connector. For example, both first and second actuating arms may be connected to the MEMS mirror using the same interconnect (e.g. connector) and/or both first and second actuating arms may be connected to each other at one end by the connecting arm. According to the present disclosure, the first actuating arm and the second actuating arm are connected to each other by a connecting arm, and the connecting arm is connected to the MEMS mirror via a connector. Exemplary MEMS mirror assemblies, in accordance with the present disclosure may include at least: a MEMS mirror; a frame; a plurality of actuators operable to rotate the MEMS mirror with respect to a plane of the frame; and interconnect elements that are mechanically connected between the actuators and the MEMS mirror. Such MEMS mirror assemblies may also include at least one actuator (possibly all of the actuators, possibly some of them) which may have a first end that may be mechanically connected to the frame and a second end that may be opposite to the first end and may be mechanically connected to the respective interconnect element, wherein the at least one actuator comprises two separate bands of silicon (e.g. actuating arms) which may be spaced apart from one another for example, for more than about 50% of the distance between the first end and the second end. Examples or such assemblies are illustrated in FIGS. 17A-17F, which are discussed below. Optionally, one or more of the actuators may include more than two (e.g., three or four) bands which are spaced apart from one another, for example, for more than about 50% of the distance between the first end and the second end. It is noted that in some exemplary embodiments, the bands may be spaced apart from each other for more than about 60%, more than about 70%, more than about 80%, or more than about 90% of the distance between the first end and the second end. As used in this disclosure the term about should be interpreted to include typical machining or manufacturing tolerances. Thus, the phrase "about 50%" should be interpreted to encompass values ranging between, for example, 50±0.5%, 50±1%, etc.

In some exemplary embodiments according to this disclosure, each band may include separate piezoelectric actuation layers. Each band may also include other separate actuation mechanism different from the actuation mechanism for another band. It is contemplated that different bands may concurrently receive the same or different actuation instructions (e.g. different voltages/biases).

Figure 17A:
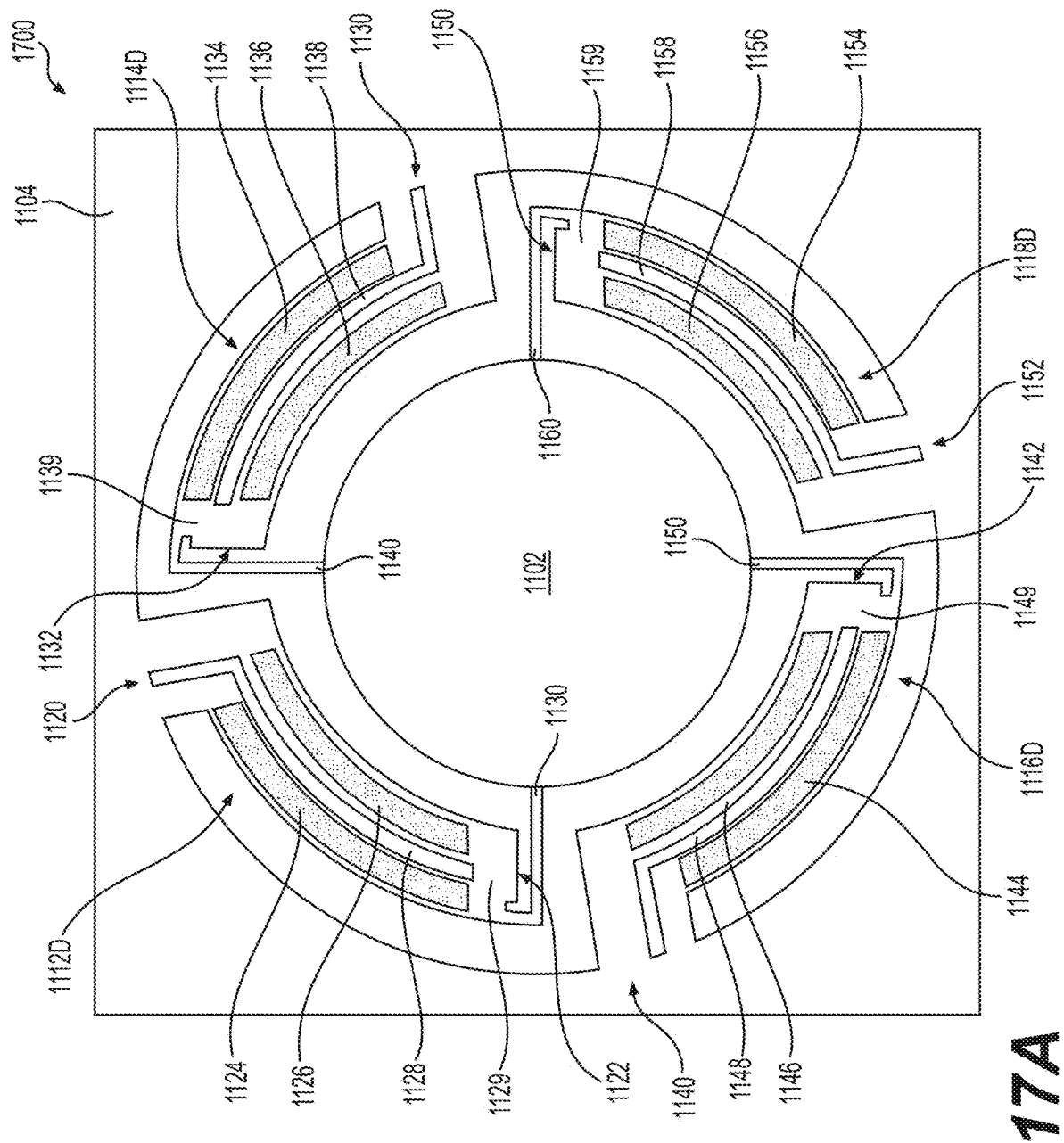
FIGS. 17A-17C are illustrations of exemplary actuator arrangements for various MEMS mirror assemblies, consistent with disclosed embodiments.
Figure 17B:
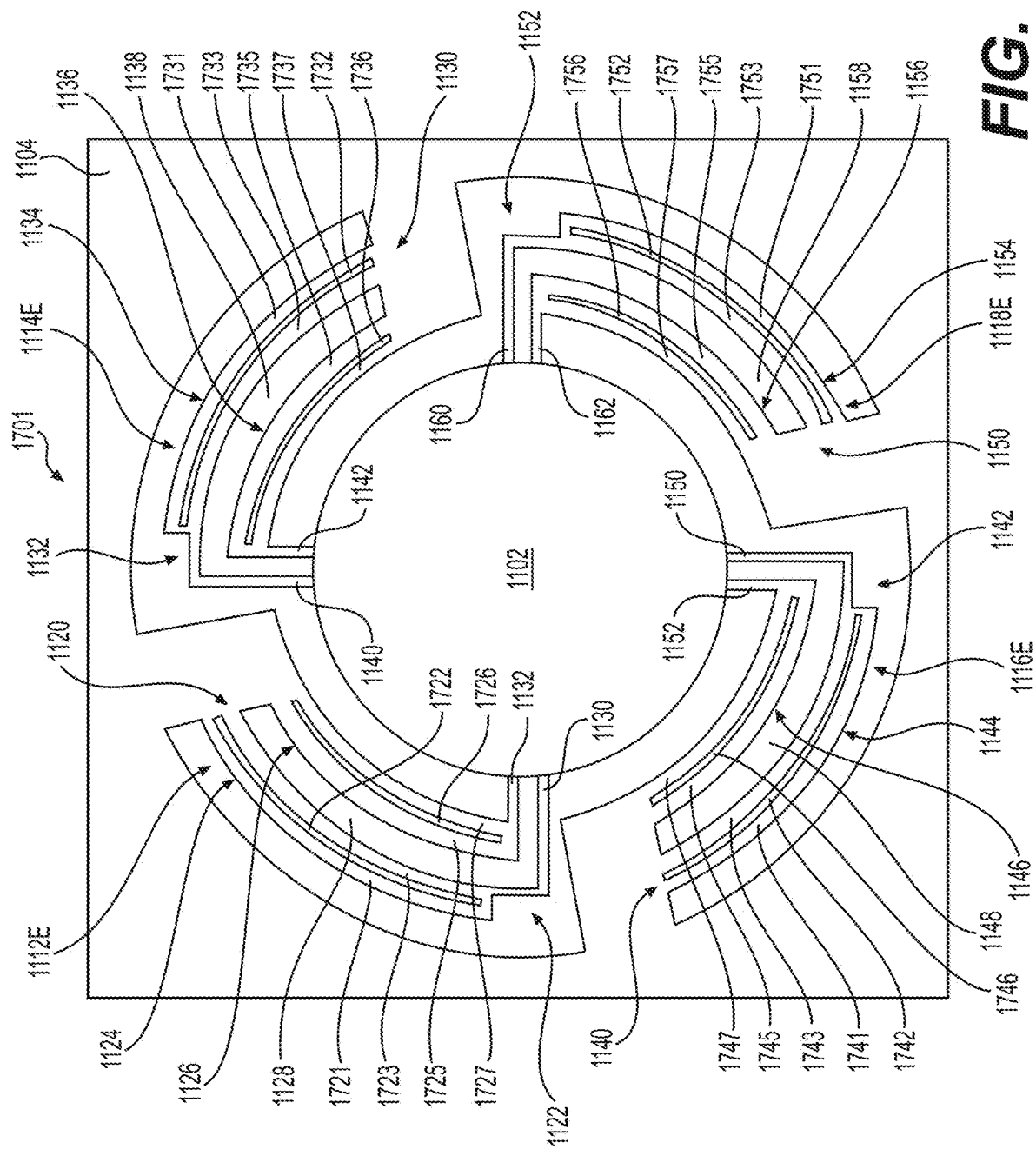
Figure 17C:
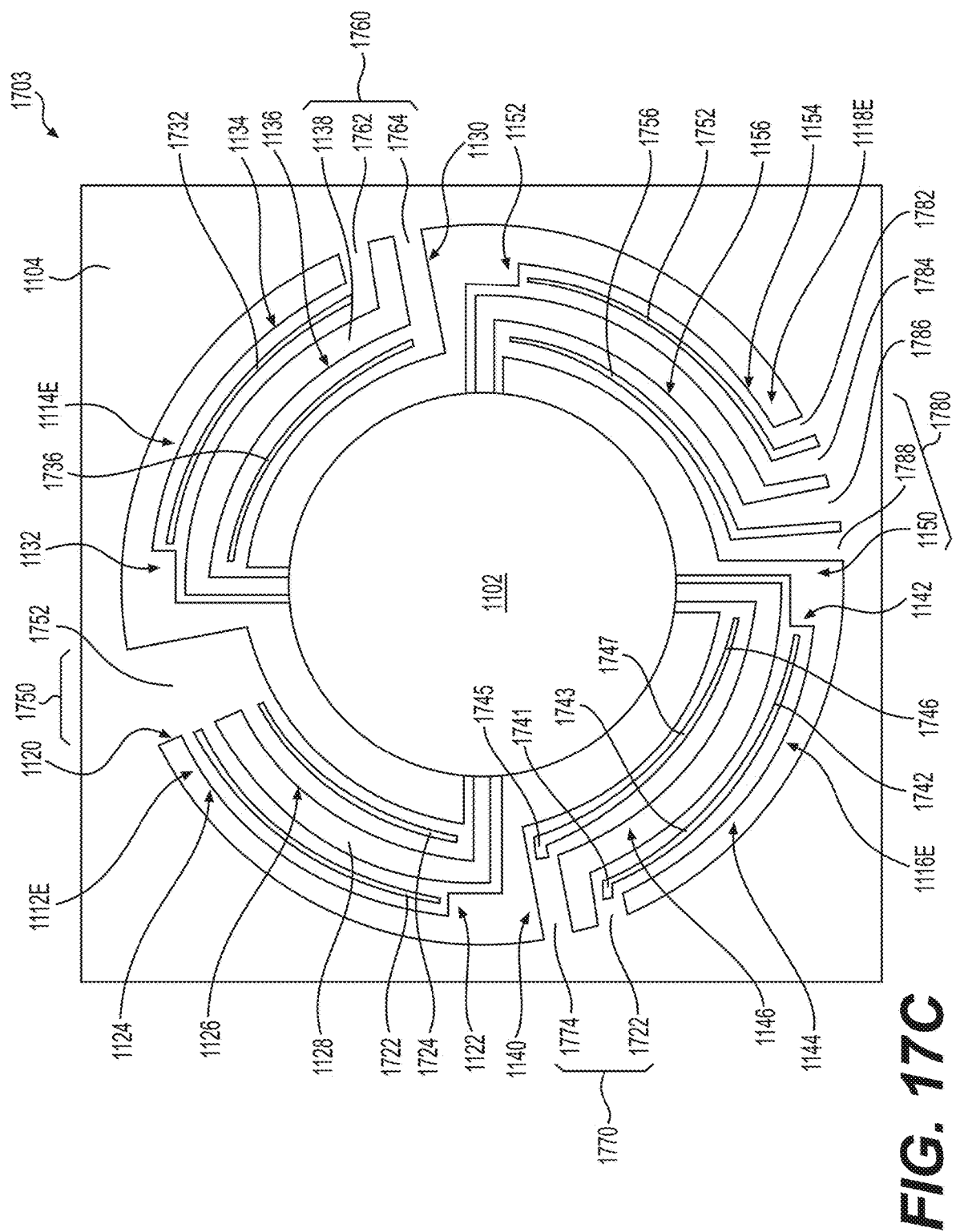

In other exemplary embodiments according to this disclosure, two (or more) bands may span over different angular sectors having different span angles with respect to a center of the MEMS mirror. Such exemplary configurations are illustrated in FIGS. 17A and 17C. It is noted that the different bands may be of similar length, or of different lengths. It is also noted that the different bands may be of similar width, or of different widths.

In some exemplary embodiments according to this disclosure, two bands may be implemented in any one of the aforementioned MEMS mirror assemblies—those which are illustratively represented in the diagrams and others. Such exemplary configurations are illustrated in FIGS. 17B and 17C. When implemented in any one of the previously disclosed MEMS mirror assembly, two bands may be implemented in some or all actuators of the respective MEMS mirror assemblies. It is also contemplated that in some exemplary embodiments, more than one silicon band may not be implemented in all the actuators of any of the MEMS mirror assemblies discussed above.

Various implementations of MEMS mirror assemblies whose actuators include more than one spaced apart bands may be used, inter alia, for achieving one or more of the following features: reducing stresses on the interconnects, reducing stress on the actuator (especially in the piezoelectric components, if implemented), working in higher frequencies, reaching larger rotation angles, increasing resonance frequencies, working with a thicker mirror, etc. In addition to the structure and position of the interconnects, the aforementioned features may also be enhanced by selecting the most suitable structure and combination of actuators, e.g. out of the configuration illustrated in FIGS. 17A-17C, discussed below.

By way of example, FIG. 17A illustrates an exemplary MEMS mirror assembly 1700 consistent with this disclosure. For example, as illustrated in FIG. 17A, MEMS mirror assembly 1100 may include MEMS mirror 1102 supported by frame 1104. MEMS mirror assembly 1700 may include exemplary actuators 1112D, 1114D, 1116D, and 1118D consistent with this disclosure. As illustrated in FIG. 17A, actuator 1112D may be connected adjacent first end 1120 to frame 1104. Actuator 1112D may extend circumferentially from adjacent first end 1120 to second end 1122 and may be connected to MEMS mirror 1102 adjacent second end 1122.

As illustrated in the exemplary embodiment of FIG. 17A, actuator 1112D may include first actuating arm 1124, second actuating arm 1126, and gap 1128 between first actuating arm 1124 and second actuating arm 1128 similar to the configuration discussed above with respect to MEMS mirror assembly 1100 of FIG. 11A. Each of the actuating arms 1124 and 1126 may be a silicon band. Unlike MEMS mirror assembly 1100, however, in MEMS mirror assembly 1700 of FIG. 17A, first actuating arm 1124 may be connected to second actuating arm 1126 by connecting arm 1129. As also illustrated in FIG. 17A, both first and second actuating arms 1124 and 1126 may be connected to one end of connector 1130 and an opposite end of connector 1130 may be connected to MEMS mirror 1102. In one exemplary embodiment, connector 1130 may be connected to connecting arm 1129 of actuator 1112D. It is contemplated, however, that in some exemplary embodiments, connector 1130 may be connected to both first and second actuating arms 1124 and 1126, without the first and second actuating arms 1124 and 1126 being connected to each other. Actuators 1114D, 1116D, and 1118D may have a similar structural arrangement as discussed above for actuator 1112D.

As illustrated in FIG. 17A, gap 1128 may extend over nearly an entire length of actuator 1112 from adjacent first end 1120 to adjacent second end 1122. It is contemplated, however, that gap 1128 may extend only partway over the length between first end 1120 and second end 1122. Thus, for example, first and second actuating arms 1124 and 1126 may be spaced apart from each other by gap 1128 over only a portion of a length of first and second actuating arms 1124 and 1126. It is also contemplated that in some embodiments gap 1128 may include a plurality of gaps spaced apart from each other by connections between the actuating arms 1124 and 1126. In some exemplary embodiments, first and second actuating arms 1124 and 1126 may be spaced apart from each other by gap 1128, which may be a single gap or a plurality of gaps, over more than about 50%, more than about 50%, more than about 70%, more than about 80%, or more than about 90% of the distance between first end 1120 and second end 1122. As also illustrated in the exemplary embodiment of FIG. 17A, each of first and second actuating arms 1124 and 1126 may include an associated PZT layer, which may be positioned over some portions or over an entire length of the first and second actuating arms 1124 and 1126.

Unlike MEMS mirror assembly 1100, however, actuating arm 1134 may be connected to actuating arm 1136 by connecting arm 1139; actuating arm 1144 may be connected to actuating arm 1146 by connecting arm 1149; and actuating arm 1154 may be connected to actuating arm 1156 by connecting arm 1159. As also illustrated in FIG. 17A, connector 1140 may be connected at one end to connecting arm 1139 and connected at the other end to MEMS mirror 1102; connector 1150 may be connected at one end to connecting arm 1149 and connected at the other end to MEMS mirror 1102; connector 1160 may be connected at one end to connecting arm 1159 and connected at the other end to MEMS mirror 1102. It is also contemplated that in some exemplary embodiments, connector 1140 may be connected directly to actuating arms 1134, 1136, which may not be connected to each other; connector 1150 may be connected directly to actuating arms 1144, 1146, which may not be connected to each other; and connector 1160 may be connected directly to actuating arms 1154, 1156, which may not be connected to each other. It is further contemplated that like gap 1128, gaps 1138, 1148, and 1158 may extend over only a portion of a distance between first and second ends 1130 and 1132; 1140 and 1142; and 1150 and 1152, respectively.

FIG. 17B illustrates an exemplary MEMS mirror assembly 1701 consistent with this disclosure. Many of the structural features of MEMS mirror assembly 1701 are similar to that of MEMS mirror assembly 1700. For example, as illustrated in FIG. 17B, MEMS mirror assembly 1701 may include MEMS mirror 1102 supported by frame 1104. MEMS mirror assembly 1701 may include exemplary actuators 1112E, 1114E, 1116E, and 1118E, actuating arms 1124, 1126, 1134, 1136, 1144, 1146, 1154, and 1156, and exemplary connectors 1130, 1132, 1140, 1142, 1150, 1152, 1160, and 1162 consistent with this disclosure. In the following, only the features of MEMS mirror assembly 1701 that differ from those of MEMS mirror assembly 1700 are discussed. In one exemplary embodiment as illustrated in FIG. 17B, first actuating arm 1124 of MEMS mirror assembly 1701 may include actuating arms 1721 and 1723, spaced apart by gap 1722. Second actuating arm 1126 of MEMS mirror assembly 1701 may include actuating arms 1725 and 1727, spaced apart by gap 1726. Thus, actuating arms 1721, 1723, 1725, and 1727 may form a plurality of silicon bands separated from each other by gaps 1722, 1128, 1723, etc. Gaps 1722, 1726, and 1128 may have equal or unequal widths.

Actuating arm 1134 of actuator 1114E in MEMS mirror assembly 1701 may include actuating arms 1731 and 1733, spaced apart by gap 1732. Actuating arm 1136 of MEMS mirror assembly 1701 may include actuating arms 1735 and 1737, spaced apart by gap 1736. Thus, actuating arms 1731, 1733, 1735, and 1737 may form a plurality of silicon bands separated from each other by gaps 1732, 1138, 1736, etc. Gaps 1732, 1736, and 1138 may have equal or unequal widths. Thus, for example, actuating arms 1731 and 1733 may be spaced apart from each other over a portion of the distance between first end 1130 and second end 1132, similar to actuating arms 1721 and 1723. Likewise, actuating arms 1735 and 1737 may be spaced apart from each other over a portion of the distance between first end 1130 and second end 1132, similar to actuating arms 1721 and 1723.

Actuating arm 1144 of actuator 1116E in MEMS mirror assembly 1701 may include actuating arms 1741 and 1743, spaced apart by gap 1742. Actuating arm 1146 of MEMS mirror assembly 1701 may include actuating arms 1745 and 1747, spaced apart by gap 1746. Thus, actuating arms 1741, 1743, 1745, and 1747 may form a plurality of silicon bands separated from each other by gaps 1742, 1148, 1746, etc. Thus, for example, actuating arms 1741 and 1743 may be spaced apart from each other over a portion of the distance between first end 1140 and second end 1142, similar to actuating arms 1721 and 1723. Likewise, actuating arms 1745 and 1747 may be spaced apart from each other over a portion of the distance between first end 1140 and second end 1142, similar to actuating arms 1721 and 1723.

Actuating arm 1154 of actuator 1118E in MEMS mirror assembly 1701 may include actuating arms 1751 and 1753, spaced apart by gap 1752. Actuating arm 1156 of MEMS mirror assembly 1701 may include actuating arms 1755 and 1757, spaced apart by gap 1756. Thus, actuating arms 1751, 1753, 1755, and 1757 may form a plurality of silicon bands separated from each other by gaps 1752, 1158, 1756, etc. Gaps 1752, 1756, and 1158 may have equal or unequal widths. Thus, for example, actuating arms 1751 and 1753 may be spaced apart from each other over a portion of the distance between first end 1150 and second end 1152, similar to actuating arms 1721 and 1723. Likewise, actuating arms 1755 and 1757 may be spaced apart from each other over a portion of the distance between first end 1150 and second end 1152, similar to actuating arms 1721 and 1723. While the present disclosure provides examples of actuator arrangements, it should be noted that aspects of the disclosure in their broadest sense, are not limited to the disclosed actuator arrangement examples.

FIG. 17C illustrates an exemplary MEMS mirror assembly 1703 that includes many of the same features as that of MEMS mirror assembly 1701 discussed above with reference to FIG. 17B. Thus for example, MEMS mirror assembly 1703 may include MEMS mirror 1102, frame 1104, exemplary actuators 1112E, 1114E, 1116E, and 1118E, actuating arms 1124, 1126, 1134, 1136, 1144, 1146, 1154, and 1156, and exemplary connectors 1130, 1132, 1140, 1142, 1150, 1152, 1160, and 1162 similar to corresponding features of MEMS mirror assembly 1701. In the following, only the features of MEMS mirror assembly 1703 that differ from those of MEMS mirror assembly 1701 are discussed.

In accordance with this disclosure, FIG. 17C illustrates different ways of connecting actuating arms 1124, 1126, 1134, 1136, 1144, 1146, 1154, and 1156 to frame 1104. As one example, MEMS mirror 1703 may include interconnect arrangement 1750, which may be used to connect actuating arms 1124 and 1126 to frame 1104. For example, interconnect arrangement 1750 may include a single interconnect 1752, attached at one end to frame 1104. Interconnect 1752 may project inwards from frame 1104 towards MEMS mirror 1102. In some exemplary embodiments, interconnect 1752 may be project in a radially inward direction and may extend over a predetermined angular span. In other exemplary embodiments, interconnect 1752 may be disposed at an angle of inclination relative to the radially inward direction. Interconnect 1752 may have a rectangular, square, trapezoidal, or any other shape. Actuators 1124 and 1126 may be attached to interconnect 1752 adjacent first end 1120. As also illustrated in FIG. 17C, gaps 1128, 1724, and 1726 may extend from adjacent interconnect 1752 to adjacent second end 1122. Thus, for example, gaps 1128, 1724, and 1726 may not extend into interconnect 1752.

As another example, MEMS mirror 1703 may include interconnect arrangement 1760, which may be used to connect actuating arms 1134 and 1136 to frame 1104. For example, interconnect arrangement 1760 may include interconnects 1762 and 1764, attached at one end to frame 1104. Interconnect 1762 may project radially inwards from frame 1104 towards MEMS mirror 1102 and may extend over a predetermined angular span. Likewise, interconnect 1764 may project inwards from frame 1104 towards MEMS mirror 1102 and may extend over a predetermined angular span. Interconnect 1762 may be disposed adjacent to interconnect 1764 and may be spaced apart from interconnect 1764 by gap 1138, which may extend to adjacent frame 1104. In some exemplary embodiments, interconnects 1762 and 1764 may be positioned parallel to a radially inward direction. In other exemplary embodiments, interconnects 1762 and 1764 may be disposed at an angle of inclination relative to the radially inward direction and/or to each other. Interconnects 1762 and 1764 may have a rectangular, square, trapezoidal, or any other shape. Actuator 1134 may be attached to interconnect 1762 adjacent first end 1130, and actuator 1136 may be attached to interconnect 1764 adjacent first end 1130. As also illustrated in FIG. 17C, gaps 1734, and 1736 may extend from adjacent interconnects 1762 and 1764, respectively, to adjacent second end 1132. Thus, for example, gaps 1734, and 1736 may not extend into interconnects 1762 and 1764, respectively.

As yet another example, MEMS mirror 1703 may include interconnect arrangement 1770, which may be used to connect actuating arms 1144 and 1146 to frame 1104. For example, interconnect arrangement 1770 may include interconnects 1772 and 1774, attached at one end to frame 1104. Interconnects 1772 and 1774 may have structures and functions similar to that of interconnects 1762 and 1764 discussed above. As also illustrated in FIG. 17C, gaps 1742 and 1746 may extend from interconnects 1772 and 1774, respectively, to adjacent second end 1132. Gaps 1742 and 1746 may include interconnect gap portions 1741 and 1745, respectively. Gaps 1742 and 1746 may also include actuator gap portions 1743 and 1747, respectively. Actuator gap portions 1743 and 1747 may extend from interconnects 1772 and 1774 in a generally circumferential direction to adjacent second end 1142. Interconnect gap portions 1741 and 1745 may extend from actuator gap portions 1743 and 1747, respectively, partway into interconnects 1772 and 1774, respectively.

As yet another example, MEMS mirror 1703 may include interconnect arrangement 1780, which may be used to connect actuating arms 1154 and 1156 to frame 1104. For example, interconnect arrangement 1780 may include interconnects 1782, 1884, 1786, and 1788, attached at one end to frame 1104. Interconnects 1782, 1784, 1786, and 1788 may have structures and functions similar to that of interconnects 1762 and 1764 discussed above. Actuating arms 1751, 1753, 1755, and 1757 may be attached to interconnects 1782, 1784, 1786, and 1788, respectively adjacent first end 1150. As also illustrated in FIG. 17C, gaps 1742 and 1746 may extend from adjacent frame 1104 to adjacent second end 1152. Thus, for example, gap 1752 may be disposed between interconnects 1782 and 1784 and may also extend between actuating arms 1751 and 1753. Likewise, gap 1756 may be disposed between interconnects 1786 and 1788 and may also extend between actuating arms 1755 and 1757. Although interconnect arrangements 1750, 1760, 1770, and 1780 were discussed with reference to actuators 1112, 1114, 1116, and 1118, respectively, it is contemplated that any of interconnect arrangements 1750, 1760, 1770, and 1780 may be implemented with any of actuators 1112, 1114, 1116, and/or 1118. Further, it is contemplated that any of interconnect arrangements 1750, 1760, 1770, and 1780 may be implemented on any of MEMS mirror assemblies illustrated in FIGS. 11A-11F, 12A-12F, 13A, 15A, 16A, and/or 17A-17C. While the present disclosure provides examples of interconnects for connecting the actuators to the frame of the MEMS mirror, it should be noted that aspects of the disclosure in their broadest sense, are not limited to the disclosed interconnect configurations.

FIGS. 18A-23B, discussed in detail below, illustrate MEMS mirror assemblies, in accordance with examples of the presently disclosed subject matter. The MEMS mirror assemblies exemplified in the non-exhausting examples of FIGS. 18A-23B include at least: a MEMS mirror; a frame; a plurality of actuators operable to rotate the MEMS mirror with respect to a plane of the frame; and interconnect elements that are mechanically connected between the actuators and the MEMS mirror. Optionally, the MEMS mirror assemblies may be manufactured so that the frame (supporting structure) is significantly thicker than the actuators which are designed to bend for rotating the MEMS mirror. As illustrated in FIGS. 18A-23B, optionally, the connection between the thinner part of an actuator and the thicker part of the frame may be implemented perpendicular to a longitudinal axis of the actuator, or parallel thereto. Optionally, a diagonal version or non-straight connection lines may also be implemented. Optionally, the thinner part of the actuator may include a bend extending at substantially right angle (or somewhat different angle, e.g. between about 70° and about 110°), and the connection to the thicker part of the frame is located "after" the bend, such that the bend is positioned within the thinner part. While the variations where illustrated only for some of the structures exemplified in the previous drawings, any one of these connection structures may be implemented for any one of the suggested structures, or for any MEMS mirror assembly (or other MEMS assembly) in which thinner actuators are supported by a thicker frame for rotating a MEMS mirror (or other MEMS surface) with respect to the frame.

FIG. 18A illustrates an exemplary MEMS mirror assembly 1801, many of the features of which are similar to those of MEMS mirror 1100 discussed above with reference to FIG. 11A. MEMS mirror assembly 1801 may also include frame 1804, which may be similar to frame 1104 of MEMS mirror assembly 1100, except that frame 1804 may be significantly thicker than frame 1104. As also illustrated in FIG. 18A, actuating arms 1124, 1126, 1134, 1136, 1144, 1146, 1154, and 1156 may be attached to frame 1804 by interconnects 1822, 1824, 1832, 1834, 1842, 1844, 1852, and 1854, respectively. Interconnects 1822, 1832, 1842, and 1852 may be similar to interconnect 1762 discussed above with reference to FIG. 17C. Likewise, interconnects 1824, 1834, 1844, and 1854 may be similar to interconnect 1764 discussed above with reference to FIG. 17C. In some exemplary embodiments as illustrated in FIG. 18A, frame 1804 may be significantly thicker than any of actuating arms 1124, 1126, 1134, 1136, 1144, 1146, 1154, and 1156, and/or any of interconnects 1822, 1824, 1832, 1834, 1842, 1844, 1852, and 1854.

FIG. 18B illustrates an exemplary MEMS mirror assembly 1803, many of the features of which are similar to those of MEMS mirror 1801 discussed above with reference to FIG. 18A. As illustrated in the exemplary embodiment of FIG. 18B, interconnects 1826, 1828, 1836, 1838, 1846, 1848, 1856, and 1858 may be significantly thicker than any of actuating arms 1124, 1126, 1134, 1136, 1144, 1146, 1154, and 1156. The thicknesses of interconnects 1826, 1828, 1836, 1838, 1846, 1848, 1856, and 1858 may be equal to or different from a thickness of frame 1804.

FIG. 19A illustrates an exemplary MEMS mirror assembly 1901, many of the features of which are similar to those of MEMS mirror assemblies 1101 and 1801 discussed above with reference to FIGS. 11B and 18A, respectively. Like MEMS mirror assembly 1800, frame 1804 of MEMS mirror assembly 1901 may be significantly thicker than any of actuating arms actuating arms 1124, 1126, 1134, 1136, 1144, 1146, 1154, and 1156 or any of interconnects 1822, 1824, 1832, 1834, 1842, 1844, 1852, and 1854.

FIG. 19B illustrates an exemplary MEMS mirror assembly 1903, many of the features of which are similar to those of MEMS mirror assembly 1901 discussed above with reference to FIG. 19A. As illustrated in FIG. 19B, however, unlike the interconnects of MEMS mirror assembly 1901, MEMS mirror assembly 1903 may include relatively thicker interconnects 1826, 1828, 1836, 1838, 1846, 1848, 1856, and 1858 similar to those of MEMS mirror assembly 1803.

Figure 20A:
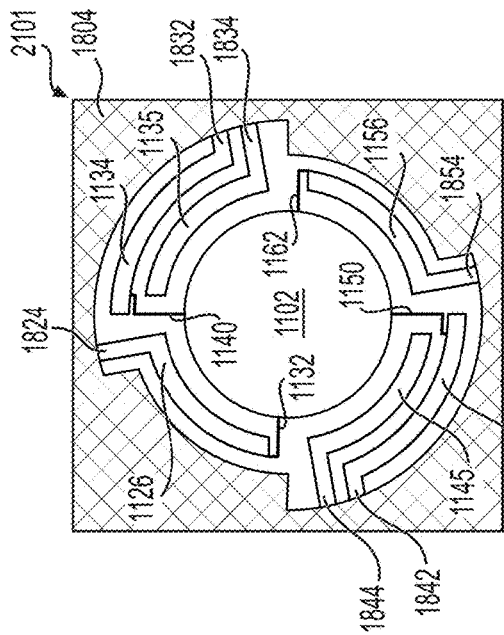

FIG. 20A illustrates an exemplary MEMS mirror assembly 2001, many of the features of which are similar to those of MEMS mirror assemblies 1103 and 1801 discussed above with reference to FIGS. 11C and 18A, respectively. MEMS mirror assembly 2001 may also include exemplary connectors 1130, 1132, 1140, 1142, 1150, 1152, 1160, and 1162 (not labeled on the figure for clarity) similar to corresponding features of MEMS mirror assembly 1103. Like MEMS mirror assembly 1801, frame 1804 of MEMS mirror assembly 2001 may be significantly thicker than any of actuating arms 1124, 1126, 1134, 1136, 1144, 1146, 1154, and 1156, or any of interconnects 1822, 1824, 1832, 1834, 1842, 1844, 1852, and 1854.

Figure 20B:
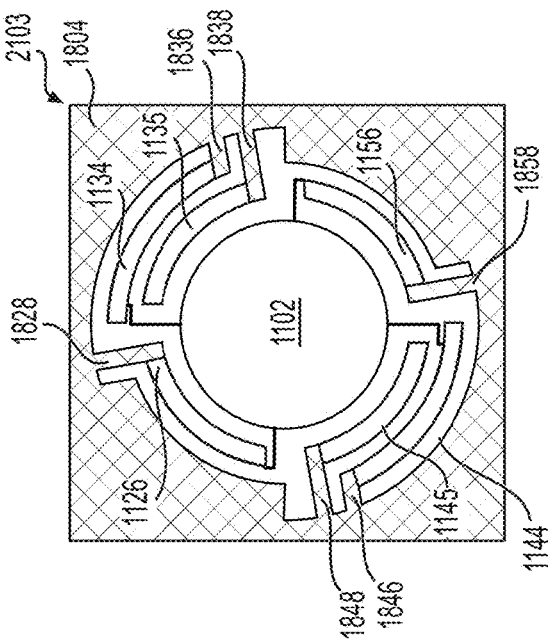

FIG. 20B illustrates an exemplary MEMS mirror assembly 2003, many of the features of which are similar to those of MEMS mirror 2001 discussed above with reference to FIG. 20A. As illustrated in FIG. 20B, however, unlike the interconnects of MEMS mirror assembly 2001, MEMS mirror assembly 2003 may include relatively thicker interconnects 1826, 1828, 1836, 1838, 1846, 1848, 1856, and 1858 similar to those of MEMS mirror assembly 1803.

Figure 21A:
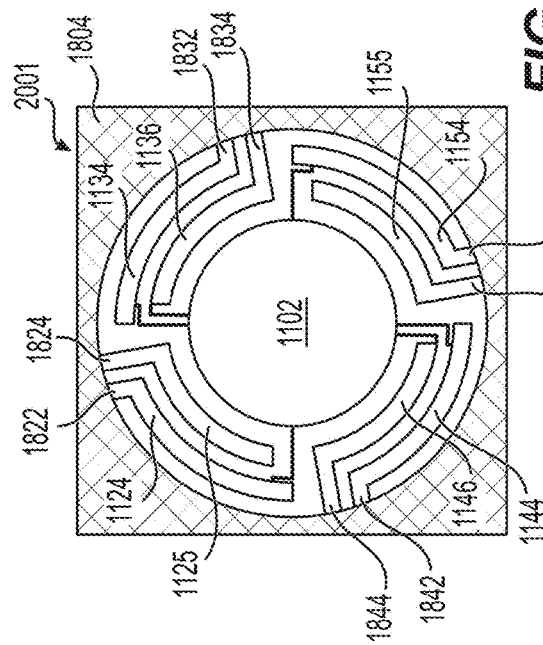

FIG. 21A illustrates an exemplary MEMS mirror assembly 2101, many of the features of which are similar to those of MEMS mirror 1105 discussed above with reference to FIG. 11D. MEMS mirror assembly 2101 may include frame 1804, which may be similar to frame 1104 of MEMS mirror assembly 1105, except that frame 1804 may be significantly thicker than frame 1104. As also illustrated in FIG. 21A, actuating arms 1124, 1126, 1134, 1136, 1144, 1146, 1154, and 1156 may be attached to frame 1804 by interconnects 1822, 1824, 1832, 1834, 1842, 1844, 1852, and 1854, respectively. Interconnects 1822, 1832, 1842, and 1852 may be similar to interconnect 1762 discussed above with reference to FIG. 17C. Similarly, interconnects 1824, 1834, 1844, and 1854 may be similar to interconnect 1764 discussed above with reference to FIG. 17C. In some exemplary embodiments as illustrated in FIG. 21A, frame 1804 may be significantly thicker than any of actuating arms 1124, 1126, 1134, 1136, 1144, 1146, 1154, and 1156, any of interconnects 1822, 1824, 1832, 1834, 1842, 1844, 1852, and 1854.

Figure 21B:
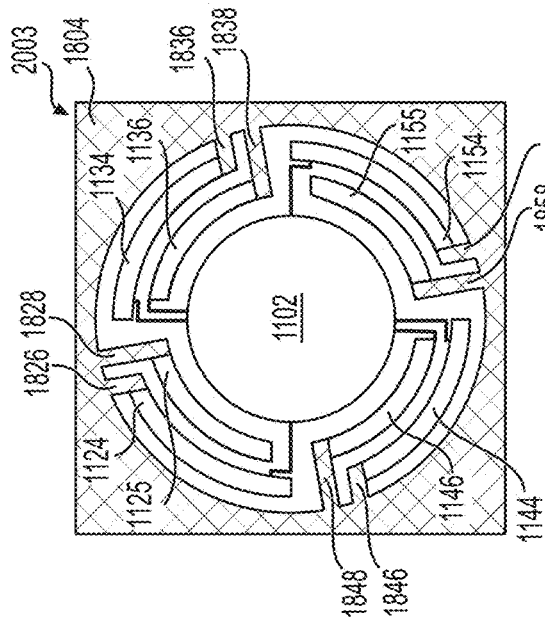

FIG. 21B illustrates an exemplary MEMS mirror assembly 2103, many of the features of which are similar to those of MEMS mirror 2101 discussed above with reference to FIG. 21A. As illustrated in FIG. 21B, however, unlike the interconnects of MEMS mirror assembly 2101, MEMS mirror assembly 2103 may include relatively thicker interconnects 1828, 1836, 1838, 1846, 1848, and 1858 similar to corresponding interconnects of MEMS mirror assembly 1803.

Figure 22A:
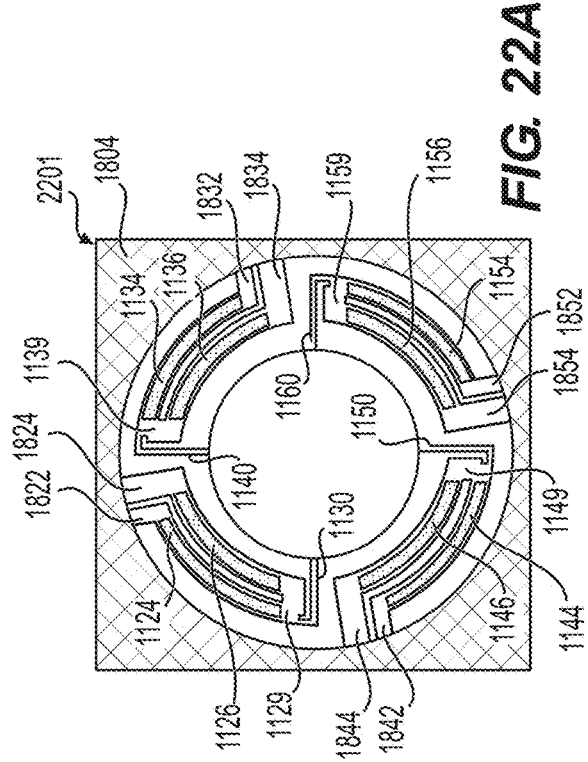

FIG. 22A illustrates an exemplary MEMS mirror assembly 2201, many of the features of which are similar to those of MEMS mirror assemblies 1700 discussed above with reference to FIG. 17A. MEMS mirror assembly 2201 may also include frame 1804, which may be similar to frame 1104 of MEMS mirror assembly 1700, except that frame 1804 may be significantly thicker than frame 1104. Like MEMS mirror assembly 1800, frame 1804 of MEMS mirror assembly 1901 may be significantly thicker than any of actuating arms actuating arms 1124, 1126, 1134, 1136, 1144, 1146, 1154, and 1156 or any of interconnects 1822, 1824, 1832, 1834, 1842, 1844, 1852, and 1854. As also illustrated in FIG. 22A, actuating arms 1126, 1134, 1136, 1144, 1146, and 1156 may be attached to frame 1804 by interconnects 1824, 1832, 1834, 1842, 1844, and 1854, respectively. Interconnects 1832 and 1842 may be similar to interconnect 1762 discussed above with reference to FIG. 17C Similarly, interconnects 1824, 1834, 1844, and 1854 may be similar to interconnect 1764 discussed above with reference to FIG. 17C. In some exemplary embodiments as illustrated in FIG. 22A, frame 1804 may be significantly thicker than any of actuating arms 1126, 1134, 1136, 1144, 1146, and 1156, any of interconnects 1824, 1832, 1834, 1842, 1844, and 1854, or connecting arms 1129, 1139, 1149, and 1159.

Figure 22B:
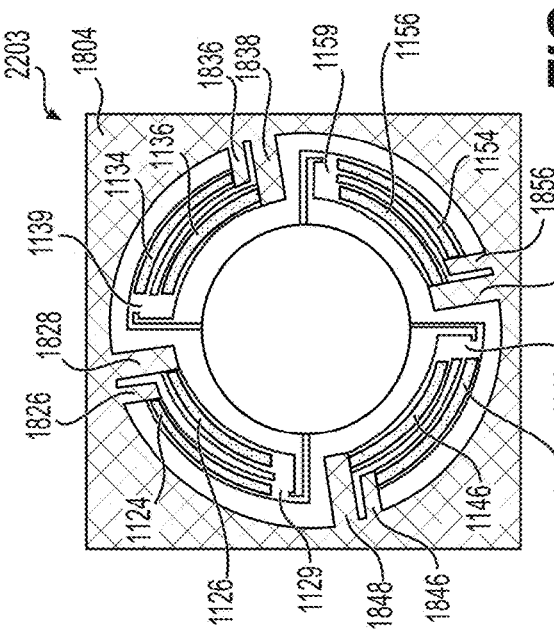

FIG. 22B illustrates an exemplary MEMS mirror assembly 2203, many of the features of which are similar to those of MEMS mirror 2201 discussed above with reference to FIG. 22A. As illustrated in FIG. 22B, however, unlike the interconnects of MEMS mirror assembly 2201, MEMS mirror assembly 2203 may include relatively thicker interconnects 1826, 1828, 1836, 1838, 1846, 1848, 1856, and 1858 similar to corresponding interconnects of MEMS mirror assembly 1803.

Figure 23A:
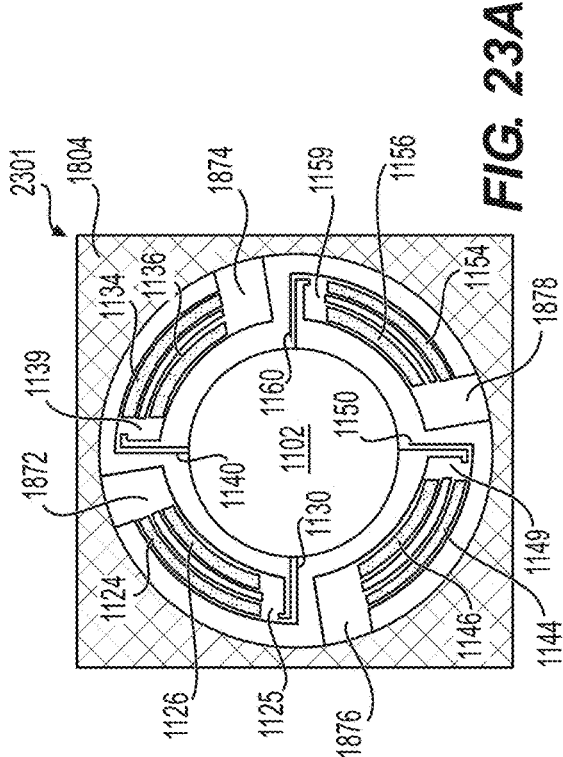

FIG. 23A illustrates an exemplary MEMS mirror assembly 2301, many of the features of which are similar to those of MEMS mirror assembly 2201 discussed above with reference to FIG. 22A. Features of MEMS mirror assembly 2301 that are similar to those of MEMS mirror assembly 2201 are labeled in FIG. 23A using the same numerical labels as in FIG. 22A. As also illustrated in FIG. 23A, actuating arms 1124 and 1126 may be connected to interconnect 1872, actuating arms 1134 and 1136 may be connected to interconnect 1874, actuating arms 1144 and 1146 may be connected to interconnect 1876, and actuating arms 1154 and 1156 may be connected to interconnect 1878. Interconnects 1872, 1874, 1876, and 1878 may in turn be connected to frame 1804. Interconnects 1872, 1874, 1876, and 1878 may be similar to interconnect 1752 of MEMS mirror assembly 1703 discussed above with reference to FIG. 17C. In some exemplary embodiments as illustrated in FIG. 23A, frame 1804 may be significantly thicker than any of actuating arms 1124, 1126, 1134, 1136, 1144, 1146, 1154, and 1156, any of interconnects 1872, 1874, 1876, and 1878, or connecting arms 1129, 1139, 1149, and 1159.

Figure 23B:
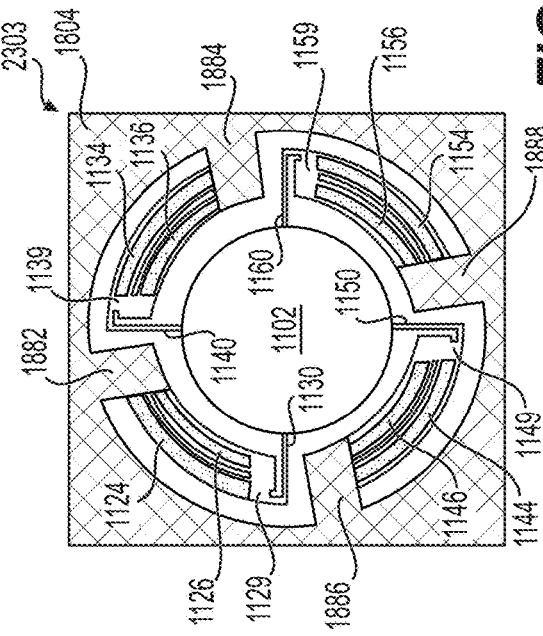

FIG. 23B illustrates an exemplary MEMS mirror assembly 2303, many of the features of which are similar to those of MEMS mirror 2301 discussed above with reference to FIG. 23A. As also illustrated in FIG. 23B, actuating arms 1124 and 1126 may be connected to interconnect 1882, actuating arms 1134 and 1136 may be connected to interconnect 1884, actuating arms 1144 and 1146 may be connected to interconnect 1886, and actuating arms 1154 and 1156 may be connected to interconnect 1888. Interconnects 1882, 1884, 1886, and 1888 may in turn be connected to frame 1804. Interconnects 1882, 1884, 1886, and 1888 may be significantly thicker than any of actuating arms 1124, 1126, 1134, 1136, 1144, 1146, 1154, and 1156, or connecting arms 1129, 1139, 1149, and 1159. Thicknesses of interconnects 1882, 1884, 1886, and 1888 may be equal to or different from a thickness of frame 1804. While the present disclosure provides examples of frames and interconnects of different thicknesses, it should be noted that aspects of the disclosure in their broadest sense, are not limited to the disclosed frame and interconnect examples.

Although various exemplary embodiments of the MEMS mirror assemblies discussed with reference to FIGS. 11A-23B have been described as being capable of causing movement of MEMS mirror 1102 about more than one axis of rotation, in accordance with various embodiments of this disclosure, the MEMS scanning device may include a MEMS mirror assembly that allows the MEMS mirror to move about only a single axis. Such MEMS mirrors may be referred to as 1D MEMS mirrors.

Figure 24:
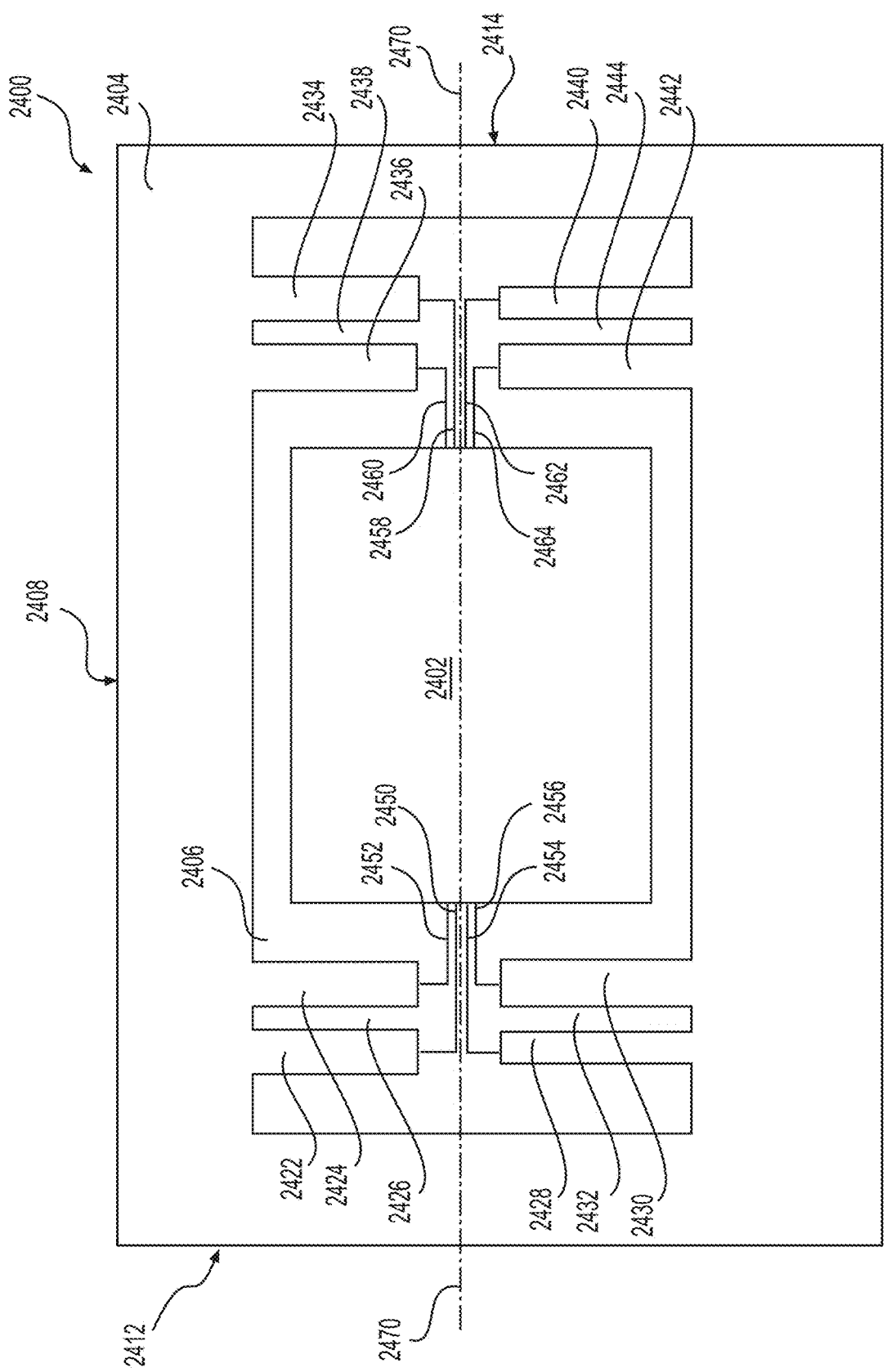
FIG. 24 is an illustration of a one-dimensional MEMS mirror assembly consistent with disclosed embodiments.

FIG. 24 illustrates an exemplary 1D MEMS mirror assembly 2400 that may be included in the disclosed MEMS scanning device. MEMS mirror assembly 2400 may include MEMS mirror 2402 and frame 2404. In one exemplary embodiment as illustrated in FIG. 24, MEMS mirror 2402 and frame 2402 may each have a generally rectangular shape. It is contemplated, however that MEMS mirror 2402 and frame 2404 may have other shapes. It is also contemplated that the shapes of MEMS mirror 2402 and frame 2404 may be similar or different. Frame 2404 may include recess 2406, which may have a generally rectangular shape although other shapes are contemplated. Recess 2406 may divide frame 2404 into frame arms 2408, 2410, 2412, and 2414. Frame arms 2408 and 2410 may be disposed generally parallel to and spaced apart from each other, and frame arms 2412 and 2414 may similarly be disposed generally parallel to and spaced apart from each other. In one exemplary embodiment as illustrated in FIG. 24, frame arms 2408 and 2410 may be disposed generally perpendicular to frame arms 2412 and 2414.

Actuating arms 2422 and 2426 may extend from frame arm 2408 into recess 2406 towards frame arm 2410. Actuating arms 2422 and 2426 may be spaced apart from each other by gap 2426. Actuating arm 2422 may also be spaced apart from frame arm 2412 and actuating arm 2424 may be spaced apart from MEMS mirror 2402. Actuating arms 2428 and 2430 may extend from frame arm 2410 into recess 2406 towards frame arm 2408. Actuating arms 2428 and 2430 may be spaced apart from each other by gap 2432. Actuating arm 2428 may also be spaced apart from frame arm 2412 and actuating arm 2430 may be spaced apart from MEMS mirror 2402. Actuating arms 2422 and 2424 may also be spaced apart from actuating arms 2428 and 2430 in a direction generally perpendicular to longitudinal axes of actuating arms 2422, 2424, 2428, and 2430. In one exemplary embodiment as illustrate in FIG. 24, actuating arms 2422 and 2424 may be disposed generally parallel to each other and to frame arm 2412. Likewise, actuating arms 2428 and 2430 may be disposed generally parallel to each other and to frame arm 2412. It is contemplated, however, that one or more of actuating arms 2422, 2424, 2428, and 2430 may be inclined relative to each other and/or relative to frame arm 2412.

Actuating arms 2434 and 2436 may extend from frame arm 2408 into recess 2406 towards frame arm 2410. Actuating arms 2434 and 2436 may be spaced apart from each other by gap 2438. Actuating arm 2434 may also be spaced apart from frame arm 2414 and actuating arm 2436 may be spaced apart from MEMS mirror 2402. Actuating arms 2440 and 2442 may extend from frame arm 2410 into recess 2406 towards frame arm 2408. Actuating arms 2440 and 2442 may be spaced apart from each other by gap 2444. Actuating arm 2440 may also be spaced apart from frame arm 2414 and actuating arm 2442 may be spaced apart from MEMS mirror 2402. Actuating arms 2434 and 2436 may also be spaced apart from actuating arms 2440 and 2442 in a direction generally perpendicular to longitudinal axes of actuating arms 2434, 2436, 2440, and 2442. In one exemplary embodiment as illustrate in FIG. 24, actuating arms 2434 and 2436 may be disposed generally parallel to each other and to frame arm 2414. Likewise, actuating arms 2440 and 2442 may be disposed generally parallel to each other and to frame arm 2414. It is contemplated, however, that one or more of actuating arms 2434, 2436, 2440, and 2442 may be inclined relative to each other and/or relative to frame arm 2414.

As also illustrated in FIG. 24, first ends of connectors 2450, 2452, 2454, and 2456 may be connected to actuating arms 2422, 2424, 2428, and 2430, respectively. Second ends of connectors 2450, 2452, 2454, and 2456 may be connected to MEMS mirror 2402. Similarly, first ends of connectors 2458, 2460, 2462, and 2464 may be connected to actuating arms 2434, 2436, 2440, and 2442, respectively. Second ends of connectors 2458, 2460, 2462, and 2464 may be connected to MEMS mirror 2402. Actuating one or more of the actuating arms 2422, 2424, 2428, 2430, 2422, 2424, 2428, and/or 2430 may cause movement (translation or rotation) of MEMS mirror 2402 about axis 2470.

Figure 25:
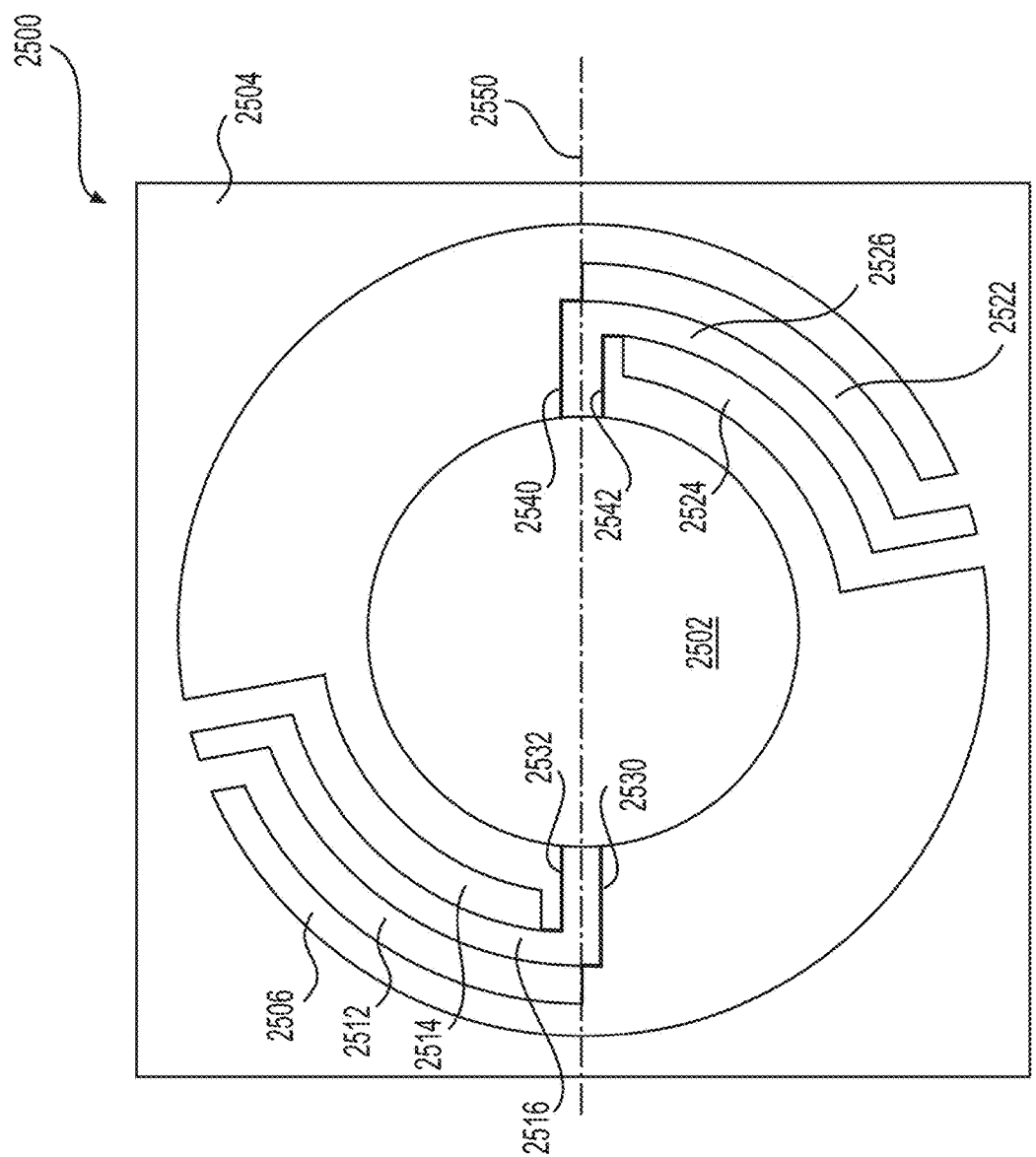
FIG. 25 is another illustration of a one-dimensional MEMS mirror assembly consistent with disclosed embodiments.

FIG. 25 illustrates another exemplary 1D MEMS mirror assembly 2500 that may be included in the disclosed MEMS scanning device. MEMS mirror assembly 2500 may include MEMS mirror 2502 and frame 2504. Frame 2504 may include recess 2506, which may have a generally circular shape although other shapes are contemplated. MEMS mirror 2502 may be positioned within recess 2506 and spaced apart from frame 2504. Actuating arms 2512 and 2514 may extend from frame 2504 into recess 2506 and may be disposed on one side of MEMS mirror 2502. Similarly, actuating arms 2522 and 2524 may extend from frame 2504 into recess 2506 and may be disposed on an opposite side of MEMS mirror 2502. Actuating arms 2512 and 2514 may be spaced apart by gap 2516, and actuating arms 2522 and 2524 may likewise be spaced apart by gap 2526. Actuating arms 2512 and 2522 may each also be spaced apart from frame 2504, and actuating arms 2514 and 2524 may be spaced apart from MEMS mirror 2502. In some exemplary embodiments as illustrated in FIG. 25, actuating arms 2512 and 2522 may be disposed nearer to frame 2504 than to MEMS mirror 2502 and therefore may constitute outer actuating arms. In contrast, actuating arms 2514 and 2524 may be disposed nearer to MEMS mirror 2502 than to frame 2504 and therefore may constitute inner actuating arms. As illustrated in FIG. 25, actuating arms 2512, 2514, 2522, and 2524 may have a generally arcuate shape, although other shapes are contemplated. First ends of connectors 2530, 2532, 2540, and 2542 may be connected to actuating arms 2512, 2514, 2522, and 2524, respectively. Second ends of connectors 2530, 2532, 2540, and 2542 may be connected to MEMS mirror 2502. Actuating one or more of the actuating arms 2512, 2514, 2522, and/or 2524 may cause movement (translation or rotation) of MEMS mirror 2502 about axis 2550.

Consistent with the present disclosure, a LIDAR system may be configured to detect objects by scanning the environment of LIDAR system. A LIDAR system in accordance with the present disclosure may include a light source configured to project light for illuminating an object in an environment external to the LIDAR system. The LIDAR system may also include a scanning unit configured to deflect light from the light source in order to scan at least part of the environment. As discussed above, and by way of example, FIG. 1A illustrates an exemplary scanning unit and FIGS. 2A-2C illustrate exemplary embodiments of a LIDAR system, and a light source consistent with embodiments of the present disclosure.

In accordance with this disclosure, the scanning unit includes a movable MEMS mirror configured to pivot about at least one axis; at least one actuator configured to cause pivoting of the movable MEMS mirror about the at least one axis in a first direction; at least one spring configured to cause pivoting of the movable MEMS mirror about the at least one axis in a second direction different from the first direction. Further the at least one actuator includes a first actuating arm; a second actuating arm; and a gap between the first actuating arm and the second actuating arm. As discussed in detail above, FIGS. 11A-25 illustrated various exemplary embodiments of MEMS mirror assemblies that include one or more actuators configured to move the MEMS mirror about one or more axes.

According to the present disclosure, the LIDAR system includes at least one sensor configured to detect reflections of the projected light. As discussed above, and by way of example, FIGS. 4A-4C illustrate exemplary embodiments of the sensor consistent with embodiments of the present disclosure.

According to the present disclosure, the LIDAR system includes at least one processor. As discussed above, and by way of example, FIGS. 2A and 2B illustrate exemplary embodiments of a processor consistent with embodiments of the present disclosure. In accordance with the present disclosure, the processor is configured to issue an instruction to the at least one actuator causing the actuator to deflect from an initial position. As discussed above the one or more actuators or actuating arms associated with the MEMS mirror assemblies may include PZT layers, which may contract or expand when a current is allowed to pass through the PZT layers or when a biasing voltage is applied to the PZT layers. In some exemplary embodiments, issuing an instruction to an actuator may include the processor causing a current to flow through PZT layers associated with one or more actuators. By way of example, processor 118 (see FIGS. 2A and 2B) may cause current to flow through one or more of PZT layers 1510 and/or 1512 (see FIGS. 15A and 15B) associated with one or more actuators 1112, 1114, 1116, and/or 1118 (see e.g. FIGS. 11A-11F, 12A-12F, 13A, 14, 16A, 17A-17C, 18A-23B, etc.). A flow of current through the PZT layers may cause the one or more actuators 1112, 1114, 1116, and/or 1118 from their original positions. Movement of these actuators may cause translation or rotation of the one or more connectors 1130, 1132, 1140, 1142, 1150, 1152, 1160, 1162 (see e.g. FIG. 11A), which in turn may cause translation or rotation of MEMS mirror 1102.

In accordance with this disclosure, the processor is configured to determine a distance between the vehicle and the object based on signals received from the at least one sensor. As discussed above, and by way of example, as illustrated in FIG. 2A, processor 118 may be configured to determine a distance between object 208 and LIDAR system 100 which may be associated with a vehicle.

In accordance with this disclosure the processor is configured to issue a single instruction to actuate both the first actuating arm and the second actuating arm. In some embodiments, the controller may issue a single instruction may include applying the same biasing voltage across the PZT layers of more than one actuating arm of an actuator, or causing the same current to flow through the PZT layers of more than one actuating arm. In other embodiments, the controller may issue a single instruction by causing the same amount of current to flow through the PZT layers of more than one actuating arm simultaneously. In both scenarios, the PZT layers will deform on more than one actuating arm at the same time causing a plurality of actuating arms to be moved (i.e. deflected, distorted, bent, twisted, etc.)

By way of example, controller 118 may issue an instruction to a power supply unit associated with LIDAR system 100 to cause the same or equal amounts of current to flow through, for example, PZT layers 1510 and 1512 of actuating arms 1134 and 1136 (see FIG. 15A or 15B). Additionally or alternatively, controller 118 may issue an instruction to a power supply unit associated with LIDAR system 100 to cause the same biasing voltage to be applied across, for example, PZT layers 1510 and 1512 of actuating arms 1134 and 1136. In response PZT layers 1510 and 1512 may expand or contract causing actuating arms 1134 and 1136 to be displaced, twisted, etc. Movement of actuating arms 1134 and 1136 may also cause MEMS mirror 1102 to be translated or rotated about one or more axes.

According to with the present disclosure, the processor is configured to issue a first instruction to the first actuating arm and a second instruction to the second actuating arm. In some embodiments, the controller may issue more than one instruction. Each of these instructions may include applying a biasing voltage across a PZT layer of an actuator or causing a current to flow through the PZT layer of an actuator. In both scenarios, the PZT layers will deform on more than one actuating arm causing a plurality of actuating arms to be moved (i.e. deflected, distorted, bent, twisted, etc.)

Thus, for example, controller 118 may issue a first instruction to a power supply unit associated with LIDAR system 100 to apply a biasing voltage across, for example, PZT layers 1510, or to cause a current to flow through PZT layer 1510 (see e.g. FIG. 15A or 15B). Controller 118 may also issue a second instruction to the power supply unit to apply a biasing voltage across, for example, PZT layers 1512, or to cause a current to flow through PZT layer 1512 (see e.g. FIG. 15A or 15B) In response PZT layers 1510 and 1512 may expand or contract causing actuating arms 1134 and 1136 to be displaced, twisted, etc. Movement of actuating arms 1134 and 1136 may also cause MEMS mirror 1102 to be translated or rotated about one or more axes.

In accordance with this disclosure, the processor is configured to issue the first instruction and the second instruction simultaneously. In other embodiments in accordance with this disclosure, the processor is configured to issue the second instruction after the first instruction. As discussed above, the processor may cause the biasing voltage to be applied across the PZT layers of more than one actuator associated with disclosed MEMS mirror assemblies simultaneously or sequentially. Similarly, the processor may cause a current to flow from the power supply unit associated with the LIDAR system to flow through the PZT layers of the more than one actuator simultaneously or sequentially. When the voltage or current is applied to the PZT layers simultaneously, the actuating arms associated with the PZT layers may be caused to be displaced simultaneously. Likewise, when the voltage or current is applied to the PZT layers sequentially the actuating arms may be displaced sequentially. As discussed above, causing the actuating arms to be displaced simultaneously may allow a combined force to be exerted by the actuating arms on the MEMS mirror. Alternatively, causing the actuating arms to be displaced sequentially may help to translate or rotate the MEMS mirror incrementally. Additionally or alternatively, such incremental movements may help to correct the displacement of the MEMS mirror to achieve precise positioning of the MEMS mirror. For example, errors in movement of the MEMS mirror due to actuation of one actuating arm may be corrected by a subsequent actuation of a different actuating arm.

By way of example, controller 118 may cause the power supply unit associated with LIDAR system 100 to apply a biasing voltage across, for example, PZT layers 1510, or to cause a current to flow through PZT layer 1510 (see e.g. FIG. 15A or 15B). Controller 118 may also cause the power supply unit to apply a biasing voltage across, for example, PZT layers 1512, or to cause a current to flow through PZT layer 1512 (see e.g. FIG. 15A or 15B) after first applying the voltage or current to the PZT layer 1510. In response PZT layer 1510 may be deformed first and PZT layer may be deformed after deformation of PZT layer 1510, which in turn may cause actuating arm 1134 to be displaced first followed by movement of actuating arm 1136.

Several aspects of the disclosure were discussed above. It is noted that any feasible combination of features, aspects, characteristics, structures, etc. which were discussed above—for example, with respect to any one or more of the drawings—may be implemented as is considered as part of the disclosure. Some of those feasible combinations were not discussed in detail for reasons such as brevity and succinctness of the disclosure, but are nevertheless part of the disclosure, and would present themselves to a person who is of skill in the art in view of the above disclosure.

The present disclosure relates to MEMS scanning devices. While the present disclosure provides examples of MEMS scanning devices that may be part of a scanning LIDAR system, it should be noted that aspects of the disclosure in their broadest sense, are not limited to MEMS scanning devices for a LIDAR system. Rather, it is contemplated that the forgoing principles may be applied to other types of electro-optic systems as well. FIGS. 3A-3D depict exemplary MEMS scanning devices 104.

A MEMS scanning device in accordance with the present disclosure may include a movable MEMS mirror configured to be rotated about at least one rotational axis. For example, a MEMS scanning device may include a light deflector configured to make light deviate from its original path. In some exemplary embodiments, the light deflector may be in the form of a MEMS mirror that may include any MEMS structure with a rotatable part which rotates with respect to a plane of a wafer (or frame). For example, a MEMS mirror may include structures such as a rotatable valve, or an acceleration sensor. In some exemplary embodiments, the rotatable part may include a reflective coating or surface to form a MEMS mirror capable of reflecting or deflecting light from a light source. Various exemplary embodiments of MEMS mirror assemblies discussed below may be part of a scanning LIDAR system (such as—but not limited to—system 100, e.g. MEMS mirror 300, deflector 114), or may be used for any other electro-optic system in which a rotatable MEMS mirror or rotatable structure may be of use. While a MEMS mirror has been disclosed as an exemplary embodiment of a light deflector, it should be noted that aspects of the disclosure in their broadest sense, are not limited to MEMS mirror. Thus, for example, the disclosed MEMS mirror in a MEMS scanning device according to this disclosure may instead include prisms, controllable lenses, mechanical mirrors, mechanical scanning polygons, active diffraction (e.g. controllable LCD), Risley prisms, or other types of optical equipment capable of deflecting a path of light.

In accordance with the present disclosure, a MEMS scanning device may include a frame, which supports the MEMS mirror. As used in this disclosure a frame may include any supporting structure to which the MEMS mirror may be attached such that the MEMS mirror may be capable of rotating relative to the frame. For example, the MEMS mirror may include portions of a wafer used to manufacture the MEMS mirror that may structurally support the MEMS mirror while allowing the MEMS mirror to pivot about one or more axes of rotation relative to the frame.

Figure 26:
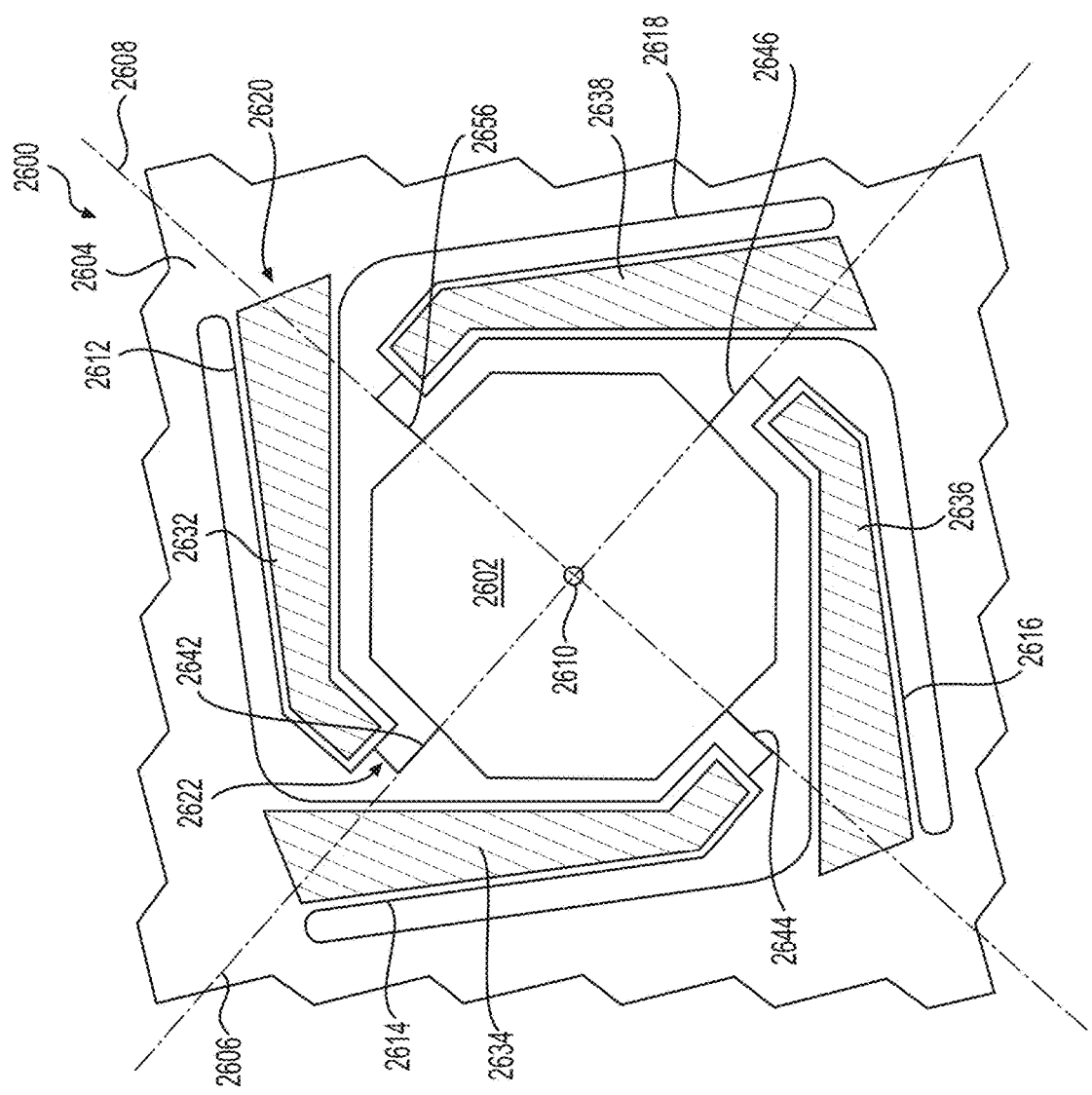
FIG. 26 is an illustration of an exemplary MEMS mirror assembly having actuators of varied dimensions, consistent with disclosed embodiments.

Referring to the non-limiting example of FIG. 26, a MEMS mirror assembly 2600 is disclosed. MEMS mirror assembly 2600 includes at least an active area (e.g. a MEMS mirror 2602, as illustrated in the example of FIG. 26) and a frame 2604 (also referred to as "support", e.g. in the above description). Possibly, the active area is completely spaced from the frame (any part of which can move from the plane of the frame) with the exception of a plurality of interconnects. The frame may include a continuous frame or a frame consisting of two or more separate parts. For example, the frame may be made from wafer layers which include one or more silicon layers, the one or more silicon layers possibly including at least one silicon layer which is a part of the movable MEMS mirror. Layers of materials other than silicon may also be used.

In accordance with the present disclosure, the MEMS scanning device may include at least one connector connected to the movable MEMS mirror and configured to facilitate rotation of the movable MEMS mirror about the at least one rotational axis. As used in this disclosure a connector may include a structural element that electrically and/or mechanically connect other elements of the disclosed MEMS scanning device. For example, a connector may provide electrical and/or mechanical connections between one or more actuating arms, springs associated with the actuating arms, and the MEMS mirror. In some exemplary embodiments, the connector may be directly attached to one or more of actuating arms, to springs, and/or to the MEMS mirror. In other embodiments, the connector may include more than one connector member that may be connected to each other and may be attached to the one or more actuating arms, to springs, and/or to the MEMS mirror. In some embodiments, the connector may be a mechanical connector, which may be configured to allow relative movement between the MEMS mirror and the one or more actuating arms or actuators. In other embodiments, the connector may also be configured to allow electrical current and or signals to pass through the connector during operation of the MEMS scanning device.

In accordance with the present disclosure a MEMS scanning device may include an elongated actuator configured to apply mechanical force on the at least one connector. The elongated actuator may have a base end connected to the frame and a distal end connected to the at least one connector. An elongated actuator according to the present disclosure may include one or more movable structural members of the MEMS mirror assembly that may be capable of causing translational or rotational movement of the MEMS mirror relative to the frame. The actuator may be elongated because it may have a length which may be larger than a width of the actuator. The disclosed actuator may be an integral part of the MEMS mirror assembly or may be separate and distinct from the MEMS mirror assembly. The disclosed actuator may be directly or indirectly attached to the disclosed MEMS mirror.

In some exemplary embodiments, the actuator may be a part of the MEMS mirror assembly and may itself be configured to move relative to the frame and/or relative to the MEMS mirror associated with the MEMS mirror assembly. For example, the disclosed actuator may be connected between the frame and the MEMS mirror and may be configured to be displaced, bent, twisted, and/or distorted to cause movement (i.e. translation or rotation) of the MEMS mirror relative to the frame. It is contemplated that a MEMS mirror assembly according to the present disclosure may include one, two, or any number of actuators.

According to the present disclosure a width of the base end of the actuator is wider than the distal end of the actuator. It is noted that the geometrical characteristics of the actuators may vary. For example, optionally the width of the actuator may gradually reduce from the first end (or base end) to the second end (or distal end). For example, the width of the piezoelectric element at the first end may be larger than a width of the piezoelectric element at the second end. The first end of the piezoelectric element is the part of the piezoelectric element positioned on the first end of the actuator, and the second end of the piezoelectric element is the part of the piezoelectric element positioned on the second end of the actuator. Optionally, the width of the piezoelectric element may change proportionally with the width of the actuator.

FIG. 26 illustrates a plurality of actuators (which may also be referred to as "springs", "benders", "cantilever," etc.), in accordance with examples of the presently disclosed subject matter. FIG. 26 illustrates an exemplary MEMS mirror assembly 2600 consistent with this disclosure. For example, as illustrated in FIG. 26, MEMS mirror assembly 2600 may include MEMS mirror 2602 supported by frame 2604. MEMS mirror 2602 may be a movable MEMS mirror in that MEMS mirror 2602 may be translatable relative to frame 2604 and/or rotatable about one or more axes relative to frame 2604. For example, MEMS mirror 2602 may be translatable or rotatable about one, two, or more axes (e.g., exemplary axes 2606, 2608, or 2610, which is going into the plane of the figure) as illustrated in FIG. 26. In some exemplary embodiments, MEMS mirror 2602 may include a reflective surface. Although MEMS mirror 2602 has been illustrated as having a polygonal shape in FIG. 26, it is contemplated that MEMS mirror 2602 may have a circular shape, an elliptical shape, a rectangular or square shape, or any other type of geometrical shape suitable for use with system 900 or any other system in which it is installed or for which it is designed. While the present disclosure describes examples of a MEMS mirror and frame, it should be noted that aspects of the disclosure in their broadest sense are not limited to the disclosed examples of the MEMS mirror and/or frame.

FIG. 26 illustrates a MEMS system with actuators of varied width, in accordance with examples of the presently disclosed subject matter. Referring to FIG. 26, actuators which move the active area of a MEMS system (e.g., the active area being the movable MEMS mirror) may be designed to have varied widths, so that one end of the actuator which is directly connected to the active area (e.g. using a flexible interconnect) is narrower than the other end of the actuator, which is connected to the frame. The width of the actuator is a dimension which is measured in the plane of a layer of the wafer out of which the actuator is made (e.g., a plane of a silicon layer which is also used for the frame), and which is substantially perpendicular to a longitudinal direction of the actuator. Examples of actuators having varied widths are provided, for example, in FIGS. 26-31.

Actuators of differing width as described below with respect to FIGS. 26-31 may be used in different MEMS system. For example, the width of one or more of the first actuators may change between its ends (or between its ends and its middle section) in the manner discussed below with respect to FIGS. 26-31. It is further noted that actuators of differing width as described below with respect to FIGS. 26-31 may be used with other actuation techniques (i.e. not only piezoelectric actuation, e.g., electrostatic actuation, other actuation techniques mentioned in the present disclosure, etc.), and with differing actuation configurations and piezoelectric material deployments (e.g., both above and under actuators of the LIDAR system).

It is noted that utilizing actuators of differing width for controllably moving active areas of MEMS systems may be useful in a system in which the frequency response of the system (e.g., the resonance behavior) is important. For example, most of the vibrations in vehicles are below a frequency of about 1 Kilohertz, and it may therefore be useful to limit the frequency-response of the MEMS systems to such frequencies.

As illustrated in the exemplary embodiment of FIG. 3A, scanning device 104 may include one or more actuators, each of which may have a first end that is mechanically connected to the frame and a second end that is opposite to the first end and which is mechanically connected to the active area by an interconnect element. While different actuation methods may be used, such as electrostatic or electromagnetic actuation), optionally the actuators may be actuated by piezoelectric actuation. Optionally, the actuator may include an actuator-body (e.g., made of silicon) and a piezoelectric element. The piezoelectric element may be configured to bend the actuator-body and move the active area when subjected to an electrical field. In scanning device 104, a width of an actuator at the first end may be larger than a width of that actuator at the second end (the difference in widths in not exemplified in FIG. 3A; comparable varying widths of an actuator is exemplified, for example, in FIG. 26). This may be true for one, some, or all of the actuators in scanning device 104.

Referring to MEMS mirror assembly 2600, optionally a width of one or more of the actuators may gradually reduce from the first end to the second end. Referring to scanning device 104, optionally a width of the piezoelectric element of one or more of the actuators at the first end may be larger than a width of the piezoelectric element at the second end. Referring to scanning device 104, optionally a width of the piezoelectric element of one or more of the actuators may change proportionally with the width of the actuator.

MEMS scanning device 104 may be used for a LIDAR system, which may further include a processor configured to process detection signals of light reflected by the MEMS mirror. For example, MEMS scanning device 104 may be implemented as the mirror assembly of LIDAR system 100. The LIDAR system which includes MEMS scanning device 104 may further include a controller configured to modify electrical fields applied to the at least actuator, to move the MEMS mirror to scan a field of view of the LIDAR system. It is noted that the LIDAR system may include a plurality of the MEMS scanning device 104 (e.g., arranged in an array of mirrors), and a controller which is configured to move the plurality of MEMS mirrors (e.g., in a coordinated manner).

By way of example, FIG. 26 illustrates exemplary actuators 2612, 2614, 2616, and 2618 associated with MEMS mirror assembly 2600 consistent with this disclosure. As illustrated in FIG. 26, actuator 2612 may extend from adjacent base end 2620 to adjacent distal end 2020. Actuator 2612 may be connected to frame 2604 adjacent base end 2620 and may be connected to MEMS mirror 2602 adjacent distal end 2622. Actuators 2614, 2616, 2618 may be connected to frame 2604 and MEMS mirror 2602 in a similar manner Notably, the MEMS mirror assembly may have any number of actuators, e.g., one, two, three, four, or any number larger than that.

In accordance with the present disclosure, the MEMS scanning device includes two actuators. Each of the two actuators include a taper decreasing from a base end-side of the actuator toward a distal end-side of the actuator. As used in this disclosure a taper refers to a portion of an actuator that decreases in width along a length of the actuator. It is to be noted that a taper as used in this disclosure may or may not end in a point (i.e. near zero width). By way of example, FIG. 26 illustrates actuator 2612 that may have a width that decreases in the form of a taper along a length of actuator 2612 from adjacent base end 2620 to adjacent distal end 2622. One or more of actuators 2614, 2616, and/or 2618 may also have a width that decreases in the form of a taper along a length of the respective actuator from a base end of that actuator to a distal end of that actuator. It is contemplated, however, that one or more actuators 2612, 2614, 2616, and 2618 may have a uniform width or a non-uniform width as illustrated in FIG. 26. While the present disclosure describes examples of actuators associated with a MEMS scanning device, it should be noted that aspects of the disclosure in their broadest sense are not limited to the disclosed actuator examples.

The actuators of the MEMS mirror assembly may be actuated in various different ways, such as by contraction of a piezoelectric member on each actuator (e.g., PZT, lead zirconate titanate, aluminum nitride), electromagnetic actuation, electrostatic actuation, etc. It is noted that in the description below, any applicable piezoelectric material may be used wherever the example of PZT is used. As mentioned above, the actuators may be piezoelectric actuators. Optionally, one or more of the plurality of actuators may include a piezoelectric layer (e.g., a PZT layer), which is configured to bend the respective actuator, thereby rotating the mirror, when subjected to an electrical field. By way of example, actuators 2612, 2614, 2616, 2618 associated with MEMS mirror assembly 2600 may include one or more PZT layers 2632, 2634, 2636, and 2638, respectively. Energizing the one or more PZT layers with an electrical field (e.g. by providing a bias voltage or current) may cause the one or more actuators 2612, 2614, 2616, 2618 to expand, contract, bend, twist, or alter their configuration, which in turn may cause MEMS mirror 2602 to be translated or rotated relative to the one or more axes 2606, 2608, and/or 2610. While the present disclosure describes examples of axes of rotation of the MEMS mirror, it should be noted that aspects of the disclosure in their broadest sense are not limited to the disclosed examples of the axes of rotation. Thus, for example, the MEMS mirror according to the present disclosure may translate and/or rotate relative to axes other than the disclosed axes 2606, 2608, and/or 2610. While the present disclosure describes examples of piezoelectric layers associated with actuators of a MEMS scanning device, it should be noted that aspects of the disclosure in their broadest sense are not limited to the disclosed piezoelectric actuator examples.

By way of example, FIG. 26 illustrates MEMS mirror assembly 2600 that may include one or more connectors connecting (directly or indirectly) the active area and the frame (e.g., connectors 2642, 2644, 2646, and 2648). As illustrated in the exemplary embodiment of FIG. 26, one end of connector 2642 may be connected to actuator 2612 adjacent distal end 2622 whereas an opposite end of connector 2642 may be connected to MEMS mirror 2602. Connectors 2644, 2646, and 2648 may be similarly connected at their respective first ends to actuators 2614, 2616, and 2618, respectively. Opposite ends of connectors 2644, 2646, and 2648 may be connected to MEMS mirror 2602. Movement of the one or more actuators 2612, 2614, 2616, and/or 2618 may cause movement of the one or more connectors 2642, 2644, 2646, and 2648, which by virtue of their connection to MEMS mirror 2602 may also cause movement of MEMS mirror 2602. While the present disclosure describes examples of connectors associated with a MEMS scanning device, it should be noted that aspects of the disclosure in their broadest sense are not limited to the disclosed connector examples.

Figure 27:
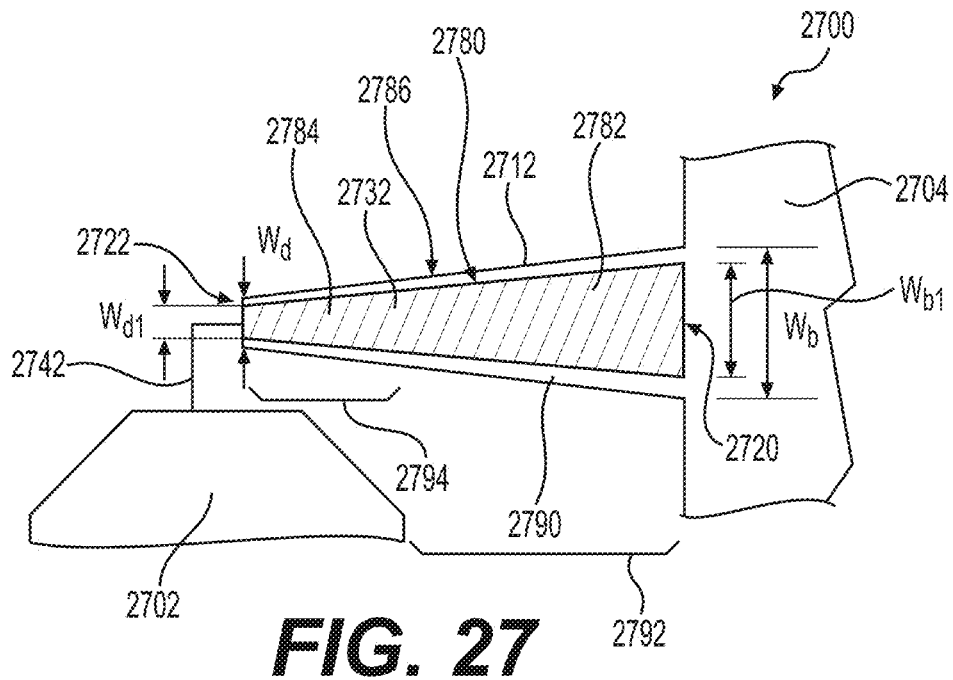
FIGS. 27 and 28 are additional illustrations of exemplary actuators of varied dimensions, consistent with disclosed embodiments.

In accordance with the present disclosure, a width of the actuator may taper between the base end and the distal end. FIG. 27 illustrates a magnified view of an exemplary actuator that may have a width that tapers between the base end and the distal end. For example, as illustrated in FIG. 27, actuator 2712 may extend from adjacent base end 2720 to adjacent distal end 2722. Actuator 2712 may be connected to frame 2704 adjacent base end 2720. One end of connector 2742 may be connected to actuator 2712 adjacent distal end 2722 and an opposite end of connector 2742 may be connected to MEMS mirror 2702. A PZT layer 2732 may be disposed on actuator 2712 and may extend from adjacent base end 2720 to adjacent distal end 2722. MEMS mirror 2702, frame 2704, actuator 2712, and connector 2742 may have structural and functional characteristics similar to those discussed above with respect to MEMS mirror 2602, frame 2604, actuators 2612, 2614, 2616, or 2618, and connectors 2642, 2644, 2646, or 2648.

As illustrated in the exemplary embodiment of FIG. 27, a width of actuator 2722 may taper between base end 2720 and distal end 2722. For example, actuator 2722 may have a width "$W_b$" adjacent base end 2720 and a width "$W_d$" adjacent distal end 2722. Width $W_b$ adjacent based end 2720 may be larger than width $W_d$ adjacent distal end 2722. It is to be noted that the widths ($W_d$, $W_b$, etc.) of actuator 2712 refer to a width dimension in the plane of MEMS mirror 2702 and not in a thickness direction, which may be perpendicular to the plane of actuator 2712.

According to the present disclosure, a width of the actuator proximate the base end is between about 1.5 to about 2.5 times larger than a width of the actuator proximate the distal end. In accordance with the present disclosure, a width of the actuator proximate the base end is between about 1.75 to about 2.25 times larger than a width of the actuator proximate the distal end. According to the present disclosure, a width of the actuator proximate base end is at least 2 times larger than a width of the actuator proximate the distal end. A ratio between the widths of the actuator at the base and distal ends of the actuator may be selected, for example, based on a maximum allowable stress in the actuator during operation of the MEMS mirror and the amount of movement of the MEMS mirror desired. In one exemplary embodiment as illustrated in FIG. 27, a width of actuator 2712 may decrease uniformly from width $W_b$ adjacent based end 2720 to width $W_d$ adjacent distal end 2722. For example, width Wb of actuator 2712 may be about 1.2, about 1.5, about 1.75, about 2, about 2.25, about 2.5, or about 4.0 times larger than width Wd. According to embodiments of this disclosures, terms such as generally, about, and substantially should be interpreted to encompass typical machining and manufacturing tolerances. Thus, for example, about 1.5 may encompass ratios of up to 1.5±0.1, 1.5±0.2, etc.

Figure 28:
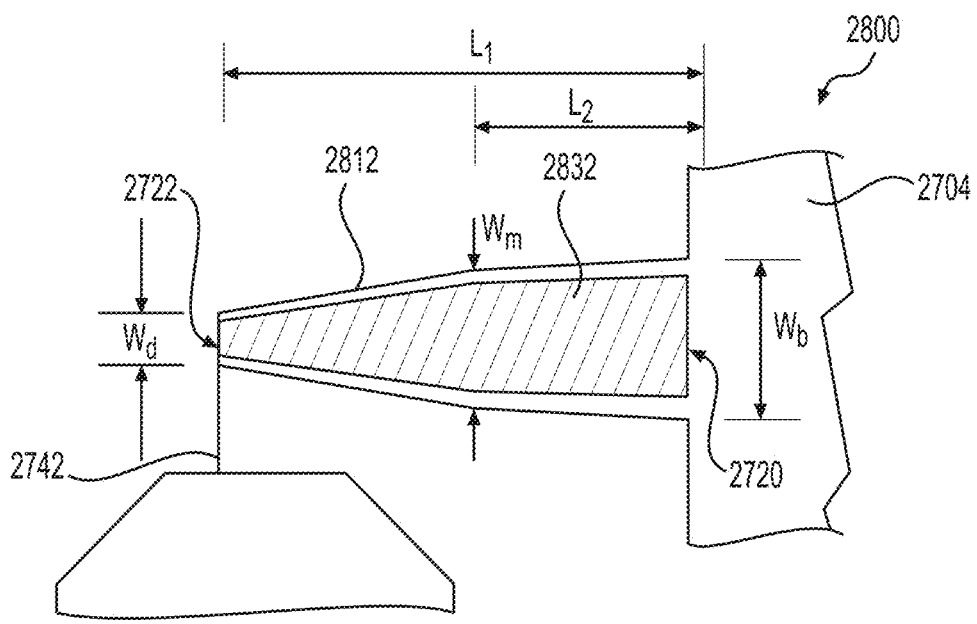

It is also contemplated that in some exemplary embodiments in accordance with this disclosure, the width of actuator 2712 may decrease non-uniformly from width $W_b$ adjacent based end 2720 to width $W_d$ adjacent distal end 2722. FIG. 28 illustrates a magnified view of an exemplary actuator that may have a width that decreases non-uniformly between the base end and the distal end. MEMS mirror assembly 2700 of FIG. 28 may include many features similar to those discussed above with respect to MEMS mirror 2700 of FIG. 27. These similar features are numbered using the same element numbers as in FIG. 27. Unless otherwise stated, throughout this disclosure, similarly numbered elements should be presumed to have similar structural and functional characteristics. Further, similar elements from one structure to the next may also have similar characteristics even if differently numbered. Only the differences between MEMS mirror assemblies 2700 and 2800 are described below. It is noted that different aspects of the invention which are discussed with respect to different drawings for the sake of clarity can be combined. For example, aspects of the invention which are discussed with respect to FIG. 28 may be implemented in a MEMS mirror assembly having curved actuators, etc.

As illustrated in FIG. 28, like actuator 2712 of FIG. 27, actuator 2812 extends from adjacent base end 2720 to adjacent distal end 2722. Actuator 2812 may have a length "$L_1$" between base end 2720 and distal end 2722. Actuator 2812 may have a width $W_b$ adjacent base end 2720 and a width $W_d$ adjacent distal end 2722. In one exemplary embodiment as illustrated in FIG. 28, actuator 2812 may have a width "$W_m$" between base end 2720 and distal end 2722. Width $W_b$ may be larger than both widths $W_m$ and $W_d$ and width $W_m$ may be larger than width $W_d$ but smaller than width $W_b$. As also illustrated in FIG. 28, a rate of decrease of the width of actuator 2712 from width $W_b$ to $W_m$ along length $L_2$ may be smaller than a rate of decrease of the width of actuator 2712 from width $W_m$ to $W_d$. It is contemplated that in other exemplary embodiments the rate of decrease of the width in length $L_2$ may be larger than or about equal to the rate of decrease of the width from width $W_m$ to $W_d$. It is also contemplated that in some exemplary embodiments in accordance with this disclosure, the width of actuator 2712 may overall decrease from width $W_b$ adjacent based end 2720 to width $W_d$ adjacent distal end 2722, while including some parts which are wider than other parts of the actuator which are closer to the base end.

In accordance with the present disclosure, the base end of the actuator is at least 15% more rigid than the distal end of the actuator. The relatively large width at the base end near the frame gives the actuator strength, increases the resonance frequency, allows sufficient area for the piezoelectric element (thus providing sufficient force to move the mirror, which can therefore be larger), and/or provides sufficient rigidity and strength at that part of the actuator and connection to frame (e.g. to match the torques applied on this area by the motion of the active area). Combining the relatively large width at the base end near the frame with the relatively small width at the distal end near the active area reduces the weight of the moving parts, allows twisting of the actuator if needed (e.g., during the rotation of the MEMS mirror), provides rigidity outside the plane of the frame (e.g. to increase resonance frequencies), and/or provides flexibility within the plane of the frame. Thus, the base end of the actuator may be more rigid than the distal end of the actuator. Stated otherwise, the distal end of the actuator may be more flexible than the base end of the actuator. In some exemplary embodiments, the base end of the actuator may be at least about 5%, about 10%, about 15%, or about 20% more rigid than the distal end. As discussed above the term about should be interpreted to encompass typical machining and manufacturing tolerances. Thus, for example, about 15% should be interpreted to encompass 15±0.5%, 15±1%, etc.

In accordance with the present disclosure, a first portion of the actuator is tapered and second portion of the actuator is non-tapered. As discussed above, an amount of width reduction of the actuator may be determined based on the allowable stresses generated in the actuator during operation of the MEMS mirror assembly and/or the amount of desired deflection of the actuator adjacent the distal end. It is contemplated that in some exemplary embodiments, the actuator may be tapered over some but not all of a length of the actuator.

Figure 29A:
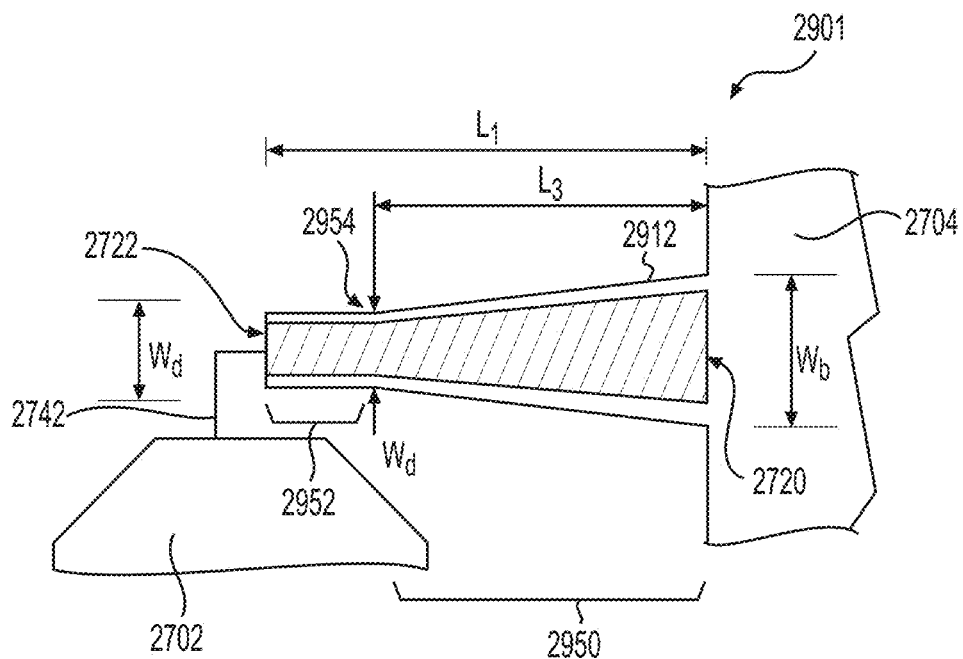
FIGS. 29A and 29B are additional illustrations of exemplary actuators of varied dimensions, consistent with disclosed embodiments.
Figure 29B:
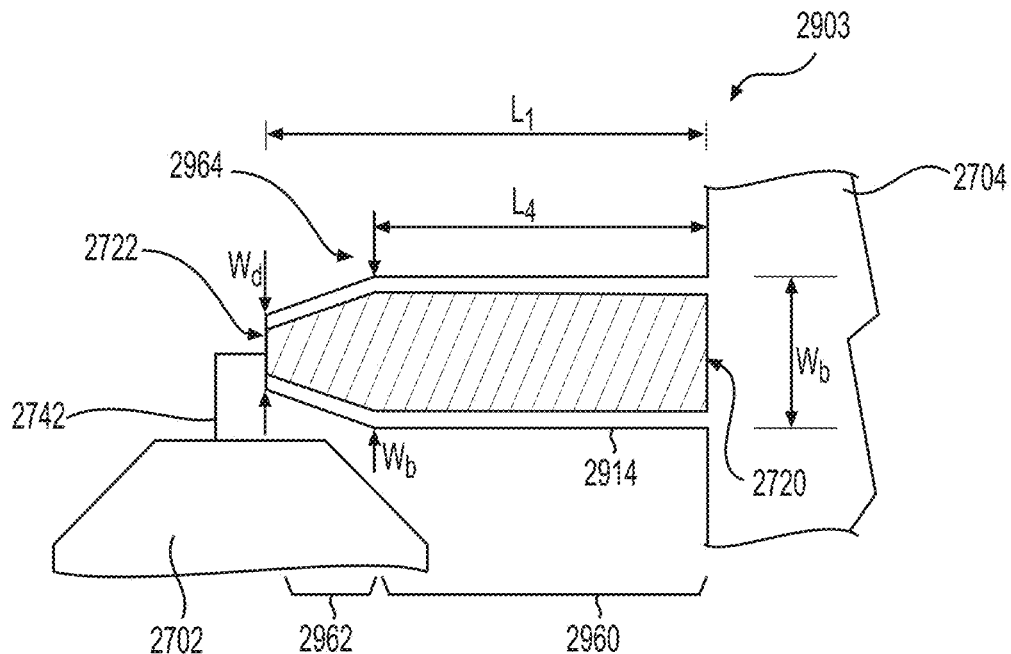

FIGS. 29A and 29B illustrate exemplary embodiments of actuators that may be tapered over only a part of their length. For example, FIG. 29A illustrates a MEMS mirror assembly 2901 that includes MEMS mirror 2702, frame 2704, and connector 2742. MEMS mirror assembly 2901 includes actuator 2912, which extends from adjacent base end 2720 to distal end 2722. Actuator 2912 is connected to frame 2704 adjacent base end 2720 and to connector 2742 adjacent distal end 2722. As illustrated in FIG. 29, actuator 2912 may have a first portion 2950 and a second portion 2952. First portion 2950 of actuator 2912 may extend from adjacent base end 2720 to location 2954 disposed between base end 2720 and distal end 2722. A width of first portion 2950 of actuator 2912 may decrease continuously from width $W_b$ adjacent base end 2720 to width $W_d$ at a location 2954. A width of second portion 2952 of actuator 2912 may generally remain constant between location 2954 and distal end 2722. Thus, actuator 2912 may have a first portion 2950 that may be tapered and a second portion 2952 that may be non-tapered.

In accordance with the present disclosure, the taper extends along a majority of a length of the actuator. In one exemplary embodiment as illustrated in FIG. 29A, first portion 2950 of actuator 2912 may have a length $L_3$, which may be smaller than a length $L_1$ of actuator 2912. In some embodiments, length $L_3$ of first portion 2950 may be a majority of a length $L_1$. Thus, for example, length $L_3$ may be greater than about 50% of length $L_1$. It is contemplated, however, that in some exemplary embodiments, length $L_3$ may be about equal to or smaller than 50% of length $L_1$.

FIG. 29B illustrates a MEMS mirror assembly 2903 that includes MEMS mirror 2702, frame 2704, and connector 2742, which may have structural and functional characteristics similar to corresponding elements of MEMS mirror 2700 described above with reference to FIG. 27. MEMS mirror assembly 2903 may include actuator 2914, which may extend from adjacent base end 2720 to distal end 2722. Actuator 2914 may be connected to frame 2704 adjacent base end 2720 and to connector 2742 adjacent distal end 2722. As illustrated in FIG. 29B, actuator 2914 may have a first portion 2960 and a second portion 2962. First portion 2960 of actuator 2914 may extend from adjacent base end 2720 to location 2964 disposed between base end 2720 and distal end 2722. A width of first portion 2960 of actuator 2912 may be generally uniform between base end 2720 and location 2764. A width of second portion 2962 of actuator 2914 may decrease from a width $W_b$ adjacent location 2964 and distal end 2722. Thus, actuator 2912 may have a first portion 2960 that may be non-tapered and a second portion 2962 that may be tapered. It is contemplated that a length $L_4$ of first portion 2650 of actuator 2914 may be larger than, about equal to, or smaller than about 50% of length $L_1$ of actuator 2914.

Figure 30A:
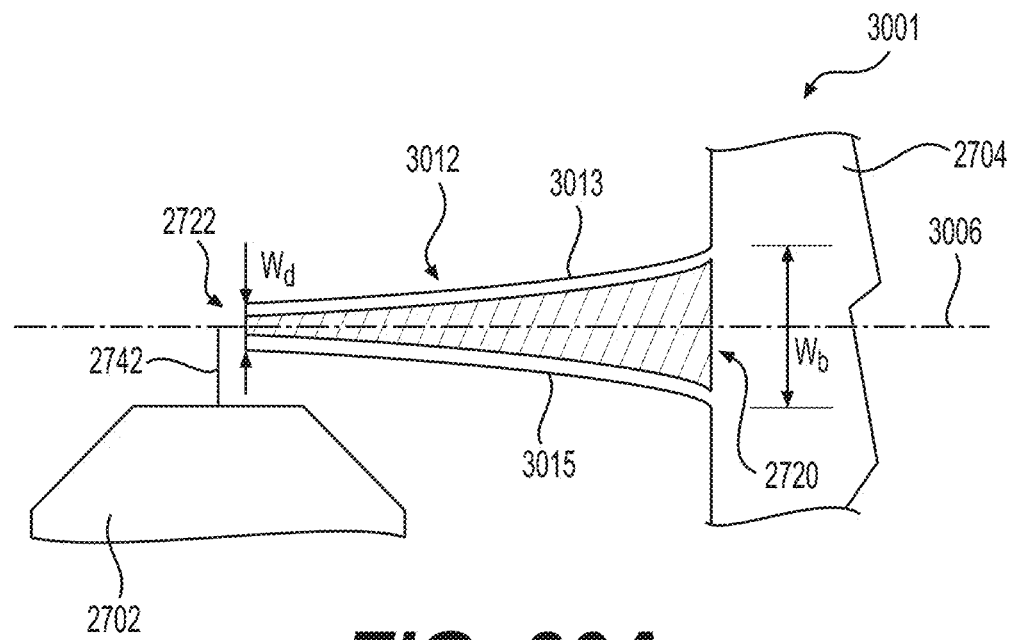
FIGS. 30A and 30B are illustrations of additional exemplary actuators of varied dimensions and orientations relative to a frame, consistent with disclosed embodiments.

FIG. 30A illustrates a MEMS mirror assembly 3001 that includes MEMS mirror 2702, frame 2704, and connector 2742. MEMS mirror assembly 3001 may include actuator 3012, which may extend from adjacent base end 2720 to distal end 2722. Actuator 3012 may be connected to frame 2704 adjacent base end 2720 and to connector 2742 adjacent distal end 2722. As illustrated in FIG. 30A, actuator 3012 may have a width $W_b$ adjacent base end 2720 and a width $W_d$, smaller than width $W_b$, adjacent distal end 2722. As also illustrated in FIG. 30A, the width of actuator 3012 may decrease along its length from width $W_b$ to width $W_d$. The decrease in width from $W_b$ to $W_d$ may be non-uniform such that sides 3013 and 3015 of actuator 3012 may have a generally curved shape. Furthermore, like the actuators illustrated in FIGS. 27-29B, actuator 3012 may be disposed generally perpendicular to frame 2704. Thus, for example, a longitudinal axis 3006 of actuator 3012 may be disposed generally perpendicular to frame 2704. As discussed above, the phrase generally perpendicular should be interpreted to encompass typical manufacturing and machining tolerances, including, for example angles in the range 90±0.1°, 90±0.5°, 90±1°, etc.

Figure 30B:
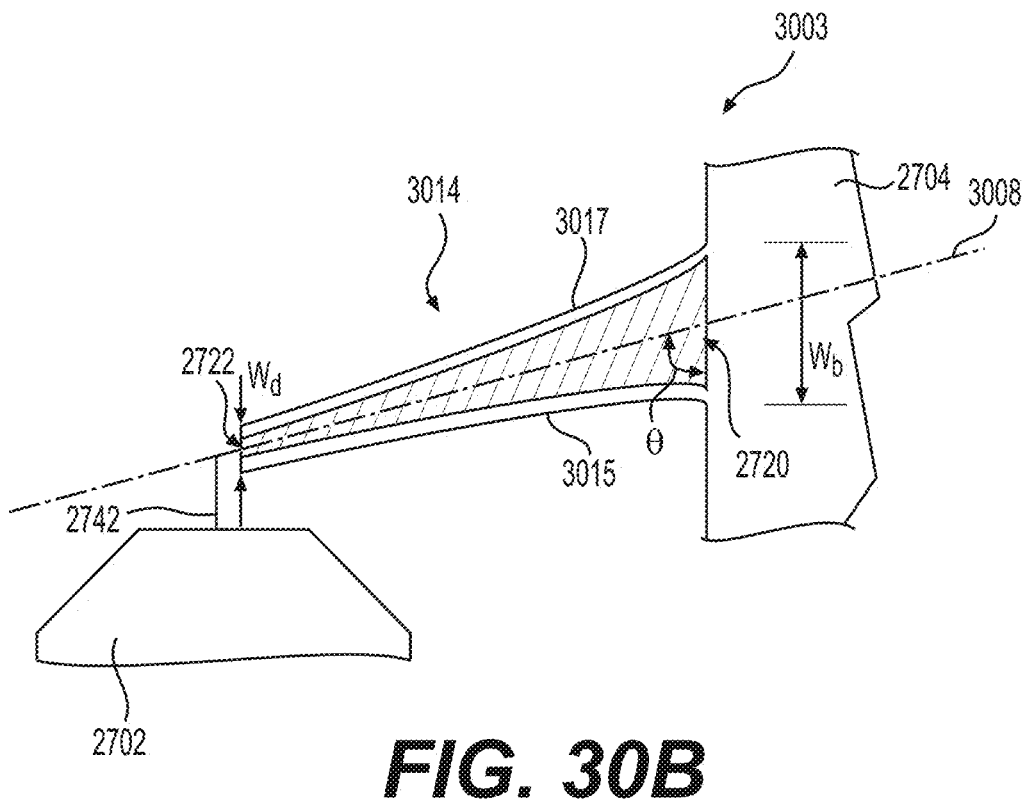

FIG. 30B illustrates a MEMS mirror assembly 3003 that includes MEMS mirror 2702, frame 2704, and connector 2742. MEMS mirror assembly 3003 may include actuator 3014, which may extend from adjacent base end 2720 to distal end 2722. Like actuator 3012 of FIG. 30A, a width of actuator 3014 may also decrease non-uniformly from a width $W_b$ adjacent base end 2720 to a width $W_d$ adjacent distal end 2722. Moreover, actuator 3014 may also include sides 3017 and 3019 that may have a generally curved shape. Unlike actuator 3012 of FIG. 30A, however, actuator 3014 may not be disposed generally perpendicular to frame 2704. Instead a longitudinal axis 3008 of actuator 3014 may be disposed generally inclined relative to frame 2704 at an angle □, which may be more than about 0° and less than about 90°.

According to the present disclosure, the actuator is substantially straight. Substantially straight in this disclosure refers to a shape of the geometrical longitudinal axis of the actuator. Thus, for example, as illustrated in FIGS. 30A and 30B, actuators 3012 and 3014 both have substantially straight (not curved) longitudinal axes 3006 and 3008. Similarly actuators 2712, 2812, 2912, and 2914 illustrated in FIGS. 27-29B are also substantially straight. While the present disclosure describes examples of shapes and width variations of actuators associated with a MEMS scanning device, it should be noted that aspects of the disclosure in their broadest sense are not limited to the disclosed exemplary shapes and/or width variations.

Figure 31:
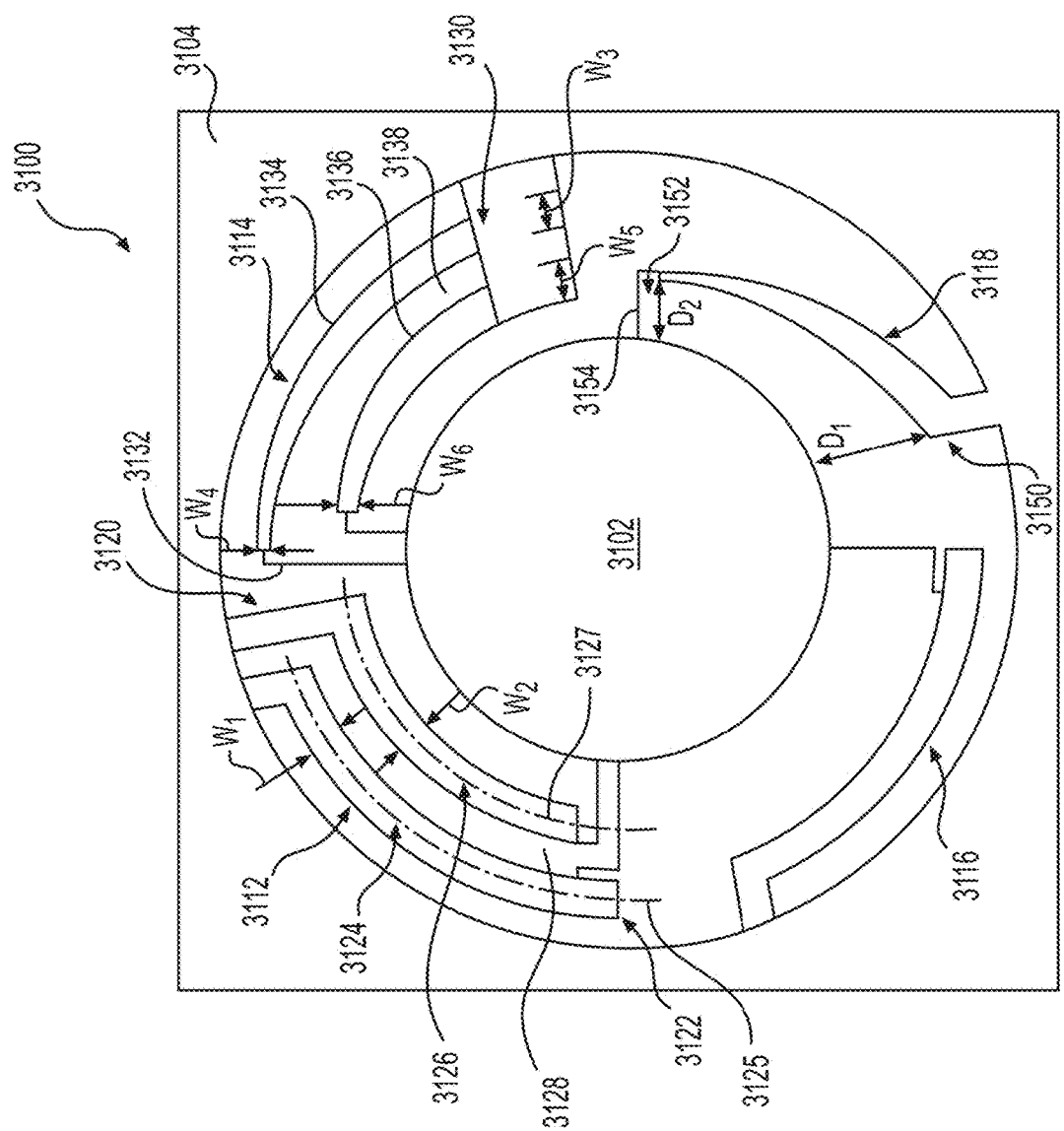
FIG. 31 is an illustration of an exemplary MEMS mirror assembly having curved actuators of varied dimensions, consistent with disclosed embodiments.

According to the present disclosure the actuator is curved. A shape of the actuators (e.g. straight or curved) may be selected based on, for example, the desired magnitude and direction of deflection of the actuator. By way of example, FIG. 31 illustrates an exemplary MEMS mirror assembly 3100 that may include one or more curved actuators. For example, MEMS mirror assembly 3100 may include MEMS mirror 3102, frame 3104, and actuators 3112, 3114, 3116, and 3118. As illustrated in FIG. 31, one or more of actuators 3112, 3114, 3116, and 3118 may be curved. For example, actuator 3112 may include arms 3124 and 3126, separated by gap 3128. In one exemplary embodiment as illustrated in FIG. 31, widths "$W_1$" and "$W_2$" of arms 3124 and 3128, respectively, may be generally uniform along a length of arms 3124 and 3128 extending from base end 3120 to distal end 3122. Widths $W_1$ and $W_2$ of arms 3124 and 3128, respectively, may be determined in a plane of MEMS mirror 3102 and frame 3104, in a generally radial direction relative to a center of MEMS mirror 3102. As also illustrated in FIG. 31, longitudinal axes 3125 and 3127 of actuating arms 3124 and 3128, respectively, may have a generally curved shape.

In accordance with the present disclosure, the actuator includes at least two arms separated by a gap and wherein a width of each arm gradually decreases from the base end of the actuator toward the distal end of the actuator. Like an actuator, an arm according to this disclosure may include a structural member that may be capable of causing translational or rotational movement of the MEMS mirror relative to the frame. In some exemplary embodiments, the disclosed actuator may include only one arm. In other exemplary embodiments the disclosed actuator may include more than one arm. For example, in some embodiments, the disclosed actuator may include two arms separated from each other by a gap. Some or all arms may be equipped with PZT layers, which may cause those arms to expand, contract, bend, twist, or move in some way. Movement of the one or more arms in turn may cause movement of the MEMS mirror associated with the MEMS scanning device. Further as discussed above, widths of the arms may decrease from a base end of the arm to a distal end of the arm. Such a decrease in width may be desirable, for example, to minimize the stresses generated in the arms and/or to obtain a desired amount of deflection or movement of the arms adjacent the distal end. It is noted that any of the different aspects of implementing actuators with more than one arm discussed above (e.g., with respect to FIGS. 11A-25) may be implemented for actuators whose distal end width is narrower than their base end width (for one, some or all of the arms of a multi-arm actuator).

By way of example, FIG. 31 illustrates actuator 3114 that may include arm 3134 and 3136, which may be separated from each other by gap 3138. Arm 3134 may extend from adjacent base end 3130 to adjacent distal end 3132. Similarly arm 3136 may extend from adjacent base end 3130 to adjacent distal end 3132. As illustrated in FIG. 31, each of arms 3134 and 3136 may have a generally curved shape. Further, arm 3134 may have a width "$W_3$" adjacent base end 3130 and a width "$W_4$" adjacent distal end 3132. Similarly, arm 3136 may have a width "$W_5$" adjacent base end 3130 and a width "$W_6$" adjacent distal end 3132. Widths $W_3$ and $W_5$ may be the same or may be different. Likewise, widths $W_4$ and $W_6$ may be equal or unequal. In one exemplary embodiment as illustrated in FIG. 31, width $W_3$ may be larger than width $W_4$ and width $W_5$ may be larger than width $W_6$. Thus, widths of arms 3134 and 3136 may decrease gradually from adjacent base end 3130 to adjacent distal end 3132. It is contemplated, however, that one or both of arms 3134 and 3136 may have shapes similar to those of one or more of arms 3124 and 3126.

According to the present disclosure, the distal end of the actuator is closer to the movable MEMS mirror than the base end of the actuator. Such a configuration may be implemented, for example, in non-circular mirror in order to free the movement path of the mirror, in order to reduce the amount of light-reflecting parts of the actuators in the immediate vicinity of the mirror, and so on. By way of example, FIG. 31 illustrates actuator 3118, which may extend from adjacent base end 3150 to adjacent distal end 3152. Actuator 3118 may be connected to frame 3104 adjacent base end 3150 and may be connected to MEMS mirror 3102 via connector 3154 adjacent distal end 3152. In one exemplary embodiment as illustrated in FIG. 31, actuator 3118 may be positioned at a distance "$D_1$" from MEMS mirror 3102 adjacent base end 3150, and at a distance "$D_2$" from MEMS mirror 3102 adjacent distal end 3152. Distances $D_1$ and $D_2$ may be measured in a generally radial direction in a plane of MEMS mirror 3102 and frame 3104. In one exemplary embodiment, distance $D_1$ may be larger than distance $D_2$. Thus, for example, distal end 3152 of actuator 3118 may be positioned closer to MEMS mirror 3102 as compared to base end 3150. Although FIG. 31 illustrates different positions and geometrical characteristics for actuators 3112, 3114, 3116, and 3118, it is contemplated that these positions and geometrical characteristics are interchangeable. That is, any of actuators 3112, 3114, 3116, and 3118 may have the characteristics described above corresponding to one or more of the other of actuators 3112, 3114, 3116, and 3118. Although various geometric and other characteristics have been described above for substantially straight actuators with reference to FIGS. 27-30 and for curve actuators with reference to FIG. 31, it is contemplated that the characteristics described for the disclosed curved actuators may be implemented on the disclosed substantially straight actuators and vice-versa.

In accordance with the present disclosure, an elongated actuator includes a piezoelectric layer having a piezoelectric base-end element and a piezoelectric distal-end element. The piezoelectric layer may be operable to contract when voltage bias is applied between the piezoelectric base-end element and the piezoelectric distal-end element. Further, a width of the piezoelectric base-end element may be wider than the piezoelectric distal-end element. As discussed above, one or more actuators discussed above may include a piezoelectric layer which may be configured to contract when subjected to a voltage bias. Contraction of the piezoelectric layer may further cause the actuator to bend, which in turn may impart movement to the MEMS mirror via one or more connectors. It is contemplated that in some exemplary embodiments, a shape of the piezoelectric layer may be similar to that of the actuator itself. Thus, for example, when the actuator is wider nearer its base end as compared to nearer its distal end, the piezoelectric layer on that actuator may also be wider nearer the base end and narrower nearer the distal end.

As illustrated, for example, in FIG. 27, actuator 2712 may include a piezoelectric layer 2780, which may have a piezoelectric-element base-end 2782 and a piezoelectric-element distal-end 2784. Piezoelectric-element base-end 2782 may extend from adjacent base end 2720 to adjacent position 2786 disposed between base end 2720 and distal end 2722. Piezoelectric-element distal-end 2784 may extend from adjacent position 2786 to adjacent distal end 2722. In one exemplary embodiment as illustrated in FIG. 27, piezoelectric-element base-end 2782 and a piezoelectric-element distal-end 2784 may be different portions of a single piezoelectric layer. In other embodiments, piezoelectric-element base-end 2782 and a piezoelectric-element distal-end 2784 may be separate and electrically connected by one or more connectors (e.g. wires, interconnects, etc.) As discussed above, applying a biasing voltage between piezoelectric-element base-end 2782 and a piezoelectric-element distal-end 2784 may cause piezoelectric layer 2780 to contract, which in turn may cause bending of actuator 2712. As also illustrated in FIG. 27, for example, piezoelectric-element base-end 2782 may have a width "$W_{b1}$" adjacent base end 2720 and piezoelectric-element distal-end 2782 may have a width "$W_{d1}$" adjacent distal end 2722. Width $W_{b1}$ may be larger than width $W_{d1}$ so that a width of piezoelectric-element base-end 2852 adjacent base end 2720 may be wider than a width of piezoelectric-element distal-end 2854 adjacent distal end 2722. Having a wider width at the piezoelectric-element base-end provides for larger area of the piezoelectric element (and hence more force to move the mirror) with limited effect on the mass and rigidity of the moving end of the actuator. Although piezoelectric layer 2780 has been described above with reference to actuator 2712 of FIG. 27, it is contemplated that similar piezoelectric layers may be present on the actuators illustrated and discussed with reference to one or more of FIGS. 27-31. Moreover, the piezoelectric layers on the actuators of FIGS. 27-31 may have shapes and width variations similar to those of the respective actuators illustrated in those figures.

In accordance with the present disclosure, the elongated actuator includes a flexible passive layer (e.g. silicon) and an active layer operable to apply force for bending the flexible passive layer. The flexible passive layer may have a passive-layer-element base-end and a passive-layer-element distal-end. A width of the passive-layer-element base-end may be wider than the passive-layer-element distal-end. As discussed above, one or more actuators discussed above may include a passive layer (e.g. of silicon) with a piezoelectric layer attached to the passive layer. The piezoelectric layer may be the active layer which may be configured to contract when subjected to a voltage bias. Contraction of the piezoelectric layer may apply a force on the passive layer causing the passive layer to bend, which in turn may impart movement to the MEMS mirror via one or more connectors.

As illustrated, for example, in FIG. 27, actuator 2712 may include a flexible passive layer 2790 and a piezoelectric layer 2780 (e.g. active layer 2780) attached to flexible passive layer 2790. Flexible passive layer 2790 may have a passive-layer-element base-end 2792 and a passive-layer-element distal-end 2794. Passive-layer-element base-end 2792 may extend from adjacent base end 2720 to adjacent position 2786 disposed between base end 2720 and distal end 2722. Passive-layer-element distal-end 2794 may extend from adjacent position 2786 to adjacent distal end 2722. In one exemplary embodiment as illustrated in FIG. 27, passive-layer-element base-end 2792 and a passive-layer-element distal-end 2794 may be different portions of a single passive layer 2790. As illustrated in FIG. 27, for example, passive-layer-element base-end 2782 may have a width $W_b$ adjacent base end 2720, and passive-layer-element distal-end 2784 may have a width $W_d$ adjacent distal end 2722. As discussed above Width $W_b$ may be larger than width $W_d$ so that a width of passive-layer-element base-end 2892 adjacent base end 2720 may be wider than a width of passive-layer-element distal-end 2894 adjacent distal end 2722. Although passive layer 2790 has been described above with reference to actuator 2712 of FIG. 27, it is contemplated that similar passive layers may be present on the actuators illustrated and discussed with reference to one or more of FIGS. 27-31. Moreover, the passive layers on the actuators of FIGS. 27-31 may have shapes and width variations similar to those of the respective actuators illustrated in those figures.

In accordance with the present disclosure, the elongated actuator includes a piezoelectric layer having a piezoelectric-element base-end and a piezoelectric-element distal-end, the piezoelectric layer operable to contract when voltage bias is applied between the piezoelectric-element base-end and the piezoelectric-element distal-end, wherein a width of the piezoelectric-element base-end is wider than a width of the piezoelectric-element distal-end. The elongated actuator also includes a flexible passive layer, having a passive-layer-element base-end and a passive-layer-element distal-end, wherein a width of the passive-layer-element base-end is wider than the passive-layer-element distal-end, wherein the piezoelectric layer is operable to apply force for bending the flexible passive layer. As discussed above, FIG. 27 illustrates and exemplary actuator that includes both the piezoelectric layer 2780 and the flexible passive layer and 2790.

Several aspects of the disclosure were discussed above. It is noted that any feasible combination of features, aspects, characteristics, structures, etc. which were discussed above—for example, with respect to any one or more of the drawings—may be implemented as is considered as part of the disclosure. Some of those feasible combinations were not discussed in detail for reasons such as brevity and succinctness of the disclosure, but are nevertheless part of the disclosure, and would present themselves to a person who is of skill in the art in view of the above disclosure.

The present disclosure relates to implementation of LIDAR system 100 (or any other LIDAR system, whether a scanning LIDAR system, a non-scanning LIDAR system, pulsed light system, continuous wave system, or any other type of LIDAR system or device) in a vehicle (e.g., vehicle 110). As discussed above, LIDAR system 100 may integrate multiple scanning units 104 and potentially multiple projecting units 102 in a single vehicle. Optionally, a vehicle may take advantage of such a LIDAR system to improve power, range and accuracy in the overlap zone and beyond it, as well as redundancy in sensitive parts of the FOV (e.g. the forward movement direction of the vehicle). As discussed above, a LIDAR system in a vehicle may be used to project light through a window (or windshield) of a vehicle towards an environment in front of the vehicle. Various objects in the environment may reflect a portion of the light projected on them by the LIDAR system. The LIDAR system may determine the positions and/or distances of the various objects in front of the vehicle, for example, by detecting the reflected light received from those objects through the windshield.

Figure 32A:
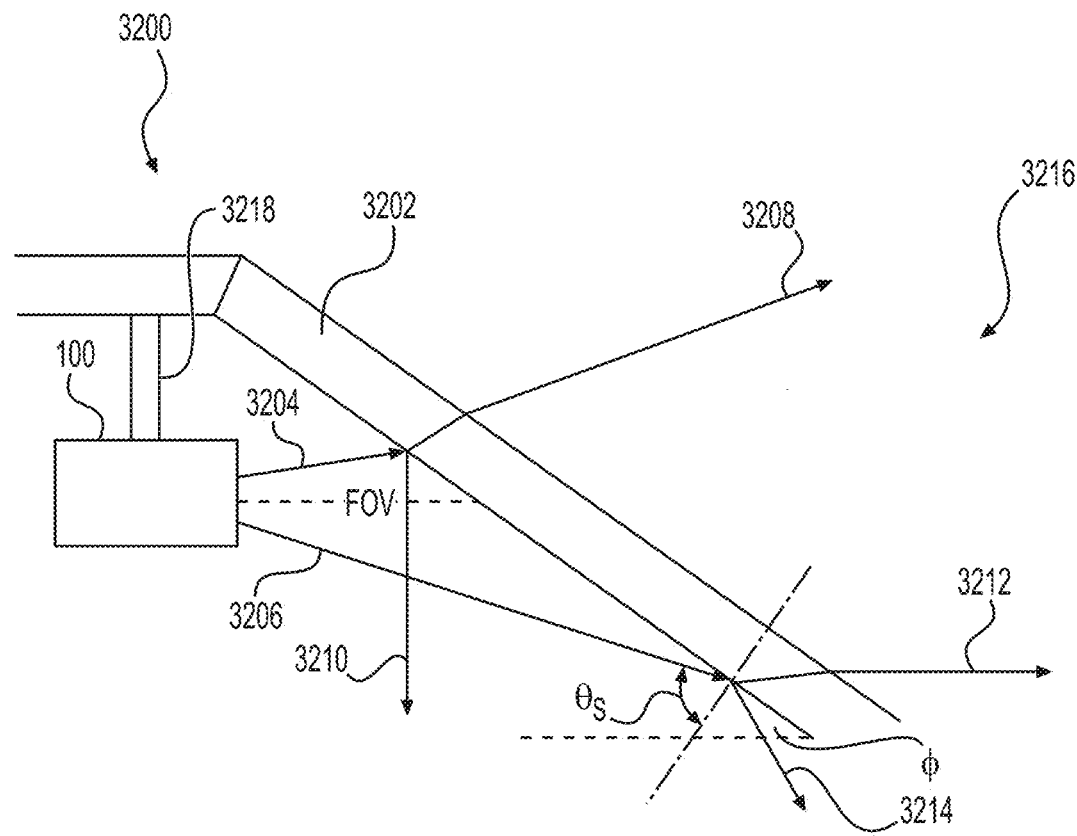
FIG. 32A is a side view illustration of an exemplary vehicle system.
Figure 32B:
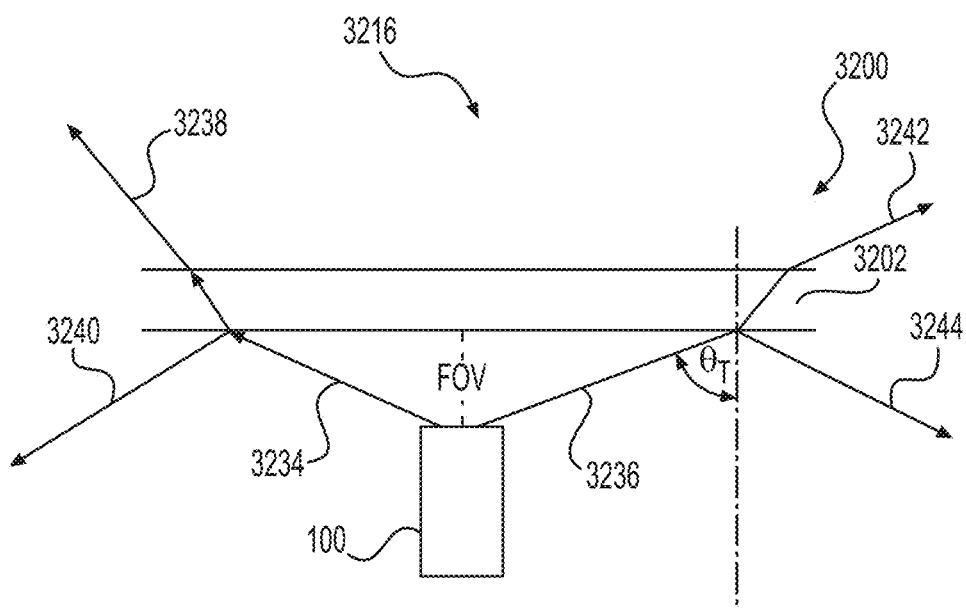
FIG. 32B is a top view illustration of an exemplary vehicle system.

Reflection of the light off the glass, however, is a significant challenge when attempting to locate a LIDAR system behind a windshield of a vehicle. This is because the reflected light may interfere with light received from objects in the external environment transmitted through the windshield, which in turn may influence determination of the positions and/or distances of the objects in front of the vehicle. At some angles of incidence (mostly in a peripheral area of the FOV) an amount of light reflected back to the vehicle is greater than an amount of light that passes through the windshield. FIG. 32A illustrates a side view illustration of an exemplary vehicle system 3200 in a vehicle having a window (e.g. a windshield of a vehicle in which the LIDAR system is installed). In this disclosure, the terms window and windshield may be used interchangeably because a LIDAR system in a vehicle may be oriented to project and/or receive light through the windshield, the rear window, or any of the other windows of the vehicle. The LIDAR system may be LIDAR system 100, or any other type of LIDAR system. The window may be, for example, a flat window (e.g., as illustrated) or a curved window. FIG. 32B illustrates a top view illustration of vehicle system 3200. While the window may be made of glass, other materials may be used in addition or instead of glass, such as clear plastics, polymeric materials, and so on. The window may include at least one layer of one or more transparent or semi-transparent materials, and may also include different types of coatings, stickers, or other transparent or semi-transparent connected to the window.

In an exemplary implementation, the LIDAR system may have differing FOV openings in the vertical plane and in the horizontal plane (e.g. ±15° to ±20° vertical opening and ±30° to ±60° horizontal opening). As a result, as illustrated in FIGS. 32A and 32B, light may fall on the window at different angles of incidence, some of which may be relatively wide. It is noted that the range of incidence angles may also depend on the angle between the optical axis of the LIDAR system and that of the window (which may be determined, e.g., in windshields) based on non-optical considerations, such as the aerodynamics of the vehicle. It is to be understood that the optical axis of the LIDAR system may depends on the intended field of view—e.g., toward the road and space in front of the vehicle. It should also be noted that the actual angle of incidence is a combination of the horizontal angle of incidence (denoted OT) and the vertical angle of incidence (denoted Os).

As illustrated in FIG. 32A, vehicle system 3200 may include, for example, LIDAR system 100 and window (e.g., windshield) 3202 of a vehicle. Window 3202 may be generally flat (as illustrated in FIG. 32A) or it may be curved. Window 3202 may be positioned at a rake angle ☐ relative to a horizontal plane 3201, which may be generally parallel to a chassis of the vehicle or to a ground surface. In some embodiments, angle ☐ may range between about 22° and about 30°. According to this disclosure, terms such as about, generally, and substantially should be interpreted to encompass typical design, manufacturing, and machining tolerances. Thus, for example, an angle of about 22° should be interpreted as encompassing angles in the range of, 22°±0.1°, 22°±0.5°, 22°±1°, etc.

Figure 34A:
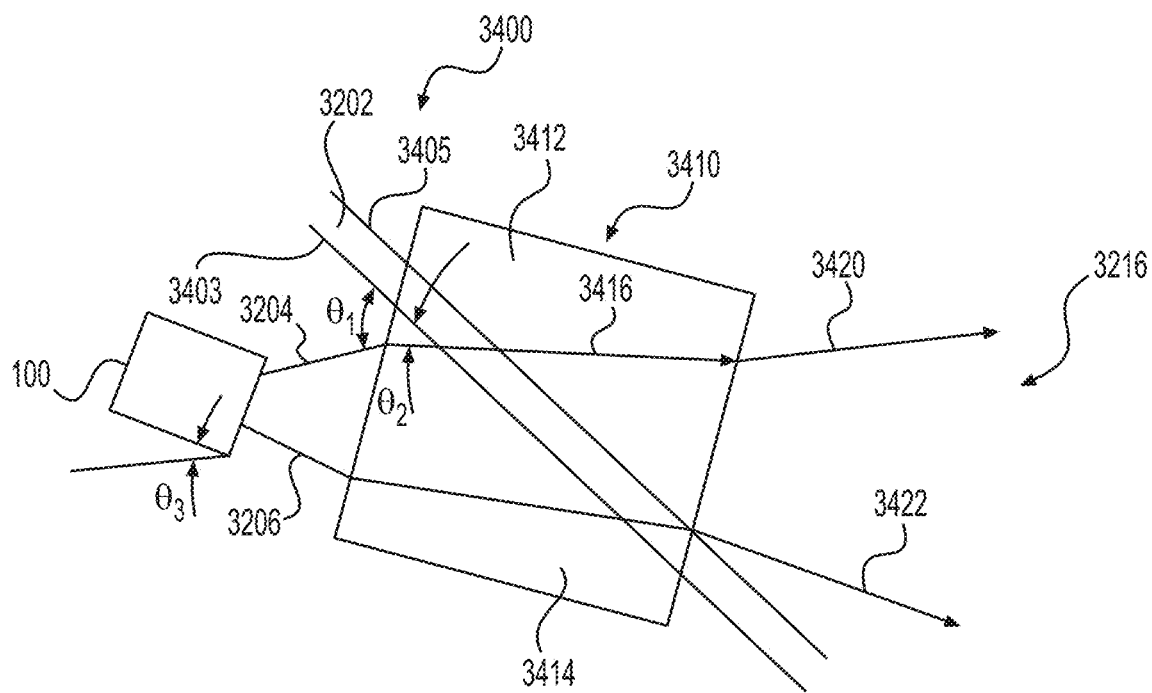
FIG. 34A-34D illustrate exemplary embodiments of a light deflector for a vehicle equipped with a LIDAR system.

LIDAR system 100 may include a light source (e.g. light source 112) configured to emit light in a field of view (FOV) defined by, for example, light rays 3204 and 3206. As illustrated in FIG. 32A, some of the light incident on window 3202 may be reflected back into the vehicle by window 3202, while another portion of the incident light may be transmitted through window 3202 to environment 3216 located in front of window 3202. As illustrated in FIG. 32A, a portion of ray 3204, for example, may be transmitted through window 3202 as shown by ray 3208, while another portion of ray 3204 (e.g. ray 3210) may be reflected back into the vehicle by window 3202. Likewise, a portion of ray 3206, for example, may be transmitted through window 3202 as shown by ray 3212, while another portion of ray 3206 (e.g. ray 3214) may be reflected back into the vehicle by window 3202. As also illustrated in FIG. 32A, a vertical angle of incidence of, for example, of ray 3206 on window 3202 may be represented by an angle $\square_S$. In some embodiments, the angle $\square_S$ may be relatively large, for example, of the order of about 60° to about 75°. In some exemplary embodiments as illustrated in FIG. 32A, LIDAR system 100 may be connected to a portion of a vehicle by a connector 3218, which may include one or more structural elements that may be configured to attach LIDAR system 100 to the vehicle. For example, one end of connector 3218 may be attached to the vehicle while an opposite end may be attached to LIDAR system 100. It is also contemplated that in some exemplary embodiments, LIDAR system 100 may be oriented in a non-horizontal manner relative to a vehicle chassis or to the ground. For example, as illustrated in FIG. 34A, LIDAR system 100 may be positioned at an inclination "$\square_3$" relative to a horizontal plane.

To ensure clarity, throughout this disclosure, the discussion of structural and functional characteristics is not repeated when subsequently disclosed elements have structural and functional characteristics similar to those previously discussed in the disclosure. Additionally, unless otherwise stated, throughout this disclosure, similarly numbered elements should be presumed to have similar structural and functional characteristics. Further, similar elements from one structure to the next may also have similar characteristics even if differently numbered.

As seen in an exemplary top view illustration of vehicle system 3200, shown in FIG. 32B, the field of view in a horizontal plane may be defined by rays 3234 and 3236. A portion of ray 3234, for example, may be transmitted through window 3202 as shown by ray 3238, while another portion of ray 3234 (e.g. ray 3240) may be reflected back into the vehicle by window 3202. Likewise, a portion of ray 3236, for example, may be transmitted through window 3202 as shown by ray 3242, while another portion of ray 3236 (e.g. ray 3244) may be reflected back into the vehicle by window 3202. As also illustrated in FIG. 32B, a horizontal angle of incidence of, for example, ray 3236 on window 3202 may be represented by an angle $\square_T$. In some embodiments, the angle $\square_T$ may be relatively large, for example, of the order of about 60° to about 75°.

In some exemplary embodiments as illustrated in FIG. 32A, LIDAR system 100 may be connected to a portion of a vehicle by a connector 3218, which may include one or more structural elements that may be configured to attach LIDAR system 100 to the vehicle. For example, one end of connector 3218 may be attached to the vehicle while an opposite end may be attached to LIDAR system 100. It is also contemplated that in some exemplary embodiments, LIDAR system 100 may be oriented in a non-horizontal manner relative to a vehicle chassis or to the ground. For example, as illustrated in FIG. 34A, LIDAR system 100 may be positioned at an inclination "$\square_3$" relative to a horizontal plane. Connector 3218 may be directly connected or otherwise touch window 3202, but this is not necessarily so. Connector 3218 may be directly connected or otherwise touch LIDAR system 100, but this is not necessarily so. In some examples, connector 3202 may be indirectly connected to one or more of window 3202 and/or LIDAR system 100. The connection of connector 3218 may be permanent or detachable, and it may or may not be adjustable (e.g., for direction and/or distance between the LIDAR system 100 and the window 3202).

Window 3202 (and/or windshield) may be made of different layers of different materials and/or may be covered with one or more types of coatings, which may reduce the level of transmittance even further. It is also noted that the level of transmittance of light through window 3202 may differ between different polarities of light, and that the loss of light due to reflections may occur also in the reception path (of light reflected from the FOV to the LIDAR). FIG. 33 illustrates an example of changes in transmission levels of the light in the field of view for a slanted window (e.g. windshield 3202 with a rake angle $\square$ of 25°), in accordance with exemplary embodiments of the present disclosure. In FIG. 33, the horizontal angle of incidence $\square_S$ is plotted on the x-axis and the vertical angle of incidence $\square_T$ is plotted in the y-axis. The different lines represent the percentage of light transmitted through windshield 3202. As seen in FIG. 33, the amount of light transmitted through window 3202 may vary over a wide range from about 50% to about 90% of the light incident on window 3202, with the remainder of the light being either reflected from window 3202 or absorbed by the material of window 3202.

In accordance with the present disclosure a light deflector for a LIDAR system located within a vehicle is disclosed. The light deflector includes a windshield optical interface configured for location within a vehicle and along an optical path of the LIDAR system. To overcome the problem of low transmittance of light through vehicle windows, resulting from wide incidence angles, the present disclosure proposes adding (e.g., gluing to the window, vacuuming to the window, suspending from an adjacent fixed location on the vehicle) an optical interface, which may reduce the incidence angles, in at least some parts of the FOV. The optical interface may be located within the vehicle, externally to the vehicle, or it may include parts on both sides of the window. The optical interface may include, for example, prism(s), lens(es), diffraction gratings, grating prisms (also known as grisms), and/or stickers (with any of the optical capabilities described above), etc. The optical interface may be flexible or rigid. The glue used to affix the optical interface to the windshield may be optical glue (transparent to light of the LIDAR), and may be of differing thicknesses (e.g., to allow some tolerance for curvature of different car windshields). The optical interface may also have other optical capabilities, for example, anti-reflective coatings, scratch-resistant coatings, spectral filters, polarization filters, waveplates (retarders), etc.

In some embodiments, a window may be manufactured to include an optical interface built into the window. In some cases, such an interface may be raised or depressed relative to a window surface and/or may include a portion that is discontinuous relative to an otherwise continuous plane of the window (whether flat or curved). Such a built-in interface may configured for location in an optical path of the LIDAR FOV and may exhibit optical parameters matching or at least partially matching those of the LIDAR.

FIGS. 34A through 34D illustrate exemplary embodiments of light deflector 3400 for a LIDAR system (e.g. LIDAR system 100) associated with windshield 3202 of a vehicle. As illustrated in FIG. 34A, light deflector 3400 may include optical interface 3402, which may be in the form of at least one prism 3410, in accordance with examples of the presently disclosed subject matter. The one or more prisms 3410 may be made from the same material as the window (e.g. glass), a material with similar refractive index as the window, or from any other material. Preferably, the one or more prisms may be transparent. The one or more prisms may be shaped and positioned to reduce the angle of incidence of light in transmission between air and glass (or other material of the window). The LIDAR system may be LIDAR system 100, or any other type of LIDAR system.

In one exemplary embodiment as illustrated in FIG. 34A, prism 3410 may be located between a light source of LIDAR system 110 and window 3202. Prism 3410 may include, for example, internal prism 3412 and external prism 3414. Internal prism 3412 may be positioned between the light source in LIDAR system 100 and window 3202. External prism 3412 may be located between window 3202 and an external environment or field of view.

The one or more prisms 3410 (including 3412 and 3414) may be attached to window 3202 in different ways (e.g. using optical glue, another adhesive, being installed on a rigid frame connected to the window or to the body of the vehicle, etc.) In some exemplary embodiments, window 3202 may include an opening (not shown) and prism 3410 may be received in the opening in window 3202. In other exemplary embodiments, the internal prism(s) 3412 may be positioned outside of a rigid housing of LIDAR system 100 (e.g. as illustrated in FIG. 9A). In yet other embodiments, the housing of LIDAR system 100 may include the at least one prism 3410 or a part thereof. The housing of LIDAR system 100 may touch (i.e. be in contact with) prism 3410 or may be spaced apart from prism 3412.

In some embodiments, the one or more prisms 3410 may be detachably attachable to the window or to a housing of LIDAR system 100. Optionally, one or more prisms 3410 may be manufactured as part of window 3202. For example, the one or more prisms 3410 may be manufactured as part of a windshield of the vehicle. In some embodiments, the one or more prisms 3410 may be manufactured as part of a rear window of the vehicle. In other embodiments, the one or more prisms 3410 may be manufactured as part of a side window of the vehicle. One or more of the system (e.g. window 3202, prism 3410, internal prism 3412, external prism 3414, etc.) may include a coating and/or another form of filter (e.g., anti-reflective filter/layer, band-pass filter/layer, etc.).

In accordance with embodiments of the present disclosure, the optical path of the LIDAR system may extend through a sloped windshield of the vehicle, wherein an optical angle of the optical path before passing through the sloped windshield is oriented at a first angle with respect to an adjacent surface of the sloped windshield. As discussed above, with reference to FIG. 32, light from LIDAR system 100 may be incident on window 3202 over a field of view defined by, for example, rays 3204 and 3206 (see FIG. 32). Rays 3204, 3206 may pass through window 3202 and may be transmitted to environment 3216 located in front of window 3202 over a range defined by rays 3208 and 3212 (see FIG. 32). Rays 3202 and 3204 may define an optical path for light passing through window 3202. Returning to FIG. 34, ray 3202 may be oriented at first angle $\square_1$ with respect to an adjacent inner surface 3403 of window 3202.

According to some embodiments of the present disclosure, the light deflector may include a connector for orienting a LIDAR emitting element to direct light through the windshield optical interface and along the optical path. with reference to FIG. 32A, LIDAR system 100 may be connected to at least some portion of a vehicle using a connector 3218, which may also help orient LIDAR system 100 horizontally or inclined relative to a vehicle chassis or a ground surface.

In accordance with embodiments of the present disclosure, the optical interface may be configured to alter the optical angle of the optical path from the first angle to a second angle. As discussed above, the optical interface may include one or more of prisms, lenses, diffraction gratings, etc. Each of these optical interfaces may be configured to alter the optical path by reflecting, refracting, and/or diffracting the incident light. Thus, for example, as illustrated in FIG. 34A, incident ray 3204 may be refracted by the one or more prisms 3410 (including, for example, internal prism 3412 and external prism 3414). The refracted light may exit prism 3410 via, for example, ray 3420. Similarly, ray 3206 may enter prism 3410 and may exit prism 3410 via, for example, ray 3422. In one exemplary embodiment as illustrated in FIG. 34A, because of the refraction of light at the surface of prism 3410, ray 3204 may be refracted as ray 3416 within prism 3410. Ray 3416 may be incident on window 3202 at second angle $\square_2$, which may be different from first angle $\square_1$.

Embodiments of the present disclosure may include an optical interface configured such that at the second angle, there is a ratio of greater than about 0.3 between light refracted through the windshield and light reflected from the windshield. As discussed above with reference to FIG. 33, an amount of light transmitted through a windshield depends on an optical angle of incidence of the light on the windshield. Correspondingly, an amount of light refracted through the windshield and an amount of light reflected back by the windshield also depend on the optical angle of incidence. Thus, a change in the angle of incidence from first angle $\square_1$ to second angle $\square_2$ may alter an amount of the incident light that may be reflected back from the windshield and an amount of light that may be refracted by the windshield. It is contemplated that a ratio between the amount of light refracted through the windshield and the amount of light reflected from the windshield may be greater than about 0.2, greater than about 0.25, greater than about 0.3, greater than about 0.35, or greater than about 0.4, etc. As also discussed above, the phrase about in this disclosure encompasses typical design, machining, and manufacturing tolerances. Thus, the term about 0.3 should be interpreted as encompassing ratios of 0.3±0.01, 0.3±0.02, 0.3±0.05.

According to embodiments of this disclosure, in the light deflector at least a portion of the optical interface protrudes from the windshield. In some exemplary embodiments, the protrusion of the optical interface is inward. In other exemplary embodiments, the protrusion of the optical interface is outward. The optical interface may be used to deflect and/or refract the incident light provided by one or more light sources in LIDAR system 100. In some exemplary embodiments, the optical interface may be disposed within a thickness of the window or the windshield. In other exemplary embodiments, however, the optical interface may extend out from a surface of the windshield. In one exemplary embodiment as illustrated in FIG. 34A, prism 3410 may protrude from window 3202 on both sides, although it is contemplated that prism 3410 may protrude from window 3202 on only one side. Inner prism 3412 of prism 3410 may protrude inward from window 3202 towards LIDAR system 100. Outer prism 3414 may protrude outward from window 3202 towards environment 3216.

In accordance with embodiments of the present disclosure, the optical interface is located only on an inside of the windshield. Although prism 3410 has been illustrated as including both inner and outer prisms 3412 and 3414, in the exemplary embodiment of FIG. 34, it is contemplated that in some embodiments, prism 3410 may include only one of inner and outer prisms 3412 and 3414. In embodiments that include only the inner prism 3412, inner prism 3412 may be located on an inside of window 3202.

In accordance with the present disclosure, the optical interface includes a first portion located on an external surface of the windshield and an internal portion located within the vehicle. In other exemplary embodiments, the internal portion within the vehicle is located on an internal surface of the windshield. In yet other embodiments, the windshield optical interface is affixed to an internal surface of the windshield. As discussed above, prism 3410 may include a first portion (e.g. external prism 3414) positioned on external surface 3405 of window or windshield 3202. As also illustrated in FIG. 34, prism 3410 may include a second portion (e.g. internal prism 3412) located within the vehicle. Internal prism 3412 may be positioned on internal surface 3403 of window 3202. Internal and external prisms 3412 and 3414, respectively, may be affixed to a portion of the vehicle chassis or frame so as to be positioned on internal surface 3403 and external surface 3405, respectively. In other exemplary embodiments, internal prism 3412 may be affixed to inner surface 3403 of window 3202. As discussed above, internal prism 3412 may be affixed to window 3202 using an adhesive or glue. It is also contemplated that internal prism 3412 may be positioned in contact with inner surface 3403 by attaching internal prism 3412 to a portion of the vehicle. External prism 3414 may be affixed to outer surface 3405 of window 3202 using techniques similar to those discussed above with respect to internal prism 3412.

Although prism 3410 has been illustrated as having a generally cuboidal shape, it is contemplated that one or more of the prisms may be curved to match the different angles at which light is emitted by the LIDAR system to different parts of the FOV. Some examples are provided in FIGS. 34B-34D. Although these illustrations show curvature in the vertical direction, it is contemplated that the prisms may additionally or alternatively also be curved in a horizontal direction or in any other direction.

Figure 34B:
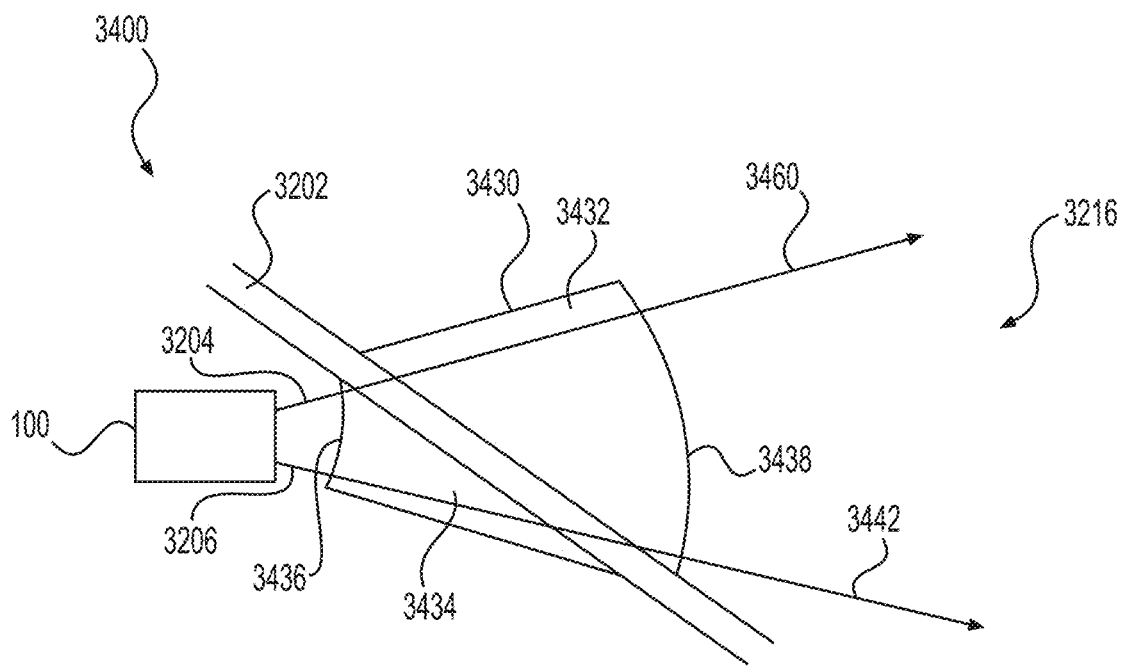

FIG. 34B illustrates an exemplary embodiment of a curved prism 3430, which may include internal prism 3432 and external prism 3434. Internal prism 3432 may protrude inward toward LIDAR system 100 and may have a curved inner surface 3436, which may face LIDAR system 100. Internal prism 3432 may be positioned inside the vehicle between LIDAR system 100 and window 3202, whereas external prism 3434 may be positioned between window 3202 and environment 3216 located in front of window 3202. Internal and external prisms 3432 and 3434 may be positioned or affixed to window 3202 using techniques similar to those discussed above with respect to prism 3410, and internal and external prisms 3412 and 3414.

Light from a light source within LIDAR system 100 may be incident on curved inner surface 3436 of internal prism 3432. External prism 3434 may include curved outer surface 3438. Light transmitted through internal and external prisms 3432 and 3434 may exit prism 3430 through curved outer surface 3438. For example, as illustrated in FIG. 34B, rays 3204 and 3206 may be incident upon curved inner surface 3436 and may be refracted through internal and external prisms 3432 and 3434 to emerge from curved outer surface 3438 as rays 3440 and 3442, respectively, which may be transmitted to environment 3216.

In accordance with some embodiments of the present disclosure, the optical interface may include a stepped surface. In accordance with other embodiments of the present disclosure, the optical interface may include a toothed surface. For example, the shape of the one or more prisms may be designed so as to shape the laser spot emitted by the LIDAR system after transmission through the window and the one or more prisms. As demonstrated in the examples of FIGS. 34C and 34D, optionally, one or more of the faces of prism 3410 and/or 3430 may include a discontinuous face, similarly to Fresnel lenses. The face of each of these narrower prisms may be flat or curved. It is noted that each such "Frensel Prism" may be made from a continuous piece of material (e.g. glass), or may be constructed from an array of adjacent prisms. Further, it is noted that while these illustrations show discontinuity of prisms surface in the vertical direction, one or more of the prisms may include discontinuous surfaces in any other direction (e.g. horizontal direction).

Figure 34C:
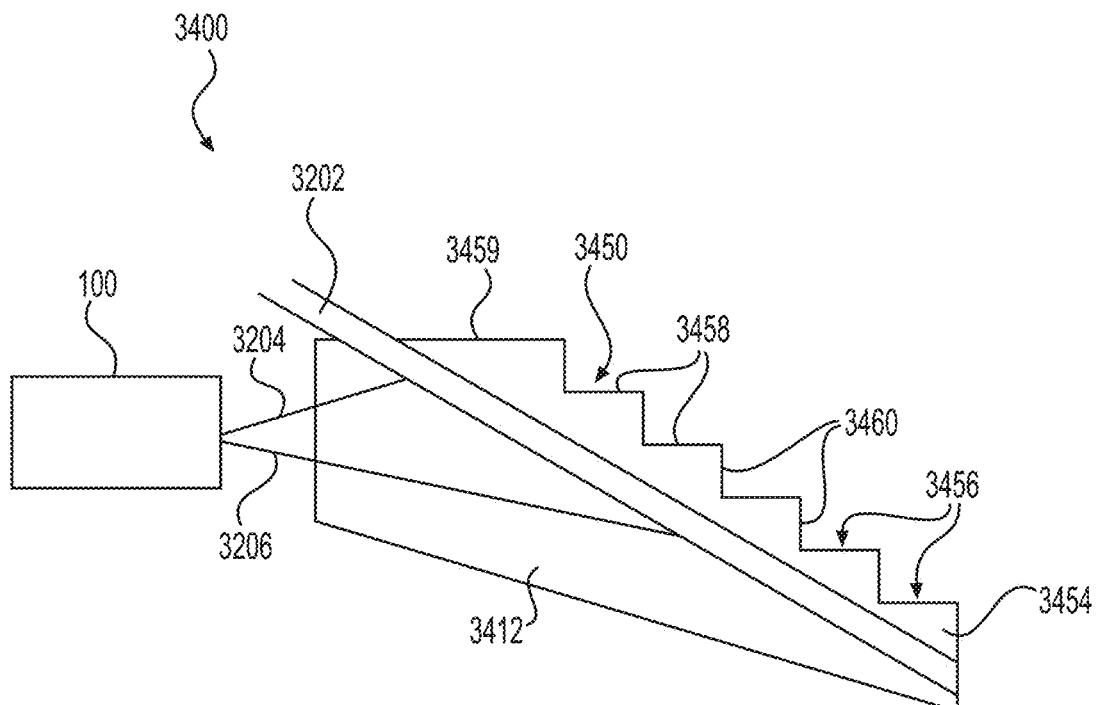

By way of example, FIG. 34C illustrates optical interface (e.g. prism 3450), which may include internal prism 3412 and external prism 3454. External prism 3454 may project outward from window 3202 towards environment 3216. External prism 3454 may include a stepped outer surface 3459, which may include one or more stepped sections 3456. As illustrated in FIG. 34C, each stepped section 3456 may include horizontal surface 3458 and vertical surface 3460. Horizontal surfaces 3458 may be generally parallel to a chassis of the vehicle or to a ground surface. Vertical surfaces 3460 may be generally perpendicular to horizontal surfaces 3460. Adjacently located horizontal and vertical surfaces 3458 and 3460 may be connected to each other forming a stepped but continuous outer surface 3459. It is contemplated that a size and number of stepped sections 3456 may be selected to ensure that light exiting prism 3450 adequately illuminates environment 3216 in front of window 3202. As also discussed above, the surfaces 3458 and 3460 of stepped sections 3456 may form a prism having characteristics similar to that of a Fresnel lens. It is also contemplated that using stepped sections 3456 may help reduce a thickness of external prism 3452 helping to reduce an amount by which external prism 3452 may protrude from window 3202.

Although surfaces 3458 and 3460 have been illustrated in FIG. 34C as straight (or flat surfaces), it is contemplated that surfaces 3458 and 3460 may instead by curved (in a convex or concave manner) to help direct the light emitted by LIDAR system 100 to the desired field of view in front of window 3202. Additionally, although only external prism 3454 has been illustrated as having stepped sections 3456, it is contemplated that in some exemplary embodiments, internal prism 3412 may also include similar stepped sections. A number of stepped sections (e.g. 3456) on internal prism 3452 and external prism 3454 may be the same or may be different. In some exemplary embodiments, a plurality of discretely manufactured stepped sections 3456 may be connected to each other (e.g. using glue or transparent adhesive) to form one or more of internal and external prisms 3452 and 3454. In other embodiments, the sections 3456 may be formed by machining or otherwise generating horizontal and vertical surfaces 3458 and 3460 on a single integral internal or external prism 3412 or 3454.

Figure 34D:
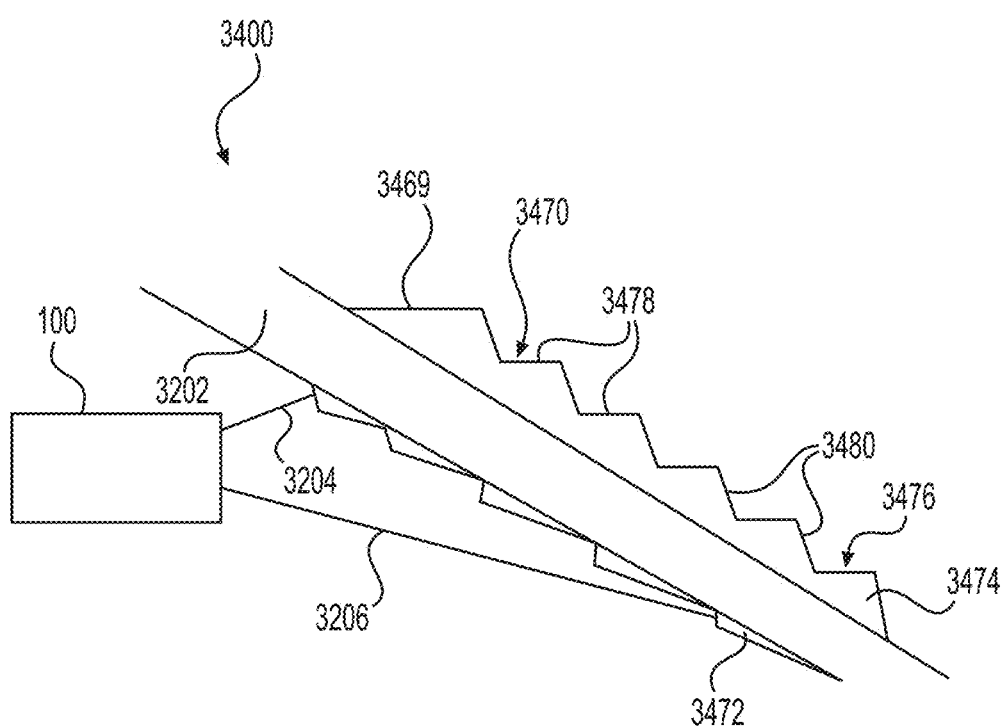

FIG. 34D illustrates another exemplary optical interface (e.g. prism 3470), which may include internal prism 3472 and external prism 3474. External prism 3474 may include a toothed outer surface 3476, which may include one or more toothed sections 3476. As illustrated in FIG. 34D, each toothed section 3476 may include inclined surfaces 3478 and 3480. Surfaces 3478 may be generally inclined relative to a horizontal plane defined by, for example, a chassis of the vehicle or a ground surface. Surfaces 3480 may also be generally inclined relative to a vertical plane disposed generally perpendicular to the horizontal plane. Thus, surfaces 3478 and 3480 may form, for example, a toothed shape. Adjacently located surfaces 3478 and 3480 may be connected to each other forming a toothed but continuous outer surface 3469. It is contemplated that a size and number of toothed sections 3476 may be selected to ensure that light exiting prism 3470 adequately illuminates the field of view in front of window 3202. It is also contemplated that using toothed sections 3476 may help reduce a thickness of external prism 3472 helping to reduce an amount by which external prism 3472 may protrude from window 3202.

Although surfaces 3478 and 3480 have been illustrated in FIG. 34C as straight (or flat surfaces), it is contemplated that surfaces 3478 and 3480 may instead by curved (in a convex or concave manner) to help direct the light emitted by LIDAR system 100 to the desired field of view in front of window 3202. In some embodiments, only external prism 3474 may have stepped sections 3476. In other exemplary embodiments as illustrated in FIG. 34D, internal prism 3474 may also include toothed sections similar to sections 3476. The sizes and number of toothed sections (e.g. 3476) on internal prism 3472 and external prism 3474 may be the same or may be different. In some exemplary embodiments, a plurality of discretely manufactured toothed sections 3476 may be connected to each other (e.g. using glue or transparent adhesive) to form one or more of internal and external prisms 3472 and 3474. In other embodiments, the sections 3476 may be formed by machining or otherwise generating horizontal and vertical surfaces 3458 and 3460 on a single integral internal or external prism 3472 or 3474.

It is contemplated that sizes of the stepped sections 3456 (e.g. dimensions of surfaces 3458 or 3460) in the exemplary prism 3450 of FIG. 34C, may be selected based on a size of the light beam that is incident on these surfaces from LIDAR system 100, or based on a size of the light beam that may be incident on these surfaces from environment 3216. The sizes of toothed sections 3476 (e.g. dimensions of surfaces 3478 or 3480) in the exemplary prism 3470 of FIG. 34D may be selected in a similar manner. Moreover, the sizes of surfaces 3458, 3460, or 3478, 3480 may be uniform or nonuniform based on a size of the light beam expected to be incident on these surfaces. An orientation of prisms 3450 or 3470, and or orientations of surfaces 3460 and 3470 may be selected so that light from LIDAR system 100 and/or environment 3216 may be incident on surfaces 3460 and/or 3470 generally perpendicular to, or at a predetermined angle with respect to surfaces 3460 or 3470.

Figure 35:
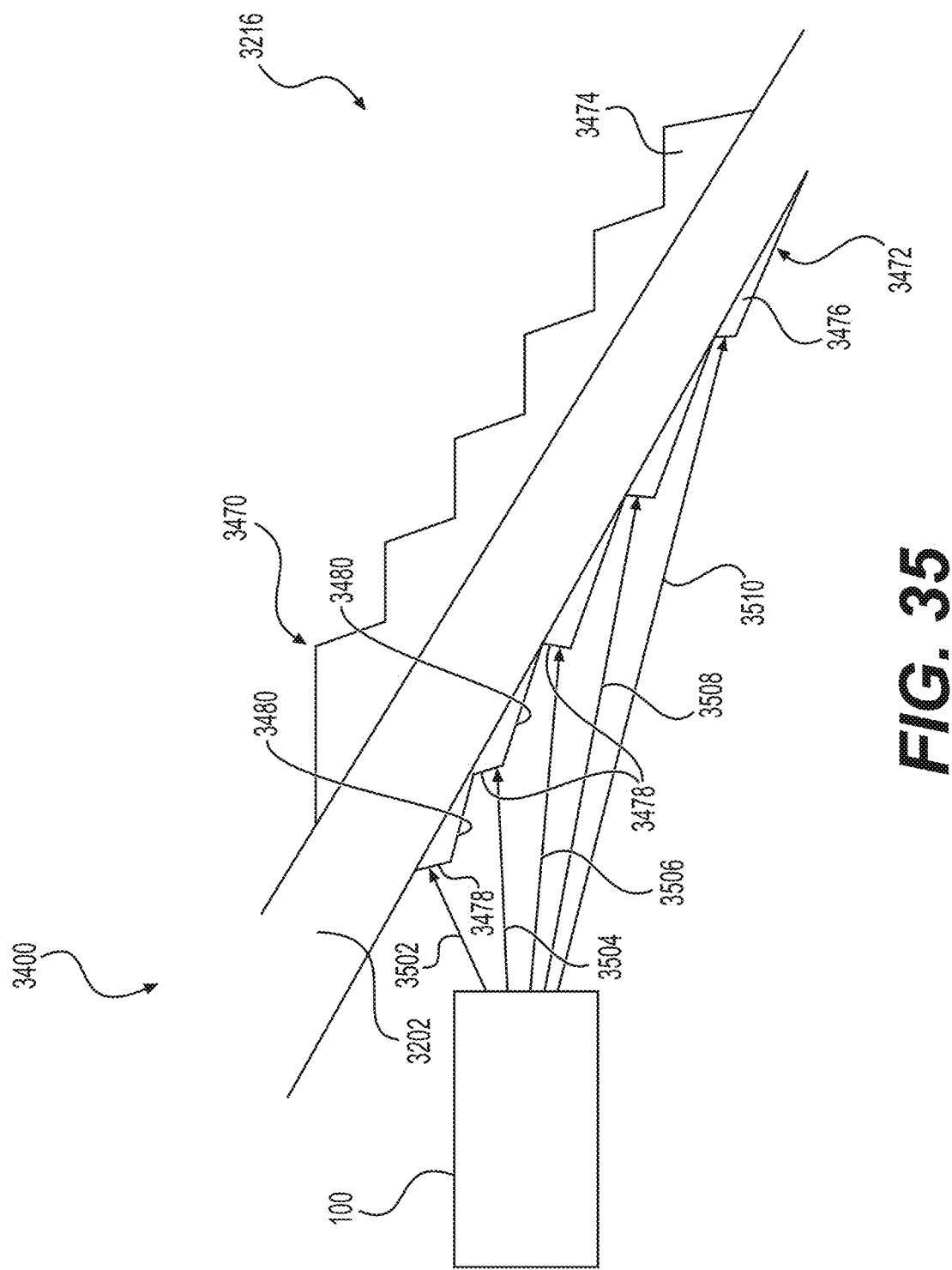
FIG. 35 illustrates an exemplary LIDAR system calibrated for use with an exemplary optical interface of FIGS. 34A-34D.

It is noted that in some embodiments the emittance of light by, for example, LIDAR system 100 may require calibration relative to the one or more prisms (e.g. 3410, 3430, 3450, 3470, etc.), especially if manufactured and/or assembled onto the window separately. For example, the calibration may include matching the scanning pattern of a scanning LIDAR system so that the illumination and/or reception of light would be executed at continuous parts of the prism (e.g. along the rows of the Fresnel prisms exemplified in FIG. 34D) and not at the junction of adjacent toothed or stepped sections (e.g. 3456 or 3476). FIG. 35 illustrates an exemplary LIDAR system 100 that may have been calibrated for use with a prism 3470. As illustrated in FIG. 35, incident light in the form of rays 3502, 3504, 3506, 3508, 3510 etc. may fall on internal prism 3474, which may have one or more stepped sections 3476, each stepped section having surfaces 3478 and 3480. As illustrated in FIG. 35, LIDAR system 100 may be calibrated so that each of rays 3502, 3504, 3506, 3508, 3510 may be incident on respective surfaces 3478 at a predetermined angle of incidence. In one exemplary embodiment as illustrated in FIG. 35, the angle of incidence may be about 90° although other angles are also contemplated. The one or more prisms (e.g. 3410, 3430, 3450, 3470, etc.) discussed above may have any shape, e.g. triangular, hexagonal, or any other regular or irregular shape. It is also noted that although the one or more prisms (e.g. 3410, 3430, 3450, 3470, etc.) were primarily discussed with respect to LIDAR system, the embodiments of this disclosure are not so limited and may include the use of the disclosed prisms with other types of optical systems such as cameras, projectors, etc.

According to various exemplary embodiments of the present disclosure, the optical interface may include a secondary window affixed to the windshield. In some exemplary embodiments, the optical interfaces discussed above may be included in a secondary window (e.g. a smaller pane of glass) which is in turn connected to the window. The secondary window may be detachably or fixedly attached to an existing windshield. Affixing a separate window with the optical interface may avoid having to replace conventional windshields on vehicles and may instead allow the use of a LIDAR system with conventional windshields.

Figure 36:
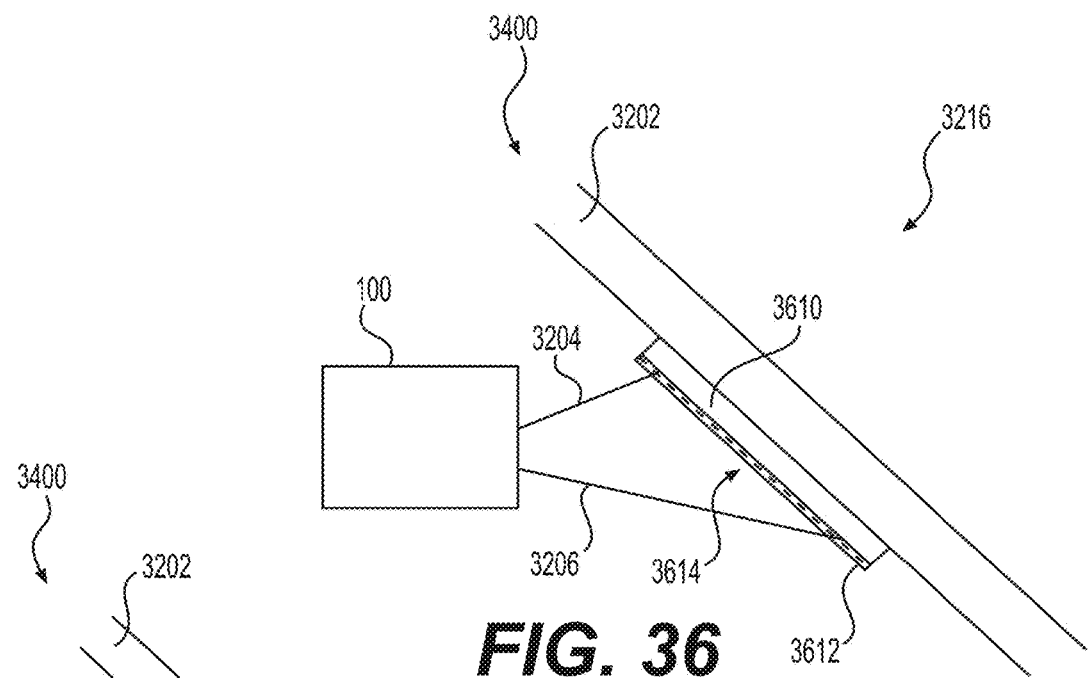
FIG. 36 illustrates an exemplary vehicle system including a secondary window affixed to a window of the vehicle.

By way of example, FIG. 36 illustrates an exemplary embodiment of a vehicle system 3400, which may include LIDAR system 100 and windshield 3202. Windshield 3202 may be a conventional flat or curved windshield or window found on a conventional automobile. In one exemplary embodiment as illustrated in FIG. 36, vehicle system 3400 may include secondary window 3610. Secondary window 3610 may be positioned between LIDAR system 100 and windshield 3202.

Additionally or alternatively secondary window 3610 may be positioned between window 3202 and environment 3216. It is contemplated that in some embodiments, secondary window 3610 may be positioned in contact with windshield 3202. It is also contemplated that in some embodiments, secondary window may be affixed to inner surface 3403 and/or to outer surface 3405 of window 3202. Although not illustrated in FIG. 36, in some embodiments, secondary window 3610 may include one or more of prisms 3410, 3430, 3450, and/or 3470 discussed above. In other exemplary embodiments as illustrated in FIG. 36, secondary window 3610 may include anti-reflective coating 3612 which may be applied on surface 3614 of secondary window 3610. Anti-reflective coating 3612 and surface 3614 may face LIDAR system 100 so that light emitted by one of more light sources within LIDAR system 100 may be incident on anti-reflective coating 3612. The anti-reflective coating 3612 may help ensure that more of the light incident on secondary window 3610 may be transmitted through secondary window 3610 and windshield 3202 to environment 3216 instead of being reflected back towards LIDAR system 100.

It is noted that the anti-reflective layer may reduce the amount of light reflected back to the incidence side of the window (e.g., back into the car or into the LIDAR system), and instead may cause more (or all) of the light to be transmitted to the other side of the window (e.g. toward the scene or environment 3216). The anti-reflective layer/coating may include more than one layer of material (e.g., in order to improve transmission levels in larger degrees of incidence). In some exemplary embodiments, additional layers, coatings and/or functionalities may be implemented together with anti-reflection (e.g. on the same secondary-window, in interleaving layers, etc.) For example, the other layers, coatings and/or functionalities may include one or more of the following:
   a. Band-pass filtering;
   b. Spectral blocking;
   c. Retardation (and other phase manipulation);
   d. Polarizers;
   e. Gratings, etc.

The anti-reflective layer (and possibly the optional secondary window as well) may be thin. For example, the anti-reflective layer (and possibly the optional secondary window as well) may be thinner than the window. In some exemplary embodiments, the anti-reflective layer (and possibly the optional secondary window as well) may be at least 10 times thinner than the window. It is noted that anti-reflective layers may be much thinner, and that any type and dimension of anti-reflective layer or coating known in the art may be implemented.

In some embodiments, the anti-reflective layer (and possibly the optional secondary window as well) may be included within (or partly within) a rigid housing of the LIDAR system. In other embodiments, the anti-reflective layer (and possibly the optional secondary window as well) may be implemented as a sticker, which includes an adhesive layer which may be used for connecting the respective component to a window. The LIDAR system may be designed such the anti-reflective layer (and possibly the optional secondary window as well) are sufficiently thin so as not to interfere with a cleaning system of the window (e.g., wipers).

Figure 37A:
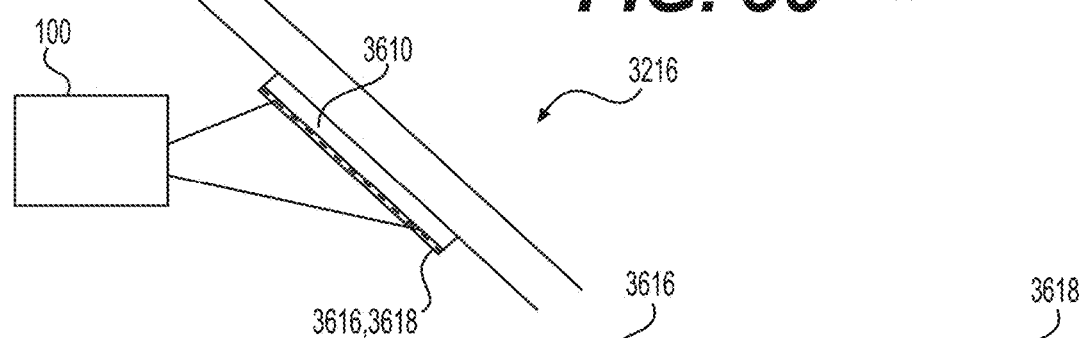
FIGS. 37A, B, and C illustrate an exemplary vehicle system including a grating affixed to the window or to a secondary window of the vehicle.
Figure 37B:
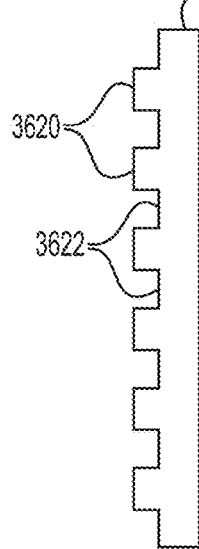
Figure 37C:
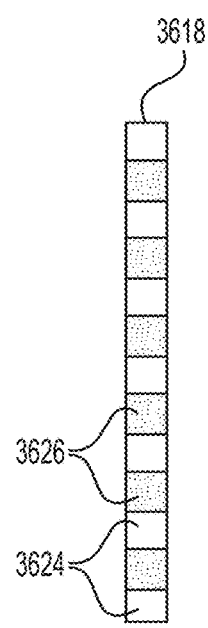

According to various exemplary embodiments of the present disclosure, the optical interface includes at least one of a grating, prism, or a light deflector. In some embodiments as discussed above, the optical interface may be a prism or may include an anti-reflective coating. In other exemplary embodiments, the optical interface may be a grating. By way of example, FIG. 37A illustrates an exemplary embodiment of a vehicle system 3400, which may include LIDAR system 100, windshield 3202, and secondary window 3610. Grating 3616 or 3618 may be attached to surface 3614 of secondary window 3610. In one exemplary embodiment as illustrated in FIG. 37B, grating 3616 may be formed by a sheet of material with differing thicknesses. For example grating 3616 may include sections 3620 which may be separated by sections 3622. As illustrated in FIG. 37B, sections 3620 may have a thickness greater than that of sections 3622. In another exemplary embodiment as illustrated in FIG. 37C, grating 3618 may be formed as a sheet of material with differing refraction indexes. For example, grating 3618 may have portions 3626 and 3628 disposed adjacent to each other. Portions 3626 and 3628 of grating 3618 may have different refractive indices. It is further contemplated that in some exemplary embodiments, grating 3616 or 3618 applied to secondary window may be formed using a combination of the grating characteristics illustrated in FIGS. 37B and 37C. It is also contemplated that in some exemplary embodiments, grating 3616, 3618, or a combination of the two may be directly applied to inner surface 3403 of windshield 3202 without requiring a secondary window 3610.

If a secondary window is implemented, the grating layer may preferably be implemented on the side of the secondary window opposing to the window (e.g., the windshield), for example, toward the light source for an inner secondary window, and toward the external environment or FOV for an external secondary window. It is noted that optionally, the LIDAR system may emit polarized light towards the grating layer (e.g., 1102, 1104). It is also noted that if the transmission path and the reception path of the LIDAR system are different (e.g. using different LIDAR-system windows, different lenses, mirror, etc.), the optical components discussed above (e.g., prisms, anti-reflective layers, gratings) may be implemented for the transmission path, for the reception path, or both. In such LIDAR systems (e.g. bi-static LIDAR system) where the aforementioned optical components (e.g., prisms, anti-reflective layers, gratings) are used for both transmission and reception, the same or different optical components may be used for the different paths (TX, RX). For example, the LIDAR system may include a first arrangement of one or more prisms, one or more anti-reflective layers, and/or one or more grating layers for transmission path, and a second arrangement of one or more prisms, one or more anti-reflective layers, and/or one or more grating layers for reception path.

While the present disclosure describes examples of optical interfaces (e.g. 3410, 3430, 3450, 3470), it should be noted that aspects of the disclosure in their broadest sense are not limited to the disclosed examples of optical interfaces. It is also contemplated that the one or more optical interfaces may only be implemented on certain portions of the windshield. For example, the one or more optical interfaces may be implemented only in portions of the windshield having relatively large angles of incidence (e.g. above about 50°, above about 60°, or above about 70°.) In some exemplary embodiments, the one or more optical interfaces may be implemented on some but not all portions of the windshield by manufacturing the optical interfaces separately from the windshield and connecting them to the windshield in the desired regions of the windshield. Further, although anti-reflective coatings and gratings have been discussed above with reference to secondary window 3610, it is contemplated that anti-reflective coatings and/or gratings may be applied to various surfaces of the one or more prisms 3410, 3430, 3450, and/or 3470 discussed above, or may be applied to inner and/or outer surfaces 3403 and 3405 of window 3202.

It is contemplated that the disclosed vehicle systems in accordance with the present disclosure may include a cleaning mechanism (internal and/or external to the car). For example, such cleaning mechanisms may include one or more of wipers, high pressure air vents, water nozzles, etc. It is also contemplated that in some exemplary embodiments, conventional wiper mechanisms already present on the vehicle may be used to clean the optical interfaces and/or windows. To facilitate cleaning of the optical interfaces and/or windows using wipers, the optical interfaces and/or windows may include mechanical transitions outside the field of view to ensure that the wipers can sweep over the optical interfaces and/or windows. For example, such mechanical transitions may include sloping and/or curved edges of the optical interfaces and/or of the secondary windows. In some exemplary embodiments, the wipers of the vehicles may be adapted to sweep over the optical interfaces and/or windows according to this disclosure. For example, the wipers may include one or more flexibly connected parts at a relevant "radius" of the wipers, to ensure that the wipers may "climb over" and sweep the one or more optical interfaces.

Figure 38A:
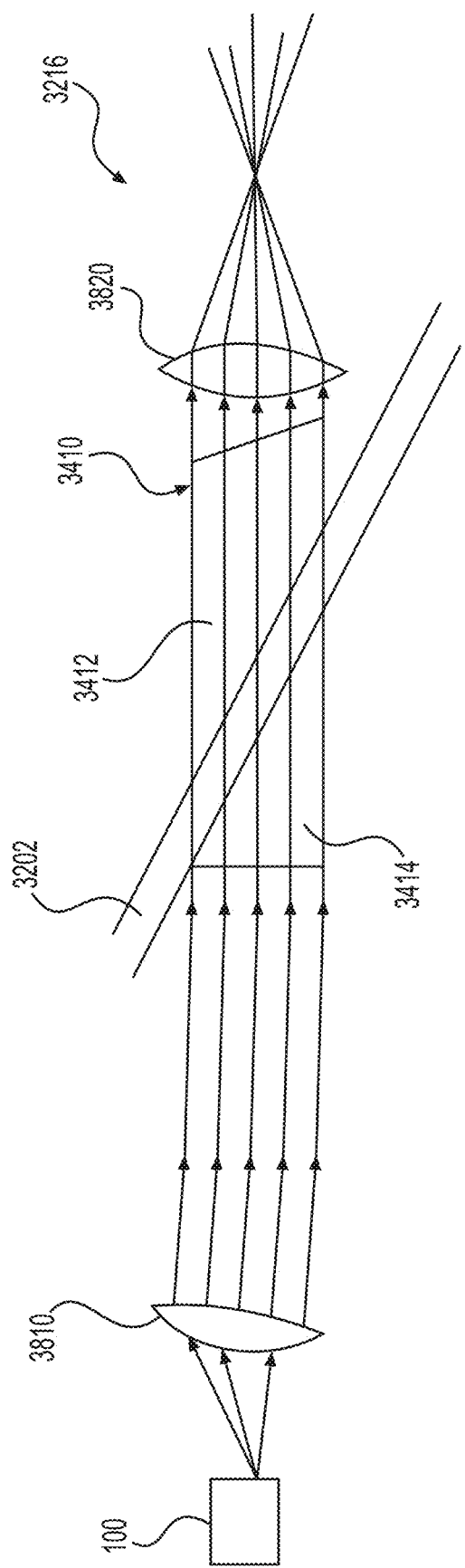
FIG. 38A illustrates an example of a vehicle system including internal and external lenses for collimation/de-collimation of light.

In accordance with the present disclosure, the disclosed vehicle system may include internal and external lenses in addition to or as an alternative to the one or more optical interfaces discussed above. By way of example, FIG. 38A illustrates an exemplary vehicle system 3400 with both internal and external lenses, in accordance with the present disclosure. As illustrated in FIG. 38A, vehicle system 3400 may include LIDAR system 100, window 3202, and prism 3410, although any of prisms 3430, 3450, and/or 3470 may also be used in the configuration of FIG. 38A. Vehicle system 3400 may further include one or more internal collimating lenses 3810 and/or one or more external de-collimating lenses 3820. Internal collimating lens 3810 may be positioned between LIDAR system 100 and internal prism 3412. External collimating lens 3820 may be positioned between external prism 3414 and environment 3216.

As illustrated in FIG. 38A, light from LIDAR system 100 may be incident on internal collimating lens 3810. For example movement of one or more MEMS mirrors 1102 may produce one or more light beams at different scanning angles. These light beams at different scanning angles may be incident on internal collimating lens 3810, which may convert the incident light to parallel beams of light. The parallel light beams may pass through prism 3410 (including, for example, internal and external prisms 3412 and 3414). Light beams exiting prism 3410 may be incident on external de-collimating lens 3820. Lens 3820 may recover the angles of the incident light emitted by LIDAR system 100 to recreate a sufficiently wide field of view. It is to be understood that lenses 3810 and 3820 may serve a similar function (e.g. collimating to parallel beams, and reconstructing the angles) for light reflected from one or more objects in environment 3216, which is received by one or more sensors of LIDAR system 100. Further, lens 3820 may be used to modify the angular aperture of the LIDAR system to a beam propagation direction which may not be parallel to each other.

A LIDAR system in accordance with the present disclosure may include a light source configured to project light for illuminating an object in an environment external to the LIDAR system. The LIDAR system may also include a scanning unit configured to deflect light from the light source in order to scan at least part of the environment. As discussed above, and by way of example, FIG. 1A illustrates an exemplary scanning unit and FIGS. 2A-2C illustrate exemplary embodiments of a LIDAR system, and a light source (e.g. 112) consistent with embodiments of the present disclosure.

In accordance with this disclosure, the scanning unit includes a movable MEMS mirror configured to pivot about at least one axis. As discussed above, FIGS. 11A-25 illustrate various exemplary embodiments of MEMS mirror assemblies that include one or more connectors configured to move the MEMS mirror about one or more axes. The disclosed MEMS mirror (e.g. 1102) may direct the light from light source (e.g. 112) through the optical interface (e.g. 3410, 3430, 3450, 3470, etc.) and along the optical path defined by, for example, rays 3204, 3206.

According to some exemplary embodiments of this disclosure, the LIDAR system includes a connector configured to connect the LIDAR system to a vehicle with an optical interface configured for location within a vehicle and along an optical path of the LIDAR system. As discussed above, FIG. 32A illustrates an exemplary connector 3218 that may connect LIDAR system 100 to some portion of the vehicle. As discussed above, FIGS. 32 and 34-38 illustrate various exemplary embodiments of optical interfaces associated with windows or windshields and positioned along an optical path (defined by, for example, rays 3204, 3206, 3420, and 3422 in FIG. 32A) of an exemplary LIDAR system.

In some exemplary embodiments according to this disclosure, when the LIDAR system is connected to the vehicle the optical path extends from the light source through a sloped windshield of the vehicle. An optical angle of the optical path before passing through the sloped windshield is oriented at a first angle with respect to an adjacent surface of the sloped windshield. As discussed above, the light from the light source of LIDAR system 100 may pass through window 3202 (e.g. sloped windshield). As also discussed above, in the disclosed embodiments, the optical angle of the optical path before passing through the windshield may be oriented at a first angle, for example, $\Box_1$.

According to some exemplary embodiments of this disclosure, the LIDAR system includes at least one sensor configured to detect light received through the windshield optical interface, wherein the optical interface is configured to alter the optical angle of the optical path from the first angle to a second angle, such that at the second angle, there is a ratio of greater than about 0.3 between light refracted through the windshield and light reflected from the windshield. As discussed above, and by way of example, FIGS. 4A-4C illustrate exemplary embodiments of the sensor (e.g. 116) consistent with embodiments of the present disclosure. Sensor 116 may be configured to receive and detect light passing through optical interface (e.g. 3410, 3430, etc.) As also discussed above, it is contemplated that a ratio between the amount of light refracted through the windshield and the amount of light reflected from the windshield may be greater than about 0.2, greater than about 0.25, greater than about 0.3, greater than about 0.35, or greater than about 0.4, etc.

According to some exemplary embodiments of this disclosure, the LIDAR system includes at least one processor. As discussed above, and by way of example, FIGS. 2A and 2B illustrate exemplary embodiments of a processor (e.g. 118) consistent with embodiments of the present disclosure. In accordance with the present disclosure, the processor is configured to determine a distance between the vehicle and the object based on signals received from the at least one sensor. As discussed above, and by way of example, as illustrated in FIG. 2A, processor 118 may be configured to determine a distance between object 208 and LIDAR system 100 which may be associated with a vehicle based on one or more signals generated by the at least one sensor (e.g. 118).

According to embodiments of this disclosure, in the LIDAR system at least a portion of the optical interface protrudes from the windshield. In some exemplary embodiments, the protrusion of the optical interface is inward. In other exemplary embodiments, the protrusion of the optical interface is outward. As illustrated above in FIG. 34A, prism 3410 may protrude from window 3202 on both sides, although it is contemplated that prism 3410 may protrude from window 3202 on only one side. Inner prism 3412 of prism 3410 may protrude inward from window 3202 towards LIDAR system 100. Outer prism 3414 may protrude outward from window 3202 towards environment 3216.

In accordance with embodiments of the present disclosure, in the LIDAR system, the optical interface is located only on an inside of the windshield. With reference to FIG. 34A, in some exemplary embodiments, prism 3410 may include only one of inner and outer prisms 3412 and 3414. In embodiments that include only the inner prism 3412, inner prism 3412 may be located on an inside of window 3202.

In accordance with the present disclosure, the optical interface in the LIDAR system includes a first portion located on an external surface of the windshield and an internal portion located within the vehicle. In other exemplary embodiments, the internal portion within the vehicle is located on an internal surface of the windshield. In yet other embodiments, the windshield optical interface is affixed to an internal surface of the windshield. As discussed in FIG. 34A, prism 3410 may include a first portion (e.g. external prism 3414) positioned on external surface 3405 of window or windshield 3202. As also illustrated in FIG. 34, in some exemplary embodiments, internal prism 3412 may be affixed to inner surface 3403 of window 3202.

In accordance with some embodiments of the present disclosure, the optical interface in the LIDAR system may include a stepped surface. In accordance with other embodiments of the present disclosure, the optical interface may include a toothed surface. By way of example, FIG. 34C illustrates optical interface (e.g. prism 3450), which may include internal prism 3412 and external prism 3454. As discussed above, external prism 3454 may include a stepped outer surface 3459, which may include one or more stepped sections 3456. As also discussed above, FIG. 34D illustrates an external prism 3474 that may include a toothed outer surface 3476, which may include one or more toothed sections 3476.

According to various exemplary embodiments of the present disclosure, in the LIDAR system, the optical interface may include a secondary window affixed to the windshield. As discussed above, FIG. 36 illustrates an exemplary embodiment of a vehicle system 3400, which may include secondary window 3610.

According to various exemplary embodiments of the present disclosure, in the LIDAR system, the optical interface includes at least one of a grating, prism, or a light deflector. As discussed above, FIG. 37A illustrates an exemplary embodiment of grating 3616 or 3618 that may be attached to surface 3614 of secondary window 3610.

Referring to various configurations in which the LIDAR system is installed within the vehicle and its projected light is transferred through a windshield (or another window such as a rear window or side window), it is noted that if the connection between the LIDAR system and the window may leak LIDAR radiation into the interior of the vehicle, such leakage may cause an eye-safety concern, may interfere with other systems within the vehicle, and so on.

Reflection from the windshield may be incident to the car interior where it may encounter objects. These objects, in turn, may reflect the light hitting them, and their reflectivity may have Lambertian nature and/or specular nature that is usually uncontrolled. For example, leaked light may be uncontrollably deflected from a car dashboard. This reflected laser light may be harmful for the eyes of the people sitting in the car, and also could potentially be reflected back to the LiDAR creating undesired noise/imaginary targets or other problems.

At the typical private car rake angles approach 25 deg angles or less, the reflection at certain angles with very large angle of incidence on the windshield will be relatively strong, which can make the problem more severe.

The following LIDAR systems (as well as light control systems for installing with a LIDAR system within a vehicle) may be used in order to block leakage of light, in a way that will not affect the LiDAR functionality.

The following systems implement one or both of the following with respect to stray light:

1. Reflect the light to areas where the reflection does not interfere or is not absorbed.
2. Absorb the light in a "sufficient" manner (depending on the LiDAR specification).

Different solutions may be implemented relative to different parts of the scanned LIDAR FOV and/or for different parts of the vehicle interior.

Figure 38B:
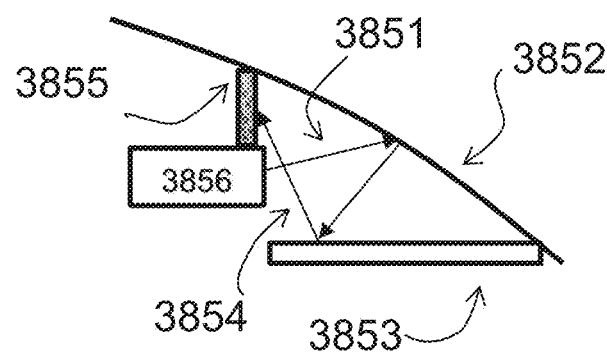
Figure 38C:
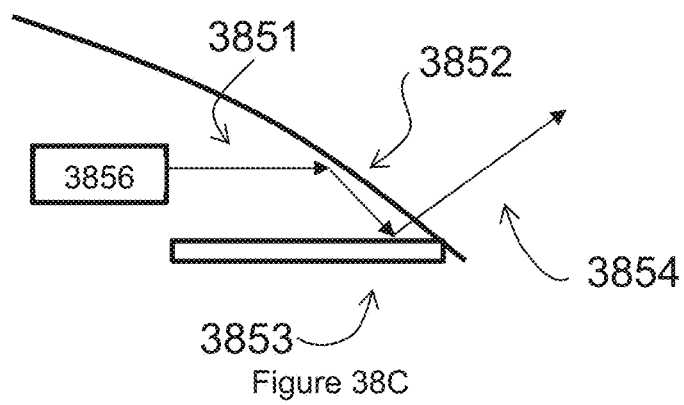

FIG. 38B is an example of a LIDAR system 3856 and optical components designed and positioned for reflecting the light to areas where the reflection does not interfere or where it may be absorbed, in accordance with examples of the presently disclosed subject matter. Laser beam 3851 is reflected from the windshield 3852 and bounces to an internal casing 3853 that reflects the light 3854 again to a desired location. The desired location could be either another beam trap 3855 (FIG. 38B) or even toward the outside of the vehicle, as seen in FIG. 38C.

Description of another light reflection strategy is represented in FIG. 38D. Laser beam 3851 is reflected from the windshield 3852 and bounces to an internal casing 3853 that absorbs the impacting laser beam. FIGS. 38E-38G illustrate three potential structures that may be used in conjunction with internal casing 3853 and/or beam trap 3855 to absorb an impacting laser beam. Any of the examples shown in FIGS. 38B-38G may be used in combination with or as partial or full substitutions with any of the structures or system configurations discussed elsewhere in this disclosure.

Figure 39:
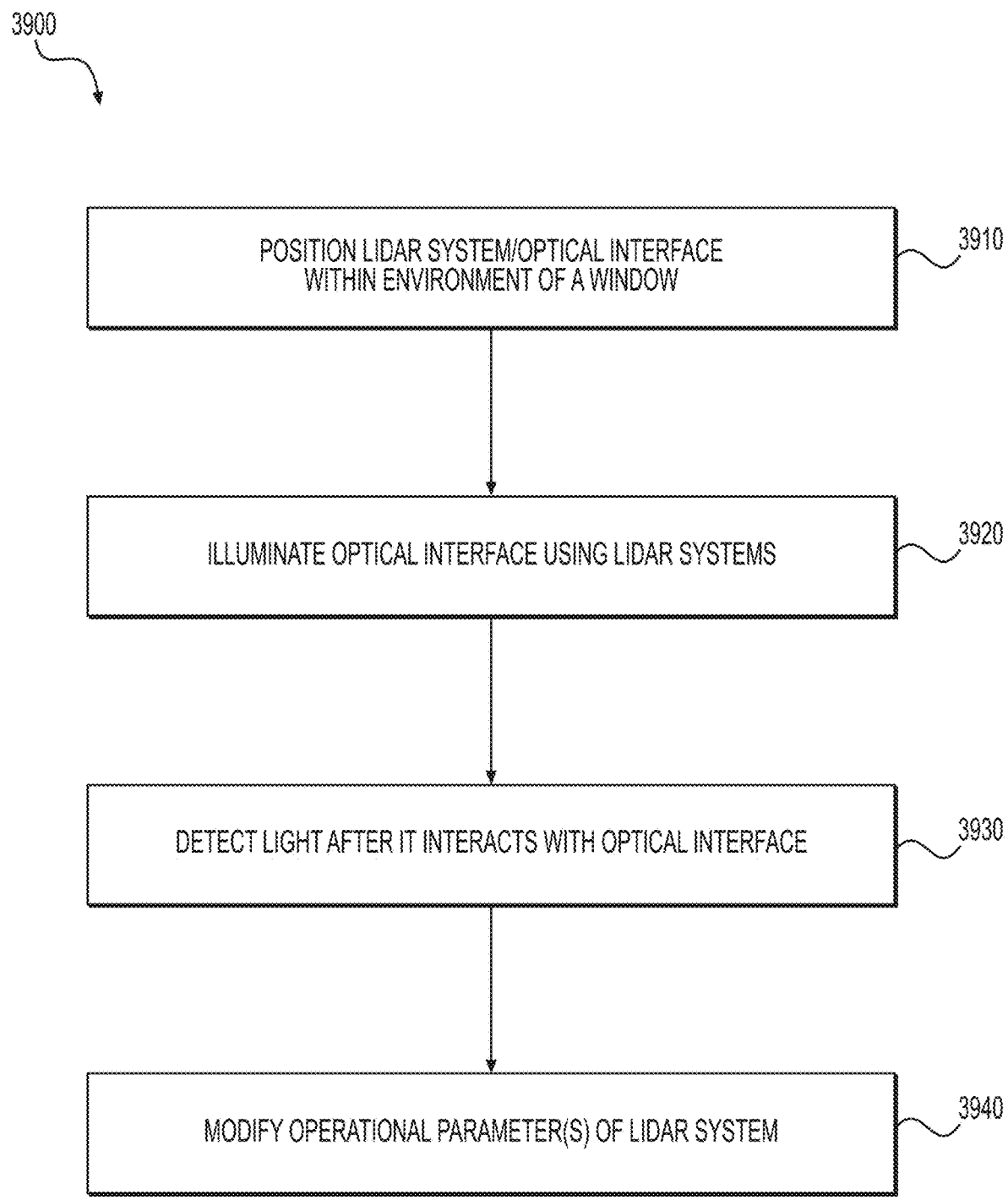
FIG. 39 illustrates an exemplary method of calibration of a LIDAR system in a vehicle system.

In accordance with embodiments of the present disclosure, a method of calibrating a LIDAR system in a vehicle system is disclosed. The method may include a step of positioning the LIDAR system within an environment of a window associated with a vehicle. By way of example, FIG. 39 illustrates an exemplary method 3900 for calibration of a LIDAR system, in accordance with the presently disclosed subject matter. It is contemplated that calibration method 3900 may also be used for "Fresnel prisms" or other non-continuous type of prisms discussed above with reference to, for example, FIGS. 34-38. The order and arrangement of steps in method 3900 is provided for purposes of illustration. As will be appreciated from this disclosure, modifications may be made to process 3900 by, for example, adding, combining, removing, and/or rearranging one or more steps of process 3900.

Method 3900 may include a step 3910 of positioning a LIDAR system (or a part thereof) and/or one or more prisms within the environment of a window (e.g., a windshield 3202 of a car). Positioning of the LIDAR system (e.g. LIDAR system 100) may include positioning of the illumination module (e.g. light source 112) and/or of the sensor (e.g. 116) of the LIDAR system (e.g. 100). As discussed above, some parts of the system (e.g. the prisms 3410, 3430, 3450, 3470, etc.) may be manufactured together with an existing component of the vehicle (e.g. prisms integrated into the window; LIDAR parts integrated with the vehicle systems) etc.

According to some embodiments of this disclosure, the method may include a step of illuminating at least one optical interface using a light source associated with the LIDAR system. By way of example, FIG. 39 illustrates exemplary steps of method 3900 that may be used for calibration of the emission and/or reception of light by the LIDAR system (e.g. LIDAR system 100). It is noted that the calibration may include determining a scanning pattern of a scanning module of the LIDAR system (e.g. a mirror, an optical phased array), an illumination pattern of the LIDAR system, positioning of optical components of the LIDAR system, modifying of operational parameters of the LIDAR system (e.g. dynamic range of the sensor), and/or any combination of the above. For example, calibration may include matching the scanning pattern of a scanning LIDAR system so that the illumination and/or reception of light would be executed at continuous parts (e.g. surfaces 3460 or 3480) of the prism (e.g. along the rows of the Fresnel prisms exemplified in FIG. 34D).

Method 3900 may include step 3920 of illuminating the prisms by using, for example, one or more light sources (e.g. 112) of the LIDAR system. In some exemplary embodiments, illuminating in step 3920 may be executed by an external system located adjacent the window (e.g. window 3402). It is noted that additionally or alternatively illumination by the LIDAR system may be used also when calibrating the sensor and/or the reception path. The calibration of both directions, for example, outbound illumination (e.g. light travelling from LIDAR system 100 to environment 3216) and inbound illumination (e.g. light travelling from the environment 3216 to LIDAR system 100) may be performed concurrently.

In accordance with exemplary embodiments of this disclosure, the method of calibrating the LIDAR system may include a step of detecting, using at least one sensor, light from the light source after the light has interacted with the at least one optical interface. For example, as illustrated in FIG. 39, method 3900 may include step 3930 of detecting the light after it has optically interacted (e.g. been reflected, refracted, diffracted, etc.) with the one or more prisms. Step 3930 may include detection of transmitted light and/or of reflected light. The detection of light in step 3930 may be executed by one or more sensors (e.g. 116) of the LIDAR system (e.g. 100). In some exemplary embodiments, the detection of light in step 3930 may be executed by an external system located adjacent the window (e.g., when calibrating the illumination pattern and/or the scanning of the transmission path). Additionally or alternatively, sensors (e.g. 116) of the LIDAR system may be used with the external system during calibration. The calibration of both directions, for example, outbound illumination (e.g. light travelling from LIDAR system 100 to environment 3216) and inbound illumination (e.g. light travelling from environment 3216 to LIDAR system 100) may be performed concurrently.

According to some exemplary embodiments of this disclosure, the method of calibrating the LIDAR system may include a step of modifying at least one operational parameter of the LIDAR system based on a signal from the at least one sensor. Method 3900 may include step 3940 of modifying an operational parameter of the LIDAR system, based on the results of, for example, the detection of light in step 3930. Some examples of operational parameters which may be determined and/or modified may include:

a. Scanning pattern of a scanning module of the LIDAR system (e.g. a mirror, an optical phased array, etc.);
b. An illumination pattern of the LIDAR system;
c. Positioning of optical components of the LIDAR system;
d. Operational parameters of a sensor of the LIDAR system (e.g. dynamic range, biases).

For example, the calibration in method 3900 may include matching the scanning pattern of a scanning LIDAR system so that the illumination and/or reception of light would be executed at continuous parts (e.g. surfaces 3460 or 3480) of the prism (e.g. along the rows of the Fresnel prisms exemplified in FIG. 34D).

Figure 40:
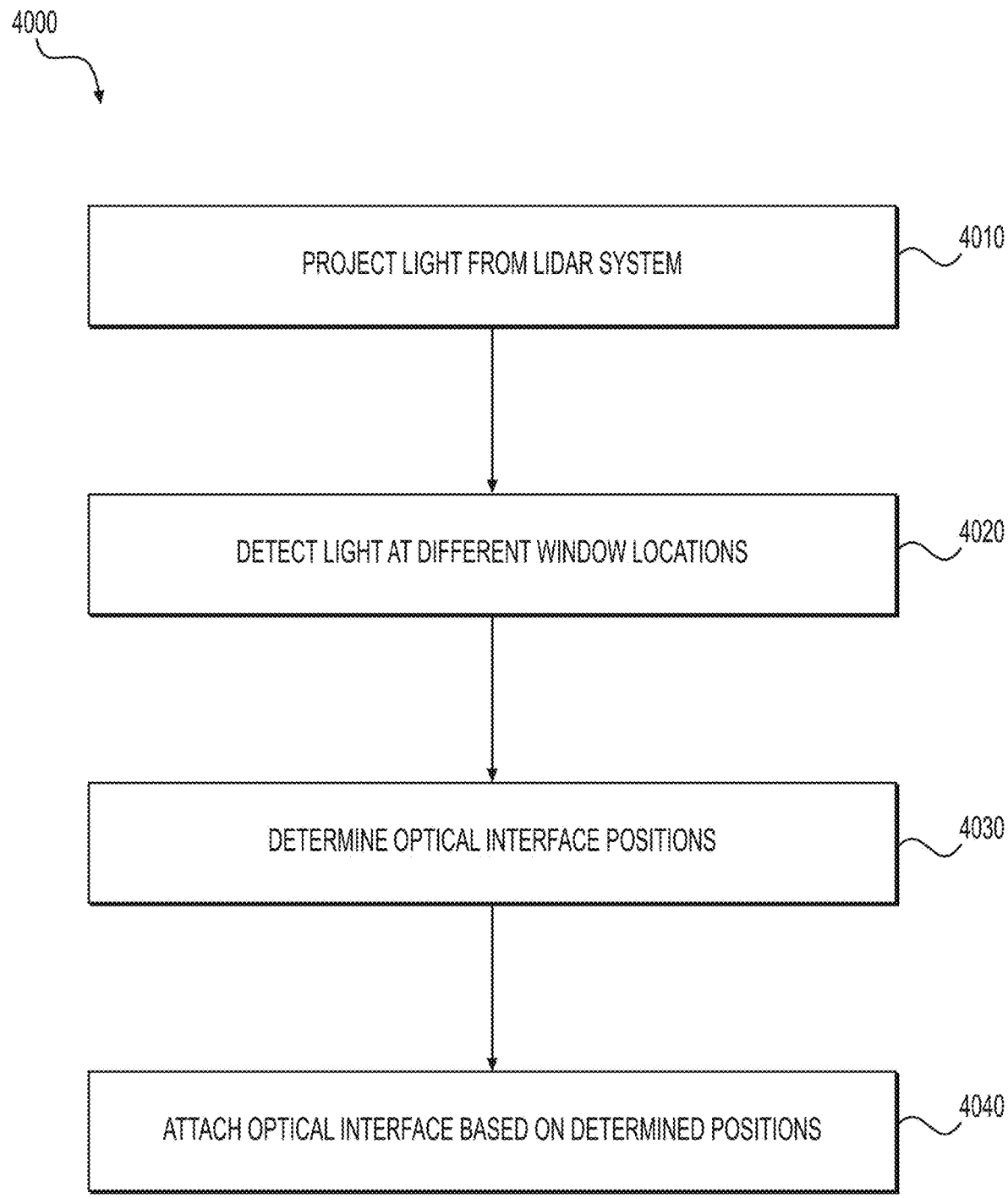
FIG. 40 illustrates an exemplary method of installing optical interfaces on a window of a vehicle equipped with a LIDAR system.

FIG. 40 is a flow chart, illustrating an exemplary method 4000 for installation of a LIDAR system and optical interface on a vehicle. In particular, method 4000 illustrates the steps for installing an optical interface on a vehicle, which is already equipped with a LIDAR system (e.g. LIDAR system 100). The order and arrangement of steps in method 4000 is provided for purposes of illustration. As will be appreciated from this disclosure, modifications may be made to process 4000 by, for example, adding, combining, removing, and/or rearranging one or more steps of process 4000

Method 4000 may include a step 4010 of projecting light from the one or more light sources (e.g. 112) of the LIDAR system installed in the vehicle. Projecting light may include operating one or more MEMS mirror assemblies (e.g. 1100) to project one or more light beams towards different portions of a windshield (e.g. window 3402) positioned in front of the LIDAR system. For example, one or more controllers (e.g. 118) associated with LIDAR system 100 may issue instructions to one or more actuators (e.g. 1112) of the one or more MEMS mirror assemblies to adjust the positions of one or more MEMS mirrors (e.g. 1102) such that light from a light source within LIDAR system 100 may be projected onto different portions of windshield 3402.

Method 4000 may include a step 4020 of detecting the light at different window locations. In some exemplary embodiments, this may be achieved by placing one or more sensors outside the vehicle, for example in a field of view in front of the windshield. In other exemplary embodiments, the LIDAR system within the vehicle may detect light received from the different locations of the windshield onto which light may be projected, for example, as in step 4010.

Method 4000 may include a step 4030 of determining the position or positions of one or more than one optical interfaces on the windshield based on the detected light. For example, as discussed above, the amount of transmitted light from a windshield is a function of the optical incidence angle of the light. Thus, one or more controllers (e.g. 118) associated with LIDAR system (e.g. 100) may determine an amount of light transmitted through the various window locations based on signals received by sensors external to the vehicle or based on the light detected by the LIDAR system. The one or more controllers associated with the LIDAR system may determine the positions on the windshield requiring placement of one or more optical interfaces to, for example increase an amount of transmitted light through that portion of the windshield, or, for example, to ensure that a predetermined amount of light projected by the LIDAR system is transmitted through the window. In some exemplary embodiments, the one or more controllers may also determine the optical characteristics of the one or more optical interfaces required to, for example increase the transmittance of light through the optical interfaces.

Method 4000 may also include a step 4040 of attaching one or more optical interfaces to the windshield. For example, in step 4040, one or more optical interfaces (e.g. 3410, 3430, 3450, 3470, etc.) may be positioned adjacent to or in contact with one or more of inner and/or outer surfaces 3403 or 3405 of window 3402 based on the positions of the optical interfaces determined, for example, in step 4030. After positioning the optical interfaces, steps 4010-4040 of method 4000 may be repeated to optimize the amount of light transmitted through window 3402.

It is contemplated that in some embodiments, the LIDAR system may be installed in a vehicle after installing the optical interfaces on a window of the vehicle. In these situations, it may be possible to adapt the calibration method 3900 discussed above to install the LIDAR system in the vehicle and calibrate the installed LIDAR system based on the already installed optical interfaces on the window of the vehicle. In one exemplary embodiment, steps 3920-3940 may be performed to calibrate LIDAR system (e.g. LIDAR system 100) after installing it in a vehicle that already includes one or more of optical interfaces 3410, 3430, 3450, and/or 3470 associated with a window 3402.

Several aspects of the disclosure were discussed above. It is noted that any feasible combination of features, aspects, characteristics, structures, etc. which were discussed above—for example, with respect to any one or more of the drawings—may be implemented as is considered as part of the disclosure. Some of those feasible combinations were not discussed in detail for reasons such as brevity and succinctness of the disclosure, but are nevertheless part of the disclosure, and would present themselves to a person who is of skill in the art in view of the above disclosure.

Figure 41A:
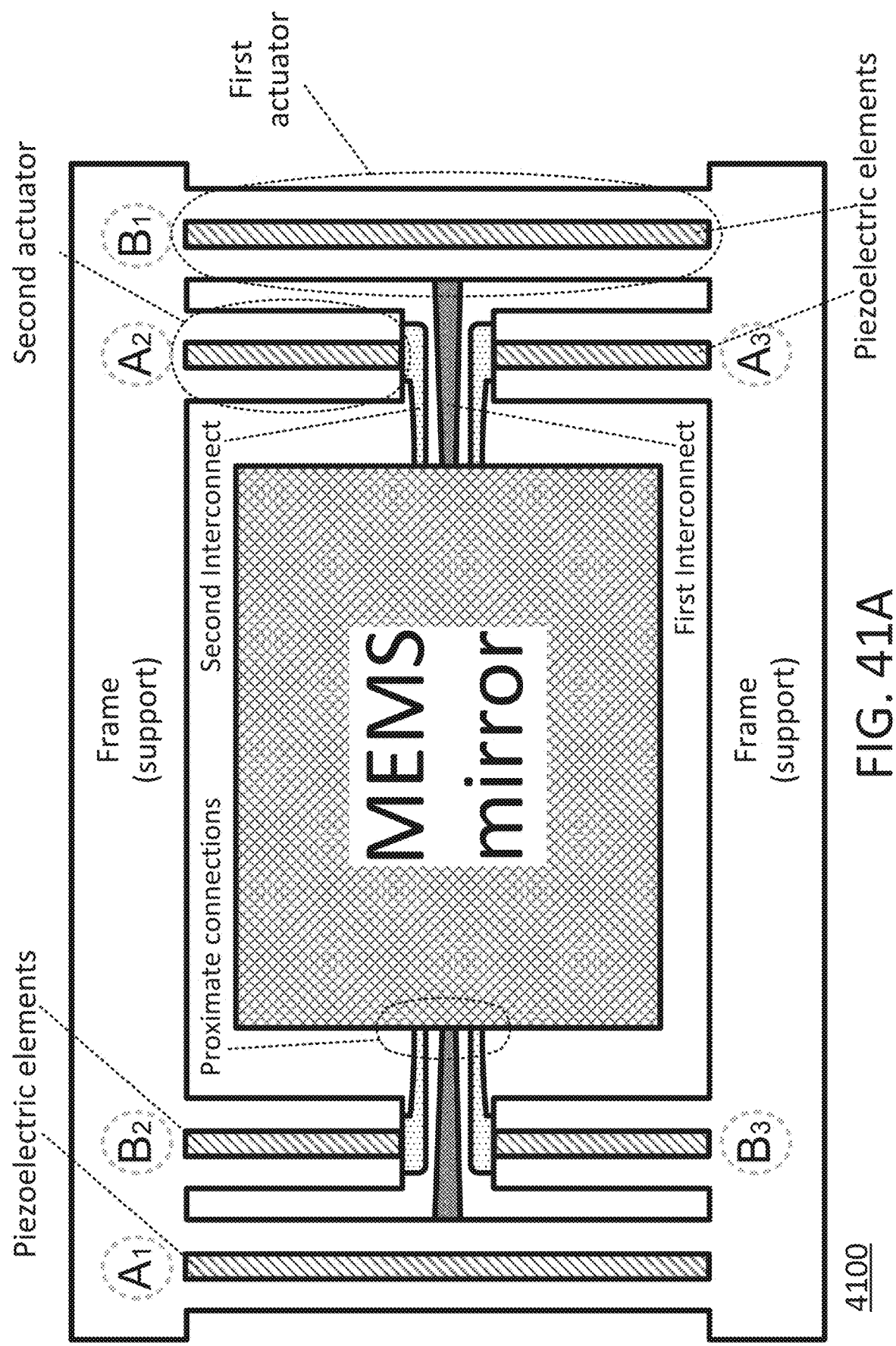
FIG. 41A illustrates a micro-electro-mechanical (MEMS) system, in accordance with examples of the presently disclosed subject matter.

FIG. 41A illustrates micro-electro-mechanical (MEMS) system 4100, in accordance with examples of the presently disclosed subject matter. MEMS system 4100 includes an active area (e.g. a MEMS mirror, as illustrated in the example of FIG. 41A) and a frame (also referred to as "support", e.g. in the above description). Possibly, the active area is completely spaced from the frame (any part of which can move from the plane of the frame) with the exception of a plurality of interconnects. The frame may include a continuous frame (e.g. as illustrated in FIGS. 11A and 11B) or a frame consisting of two or more separate parts (e.g. as optionally suggested by FIG. 41A).

MEMS system 4100 includes two type of actuators—at least one first actuator and at least one second actuator. The different types of actuators allows moving of the active area in different directions. This is enabled even if the piezoelectric material in both type of connectors is implemented in the same side of the wafer (e.g. top, as illustrated). Furthermore, the proposed structure allows to move the active area of the MEMS system in opposing directions (e.g. into and out of the surface of the diagram) using piezoelectric elements implemented on the same side of the wafer, while all piezoelectric elements are being used in pulling (contraction) mode, without necessitating any piezoelectric element to work in push (expansion) mode.

Each first actuator has a first end that is mechanically connected to the frame and a second end that is opposite to the first end and is mechanically connected to the active area by a first interconnect element. Each first actuator includes a first actuator-body (e.g. a Si layer, could be made from the same layer of Si as the frame), and a first piezoelectric element which is configured to bend the first actuator-body and move the active area at a first direction when subjected to a first electrical field. In the illustrated example, contracting the first piezoelectric element would pull the first actuator-body out of the surface of the diagram (toward the viewer).

Each second actuator has a third end, a middle part, and a fourth end that is opposite to the third end. The third end and the fourth end are mechanically connected to the frame. The middle part is mechanically connected to the active area by a second interconnect element. The second actuator includes a second actuator-body and a second piezoelectric element which is configured to bend the second actuator-body and move the active area at a second direction, opposite to the first direction, when subjected to a second electrical field. In the illustrated example, contracting the first piezoelectric element would push the second actuator-body further deeper than the surface of the diagram (away from the viewer). This may be the result of the piezoelectric material becoming shorter than the Si layer on which it is implemented, and therefore the Si is pushed, to allow the piezoelectric element to shrink.

It is noted that the different mechanisms of operations may require different rigidity of connections to the frame. For example, a connection to the frame at a first end may be the most rigid, and a connection to the frame at third ends and fourth ends may be more flexible. The interconnect elements themselves may also have different rigidity levels. For example, the second interconnect may be semi-rigid.

As aforementioned, all piezoelectric elements may be implemented on the same side of the silicon layer (or any other one or more layers from which the frame is made). For example, the first piezoelectric element may be positioned at a top part of the first actuator-body and the second piezoelectric element may be positioned at a top part of the second actuator-body.

As demonstrated in the example of FIG. 41A, two or more of the first actuators may be arraigned in pairs, so that the second ends of the first actuators are adjacent to each other. Those first ends may be positioned in proximity to the middle part of a neighboring second actuator. Generally, the first interconnect element and the second interconnect element may be connected to the active area next to each other (e.g. as exemplified in FIG. 41A).

Optionally, MEMS system 4100 may include a plurality of actuation assemblies which are connected to the active area at different sides, each actuation assembly including at least one first actuator and at least one second actuator. In the illustrated example there are two actuation assemblies (to the left and to the right of the MEMS mirror), each including a single second actuator and two first actuators. The connection points of all the actuators of an actuation assembly may be proximate to one another, e.g., as illustrated.

Optionally, MEMS system 4100 may include a first actuation assembly connected at a first side of the active area (e.g. the left actuation assembly of FIG. 41A) and a second actuation assembly connected at a second side of the active area, opposing the first side (e.g. the right actuation assembly of FIG. 41A). A first actuator of the first actuation assembly (e.g. actuator $B_2$) moves the active area at the first direction concurrent with a second actuator of the second actuation assembly (e.g. actuator $A_1$) moving the active area at the second direction. This may result, of course, in rotation of the active area (e.g. the MEMS mirror) about an axis of the other area (whether an actual axis or an imaginary rotation axis). It is noted that more than one actuator may be used for concurrently moving the active area in a given direction. In other times, different combinations of actuators may be used to move, rotate or translate the active area with respect to the frame.

Figure 41B:
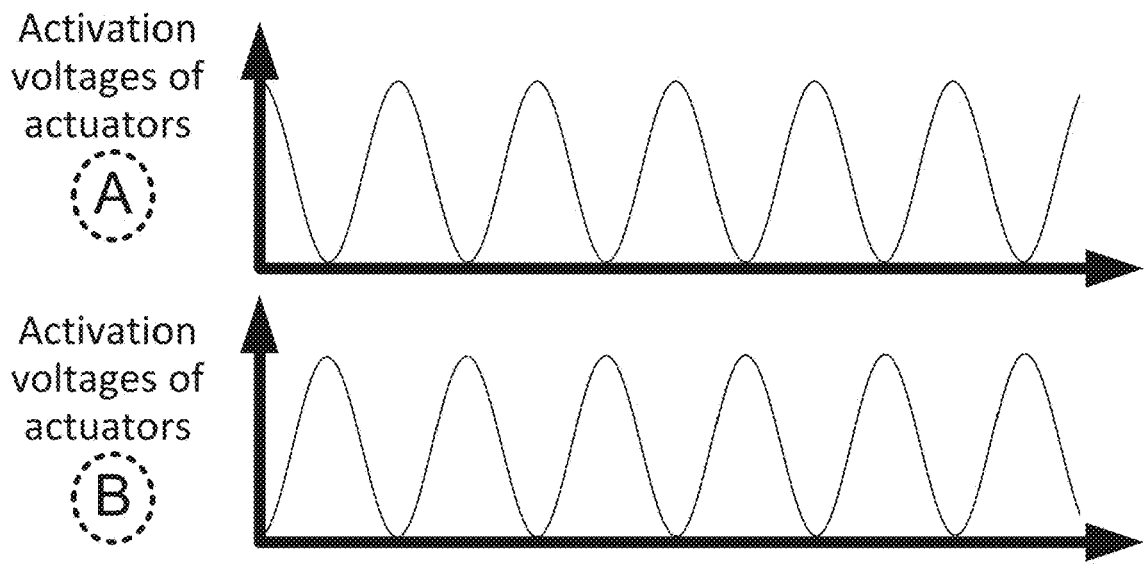
FIGS. 41B and 41C illustrate two example of optional actuation commands (e.g., voltages, biases, currents) for the different actuation assemblies located at different sides of the active area.
Figure 41C:
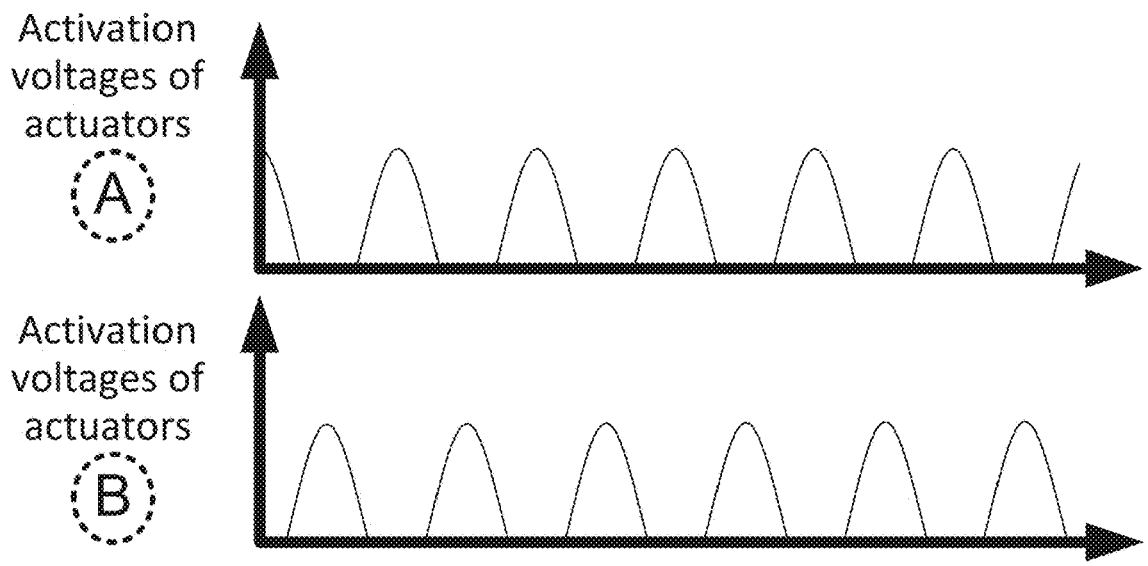

FIGS. 41B and 41C illustrate two example of optional actuation commands (e.g., voltages, biases, currents) for the different actuation assemblies located at different sides of the active area. As can be seen, actuator of different actuation assemblies may receive similar commands at the same time, while actuators of a single actuation assembly may receive opposing commands at the same time (because their actuation results of movement in opposing directions). Referring to the example of FIG. 41A, actuators $A_1$, $A_2$ and $A_3$ are collectively denoted "A" while actuators $B_1$, $B_2$ and $B_3$ are collectively denoted "B".

It is noted that more than two actuation assemblies may be used, for moving the active area with more than one degree of freedom, possibly in two or more axes. Optionally, the plurality of actuation assemblies may include at least: a first actuation assembly, a second actuation assembly, a third actuation assembly, and a fourth actuation assembly which are collectively configured to move the active area in two dimensional motion. Referring to the example of FIG. 41A, the third actuation assembly may be located on a top part of the diagram and the forth actuation assembly may be located at a bottom part of the diagram.

Obviously, MEMS system 4100 may be used for a LIDAR system, which further includes and a processor configured to process detection signals of light reflected by the MEMS mirror. For example, MEMS system 4100 may be implemented as the mirror assembly of LIDAR system 100. The LIDAR system which includes MEMS system 4100 may further include a controller configured to modify electrical fields applied to the at least one first actuator and to the at least one second actuator to move the MEMS mirror to scan a field of view of the LIDAR system.

Figure 41D:
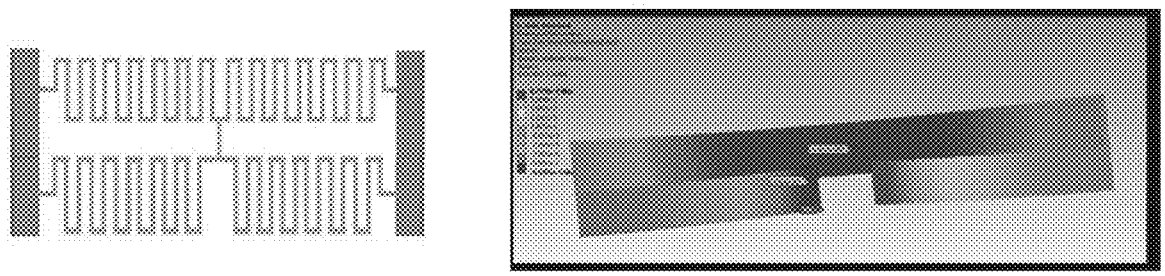
FIG. 41D illustrates a conceptual diagram in which the actuators are represented as springs, and a diagram of stresses applied to different parts of the actuators during movement of the active area, in accordance with examples of the presently disclosed subject matter.

FIG. 41D illustrates a conceptual diagram in which the actuators are represented as springs, and a diagram of stresses applied to different parts of the actuators during movement of the active area, in accordance with examples of the presently disclosed subject matter.

It is noted that the LIDAR system may include a plurality of the MEMS mirror of system 4100 (e.g., arranged in an array of mirrors), and a controller which is configured to move the plurality of MEMS mirrors (e.g., in a coordinated manner).

Figure 42A:
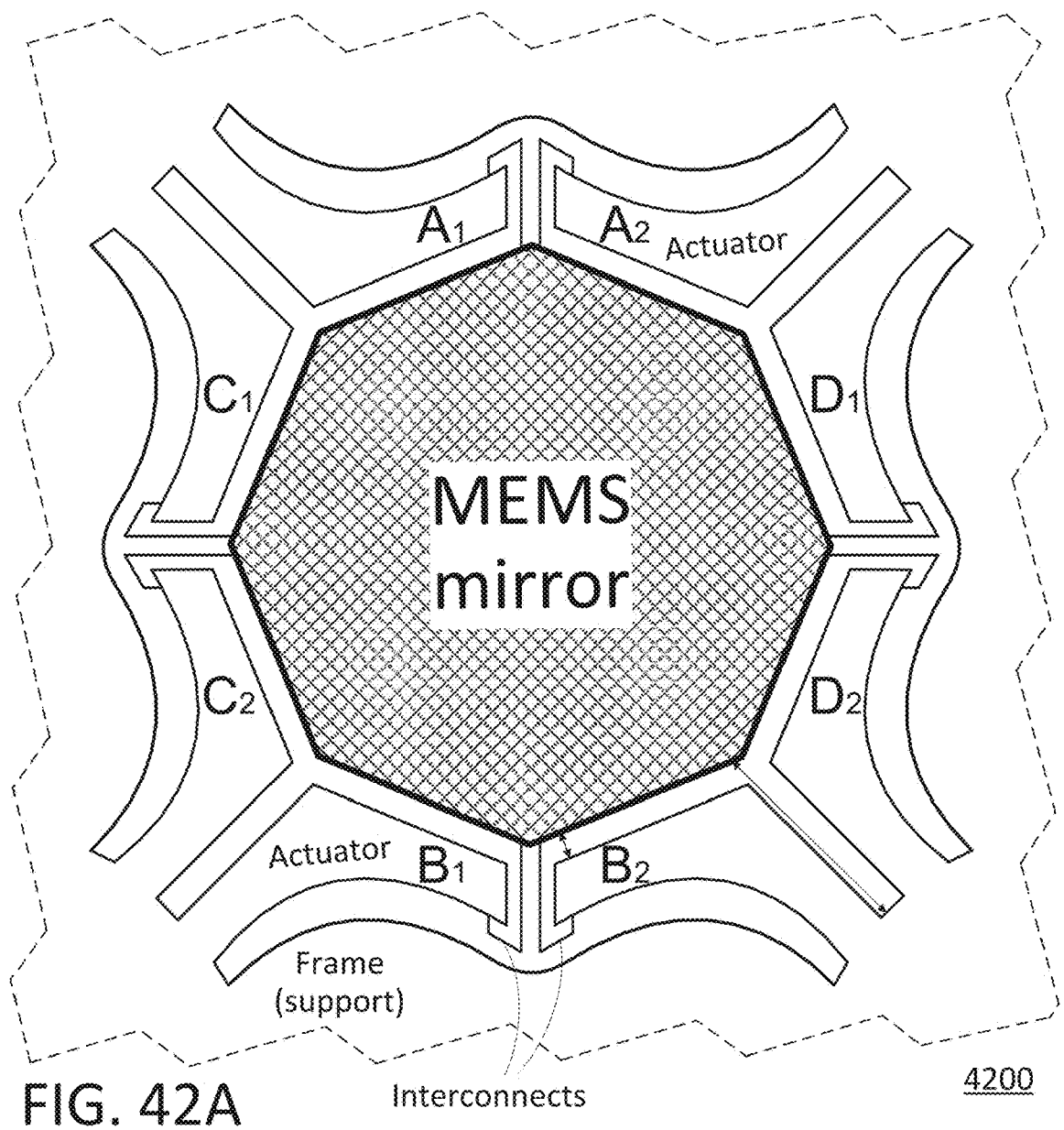
FIG. 42A illustrates a MEMS system, in accordance with examples of the presently disclosed subject matter.

FIG. 42A illustrates MEMS system 4200, in accordance with examples of the presently disclosed subject matter. MEMS system 4200 includes an active area (e.g. a MEMS mirror, as illustrated in the example of FIG. 42A) and a frame (also referred to as "support", e.g. in the above description). Possibly, the active area is completely spaced from the frame (any part of which can move from the plane of the frame) with the exception of a plurality of interconnects. The frame may include a continuous frame (e.g. as illustrated in FIG. 42A) or a frame consisting of two or more separate parts.

MEMS system 4200 further includes a plurality of actuator pairs, each pair including two paired actuators which are separately connected using separate interconnects to proximate locations of the active area. For example, in the diagram there are four actuator pairs—pair A (including actuators $A_1$ and $A_2$) positioned on a top part of the diagram; pair B (including actuators $B_1$ and $B_2$) positioned on a bottom part of the diagram; pair C (including actuators $C_1$ and $C_2$) positioned on a left part of the diagram; and pair D (including actuators $D_1$ and $D_2$) positioned on a right part of the diagram. In each pair, the actuator-ends to which the interconnects are connected may be directed toward each other (e.g., as illustrated in the diagram).

While different actuation methods may be used, such as electrostatic or electromagnetic actuation), optionally the actuators may be actuated by piezoelectric actuation. Optionally, each actuator may include a body (e.g., made of silicon) and a piezoelectric element. The piezoelectric element is configured to bend the body and move the active area when subjected to an electrical field. In system 4200, the piezoelectric elements of the paired actuators may be configured to bend the actuators at the same direction and move the active area when subjected to an electrical field.

Referring to system 4200 as a whole, the plurality of actuator pairs includes a first actuator pair (e.g. pair A) whose actuators are configured to rotate the active area about a first axis, and a second actuator pair (e.g. pair C) whose actuators are configured to rotate the active area about a second axis. It is noted that MEMS system 4200 may include more than one first actuator pairs configured to rotate the active area about the first axis (e.g. pairs A and B) and/or more than one second actuator pairs configured to rotate the active area about the second axis (e.g. pairs C and D). If more than one pair of actuators can rotate the active area about a given axis, these actuators may operate concurrently, partly concurrently, at alternating times, or according to any other timing scheme.

Figure 42B:
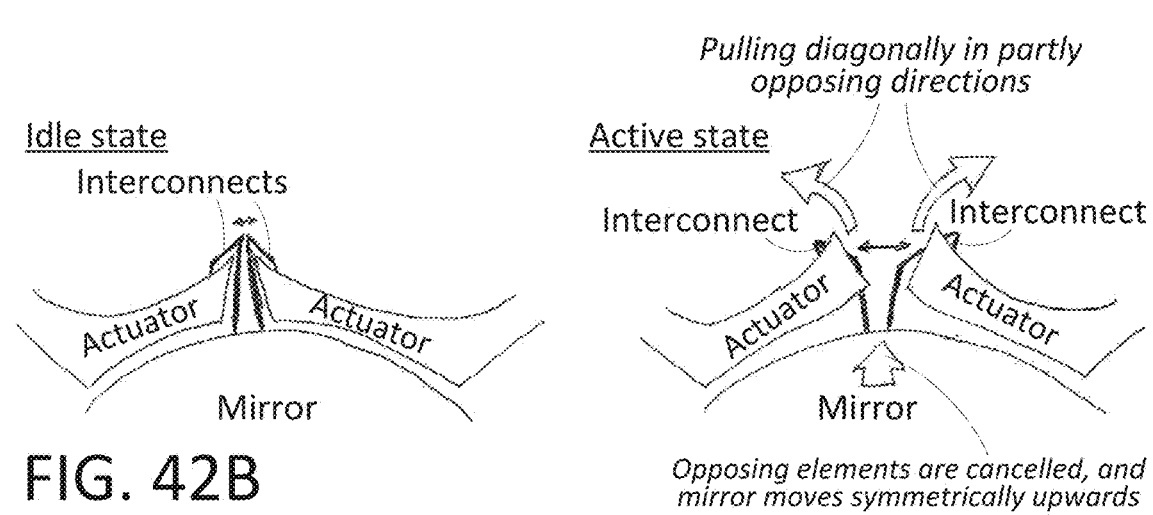
FIG. 42B illustrates two states during operation of a pair of actuators, in accordance with examples of the presently disclosed subject matter.

FIG. 42B illustrates two states during operation of a pair of actuators of system 4200, in accordance with examples of the presently disclosed subject matter. When the actuators of each pair move together in a synchronized fashion, movement perpendicular to the plane of the frame is induced by both of the actuators of the pair, while the structure of pairs of actuators causes movements in the plane of the frame to cancel each other out. Also, the structure of the actuators and the interconnects in each pair may provide sufficient resilience from effects of movement about other axes from moving the respective pair of actuators. E.g., the forces applied on the active area by the first pair of actuators may be controlled by the structure of the second pair of actuators, so as to limit the resulting movement of the actuators of the second pair.

Optionally, the second axis is substantially perpendicular to the first axis.

Optionally, the interconnects may be elongated so as to allow the paired actuators to move away from one another when extending from a plane of the frame.

Optionally, the interconnects may be connected to the actuators at a distanced side of the actuators, which is distanced from the active area (e.g., as illustrated in FIGS. 42A and 42B).

Optionally, movement of the first actuators pair substantially rotates the active area only about the first axis and movement of the second actuators pair substantially rotates the active area only about the second axis.

Optionally, the first actuators pair may be configured to rotate the active area about the first axis while the second actuators pair rotates the active area about the second axis.

Optionally, at least one of the actuators includes piezoelectric element deployed on a top part of the actuator, and at least another one of the actuators includes piezoelectric element deployed on a bottom part of the other actuator.

Optionally, the plurality of actuators may be curved opposite to a curvature of the active area (e.g., as illustrated in FIGS. 42A and 42B). Optionally, the plurality of actuators may be curved so that an end of each actuator which is connected to the frame is more distanced from an edge of the active area than another end of the actuator to which the interconnect is connected. The difference between the distances may be by a factor of at least three, by a factor of at least five, by a factor of at least ten. Such distances are illustrated in FIG. 42A next to actuator $B_2$.

The optional curving of the actuators in system 4200 may be used for condensing elongated actuators in a relatively small area of the MEMS system. The structure of symmetrically deployed actuators provide sufficient rigidity to the structure (and hence lower response to lower frequencies of vibration), that that the elongation of the actuators would not hamper the frequency-response of the system. The elongated structure of the actuators may be implemented in order to allow large amplitude of movements outside the plane of the frame. It is noted that the angle of the curve is sufficiently obtuse, so that the piezoelectric element of each actuator will not work against itself.

Obviously, MEMS system 4200 may be used for a LIDAR system, which further includes and a processor configured to process detection signals of light reflected by the MEMS mirror. For example, MEMS system 4200 may be implemented as the mirror assembly of LIDAR system 100. The LIDAR system which includes MEMS system 4200 may further include a controller configured to modify electrical fields applied to the at least actuator, to move the MEMS mirror to scan a field of view of the LIDAR system.

It is noted that the LIDAR system may include a plurality of the MEMS mirror of system 4200 (e.g., arranged in an array of mirrors), and a controller which is configured to move the plurality of MEMS mirrors (e.g., in a coordinated manner).

Actuations by synchronized pairs of actuators as described with respect to FIGS. 42A-42B may be used in different MEMS system, such as MEMS systems 4100 and 2600.

FIG. 43 illustrates MEMS system 4300, in accordance with examples of the presently disclosed subject matter. System 4300 includes a plurality of insulator layers, which are used for improving accuracies of the manufacturing process. The bottom part of MEMS system 4300 includes elements of differing heights. For example, reinforcement substructure (e.g. ribs) may be manufactured on the bottom side of the active area, to provide it with structural strength while keeping its weight relatively low. Such differing heights may be manufactured by etching, but the etching process may suffer from inaccuracies in both shape and depth, in differences between MEMS systems manufactured in the same process.

The proposed system includes two etch-stopper layers (e.g., Silicon oxide, other oxide or another insulator layer) which are used in two different etching steps.

A method for manufacturing a MEMS system is disclosed, the method including:

Obtaining a wafer which includes at least five different layers (e.g. including at least two separate etch-stopping layers such as discussed above) (e.g. including at least two layers of Silicon or other similar material); Etching parts of a first layer (e.g. bottom layer) of the wafer (e.g. using an oxide, or another etching material), wherein a first etch-stopping layer as a stopper for the etching process. For example, etching parts of Si layer 4311 using layer 4321 as a stopper for the etching process;

Etching, grinding or otherwise removing parts of the first etch-stopping layer (e.g., using another etching technique); and Etching parts of a second layer (e.g. bottom layer) of the wafer (e.g. using an oxide, or another etching material), wherein a second etch-stopping layer as a stopper for the etching process. For example, etching parts of Si layer 4312 using layer 4322 as a stopper for the etching process. The second etching process may implement a mask, for generating a substructure for the active area (e.g. MEMS mirror) of a MEMS system (e.g. MEMS system 4300).

The method may include other processing steps known in the art, such as coating (e.g. photo-resist coating), alignment, exposure and developing, dry etching, photo-resist removal, and so on. The method may include connecting (e.g. bonding) a portion of a glass wafer as a protective layer to the aforementioned multi-layered wafer. While not necessarily so, the connecting of the glass portion (or another transparent material) may be performed before the etching steps. The grass wafer may be processed (e.g. etched, grinded) to provide a hollowness in which the active area of the MEMS system may move.

Referring to all of the MEMS system discussed above, it is noted that all of the above systems may be implemented to include a plurality of active areas, which are actuated by respective actuators. Some actuators may be connected to more than one active area, but this is not necessarily so. A controller of any MEMS systems discussed above may be configured to actuate active areas (e.g.—mirrors) of such arrays of active areas in synchronized fashion.

It is further noted that while different aspects of MEMS systems were discussed above in subtitled portions of the disclosure for sake of simplicity of disclosure, any combination of characteristics of MEMS systems 4100, 2600, 4200, 1100 and 4300 (or of parts thereof, such as actuators, interconnects, active area, etc.) may be implemented, and is considered part of the presently disclosed subject matter. Some nonlimiting examples for such possible combinations were offered above.

Notably, in some diagrams the letters "PZT" were used to referred to one or more piezoelectric elements. It is noted that such piezoelectric elements may be made from Lead zirconate titanate (known as "PZT"), or from any other piezoelectric material.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A MEMS scanning device, comprising:
 a movable MEMS mirror configured to pivot about an axis;
 at least one actuator configured to cause pivoting of the movable MEMS mirror about the axis in a first direction;
 at least one spring configured to cause pivoting of the movable MEMS mirror about the axis in a second direction different from the first direction; and,
 wherein the at least one actuator includes:
  a first actuating arm;
  a second actuating arm; and
  a gap extending from a first surface of the first actuating arm to a second surface of the second actuating arm,
 wherein the first actuating arm and the second actuating arm lie adjacent each other and are configured to be actuated simultaneously to thereby enable exertion of a combined mechanical force on the movable MEMS mirror to pivot the movable MEMS mirror about the axis.

2. The MEMS scanning device of claim 1, wherein the axis is a first axis and wherein the at least one actuator includes a first actuator and a second actuator, the first actuator including the first actuating arm and the second actuating arm and the second actuator including a third actuating arm and a fourth actuating arm, the first actuating arm and the second actuating arm being configured to simultaneously act to pivot the movable MEMS mirror about the first axis and the third actuating arm and the fourth actuating arm being configured to simultaneously act to pivot the MEMS mirror about a second axis.

3. The MEMS scanning device of claim 1, wherein the first actuating arm and the second actuating arm are of different lengths.

4. The MEMS scanning device of claim 1, wherein the first actuating arm and the second actuating arm are of different widths.

5. The MEMS scanning device of claim 1, wherein the first actuating arm is shaped differently than the second actuating arm.

6. The MEMS scanning device of claim 1, wherein the first actuating arm and the second actuating arm are connected to the MEMS mirror by a single connector.

7. The MEMS scanning device of claim 1, wherein a connector connecting at least one of the first actuating arm and the second actuating arm to the movable MEMS mirror, the connector having an L shape.

8. The MEMS scanning device of claim 1, wherein a connector connecting at least one of the first actuating arm and the second actuating arm to the movable MEMS mirror, the connector having an S shape.

9. The MEMS scanning device of claim 1, wherein the first actuating arm is connected to the MEMS mirror via a first connector and the second actuating arm is connected to the MEMS mirror via a second connector.

10. The MEMS scanning device of claim 1, wherein
the first actuating arm and the second actuating arm are connected to each other by a connecting arm, and
the connecting arm is connected to the MEMS mirror via a connector.

11. The MEMS scanning device of claim 1, wherein each of the first actuating arm and the second actuating arm includes an outer side and an opposing inner side closer to the movable MEMS mirror than the outer side, wherein a first connector is connected to the opposing inner side of the first actuating arm and a second connector is connected to the outer side of the second actuating arm.

12. The MEMS scanning device of claim 1, wherein the gap includes a slit.

13. The MEMS scanning device of claim 10, wherein a width of the slit is less than 5% of an average width of the first actuating arm.

14. The MEMS scanning device of claim 1, wherein the gap is filled with stationary non-reflective material.

15. The MEMS scanning device of claim 1, wherein the moveable MEMS mirror is further configured to pivot about more than one axis.

16. The MEMS scanning device of claim 1, further comprising a contiguous frame, wherein the at least one actuator extends from the contiguous frame.

17. A LIDAR system, comprising:
a light source configured to project light for illuminating an object in an environment external to the LIDAR system;
a scanning unit configured to deflect light from the light source in order to scan at least part of the environment, the scanning unit including:
a movable MEMS mirror configured to pivot about an axis;
at least one actuator configured to cause pivoting of the movable MEMS mirror about the axis in a first direction; and
at least one spring configured to cause pivoting of the movable MEMS mirror about the axis in a second direction different from the first direction; and,
wherein the at least one actuator includes:
a first actuating arm;
a second actuating arm; and
a gap extending from a first surface of the first actuating arm to a second surface of the second actuating arm;
at least one sensor configured to detect reflections of the projected light; and
at least one processor configured to:
issue an instruction to the at least one actuator causing the actuator to deflect from an initial position; and
determine a distance between the vehicle and the object based on signals received from the at least one sensor.

18. The LIDAR system of claim 17, wherein the at least one processor is configured to issue a single instruction to actuate both the first actuating arm and the second actuating arm.

19. The LIDAR system of claim 17, wherein the instruction is a first instruction and the at least one processor is configured to:
issue the first instruction to the first actuating arm; and
issue a second instruction to the second actuating arm.

20. The LIDAR system of claim 19, wherein the at least one processor is configured to issue the first instruction and the second instruction simultaneously.

21. The LIDAR system of claim 19, wherein the at least one processor is configured to issue the second instruction after the first instruction.

* * * * *